United States Patent
Chen et al.

(10) Patent No.: US 11,977,411 B2
(45) Date of Patent: May 7, 2024

(54) METHODS AND SYSTEMS FOR ADDING RESPECTIVE COMPLICATIONS ON A USER INTERFACE

(71) Applicant: Apple Inc., Cupertino, CA (US)

(72) Inventors: Kevin Will Chen, Cupertino, CA (US); Taylor G. Carrigan, San Francisco, CA (US); Alan C. Dye, San Francisco, CA (US); Nicholas D. Felton, Sunnyvale, CA (US); Aled Hywel Williams, Llandeilo (GB); Christopher Wilson, Sonoma, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/717,275

(22) Filed: Apr. 11, 2022

(65) Prior Publication Data
US 2022/0236867 A1    Jul. 28, 2022

Related U.S. Application Data

(63) Continuation of application No. 16/401,934, filed on May 2, 2019, now Pat. No. 11,327,650.
(Continued)

(51) Int. Cl.
*G06F 1/16* (2006.01)
*G04G 9/00* (2006.01)
(Continued)

(52) U.S. Cl.
CPC .......... *G06F 1/163* (2013.01); *G04G 9/0064* (2013.01); *G06F 3/0484* (2013.01); *G06F 3/04847* (2013.01); *G06F 3/04886* (2013.01)

(58) Field of Classification Search
CPC ..... G04G 9/0064; G06F 1/163; G06F 3/0488; G06F 3/04817; G06F 3/04842; G06F 3/017; G06F 3/0416; G06F 9/451; G06F 3/0484
See application file for complete search history.

(56) References Cited

U.S. PATENT DOCUMENTS

| 872,200 A | 11/1907 | Rowe |
|---|---|---|
| 3,148,500 A | 9/1964 | Thomas |

(Continued)

FOREIGN PATENT DOCUMENTS

| AU | 2010249319 A1 | 6/2012 |
|---|---|---|
| AU | 2015101019 A4 | 9/2015 |

(Continued)

OTHER PUBLICATIONS

Applicant Initiated Interview Summary received for U.S. Appl. No. 17/746,807, dated Mar. 31, 2023, 2 pages.
(Continued)

*Primary Examiner* — Nicholas Ulrich
(74) *Attorney, Agent, or Firm* — DLA Piper LLP (US)

(57) ABSTRACT

The present disclosure generally relates to context-specific user interfaces. In some embodiments, methods are provided for displaying a watch user interface including a clock face and a user interface element at least partially surrounding the clock face. In some embodiments, methods are further provided for receiving a request to add a respective complication to a respective location on the clock face and, in response to receiving the request: in accordance with a determination that the respective complication is a first complication, displaying the first complication in the respective location and replacing at least a portion of the user interface element with content associated with the first complication; and in accordance with a determination that the respective complication is a second complication, dis-
(Continued)

playing the second complication in the respective location without replacing the portion of the user interface element with content associated with the second complication.

39 Claims, 66 Drawing Sheets

Related U.S. Application Data

(60) Provisional application No. 62/725,215, filed on Aug. 30, 2018, provisional application No. 62/679,941, filed on Jun. 3, 2018, provisional application No. 62/668,041, filed on May 7, 2018.

(51) Int. Cl.
  *G06F 3/0484* (2022.01)
  *G06F 3/04847* (2022.01)
  *G06F 3/04886* (2022.01)

(56) References Cited

U.S. PATENT DOCUMENTS

| | | |
|---|---|---|
| 3,633,354 A | 1/1972 | Stemmler |
| 4,205,628 A | 6/1980 | Null |
| 4,355,380 A | 10/1982 | Huguenin et al. |
| 4,597,674 A | 7/1986 | Thompson, III |
| 4,847,819 A | 7/1989 | Hong |
| 4,945,521 A | 7/1990 | Klaus |
| 5,124,959 A | 6/1992 | Yamazaki et al. |
| 5,208,790 A | 5/1993 | Sato et al. |
| 5,220,541 A | 6/1993 | Vuilleumier |
| 5,383,165 A | 1/1995 | Vaucher |
| 5,455,808 A | 10/1995 | Grupp et al. |
| 5,500,835 A | 3/1996 | Born |
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai et al. |
| 5,986,655 A | 11/1999 | Chiu et al. |
| 5,999,195 A | 12/1999 | Santangeli |
| 6,043,818 A | 3/2000 | Nakano et al. |
| 6,084,598 A | 7/2000 | Chekerylla |
| 6,128,012 A | 10/2000 | Seidensticker et al. |
| 6,160,767 A | 12/2000 | Ho |
| 6,279,018 B1 | 8/2001 | Kudrolli et al. |
| 6,297,795 B1 | 10/2001 | Kato et al. |
| 6,353,449 B1 | 3/2002 | Gregg et al. |
| 6,359,839 B1 | 3/2002 | Schenk et al. |
| 6,441,824 B2 | 8/2002 | Hertzfeld et al. |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,690,623 B1 | 2/2004 | Maano |
| 6,728,533 B2 | 4/2004 | Ishii et al. |
| 6,806,893 B1 | 10/2004 | Kolawa et al. |
| 6,809,724 B1 | 10/2004 | Shiraishi et al. |
| 6,871,076 B2 | 3/2005 | Samn et al. |
| 7,036,025 B2 | 4/2006 | Hunter |
| 7,113,809 B2 | 9/2006 | Noesgaard et al. |
| 7,203,380 B2 | 4/2007 | Chiu et al. |
| 7,257,254 B2 | 8/2007 | Tunney et al. |
| 7,302,650 B1 | 11/2007 | Allyn et al. |
| 7,378,954 B2 | 5/2008 | Wendt et al. |
| 7,479,949 B2 | 1/2009 | Jobs et al. |
| 7,515,509 B2 | 4/2009 | Klein et al. |
| 7,515,903 B1 | 4/2009 | Cast |
| 7,619,615 B1 | 11/2009 | Donoghue et al. |
| 7,637,204 B2 | 12/2009 | Sumser et al. |
| 7,716,057 B2 | 5/2010 | Horvitz |
| 7,751,285 B1 | 7/2010 | Cain et al. |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 8,041,968 B2 | 10/2011 | Tupman |
| 8,046,617 B2 | 10/2011 | Fleck et al. |
| 8,238,876 B2 | 8/2012 | Teng et al. |
| 8,245,143 B2 | 8/2012 | Yach et al. |
| 8,364,855 B2 | 1/2013 | James et al. |
| 8,405,663 B2 | 3/2013 | Wikkerink et al. |
| 8,462,997 B2 | 6/2013 | Soldan et al. |
| 8,595,649 B2 | 11/2013 | Sherrard et al. |
| 8,635,475 B2 | 1/2014 | Lin et al. |
| 8,725,842 B1 | 5/2014 | Al-Nasser |
| 8,768,648 B2 | 7/2014 | Panther et al. |
| 8,775,844 B1 | 7/2014 | Peterson |
| 8,847,903 B2 | 9/2014 | Stokes et al. |
| 8,854,925 B1 | 10/2014 | Lee et al. |
| 8,924,894 B1 | 12/2014 | Yaksick et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,171,268 B1 | 10/2015 | Penilla et al. |
| 9,173,052 B2 | 10/2015 | Hauser et al. |
| 9,197,738 B2 | 11/2015 | Peev et al. |
| 9,237,855 B2 | 1/2016 | Hong et al. |
| 9,239,605 B1 | 1/2016 | Nanda et al. |
| 9,259,615 B2 | 2/2016 | Weast et al. |
| 9,292,310 B2 | 3/2016 | Chaudhri et al. |
| 9,369,537 B1 | 6/2016 | Mathew et al. |
| 9,377,762 B2 | 6/2016 | Hoobler et al. |
| 9,436,269 B2 | 9/2016 | Yang |
| 9,448,685 B1 | 9/2016 | Somin et al. |
| 9,459,781 B2 | 10/2016 | Kocienda et al. |
| 9,542,070 B2 | 1/2017 | Xu et al. |
| 9,547,425 B2 | 1/2017 | Kocienda et al. |
| 9,557,806 B2 | 1/2017 | Väyrynen |
| 9,568,891 B2 | 2/2017 | Adams et al. |
| 9,582,165 B2 | 2/2017 | Wilson et al. |
| 9,594,354 B1 | 3/2017 | Kahn et al. |
| 9,600,178 B2 | 3/2017 | Yun et al. |
| 9,606,695 B2 | 3/2017 | Matas |
| 9,625,987 B1 | 4/2017 | Lapenna et al. |
| 9,753,436 B2 | 9/2017 | Ely et al. |
| 9,756,172 B2 | 9/2017 | Piemonte et al. |
| 9,794,397 B2 | 10/2017 | Min et al. |
| 9,939,872 B2 | 4/2018 | Graham et al. |
| 10,019,599 B1 | 7/2018 | Moran et al. |
| 10,062,133 B1 | 8/2018 | Mishra et al. |
| 10,268,432 B2 | 4/2019 | Kyung |
| 10,282,078 B2 | 5/2019 | Choi |
| 10,304,347 B2 | 5/2019 | Wilson et al. |
| 10,317,977 B2 | 6/2019 | Yang |
| 10,356,070 B2 | 7/2019 | Cha et al. |
| 10,459,887 B1 | 10/2019 | Dvortsov et al. |
| 10,489,508 B2 | 11/2019 | Zhai et al. |
| 10,620,590 B1 | 4/2020 | Guzman et al. |
| 10,643,246 B1 | 5/2020 | Suprasadachandran Pillai |
| 10,684,592 B2 | 6/2020 | Chang et al. |
| 10,721,711 B2 | 7/2020 | Kirov et al. |
| 10,761,702 B2 | 9/2020 | Block et al. |
| 10,788,797 B1 | 9/2020 | Guzman et al. |
| 10,807,005 B2 | 10/2020 | Dugan et al. |
| 10,817,981 B1 | 10/2020 | Belkin |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,009,833 B2 | 5/2021 | Essery |
| 11,023,090 B2 | 6/2021 | Xu et al. |

(56) References Cited

U.S. PATENT DOCUMENTS

| | | |
|---|---|---|
| 11,050,873 B2 | 6/2021 | Kim et al. |
| 11,061,372 B1 | 7/2021 | Chen et al. |
| 11,435,887 B1 | 9/2022 | Mirho et al. |
| 2002/0054066 A1 | 5/2002 | Kikinis et al. |
| 2002/0054157 A1 | 5/2002 | Hayashi et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0099452 A1 | 7/2002 | Kawai |
| 2002/0131331 A1 | 9/2002 | Molander et al. |
| 2003/0002391 A1 | 1/2003 | Biggs et al. |
| 2003/0027621 A1 | 2/2003 | Libby et al. |
| 2003/0067497 A1 | 4/2003 | Pichon et al. |
| 2003/0107603 A1 | 6/2003 | Clapper |
| 2003/0135769 A1 | 7/2003 | Loughran |
| 2003/0140309 A1 | 7/2003 | Saito et al. |
| 2003/0164847 A1 | 9/2003 | Zaima et al. |
| 2003/0169306 A1 | 9/2003 | Makipaa et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0047244 A1 | 3/2004 | Iino et al. |
| 2004/0066710 A1 | 4/2004 | Yuen et al. |
| 2004/0075699 A1 | 4/2004 | Franchi et al. |
| 2004/0075700 A1 | 4/2004 | Liu et al. |
| 2004/0083474 A1 | 4/2004 | Mckinlay et al. |
| 2004/0168107 A1 | 8/2004 | Sharp et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear et al. |
| 2005/0122543 A1 | 6/2005 | Walker |
| 2005/0124389 A1 | 6/2005 | Yang |
| 2005/0139852 A1 | 6/2005 | Chen et al. |
| 2005/0156873 A1 | 7/2005 | Walter et al. |
| 2005/0188856 A1 | 9/2005 | Sumser et al. |
| 2005/0190653 A1 | 9/2005 | Chen |
| 2005/0195173 A1 | 9/2005 | Mckay |
| 2005/0198319 A1 | 9/2005 | Chan et al. |
| 2005/0200611 A1 | 9/2005 | Goto et al. |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0020904 A1 | 1/2006 | Aaltonen et al. |
| 2006/0035628 A1 | 2/2006 | Miller et al. |
| 2006/0085765 A1 | 4/2006 | Peterson et al. |
| 2006/0087502 A1 | 4/2006 | Karidis et al. |
| 2006/0092770 A1 | 5/2006 | Demas |
| 2006/0123362 A1 | 6/2006 | Keely |
| 2006/0166708 A1 | 7/2006 | Kim et al. |
| 2006/0214935 A1 | 9/2006 | Boyd et al. |
| 2006/0239640 A1 | 10/2006 | Watanabe et al. |
| 2006/0277469 A1 | 12/2006 | Chaudhri et al. |
| 2007/0004451 A1 | 1/2007 | C. Anderson |
| 2007/0006096 A1 | 1/2007 | Kim et al. |
| 2007/0021153 A1 | 1/2007 | Novak |
| 2007/0052851 A1 | 3/2007 | Ochs et al. |
| 2007/0055947 A1 | 3/2007 | Ostojic et al. |
| 2007/0057775 A1 | 3/2007 | O'reilly et al. |
| 2007/0094330 A1 | 4/2007 | Russell et al. |
| 2007/0101279 A1 | 5/2007 | Chaudhri et al. |
| 2007/0113181 A1 | 5/2007 | Blattner et al. |
| 2007/0146344 A1 | 6/2007 | Martin et al. |
| 2007/0192718 A1 | 8/2007 | Voorhees et al. |
| 2007/0211042 A1 | 9/2007 | Kim et al. |
| 2007/0213955 A1 | 9/2007 | Ishida et al. |
| 2007/0226653 A1 | 9/2007 | Moore et al. |
| 2007/0236475 A1 | 10/2007 | Wherry |
| 2007/0239754 A1 | 10/2007 | Schnitman et al. |
| 2007/0250772 A1 | 10/2007 | Milosevski |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0005599 A1 | 1/2008 | Theocharous et al. |
| 2008/0071885 A1 | 3/2008 | Hardy et al. |
| 2008/0082930 A1 | 4/2008 | Omernick et al. |
| 2008/0095470 A1 | 4/2008 | Chao et al. |
| 2008/0098031 A1 | 4/2008 | Ducharme |
| 2008/0127268 A1 | 5/2008 | Bergeron et al. |
| 2008/0130421 A1 | 6/2008 | Akaiwa et al. |
| 2008/0143729 A1 | 6/2008 | Wyatt et al. |
| 2008/0150959 A1 | 6/2008 | Marui et al. |
| 2008/0151700 A1 | 6/2008 | Inoue et al. |
| 2008/0167834 A1 | 7/2008 | Herz et al. |
| 2008/0168396 A1 | 7/2008 | Matas et al. |
| 2008/0174606 A1 | 7/2008 | Rengarajan et al. |
| 2008/0186808 A1 | 8/2008 | Lee |
| 2008/0192021 A1 | 8/2008 | Lim et al. |
| 2008/0195961 A1 | 8/2008 | Bae et al. |
| 2008/0201438 A1 | 8/2008 | Mandre et al. |
| 2008/0201647 A1 | 8/2008 | Lagerstedt et al. |
| 2008/0215240 A1 | 9/2008 | Howard et al. |
| 2008/0246778 A1 | 10/2008 | Ham et al. |
| 2008/0247519 A1 | 10/2008 | Abella et al. |
| 2008/0270934 A1 | 10/2008 | Firebaugh et al. |
| 2009/0005882 A1 | 1/2009 | Boyer et al. |
| 2009/0012988 A1 | 1/2009 | Brown |
| 2009/0016168 A1 | 1/2009 | Smith |
| 2009/0016492 A1 | 1/2009 | Tsuchiya |
| 2009/0017800 A1 | 1/2009 | Middleton |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0068984 A1 | 3/2009 | Burnett |
| 2009/0070675 A1 | 3/2009 | Li |
| 2009/0077497 A1 | 3/2009 | Cho et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0198581 A1 | 8/2009 | Lidestri |
| 2009/0199130 A1 | 8/2009 | Tsern et al. |
| 2009/0249247 A1 | 10/2009 | Tseng et al. |
| 2009/0259958 A1 | 10/2009 | Ban |
| 2009/0262088 A1 | 10/2009 | Moll-carrillo et al. |
| 2009/0264116 A1 | 10/2009 | Thompson et al. |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0300598 A1 | 12/2009 | Choi |
| 2009/0305732 A1 | 12/2009 | Marcellino et al. |
| 2009/0312059 A1 | 12/2009 | Pratt et al. |
| 2009/0319467 A1 | 12/2009 | Berg et al. |
| 2009/0327886 A1 | 12/2009 | Whytock et al. |
| 2010/0015774 A1 | 1/2010 | Shimamune et al. |
| 2010/0016771 A1 | 1/2010 | Jardine et al. |
| 2010/0026640 A1 | 2/2010 | Kim et al. |
| 2010/0060586 A1 | 3/2010 | Pisula et al. |
| 2010/0062905 A1 | 3/2010 | Rottler et al. |
| 2010/0064255 A1 | 3/2010 | Rottler et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0088597 A1 | 4/2010 | Shin et al. |
| 2010/0100841 A1 | 4/2010 | Shin et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0146463 A1 | 6/2010 | Cho et al. |
| 2010/0149573 A1 | 6/2010 | Pat et al. |
| 2010/0156833 A1 | 6/2010 | Kim et al. |

(56) References Cited

U.S. PATENT DOCUMENTS

| | | |
|---|---|---|
| 2010/0157742 A1* | 6/2010 | Relyea .................. G04G 11/00 715/833 |
| 2010/0167712 A1 | 7/2010 | Stallings et al. |
| 2010/0205563 A1 | 8/2010 | Haapsaari et al. |
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0248688 A1 | 9/2010 | Teng et al. |
| 2010/0257469 A1 | 10/2010 | Kim et al. |
| 2010/0281374 A1 | 11/2010 | Schulz et al. |
| 2010/0289723 A1 | 11/2010 | London |
| 2010/0309149 A1 | 12/2010 | Blumenberg et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0022294 A1 | 1/2011 | Apley |
| 2011/0025719 A1 | 2/2011 | Yanase et al. |
| 2011/0029870 A1 | 2/2011 | May et al. |
| 2011/0047014 A1 | 2/2011 | De Angelo |
| 2011/0061010 A1 | 3/2011 | Wasko et al. |
| 2011/0070924 A1 | 3/2011 | Kim et al. |
| 2011/0071818 A1 | 3/2011 | Jiang |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0115721 A1 | 5/2011 | Li et al. |
| 2011/0119610 A1 | 5/2011 | Hackborn et al. |
| 2011/0138329 A1 | 6/2011 | Wells et al. |
| 2011/0151415 A1 | 6/2011 | Darling et al. |
| 2011/0157046 A1 | 6/2011 | Lee et al. |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202834 A1 | 8/2011 | Mandryk et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0230986 A1 | 9/2011 | Lafortune et al. |
| 2011/0234152 A1 | 9/2011 | Frossen et al. |
| 2011/0237221 A1 | 9/2011 | Prakash et al. |
| 2011/0248992 A1 | 10/2011 | Van et al. |
| 2011/0256848 A1 | 10/2011 | Bok et al. |
| 2011/0261079 A1 | 10/2011 | Ingrassia et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0013552 A1 | 1/2012 | Ahn |
| 2012/0017180 A1 | 1/2012 | Flik et al. |
| 2012/0028707 A1 | 2/2012 | Raitt et al. |
| 2012/0036220 A1 | 2/2012 | Dare et al. |
| 2012/0047447 A1 | 2/2012 | Haq |
| 2012/0059787 A1 | 3/2012 | Brown et al. |
| 2012/0062470 A1 | 3/2012 | Chang et al. |
| 2012/0077554 A1 | 3/2012 | Ahn et al. |
| 2012/0079375 A1 | 3/2012 | Ogino et al. |
| 2012/0084729 A1 | 4/2012 | Lin et al. |
| 2012/0092383 A1 | 4/2012 | Hysek et al. |
| 2012/0110438 A1 | 5/2012 | Peraza et al. |
| 2012/0113762 A1 | 5/2012 | Frost |
| 2012/0116550 A1 | 5/2012 | Hoffman et al. |
| 2012/0117507 A1 | 5/2012 | Tseng et al. |
| 2012/0124499 A1 | 5/2012 | Tsai et al. |
| 2012/0150327 A1 | 6/2012 | Altman et al. |
| 2012/0154156 A1 | 6/2012 | Kuntzel |
| 2012/0182226 A1 | 7/2012 | Tuli |
| 2012/0197523 A1 | 8/2012 | Kirsch |
| 2012/0210263 A1 | 8/2012 | Perry et al. |
| 2012/0212495 A1 | 8/2012 | Butcher et al. |
| 2012/0218201 A1 | 8/2012 | Tamas et al. |
| 2012/0231849 A1 | 9/2012 | Yamashita et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0320081 A1 | 12/2012 | Kim et al. |
| 2012/0323933 A1 | 12/2012 | He et al. |
| 2012/0324390 A1 | 12/2012 | Tao et al. |
| 2013/0007665 A1 | 1/2013 | Chaudhri et al. |
| 2013/0019175 A1 | 1/2013 | Kotler et al. |
| 2013/0021236 A1 | 1/2013 | Bender et al. |
| 2013/0030892 A1 | 1/2013 | Liu et al. |
| 2013/0044072 A1 | 2/2013 | Kobayashi et al. |
| 2013/0044080 A1 | 2/2013 | Chiang |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |
| 2013/0111550 A1 | 5/2013 | Naveh et al. |
| 2013/0111579 A1 | 5/2013 | Newman et al. |
| 2013/0116967 A1 | 5/2013 | Akcasu et al. |
| 2013/0121119 A1 | 5/2013 | Umamoto |
| 2013/0132888 A1 | 5/2013 | Tijssen |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0157646 A1 | 6/2013 | Ferren et al. |
| 2013/0170324 A1 | 7/2013 | Tu et al. |
| 2013/0185813 A1 | 7/2013 | Shim et al. |
| 2013/0191785 A1 | 7/2013 | Wu et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0225152 A1 | 8/2013 | Matthews et al. |
| 2013/0232443 A1 | 9/2013 | Ryu et al. |
| 2013/0234964 A1 | 9/2013 | Kim et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326418 A1 | 12/2013 | Utsuki et al. |
| 2013/0332721 A1 | 12/2013 | Chaudhri et al. |
| 2013/0332856 A1 | 12/2013 | Sanders et al. |
| 2013/0345978 A1 | 12/2013 | Lush et al. |
| 2013/0345980 A1 | 12/2013 | Van Os et al. |
| 2014/0013414 A1 | 1/2014 | Bruck et al. |
| 2014/0013945 A1 | 1/2014 | Tanaka et al. |
| 2014/0022183 A1 | 1/2014 | Ayoub et al. |
| 2014/0037109 A1 | 2/2014 | Ban |
| 2014/0043367 A1 | 2/2014 | Sakaino et al. |
| 2014/0047389 A1 | 2/2014 | Aarabi |
| 2014/0047525 A1 | 2/2014 | Bonhoff |
| 2014/0055495 A1 | 2/2014 | Kim et al. |
| 2014/0059493 A1 | 2/2014 | Kim |
| 2014/0063049 A1 | 3/2014 | Armstrong-muntner |
| 2014/0068755 A1 | 3/2014 | King et al. |
| 2014/0074570 A1 | 3/2014 | Hope et al. |

(56) References Cited

U.S. PATENT DOCUMENTS

| | | |
|---|---|---|
| 2014/0080465 A1 | 3/2014 | Cho |
| 2014/0082533 A1 | 3/2014 | Kelley et al. |
| 2014/0086123 A1 | 3/2014 | Deivasigamani et al. |
| 2014/0094224 A1 | 4/2014 | Lozovoy et al. |
| 2014/0101169 A1 | 4/2014 | Kurata et al. |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0139454 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0171132 A1 | 6/2014 | Ziemianska et al. |
| 2014/0173439 A1 | 6/2014 | Gutierrez et al. |
| 2014/0179272 A1 | 6/2014 | Zhang et al. |
| 2014/0189578 A1 | 7/2014 | Shuttleworth et al. |
| 2014/0189584 A1 | 7/2014 | Weng et al. |
| 2014/0195476 A1 | 7/2014 | Sxhmidt |
| 2014/0200691 A1 | 7/2014 | Lee et al. |
| 2014/0201655 A1 | 7/2014 | Mahaffey et al. |
| 2014/0210708 A1 | 7/2014 | Simmons et al. |
| 2014/0210801 A1 | 7/2014 | Li |
| 2014/0229752 A1 | 8/2014 | Lee et al. |
| 2014/0244009 A1 | 8/2014 | Mestas |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282103 A1 | 9/2014 | Jerry |
| 2014/0282153 A1 | 9/2014 | Christiansen et al. |
| 2014/0282207 A1 | 9/2014 | Wouhaybi et al. |
| 2014/0282254 A1 | 9/2014 | Feiereisen et al. |
| 2014/0289660 A1 | 9/2014 | Min |
| 2014/0293755 A1 | 10/2014 | Geiser et al. |
| 2014/0302834 A1 | 10/2014 | Jones |
| 2014/0304664 A1 | 10/2014 | Lee et al. |
| 2014/0310350 A1 | 10/2014 | Borggaard et al. |
| 2014/0310618 A1 | 10/2014 | Venkatesh |
| 2014/0310643 A1 | 10/2014 | Karmanenko et al. |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0342792 A1 | 11/2014 | Markus |
| 2014/0344723 A1 | 11/2014 | Malik et al. |
| 2014/0344820 A1 | 11/2014 | Kumar |
| 2014/0344951 A1 | 11/2014 | Brewer |
| 2014/0347275 A1 | 11/2014 | Jung et al. |
| 2014/0359124 A1 | 12/2014 | Adimatyam et al. |
| 2014/0359477 A1 | 12/2014 | Chen |
| 2014/0362105 A1 | 12/2014 | Kocienda et al. |
| 2014/0371887 A1 | 12/2014 | Hoffman et al. |
| 2014/0380229 A1 | 12/2014 | Volodin et al. |
| 2015/0011204 A1 | 1/2015 | Seo et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0026615 A1 | 1/2015 | Choi et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0049033 A1 | 2/2015 | Kim et al. |
| 2015/0052461 A1 | 2/2015 | Sullivan et al. |
| 2015/0055197 A1 | 2/2015 | Romanoff et al. |
| 2015/0058651 A1 | 2/2015 | Choi et al. |
| 2015/0061988 A1 | 3/2015 | Galu, Jr. |
| 2015/0062052 A1 | 3/2015 | Bernstein et al. |
| 2015/0062130 A1 | 3/2015 | Ho |
| 2015/0067596 A1 | 3/2015 | Brown et al. |
| 2015/0070378 A1 | 3/2015 | Kriese et al. |
| 2015/0071043 A1 | 3/2015 | Kubota |
| 2015/0081474 A1 | 3/2015 | Kostka et al. |
| 2015/0082193 A1 | 3/2015 | Wallace et al. |
| 2015/0082446 A1 | 3/2015 | Flowers et al. |
| 2015/0083970 A1 | 3/2015 | Koh et al. |
| 2015/0100621 A1 | 4/2015 | Pan |
| 2015/0105125 A1 | 4/2015 | Min et al. |
| 2015/0106221 A1 | 4/2015 | Tapley et al. |
| 2015/0106752 A1 | 4/2015 | Yang |
| 2015/0111558 A1 | 4/2015 | Yang |
| 2015/0112700 A1 | 4/2015 | Sublett et al. |
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0128042 A1 | 5/2015 | Churchill et al. |
| 2015/0128078 A1 | 5/2015 | Oh et al. |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0163210 A1 | 6/2015 | Meyers et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |
| 2015/0217163 A1 | 8/2015 | Amis et al. |
| 2015/0220265 A1 | 8/2015 | Takahashi |
| 2015/0220299 A1 | 8/2015 | Kim et al. |
| 2015/0228048 A1 | 8/2015 | Heo et al. |
| 2015/0248235 A1 | 9/2015 | Offenberg et al. |
| 2015/0253736 A1 | 9/2015 | Watterson |
| 2015/0253740 A1 | 9/2015 | Nishijima et al. |
| 2015/0254875 A1 | 9/2015 | Zhang |
| 2015/0261284 A1 | 9/2015 | Lee et al. |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0317945 A1 | 11/2015 | Andress et al. |
| 2015/0339261 A1 | 11/2015 | Jha et al. |
| 2015/0346694 A1 | 12/2015 | Hoobler et al. |
| 2015/0346824 A1 | 12/2015 | Chen et al. |
| 2015/0355830 A1 | 12/2015 | Chaudhri et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0378592 A1 | 12/2015 | Kim |
| 2015/0379476 A1 | 12/2015 | Chaudhri et al. |
| 2016/0004393 A1 | 1/2016 | Faaborg et al. |
| 2016/0022202 A1 | 1/2016 | Peterson et al. |
| 2016/0027420 A1 | 1/2016 | Eronen |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0044091 A1 | 2/2016 | Doumet |
| 2016/0044442 A1 | 2/2016 | Pacelli et al. |
| 2016/0048161 A1 | 2/2016 | Carceroni et al. |
| 2016/0048283 A1 | 2/2016 | Yang et al. |
| 2016/0049106 A1 | 2/2016 | Connell et al. |
| 2016/0054710 A1 | 2/2016 | Jo et al. |
| 2016/0054892 A1 | 2/2016 | Kim et al. |
| 2016/0058336 A1 | 3/2016 | Blahnik et al. |
| 2016/0058337 A1 | 3/2016 | Blahnik et al. |
| 2016/0062450 A1 | 3/2016 | Han et al. |
| 2016/0062540 A1 | 3/2016 | Yang et al. |
| 2016/0062570 A1 | 3/2016 | Dascola et al. |
| 2016/0062572 A1 | 3/2016 | Yang et al. |

(56) References Cited

U.S. PATENT DOCUMENTS

| | | |
|---|---|---|
| 2016/0062589 A1 | 3/2016 | Wan et al. |
| 2016/0062630 A1 | 3/2016 | Anzures et al. |
| 2016/0073034 A1 | 3/2016 | Mukherjee et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0103427 A1 | 4/2016 | Westra et al. |
| 2016/0134840 A1 | 5/2016 | Mcculloch |
| 2016/0142763 A1 | 5/2016 | Kim et al. |
| 2016/0165037 A1 | 6/2016 | Youn et al. |
| 2016/0165038 A1 | 6/2016 | Lim et al. |
| 2016/0170731 A1 | 6/2016 | Maddern et al. |
| 2016/0179353 A1 | 6/2016 | Iskander |
| 2016/0180568 A1 | 6/2016 | Bullivant et al. |
| 2016/0187995 A1 | 6/2016 | Rosewall |
| 2016/0188179 A1 | 6/2016 | Roh |
| 2016/0188181 A1 | 6/2016 | Smith |
| 2016/0189328 A1 | 6/2016 | Vranjes et al. |
| 2016/0191511 A1 | 6/2016 | Tijerina et al. |
| 2016/0192324 A1 | 6/2016 | Zhang et al. |
| 2016/0205244 A1 | 7/2016 | Dvortsov |
| 2016/0217601 A1 | 7/2016 | Tsuda et al. |
| 2016/0259518 A1 | 9/2016 | King et al. |
| 2016/0259656 A1 | 9/2016 | Sumner et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0313869 A1* | 10/2016 | Jang .................. G04G 9/00 |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2016/0332025 A1 | 11/2016 | Repka |
| 2016/0342327 A1 | 11/2016 | Chi et al. |
| 2016/0357151 A1 | 12/2016 | Block et al. |
| 2016/0357282 A1 | 12/2016 | Block et al. |
| 2016/0357354 A1 | 12/2016 | Chen et al. |
| 2016/0357386 A1 | 12/2016 | Choi |
| 2016/0357413 A1 | 12/2016 | Block et al. |
| 2016/0358311 A1 | 12/2016 | Chen et al. |
| 2017/0003659 A1 | 1/2017 | Nakanishi |
| 2017/0004798 A1 | 1/2017 | Park et al. |
| 2017/0011210 A1 | 1/2017 | Cheong et al. |
| 2017/0039535 A1 | 2/2017 | Park et al. |
| 2017/0040001 A1 | 2/2017 | Zhang et al. |
| 2017/0045993 A1 | 2/2017 | Oh et al. |
| 2017/0046024 A1 | 2/2017 | Dascola et al. |
| 2017/0046052 A1 | 2/2017 | Lee et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0075305 A1 | 3/2017 | Ryu et al. |
| 2017/0075316 A1 | 3/2017 | Berdinis et al. |
| 2017/0082983 A1 | 3/2017 | Katzer et al. |
| 2017/0109011 A1 | 4/2017 | Jiang |
| 2017/0123571 A1 | 5/2017 | Huang et al. |
| 2017/0123640 A1 | 5/2017 | Wilson et al. |
| 2017/0127354 A1 | 5/2017 | Garland et al. |
| 2017/0134321 A1 | 5/2017 | Ushio et al. |
| 2017/0149795 A1 | 5/2017 | Day, II |
| 2017/0160898 A1 | 6/2017 | Lee et al. |
| 2017/0164292 A1 | 6/2017 | Santamaria et al. |
| 2017/0176950 A1 | 6/2017 | Jung et al. |
| 2017/0186399 A1 | 6/2017 | Moritani et al. |
| 2017/0209766 A1 | 7/2017 | Riley et al. |
| 2017/0212648 A1 | 7/2017 | Choi et al. |
| 2017/0230236 A1 | 8/2017 | Kim et al. |
| 2017/0236497 A1 | 8/2017 | Huitema et al. |
| 2017/0255169 A1 | 9/2017 | Lee et al. |
| 2017/0257426 A1 | 9/2017 | Wilbur et al. |
| 2017/0266494 A1 | 9/2017 | Crankson et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1 | 11/2017 | Robinson et al. |
| 2017/0325196 A1 | 11/2017 | Cho et al. |
| 2017/0329477 A1 | 11/2017 | Sachidanandam et al. |
| 2017/0337554 A1 | 11/2017 | Mokhasi et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357413 A1 | 12/2017 | Green |
| 2017/0357426 A1 | 12/2017 | Wilson et al. |
| 2017/0357427 A1 | 12/2017 | Wilson et al. |
| 2017/0357495 A1 | 12/2017 | Crane et al. |
| 2017/0371394 A1 | 12/2017 | Chan et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0074462 A1 | 3/2018 | Helder et al. |
| 2018/0081515 A1 | 3/2018 | Block et al. |
| 2018/0088537 A1 | 3/2018 | Murai |
| 2018/0088733 A1 | 3/2018 | Syed et al. |
| 2018/0088797 A1 | 3/2018 | Mcatee et al. |
| 2018/0097925 A1 | 4/2018 | Ryu et al. |
| 2018/0120927 A1 | 5/2018 | Ma et al. |
| 2018/0121060 A1 | 5/2018 | Jeong et al. |
| 2018/0136810 A1 | 5/2018 | Martin et al. |
| 2018/0150212 A1 | 5/2018 | Chen et al. |
| 2018/0150443 A1 | 5/2018 | Singleton |
| 2018/0157452 A1 | 6/2018 | Nelson et al. |
| 2018/0174550 A1 | 6/2018 | Zhang et al. |
| 2018/0181078 A1 | 6/2018 | Imamura |
| 2018/0181381 A1 | 6/2018 | Michaely et al. |
| 2018/0188925 A1 | 7/2018 | Na et al. |
| 2018/0246635 A1 | 8/2018 | Baer et al. |
| 2018/0246639 A1 | 8/2018 | Han et al. |
| 2018/0260080 A1 | 9/2018 | Cho |
| 2018/0261183 A1 | 9/2018 | Gou et al. |
| 2018/0275739 A1 | 9/2018 | Minami et al. |
| 2018/0288560 A1 | 10/2018 | Naik et al. |
| 2018/0316783 A1 | 11/2018 | Ye et al. |
| 2018/0321842 A1 | 11/2018 | Lee et al. |
| 2018/0329587 A1 | 11/2018 | Ko et al. |
| 2018/0335927 A1 | 11/2018 | Anzures et al. |
| 2018/0341389 A1 | 11/2018 | Kim et al. |
| 2018/0343023 A1 | 11/2018 | Park et al. |
| 2018/0348844 A1 | 12/2018 | Lingutla et al. |
| 2018/0352435 A1 | 12/2018 | Donley et al. |
| 2018/0366068 A1 | 12/2018 | Liu et al. |
| 2018/0374429 A1 | 12/2018 | Nakamura |
| 2019/0018445 A1 | 1/2019 | Watanabe et al. |
| 2019/0050045 A1 | 2/2019 | Jha et al. |
| 2019/0069244 A1 | 2/2019 | Jeon et al. |
| 2019/0072909 A1 | 3/2019 | Misaki et al. |
| 2019/0079576 A1 | 3/2019 | Liu et al. |
| 2019/0121300 A1 | 4/2019 | Peterson et al. |
| 2019/0121523 A1 | 4/2019 | Block et al. |
| 2019/0139207 A1 | 5/2019 | Jeong et al. |
| 2019/0163142 A1 | 5/2019 | Chang et al. |
| 2019/0180221 A1 | 6/2019 | Greenberger et al. |
| 2019/0182749 A1 | 6/2019 | Breaux et al. |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0237003 A1 | 8/2019 | Cao et al. |
| 2019/0250813 A1 | 8/2019 | Block et al. |
| 2019/0268771 A1 | 8/2019 | Seo et al. |
| 2019/0279520 A1 | 9/2019 | Wilson et al. |
| 2019/0281154 A1 | 9/2019 | Choi et al. |
| 2019/0302972 A1 | 10/2019 | Kline et al. |
| 2019/0324620 A1 | 10/2019 | Gu et al. |
| 2019/0339860 A1 | 11/2019 | Chen et al. |
| 2019/0340348 A1 | 11/2019 | Yu et al. |
| 2019/0349469 A1 | 11/2019 | Skogen et al. |
| 2020/0042311 A1 | 2/2020 | Shin |

(56) References Cited

U.S. PATENT DOCUMENTS

| | | |
|---|---|---|
| 2020/0050332 A1 | 2/2020 | Yang et al. |
| 2020/0068095 A1 | 2/2020 | Nabetani |
| 2020/0073122 A1 | 3/2020 | Rothkopf et al. |
| 2020/0089302 A1 | 3/2020 | Kim et al. |
| 2020/0110946 A1 | 4/2020 | Kline et al. |
| 2020/0125037 A1 | 4/2020 | Jo et al. |
| 2020/0133206 A1 | 4/2020 | Jo et al. |
| 2020/0228646 A1 | 7/2020 | Hotes et al. |
| 2020/0242228 A1 | 7/2020 | Farraro et al. |
| 2020/0249632 A1 | 8/2020 | Olwal et al. |
| 2020/0264567 A1 | 8/2020 | Ok et al. |
| 2020/0319348 A1 | 10/2020 | Oshita et al. |
| 2020/0327862 A1 | 10/2020 | Sinha et al. |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379413 A1 | 12/2020 | Chen et al. |
| 2020/0408521 A1 | 12/2020 | Lyons et al. |
| 2021/0042028 A1 | 2/2021 | Block et al. |
| 2021/0048929 A1 | 2/2021 | Agnoli et al. |
| 2021/0132780 A1 | 5/2021 | Kyung |
| 2021/0149694 A1 | 5/2021 | Guzman et al. |
| 2021/0201732 A1 | 7/2021 | Ranjan et al. |
| 2021/0216654 A1 | 7/2021 | Ko et al. |
| 2021/0294438 A1 | 9/2021 | Yang et al. |
| 2021/0349426 A1 | 11/2021 | Chen et al. |
| 2021/0349427 A1 | 11/2021 | Chen et al. |
| 2021/0349583 A1 | 11/2021 | Guzman et al. |
| 2021/0349611 A1 | 11/2021 | Chen et al. |
| 2021/0349741 A1 | 11/2021 | Guzman et al. |
| 2022/0157184 A1 | 5/2022 | Wilson et al. |
| 2022/0184309 A1 | 6/2022 | Rosinko et al. |
| 2022/0198984 A1 | 6/2022 | Connor et al. |
| 2022/0214785 A1 | 7/2022 | Giv |
| 2022/0221964 A1 | 7/2022 | Ko et al. |
| 2022/0229537 A1 | 7/2022 | Chen et al. |
| 2022/0276780 A1 | 9/2022 | Ko et al. |
| 2022/0342514 A1 | 10/2022 | Chao et al. |
| 2023/0004270 A1 | 1/2023 | Chen et al. |
| 2023/0008229 A1 | 1/2023 | Chen et al. |
| 2023/0035532 A1 | 2/2023 | Chen et al. |
| 2023/0071987 A1 | 3/2023 | Zeng et al. |
| 2023/0078153 A1 | 3/2023 | Yang et al. |
| 2023/0082876 A1 | 3/2023 | Guzman et al. |
| 2023/0236547 A1 | 7/2023 | Chen et al. |
| 2023/0236549 A1 | 7/2023 | Guzman et al. |
| 2023/0236550 A1 | 7/2023 | Chen et al. |
| 2023/0282146 A1 | 9/2023 | Connor et al. |
| 2023/0350564 A1 | 11/2023 | Chen et al. |

FOREIGN PATENT DOCUMENTS

| | | |
|---|---|---|
| AU | 2015101639 A4 | 12/2015 |
| CA | 2356232 A1 | 3/2002 |
| CA | 2781636 A1 | 7/2010 |
| CA | 2800123 C | 7/2016 |
| CA | 2986980 A1 | 5/2019 |
| CH | 707412 A2 | 6/2014 |
| CN | 1083229 A | 3/1994 |
| CN | 1337638 A | 2/2002 |
| CN | 1397904 A | 2/2003 |
| CN | 2602404 Y | 2/2004 |
| CN | 1536511 A | 10/2004 |
| CN | 1610866 A | 4/2005 |
| CN | 1997957 A | 7/2007 |
| CN | 101382438 A | 3/2009 |
| CN | 100492288 C | 5/2009 |
| CN | 101505320 A | 8/2009 |
| CN | 101627349 A | 1/2010 |
| CN | 101702112 A | 5/2010 |
| CN | 101819486 A | 9/2010 |
| CN | 101939740 A | 1/2011 |
| CN | 101981987 A | 2/2011 |
| CN | 202217134 U | 5/2012 |
| CN | 102681648 A | 9/2012 |
| CN | 102687176 A | 9/2012 |
| CN | 102775070 A | 10/2012 |
| CN | 103154954 A | 6/2013 |
| CN | 103399480 A | 11/2013 |
| CN | 103544920 A | 1/2014 |
| CN | 103562832 A | 2/2014 |
| CN | 103607660 A | 2/2014 |
| CN | 103649897 A | 3/2014 |
| CN | 103902165 A | 7/2014 |
| CN | 103914238 A | 7/2014 |
| CN | 103973899 A | 8/2014 |
| CN | 203773233 U | 8/2014 |
| CN | 104281405 A | 1/2015 |
| CN | 104487929 A | 4/2015 |
| CN | 104501043 A | 4/2015 |
| CN | 104580576 A | 4/2015 |
| CN | 104898402 A | 9/2015 |
| CN | 105204931 A | 12/2015 |
| CN | 105260049 A | 1/2016 |
| CN | 105264479 A | 1/2016 |
| CN | 105335087 A | 2/2016 |
| CN | 105388966 A | 3/2016 |
| CN | 105389078 A | 3/2016 |
| CN | 105389107 A | 3/2016 |
| CN | 105453016 A | 3/2016 |
| CN | 205608658 U | 9/2016 |
| CN | 106056848 A | 10/2016 |
| CN | 106486044 A | 3/2017 |
| CN | 106598201 A | 4/2017 |
| CN | 106605201 A | 4/2017 |
| CN | 106909064 A | 6/2017 |
| CN | 107239101 A | 10/2017 |
| CN | 107430489 A | 12/2017 |
| CN | 107643677 A | 1/2018 |
| CN | 107870560 A | 4/2018 |
| CN | 108255049 A | 7/2018 |
| CN | 109196469 A | 1/2019 |
| CN | 109313655 A | 2/2019 |
| CN | 109690445 A | 4/2019 |
| CN | 110471582 B | 10/2021 |
| DE | 202017105858 U1 | 3/2018 |
| EP | 0579093 A1 | 1/1994 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1750242 A2 | 2/2007 |
| EP | 1832969 A2 | 9/2007 |
| EP | 1855170 A2 | 11/2007 |
| EP | 1988432 A1 | 11/2008 |
| EP | 2120115 A2 | 11/2009 |
| EP | 2175367 A2 | 4/2010 |
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2360902 A2 | 8/2011 |
| EP | 2413577 A2 | 2/2012 |
| EP | 2423810 A1 | 2/2012 |
| EP | 2426902 A1 | 3/2012 |
| EP | 2600215 A1 | 6/2013 |
| EP | 2629483 A1 | 8/2013 |
| EP | 2738640 A2 | 6/2014 |
| EP | 2942932 A1 | 11/2015 |
| EP | 2955591 A2 | 12/2015 |
| EP | 2990887 A2 | 3/2016 |
| EP | 2993602 A1 | 3/2016 |
| EP | 3056949 A1 | 8/2016 |
| EP | 3101958 A1 | 12/2016 |
| EP | 3152643 A1 | 4/2017 |
| EP | 3376342 A1 | 9/2018 |
| EP | 3401770 A1 | 11/2018 |
| EP | 3465408 B1 | 8/2020 |
| EP | 3896560 A1 | 10/2021 |

(56) References Cited

FOREIGN PATENT DOCUMENTS

| | | |
|---|---|---|
| GB | 2475669 A | 6/2011 |
| JP | 49-134364 A | 12/1974 |
| JP | 53-31170 A | 3/1978 |
| JP | 56-621 A | 1/1981 |
| JP | 3007616 U | 2/1995 |
| JP | 8-110955 A | 4/1996 |
| JP | 9-251084 A | 9/1997 |
| JP | 10-143636 A | 5/1998 |
| JP | 10-506472 A | 6/1998 |
| JP | 11-109066 A | 4/1999 |
| JP | 11-160470 A | 6/1999 |
| JP | 11-232013 A | 8/1999 |
| JP | 2000-162349 A | 6/2000 |
| JP | 3062531 B2 | 7/2000 |
| JP | 2001-144884 A | 5/2001 |
| JP | 2001-147282 A | 5/2001 |
| JP | 2001-273064 A | 10/2001 |
| JP | 2001-313886 A | 11/2001 |
| JP | 2001-318852 A | 11/2001 |
| JP | 2002-73486 A | 3/2002 |
| JP | 2002-507718 A | 3/2002 |
| JP | 2002-251238 A | 9/2002 |
| JP | 2002-271451 A | 9/2002 |
| JP | 2003-9404 A | 1/2003 |
| JP | 2003-121568 A | 4/2003 |
| JP | 2003-233616 A | 8/2003 |
| JP | 2003-296246 A | 10/2003 |
| JP | 2004-28918 A | 1/2004 |
| JP | 2004-184396 A | 7/2004 |
| JP | 2005-521890 A | 7/2005 |
| JP | 2005-339017 A | 12/2005 |
| JP | 2006-101505 A | 4/2006 |
| JP | 2006-242717 A | 9/2006 |
| JP | 2006-293340 A | 10/2006 |
| JP | 2008-175800 A | 7/2008 |
| JP | 2009-147889 A | 7/2009 |
| JP | 2009-229106 A | 10/2009 |
| JP | 2009-293960 A | 12/2009 |
| JP | 2010-124181 A | 6/2010 |
| JP | 2010-257051 A | 11/2010 |
| JP | 3168099 U | 6/2011 |
| JP | 2011-159172 A | 8/2011 |
| JP | 2011-217000 A | 10/2011 |
| JP | 2012-32306 A | 2/2012 |
| JP | 2012-53642 A | 3/2012 |
| JP | 2012-505478 A | 3/2012 |
| JP | 2012-109778 A | 6/2012 |
| JP | 2012-147432 A | 8/2012 |
| JP | 2012-517630 A | 8/2012 |
| JP | 2012-203537 A | 10/2012 |
| JP | 2012-203832 A | 10/2012 |
| JP | 2012-531607 A | 12/2012 |
| JP | 2013-3671 A | 1/2013 |
| JP | 2013-29925 A | 2/2013 |
| JP | 2013-92989 A | 5/2013 |
| JP | 2013-146557 A | 8/2013 |
| JP | 2013-232230 A | 11/2013 |
| JP | 2014-35766 A | 2/2014 |
| JP | 2014-123197 A | 7/2014 |
| JP | 2014-143575 A | 8/2014 |
| JP | 2014-519126 A | 8/2014 |
| JP | 2014-216868 A | 11/2014 |
| JP | 5630676 B2 | 11/2014 |
| JP | 2015-210587 A | 11/2015 |
| JP | 2016-13151 A | 1/2016 |
| JP | 2017-111083 A | 6/2017 |
| JP | 2017-527026 A | 9/2017 |
| JP | 2017-531225 A | 10/2017 |
| JP | 2017-531230 A | 10/2017 |
| JP | 2018-514838 A | 6/2018 |
| JP | 2018-113544 A | 7/2018 |
| JP | 2018-116067 A | 7/2018 |
| JP | 2020-56745 A | 4/2020 |
| KR | 10-2004-0107489 A | 12/2004 |
| KR | 20-0425314 Y1 | 9/2006 |
| KR | 10-2007-0025292 A | 3/2007 |
| KR | 10-2008-0058246 A | 6/2008 |
| KR | 10-0864578 B1 | 10/2008 |
| KR | 10-2009-0112132 A | 10/2009 |
| KR | 10-2010-0025846 A | 3/2010 |
| KR | 10-2010-0025853 A | 3/2010 |
| KR | 10-2011-0093729 A | 8/2011 |
| KR | 10-2012-0132134 A | 12/2012 |
| KR | 10-2013-0109466 A | 10/2013 |
| KR | 10-2014-0025552 A | 3/2014 |
| KR | 10-2014-0064687 A | 5/2014 |
| KR | 10-2014-0074824 A | 6/2014 |
| KR | 10-2015-0008996 A | 1/2015 |
| KR | 10-2015-0038711 A | 4/2015 |
| KR | 10-2015-0081140 A | 7/2015 |
| KR | 10-2015-0093090 A | 8/2015 |
| KR | 10-2015-0140212 A | 12/2015 |
| KR | 10-2016-0026314 A | 3/2016 |
| KR | 10-2017-0032471 A | 3/2017 |
| KR | 10-2017-0076452 A | 7/2017 |
| KR | 10-2017-0081391 A | 7/2017 |
| KR | 10-2017-0082698 A | 7/2017 |
| KR | 10-2018-0011581 A | 2/2018 |
| KR | 10-1875907 B1 | 7/2018 |
| KR | 10-2019-0020850 A | 3/2019 |
| KR | 10-2019-0071285 A | 6/2019 |
| KR | 10-2019-0114034 A | 10/2019 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | I348803 B | 9/2011 |
| TW | 201232486 A | 8/2012 |
| TW | 201419115 A | 5/2014 |
| WO | 98/40795 A1 | 9/1998 |
| WO | 01/71433 A1 | 9/2001 |
| WO | 02/054157 A1 | 7/2002 |
| WO | 2003/048872 A1 | 6/2003 |
| WO | 03/085460 A2 | 10/2003 |
| WO | 2006/012343 A2 | 2/2006 |
| WO | 2006/112641 A1 | 10/2006 |
| WO | 2006/131780 A1 | 12/2006 |
| WO | 2007/018881 A2 | 2/2007 |
| WO | 2008/114491 A1 | 9/2008 |
| WO | 2009/053775 A1 | 4/2009 |
| WO | 2009/146857 A2 | 12/2009 |
| WO | 2010/017627 A1 | 2/2010 |
| WO | 2011/000893 A1 | 1/2011 |
| WO | 2011/062871 A2 | 5/2011 |
| WO | 2011/099819 A2 | 8/2011 |
| WO | 2012/021507 A2 | 2/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2013/169882 A2 | 11/2013 |
| WO | 2014/078114 A1 | 5/2014 |
| WO | 2014/081181 A1 | 5/2014 |
| WO | 2014/105274 A1 | 7/2014 |
| WO | 2014/105278 A1 | 7/2014 |
| WO | 2014/189197 A1 | 11/2014 |
| WO | 2014/200730 A1 | 12/2014 |
| WO | 2015/023419 A1 | 2/2015 |
| WO | 2015/029313 A1 | 3/2015 |
| WO | 2015/034960 A1 | 3/2015 |
| WO | 2015/065402 A1 | 5/2015 |
| WO | 2015/163536 A1 | 10/2015 |
| WO | 2016/022203 A1 | 2/2016 |
| WO | 2016/022204 A1 | 2/2016 |
| WO | 2016/022205 A1 | 2/2016 |
| WO | 2016/022496 A2 | 2/2016 |
| WO | 2016/025395 A2 | 2/2016 |
| WO | 2016/032076 A1 | 3/2016 |

(56) References Cited

FOREIGN PATENT DOCUMENTS

| WO | 2016/036427 A1 | 3/2016 |
|---|---|---|
| WO | 2016/036522 A2 | 3/2016 |
| WO | 2016/057062 A1 | 4/2016 |
| WO | 2016/099097 A1 | 6/2016 |
| WO | 2016/144385 A1 | 9/2016 |
| WO | 2016/144563 A1 | 9/2016 |
| WO | 2016/144977 A1 | 9/2016 |
| WO | 2017/062621 A1 | 4/2017 |
| WO | 2017/213777 A1 | 12/2017 |
| WO | 2017/213899 A1 | 12/2017 |
| WO | 2017/213937 A1 | 12/2017 |
| WO | 2018/048700 A1 | 3/2018 |
| WO | 2018/213451 A1 | 11/2018 |
| WO | 2019/200350 A1 | 10/2019 |
| WO | 2019/217086 A2 | 11/2019 |
| WO | 2019/217249 A2 | 11/2019 |
| WO | 2021/050190 A1 | 3/2021 |

OTHER PUBLICATIONS

Applicant-Initiated Interview Summary received for U.S. Appl. No. 17/948,578, dated Apr. 11, 2023, 3 pages.
Decision to Grant received for European Patent Application No. 21177569.7, dated Apr. 6, 2023, 3 pages.
Final Office Action received for U.S. Appl. No. 17/158,936, dated Apr. 7, 2023, 18 pages.
Non-Final Office Action received for U.S. Appl. No. 17/546,630, dated Mar. 30, 2023, 41 pages.
Applicant-Initiated Interview Summary received for U.S. Appl. No. 17/031,765, dated May 23, 2022, 5 pages.
Notice of Acceptance received for Australian Patent Application No. 2021202797, dated May 9, 2022, 3 pages.
Notice of Allowance received for Japanese Patent Application No. 2021-565837, dated May 16, 2022, 4 pages (1 page of English Translation and 3 pages of Official Copy).
Notice of Allowance received for U.S. Appl. No. 17/078,896, dated May 13, 2022, 8 pages.
Office Action received for Australian Patent Application No. 2022202292, dated May 10, 2022, 2 pages.
Office Action received for European Patent Application No. 20761084.1, dated May 9, 2022, 9 pages.
Office Action received for Japanese Patent Application No. 2020-124605, dated May 13, 2022, 6 pages (3 pages of English Translation and 3 pages of Official Copy).
Corrected Notice of Allowance received for U.S. Appl. No. 17/373,163, dated Jul. 15, 2022, 5 pages.
Final Office Action received for U.S. Appl. No. 15/421,865, dated Jul. 12, 2022, 27 pages.
Final Office Action received for U.S. Appl. No. 17/341,839, dated Jul. 18, 2022, 15 pages.
Invitation to Pay Search Fees received for European Patent Application No. 20730136.7, dated Jul. 1, 2022, 4 pages.
Non-Final Office Action received for U.S. Appl. No. 16/389,722, dated Jul. 7, 2022, 16 pages.
Notice of Acceptance received for Australian Patent Application No. 2022202292, dated Jul. 6, 2022, 3 pages.
Notice of Allowance received for Japanese Patent Application No. 2021-105941, dated Jul. 4, 2022, 4 pages (1 page of English Translation and 3 pages of Official Copy).
Summons to Attend Oral Proceedings received for European Patent Application No. 17810723.1, mailed on Jul. 5, 2022, 8 pages.
Applicant Initiated Interview Summary received for U.S. Appl. No. 17/546,630, dated May 22, 2023, 4 pages.
Applicant-Initiated Interview Summary received for U.S. Appl. No. 16/389,722, dated May 31, 2023, 4 pages.
Applicant-Initiated Interview Summary received for U.S. Appl. No. 17/031,671, dated May 23, 2023, 3 pages.
Applicant-Initiated Interview Summary received for U.S. Appl. No. 17/941,962, dated May 30, 2023, 2 pages.
Office Action received for Australian Patent Application No. 2022203957, dated May 12, 2023, 5 pages.
Office Action received for Korean Patent Application No. 10-2023-7011744, dated May 15, 2023, 11 pages (5 pages of English Translation and 6 pages of Official Copy).
Applicant-Initiated Interview Summary received for U.S. Appl. No. 16/389,722, dated Nov. 4, 2022, 4 pages.
Applicant-Initiated Interview Summary received for U.S. Appl. No. 17/031,765, dated Nov. 16, 2022, 5 pages.
Brief Communication Regarding Oral Proceedings received for European Patent Application No. 17810723.1, mailed on Nov. 11, 2022, 11 pages.
Final Office Action received for U.S. Appl. No. 17/031,671, dated Nov. 15, 2022, 27 pages.
International Search Report and Written Opinion received for PCT Patent Application No. PCT/US2022/029279, dated Nov. 9, 2022, 16 pages.
Invitation to Pay Additional Fees and Partial International Search Report received for PCT Patent Application No. PCT/US2022/029279, dated Sep. 15, 2022, 9 pages.
Notice of Allowance received for Chinese Patent Application No. 202111457936.3, dated Nov. 7, 2022, 4 pages (1 page of English Translation and 3 pages of Official Copy).
Notice of Allowance received for U.S. Appl. No. 16/418,786, dated Nov. 22, 2022, 6 pages.
Notice of Allowance received for U.S. Appl. No. 17/317,042, dated Nov. 9, 2022, 10 pages.
Applicant-Initiated Interview Summary received for U.S. Appl. No. 16/418,786, dated Sep. 23, 2022, 2 pages.
Applicant-Initiated Interview Summary received for U.S. Appl. No. 17/591,184, dated Sep. 23, 2022, 2 pages.
Notice of Allowance received for Danish Patent Application No. PA202070623, dated Sep. 20, 2022, 2 pages.
Notice of Allowance received for U.S. Appl. No. 17/341,839, dated Oct. 5, 2022, 5 pages.
Office Action received for Danish Patent Application No. PA202070625, dated Sep. 23, 2022, 4 pages.
Office Action received for Korean Patent Application No. 10-2022-7019205, dated Sep. 21, 2022, 6 pages (2 pages of English Translation and 4 pages of Official Copy).
Extended European Search Report received for European Patent Application No. 22173249.8, dated Aug. 19, 2022, 15 pages.
Notice of Allowance received for Japanese Patent Application No. 2020-562622, dated Aug. 26, 2022, 4 pages (1 page of English Translation and 3 pages of Official Copy).
Office Action received for Australian Patent Application No. 2021245228, dated Aug. 31, 2022, 2 pages.
Programmatically download APK from google play store, Retrieved from the Internet: https://stackoverflow.com/questions/13703982/programmaticallydownload-apk-from-google-play-store/13704021#13704021, Dec. 10, 2012, 2 pages.
Google, "Android User's Guide", Feb. 23, 2011, 140 pages.
Examiner's Answer to Appeal Brief received for U.S. Appl. No. 15/405,122, dated Jan. 11, 2023, 16 pages.
Examiner's Answer to Appeal Brief received for U.S. Appl. No. 16/861,651, dated Jan. 18, 2023, 16 pages.
Non-Final Office Action received for U.S. Appl. No. 17/681,584, dated Jan. 18, 2023, 12 pages.
Notice of Acceptance received for Australian Patent Application No. 2021250863, dated Jan. 13, 2023, 3 pages.
Notice of Allowance received for Japanese Patent Application No. 2022-139320, dated Jan. 6, 2023, 4 pages (1 page of English Translation and 3 pages of Official Copy).
Notice of Allowance received for Korean Patent Application No. 10-2022-7019205, dated Jan. 5, 2023, 8 pages (2 pages of English Translation and 6 pages of Official Copy).
Office Action received for Chinese Patent Application No. 201910924197.0, dated Nov. 30, 2022, 13 pages (06 pages of English Translation and 07 pages of Official Copy).
Applicant-Initiated Interview Summary received for U.S. Appl. No. 17/591,184, dated Feb. 27, 2023, 2 pages.
Applicant-Initiated Interview Summary received for U.S. Appl. No. 17/738,940, dated Mar. 7, 2023, 4 pages.

(56) References Cited

OTHER PUBLICATIONS

Corrected Notice of Allowance received for U.S. Appl. No. 16/935,002, dated Mar. 2, 2023, 2 pages.
Extended European Search Report received for European Patent Application No. 22188724.3, dated Mar. 2, 2023, 14 pages.
Final Office Action received for U.S. Appl. No. 17/713,016, dated Mar. 15, 2023, 6 pages.
Intention to Grant received for European Patent Application No. 21169911.1, dated Mar. 6, 2023, 9 pages.
Notice of Allowance received for Korean Patent Application No. 10-2020-0123857, dated Feb. 21, 2023, 6 pages (1 page of English Translation and 5 pages of Official Copy).
Notice of Allowance received for U.S. Appl. No. 17/515,143, dated Mar. 13, 2023, 10 pages.
Notice of Allowance received for U.S. Appl. No. 17/556,165, dated Feb. 21, 2023, 12 pages.
Notice of Allowance received for U.S. Appl. No. 17/591,184, dated Feb. 22, 2023, 5 pages.
Notice of Allowance received for U.S. Appl. No. 17/941,962, dated Mar. 10, 2023, 11 pages.
Pre-Appeal Review Report received for Japanese Patent Application No. 2020-159823, dated Jan. 12, 2023, 4 pages (2 pages of English Translation and 2 pages of Official Copy).
Lee et al., "PASS: Reducing Redundant Notifications between a Smartphone and a Smartwatch for Energy Saving", IEEE Transactions on Mobile Computing, vol. 19, No. 11, Jul. 23, 2019, pp. 2656-2669.
Lyons Kent, "Smartwatch Innovation: Exploring a Watch-First Model", Pervasive Computing, Jan. 2016, pp. 10-13.
Decision to Grant received for European Patent Application No. 20185974.1, dated Aug. 19, 2022, 3 pages.
Notice of Allowance received for Japanese Patent Application No. 2021-122610, dated Aug. 5, 2022, 4 pages (1 page of English Translation and 3 pages of Official Copy).
Office Action received for Chinese Patent Application No. 202111457936.3, dated Jul. 5, 2022, 18 pages (9 pages of English Translation and 9 pages of Official Copy).
Office Action received for Japanese Patent Application No. 2020-159823, dated Aug. 15, 2022, 6 pages (3 pages of English Translation and 3 pages of Official Copy).
Applicant Initiated Interview Summary received for U.S. Appl. No. 17/681,584, dated Mar. 24, 2023, 2 pages.
Corrected Notice of Allowance received for U.S. Appl. No. 16/935,002, dated Mar. 28, 2023, 2 pages.
Corrected Notice of Allowance received for U.S. Appl. No. 17/515,143, dated Mar. 29, 2023, 2 pages.
Final Office Action received for U.S. Appl. No. 16/389,722, dated Mar. 17, 2023, 14 pages.
Intention to Grant received for European Patent Application No. 20761084.1, dated Mar. 27, 2023, 10 pages.
Non-Final Office Action received for U.S. Appl. No. 16/943,737, dated Mar. 28, 2023, 28 pages.
Non-Final Office Action received for U.S. Appl. No. 17/031,671, dated Mar. 17, 2023, 34 pages.
Non-Final Office Action received for U.S. Appl. No. 17/031,765, dated Mar. 28, 2023, 31 pages.
Notice of Allowance received for Korean Patent Application No. 10-2020-0123852, dated Mar. 9, 2023, 7 pages (2 pages of English Translation and 5 pages of Official Copy).
Office Action received for Australian Patent Application No. 2022201419, dated Mar. 20, 2023, 3 pages.
Office Action received for Australian Patent Application No. 2022202583, dated Mar. 24, 2023, 4 pages.
Droid Life, "20+ Galaxy S9, S9+ Tips and Tricks", Available Online at: https://www.youtube.com/watch?v=sso0mYTfV6w, Mar. 22, 2018, pp. 1-33.
Gauging Gadgets, "How to Customize Watch Faces—Garmin Venu Tutorial", Online Available at: https://www.youtube.com/watch?v=dxajKKulaP0, Jan. 7, 2020, 14 pages.
Applicant-Initiated Interview Summary received for U.S. Appl. No. 17/031,765, dated Apr. 17, 2023, 4 pages.
Applicant-Initiated Interview Summary received for U.S. Appl. No. 17/068,386, dated Apr. 24, 2023, 2 pages.
Corrected Notice of Allowance received for U.S. Appl. No. 17/941,962, dated Apr. 14, 2023, 6 pages.
Final Office Action received for U.S. Appl. No. 17/681,584, dated Apr. 20, 2023, 15 pages.
Intention to Grant received for European Patent Application No. 16837432.0, dated Apr. 14, 2023, 8 pages.
Non-Final Office Action received for U.S. Appl. No. 17/591,184, dated Apr. 21, 2023, 15 pages.
Notice of Allowance received for Chinese Patent Application No. 201910924197.0, dated Apr. 5, 2023, 3 pages (2 pages of English Translation and 1 page of Official Copy).
Notice of Allowance received for Japanese Patent Application No. 2021-023661, dated Apr. 10, 2023, 4 pages (1 page of English Translation and 3 pages of Official Copy).
Notice of Allowance received for U.S. Appl. No. 17/713,016, dated Apr. 18, 2023, 10 pages.
Office Action received for Australian Patent Application No. 2022218607, dated Apr. 14, 2023, 3 pages.
Summons to Attend Oral Proceedings received for European Patent Application No. 20172197.4, mailed on Apr. 14, 2023, 8 pages.
Applicant-Initiated Interview Summary received for U.S. Appl. No. 17/341,839, dated Sep. 16, 2022, 2 pages.
Final Office Action received for U.S. Appl. No. 17/031,765, dated Sep. 12, 2022, 37 pages.
Non-Final Office Action received for U.S. Appl. No. 17/556,165, dated Sep. 7, 2022, 15 pages.
Office Action received for Indian Patent Application No. 202017048447, dated Sep. 5, 2022, 6 pages.
Lein et al., "Patternizer", Available online at: https://patternizer.com/, Apr. 2016, 5 pages.
Advisory Action received for U.S. Appl. No. 15/405,122, dated Apr. 18, 2022, 5 pages.
Advisory Action received for U.S. Appl. No. 16/935,002, dated May 6, 2022, 3 pages.
Applicant-Initiated Interview Summary received for U.S. Appl. No. 15/405,122, dated Mar. 1, 2022, 4 pages.
Applicant-Initiated Interview Summary received for U.S. Appl. No. 15/421,865, dated Feb. 28, 2022, 5 pages.
Applicant-Initiated Interview Summary received for U.S. Appl. No. 16/389,722, dated Feb. 18, 2022, 5 pages.
Applicant-Initiated Interview Summary received for U.S. Appl. No. 16/418,786, dated May 9, 2022, 2 pages.
Applicant-Initiated Interview Summary received for U.S. Appl. No. 16/943,737, dated Apr. 29, 2022, 6 pages.
Applicant-Initiated Interview Summary received for U.S. Appl. No. 17/041,350, dated Feb. 2, 2022, 2 pages.
Applicant-Initiated Interview Summary received for U.S. Appl. No. 17/068,386, dated Jan. 13, 2022, 2 pages.
Applicant-Initiated Interview Summary received for U.S. Appl. No. 17/078,896, dated Apr. 25, 2022, 2 pages.
Applicant-Initiated Interview Summary received for U.S. Appl. No. 17/317,042, dated Apr. 29, 2022, 2 pages.
Applicant-Initiated Interview Summary received for U.S. Appl. No. 17/341,839, dated Apr. 29, 2022, 2 pages.
Applicant-Initiated Interview Summary received for U.S. Appl. No. 17/373,163, dated Apr. 11, 2022, 2 pages.
Corrected Notice of Allowance received for U.S. Appl. No. 17/041,350, dated Apr. 4, 2022, 3 pages.
Corrected Notice of Allowance received for U.S. Appl. No. 17/041,350, dated Mar. 15, 2022, 3 pages.
Decision to Grant received for European Patent Application No. 16762356.0, dated Apr. 26, 2022, 2 pages.
Final Office Action received for U.S. Appl. No. 16/861,651, dated Jan. 26, 2022, 16 pages.
Final Office Action received for U.S. Appl. No. 16/943,737, dated Feb. 4, 2022, 24 pages.
Final Office Action received for U.S. Appl. No. 17/068,386, dated Mar. 3, 2022, 29 pages.

(56) References Cited

OTHER PUBLICATIONS

ILOVEX,""Stripe Generator", a tool that makes it easy to create striped materials", Online available at : https://www.ilovex.co.jp/blog/system/webconsulting/stripe-generator.html, May 2, 2012, 3 pages (Official Copy Only) {See Communication Under 37 CFR § 1.98(a) (3)}.
Intention to Grant received for European Patent Application No. 20185974.1, dated Apr. 28, 2022, 8 pages.
International Preliminary Report on Patentability received for PCT Patent Application No. PCT/US2020/045814, dated Mar. 17, 2022, 12 pages.
Jurick et al., "IPhone Hacks", Tips & Tools for Unlocking the Power of Your iPhone & iPod touch, Available Online at: https://api.pageplace.de/preview/DT0400.9780596550974_A23629666/preview-9780596550974_A23629666.pdf >, Apr. 2009, 49 pages.
Non-Final Office Action received for U.S. Appl. No. 16/418,786, dated Mar. 28, 2022, 14 pages.
Non-Final Office Action received for U.S. Appl. No. 17/031,671, dated Apr. 1, 2022, 32 pages.
Non-Final Office Action received for U.S. Appl. No. 17/031,765, dated Mar. 29, 2022, 33 pages.
Non-Final Office Action received for U.S. Appl. No. 17/341,839, dated Mar. 17, 2022, 14 pages.
Non-Final Office Action received for U.S. Appl. No. 17/373,163, dated Jan. 27, 2022, 14 pages.
Notice of Acceptance received for Australian Patent Application No. 2020239774, dated Jan. 5, 2022, 3 pages.
Notice of Acceptance received for Australian Patent Application No. 2020250323, dated Feb. 28, 2022, 3 pages.
Notice of Allowance received for Chinese Patent Application No. 202110194015.6, dated Mar. 9, 2022, 6 pages (3 pages of English Translation and 3 pages of Official Copy).
Notice of Allowance received for Japanese Patent Application No. 2020-159825, dated Mar. 25, 2022, 5 pages (1 page of English Translation and 4 pages of Official Copy).
Notice of Allowance received for Korean Patent Application No. 10-2021-7025301, dated Mar. 16, 2022, 4 pages (1 page of English Translation and 3 pages of Official Copy).
Notice of Allowance received for Korean Patent Application No. 10-2021-7034748, dated Jan. 27, 2022, 6 pages (2 pages of English Translation and 4 pages of Official Copy).
Notice of Allowance received for Korean Patent Application No. 10-2021-7036246, dated Mar. 2, 2022, 5 pages (1 page of English Translation and 4 pages of Official Copy).
Notice of Allowance received for Korean Patent Application No. 10-2021-7036678, dated Mar. 7, 2022, 5 pages (1 page of English Translation and 4 pages of Official Copy).
Notice of Allowance received for Korean Patent Application No. 10-2022-7001721, dated Feb. 28, 2022, 5 pages (1 page of English Translation and 4 pages of Official Copy).
Notice of Allowance received for U.S. Appl. No. 16/867,002, dated Mar. 1, 2022, 7 pages.
Notice of Allowance received for U.S. Appl. No. 16/997,588, dated Mar. 18, 2022, 9 pages.
Notice of Allowance received for U.S. Appl. No. 17/041,350, dated Feb. 24, 2022, 6 pages.
Notice of Allowance received for U.S. Appl. No. 17/087,845, dated Mar. 3, 2022, 9 pages.
Notice of Allowance received for U.S. Appl. No. 17/373,163, dated May 11, 2022, 8 pages.
Office Action received for Australian Patent Application No. 2020239749, dated Jan. 21, 2022, 4 pages.
Office Action received for Australian Patent Application No. 2021202797, dated Feb. 4, 2022, 5 pages.
Office Action received for Australian Patent Application No. 2021203216, dated Mar. 7, 2022, 8 pages.
Office Action received for Chinese Patent Application No. 202110783860.7, dated Mar. 10, 2022, 15 pages (5 pages of English Translation and 10 pages of Official Copy).
Office Action received for Danish Patent Application No. PA202070610, dated Mar. 14, 2022, 7 pages.
Office Action received for Danish Patent Application No. PA202070624, dated Feb. 4, 2022, 4 pages.
Office Action received for Danish Patent Application No. PA202070625, dated Feb. 8, 2022, 2 pages.
Office Action received for European Patent Application No. 20729346.5, dated Jan. 17, 2022, 8 pages.
Office Action received for Indian Patent Application No. 202118025047, dated Apr. 26, 2022, 6 pages.
Office Action received for Japanese Patent Application No. 2020-159824, dated Dec. 17, 2021, 13 pages (7 pages of English Translation and 6 pages of Official Copy).
Office Action received for Japanese Patent Application No. 2020-159825, dated Dec. 10, 2021, 4 pages (2 pages of English Translation and 2 pages of Official Copy).
Office Action received for Japanese Patent Application No. 2021-023661, dated Feb. 25, 2022, 6 pages (3 pages of English Translation and 3 pages of Official Copy).
Result of Consultation received for European Patent Application No. 20185974.1, dated Apr. 4, 2022, 4 pages.
Supplemental Notice of Allowance received for U.S. Appl. No. 16/867,002, dated Mar. 16, 2022, 2 pages.
Supplemental Notice of Allowance received for U.S. Appl. No. 16/997,588, dated Apr. 20, 2022, 4 pages.
Non-Final Office Action received for U.S. Appl. No. 17/068,386, dated Jan. 30, 2023, 20 pages.
Office Action received for Chinese Patent Application No. 202110453180.9, dated Dec. 26, 2022, 13 pages (8 pages of English Translation and 5 pages of Official Copy).
Office Action received for European Patent Application No. 20730136.7, dated Jan. 19, 2023, 4 pages.
Summons to Attend Oral Proceedings received for European Patent Application No. 20729346.5, mailed on Jan. 23, 2023, 11 pages.
Applicant-Initiated Interview Summary received for U.S. Appl. No. 17/158,936, dated Dec. 28, 2022, 4 pages.
Final Office Action received for U.S. Appl. No. 17/591,184, dated Dec. 23, 2022, 10 pages.
Non-Final Office Action received for U.S. Appl. No. 17/738,940, dated Dec. 22, 2022, 31 pages.
Notice of Allowance received for Korean Patent Application No. 10-2022-7014529, dated Dec. 13, 2022, 8 pages (2 pages of English Translation and 6 pages of Official Copy).
Office Action received for Chinese Patent Application No. 202110783860.7, dated Nov. 15, 2022, 8 pages (2 pages of English Translation and 6 pages of Official Copy).
Office Action received for Korean Patent Application No. 10-2020-0123857, dated Dec. 16, 2022, 8 pages (4 pages of English Translation and 4 pages of Official Copy).
Advisory Action received for U.S. Appl. No. 16/861,651, dated Jul. 29, 2022, 4 pages.
Intention to Grant received for Danish Patent Application No. PA202070623, dated Jul. 20, 2022, 2 pages.
Non-Final Office Action received for U.S. Appl. No. 16/418,786, dated Aug. 1, 2022, 18 pages.
Non-Final Office Action received for U.S. Appl. No. 17/591,184, dated Aug. 4, 2022, 18 pages.
Notice of Acceptance received for Australian Patent Application No. 2021203216, dated Jul. 26, 2022, 3 pages.
Notice of Allowance received for U.S. Appl. No. 17/317,042, dated Jul. 26, 2022, 12 pages.
Notice of Allowance received for U.S. Appl. No. 17/373,163, dated Jul. 27, 2022, 8 pages.
Office Action received for Chinese Patent Application No. 202110453180.9, dated Jun. 16, 2022, 14 pages (7 pages of English Translation and 7 pages of Official Copy).
Office Action received for European Patent Application No. 20729346.5, dated Jul. 28, 2022, 9 pages.
2RaZ Tech&Moto, Sony Smartwatch 2 update—new feartures and watchface creator!!! New!!!, Online available at: https://www.youtube.com/watch?v=k3jjBv7QZSk, May 8, 2014, 3 pages.
Advisory Action received for U.S. Appl. No. 14/841,606, dated Feb. 28, 2019, 3 pages.

(56) References Cited

OTHER PUBLICATIONS

Advisory Action received for U.S. Appl. No. 14/815,898, dated Aug. 30, 2016, 3 pages.
Advisory Action received for U.S. Appl. No. 14/846,511, dated Oct. 22, 2019, 5 pages.
Advisory Action received for U.S. Appl. No. 14/846,511, dated Sep. 19, 2018, 8 pages.
Advisory Action received for U.S. Appl. No. 15/421,865, dated Apr. 16, 2020, 7 pages.
Advisory Action received for U.S. Appl. No. 15/554,204, dated Mar. 12, 2020, 3 pages.
Advisory Action received for U.S. Appl. No. 16/389,722, dated Mar. 9, 2021, 5 pages.
Advisory Action received for U.S. Appl. No. 16/582,020, dated Aug. 3, 2020, 4 pages.
AdyClock—Night Alarm Clock, App for android, Google play store page: https://web.archive.org/web/20130924223153/https://play.google.com/store/apps/details?id=com.adyclock&hl=en, Sep. 24, 2013, 2 pages.
Airshow, Airshow App for Mobile Devices, 2012, 4 pages.
Andro Dollar, Huawei Watch GT Always on Mode Update is finally here!, Online available at: https://www.youtube.com/watch?v=AJw_FIAf7v4,Jun. 6, 2019, 4 pages.
Android Central, BeWeather weather app for Android, Available online at: <https://www.youtube.com/watch?v=G2EY2K-XkSI>, Sep. 1, 2011, 1 page.
Android Central, Changing the watchface on your Android Wear device, Retrieved from: https://www.youtube.com/watch?v=YYwFe2K_qil, Jul. 2, 2014, 4 pages.
Android Tips, Create a Minimal Lock Screen with WidgetLocker, Online Available at: http://appstap192.blogspot.com/2012/01/create-minimal-lock-screen-with.html, Jan. 18, 2012, 6 pages.
Androidika, Butterfly 3D Live Wallpaper 1.0 APK, Available at: <http://net-suckga-ilauncher2.apk-dl.com/butterfly-3d-live-wallpaper>, Feb. 26, 2013, 7 pages.
AOD too dim. I've answered my own question to help others, Online Available: https://forums.androidcentral.com/samsung-galaxy-s9-s9-plus/874444-aod-too-dim-ive-answered-my-own-question-help-others.html, Mar. 11, 2018, 3 pages.
Applicant-Initiated Interview Summary received for U.S. Appl. No. 14/846,511, dated Apr. 20, 2020, 4 pages.
Applicant-Initiated Interview Summary received for U.S. Appl. No. 15/405,122, dated Dec. 22, 2020, 5 pages.
Applicant-Initiated Interview Summary received for U.S. Appl. No. 15/405,122, dated Jul. 7, 2021, 4 pages.
Applicant-Initiated Interview Summary received for U.S. Appl. No. 15/405,122, dated May 21, 2020, 5 pages.
Applicant-Initiated Interview Summary received for U.S. Appl. No. 15/421,865, dated Dec. 15, 2020, 6 pages.
Applicant-Initiated Interview Summary received for U.S. Appl. No. 15/421,865, dated Feb. 3, 2020, 5 pages.
Applicant-Initiated Interview Summary received for U.S. Appl. No. 15/421,865, dated Jun. 30, 2021, 6 pages.
Applicant-Initiated Interview Summary received for U.S. Appl. No. 15/554,204, dated Jan. 31, 2020, 3 pages.
Applicant-Initiated Interview Summary received for U.S. Appl. No. 15/554,204, dated Oct. 11, 2019, 5 pages.
Applicant-Initiated Interview Summary received for U.S. Appl. No. 15/798,235, dated Feb. 3, 2020, 3 pages.
Applicant-Initiated Interview Summary received for U.S. Appl. No. 16/389,722, dated Feb. 11, 2021, 4 pages.
Applicant-Initiated Interview Summary received for U.S. Appl. No. 16/389,722, dated Jul. 7, 2020, 5 pages.
Applicant-Initiated Interview Summary received for U.S. Appl. No. 16/389,722, dated Sep. 7, 2021, 4 pages.
Applicant-Initiated Interview Summary received for U.S. Appl. No. 16/401,934, dated Feb. 23, 2021, 8 pages.
Applicant-Initiated Interview Summary received for U.S. Appl. No. 16/418,786, dated Mar. 30, 2021, 4 pages.
Applicant-Initiated Interview Summary received for U.S. Appl. No. 16/582,020, dated Jul. 9, 2021, 4 pages.
Applicant-Initiated Interview Summary received for U.S. Appl. No. 16/582,020, dated Jul. 14, 2020, 5 pages.
Applicant-Initiated Interview Summary received for U.S. Appl. No. 16/582,020, dated Mar. 25, 2020, 5 pages.
Applicant-Initiated Interview Summary received for U.S. Appl. No. 16/584,281, dated Mar. 9, 2020, 5 pages.
Applicant-Initiated Interview Summary received for U.S. Appl. No. 16/584,281, dated Sep. 14, 2020, 6 pages.
Applicant-Initiated Interview Summary received for U.S. Appl. No. 16/584,445, dated Mar. 17, 2020, 5 pages.
Applicant-Initiated Interview Summary received for U.S. Appl. No. 16/585,399, dated Mar. 25, 2020, 3 pages.
Applicant-Initiated Interview Summary received for U.S. Appl. No. 16/585,714, dated Jul. 20, 2020, 5 pages.
Applicant-Initiated Interview Summary received for U.S. Appl. No. 16/585,721, dated Aug. 31, 2020, 5 pages.
Applicant-Initiated Interview Summary received for U.S. Appl. No. 16/585,721, dated Mar. 13, 2020, 5 pages.
Applicant-Initiated Interview Summary received for U.S. Appl. No. 16/659,507, dated Nov. 17, 2020, 3 pages.
Applicant-Initiated Interview Summary received for U.S. Appl. No. 16/861,651, dated Dec. 29, 2021, 5 pages.
Applicant-Initiated Interview Summary received for U.S. Appl. No. 16/861,651, dated Mar. 25, 2021, 6 pages.
Applicant-Initiated Interview Summary received for U.S. Appl. No. 16/861,651, dated Sep. 3, 2021, 5 pages.
Applicant-Initiated Interview Summary received for U.S. Appl. No. 16/935,002, dated Sep. 21, 2021, 4 pages.
Applicant-Initiated Interview Summary received for U.S. Appl. No. 16/943,737, dated Sep. 7, 2021, 4 pages.
Applicant-Initiated Interview Summary received for U.S. Appl. No. 16/997,588, dated Jan. 29, 2021, 3 pages.
Applicant-Initiated Interview Summary received for U.S. Appl. No. 16/997,588, dated May 12, 2021, 2 pages.
Applicant-Initiated Interview Summary received for U.S. Appl. No. 17/031,654, dated Feb. 1, 2021, 2 pages.
Applicant-Initiated Interview Summary received for U.S. Appl. No. 17/031,671, dated Aug. 2, 2021, 5 pages.
Applicant-Initiated Interview Summary received for U.S. Appl. No. 17/031,671, dated Nov. 8, 2021, 5 pages.
Applicant-Initiated Interview Summary received for U.S. Appl. No. 17/031,765, dated Dec. 15, 2021, 4 pages.
Applicant-Initiated Interview Summary received for U.S. Appl. No. 17/031,765, dated Sep. 22, 2021, 5 pages.
Applicant-Initiated Interview Summary received for U.S. Appl. No. 17/041,350, dated Aug. 18, 2021, 2 pages.
Applicant-Initiated Interview Summary received for U.S. Appl. No. 17/068,386, dated Sep. 21, 2021, 2 pages.
Avdonin, Nikita, Astroviewer 3D, Available at: https:jjwww.youtube.comjwatch?v=zY0tslx3JHY/>, Nov. 5, 2013, 2 pages.
Baar, Marius, Fitbit Ace—Unboxing, Setup and 24 Hour Test, YouTube [online] [video], Retrieved from: https://youtu.be/ekvkfqOyrls, See especially 4:44., Oct. 24, 2018, 3 pages.
Barbosa, Jonathan, Weather Clock 2.1 for Android, APKPure, Online Available at: https://apkpure.com/weather-clock/com.urbandroid.wclock, Oct. 15, 2015, 3 pages.
Big Phil TV, Gear S3 Watch faces with great always on display(A O D),Available online at: https://www.youtube.com/watch?v=2cxMnrMiGU8, Apr. 5, 2017, 3 pages.
Bogdanov, Alexei, Skmei 1016, XP054977588, Available online at : https://www.youtube.com/watch?v=E4q4Fug05Fw>, Jun. 21, 2014, 2 pages.
Brief Communication regarding Oral Proceedings received for European Patent Application No. 15730925.3, mailed on Feb. 18, 2020, 7 pages.
Brief Communication regarding Oral Proceedings received for European Patent Application No. 17206177.2, mailed on Nov. 21, 2019, 5 pages.
Brightness on lock screen, Online Available at: https://www.reddit.com/r/galaxys10/comments/b4d5fb/brightness_on_lock_screen/,2019, 1 page.

(56) References Cited

OTHER PUBLICATIONS

Cancellation of Oral Proceedings received for European Patent Application No. 17206177.2, mailed on Dec. 4, 2019, 2 pages.
Castellini, Rick, Google Earth, Retrieved from: https://www.youtube.com/watch?v=bgjMSBXsFZQ>, Feb. 12, 2013, 3 pages.
Cengic, Suad, Samsung Gear S3—Display Always On! Cool!, Available online at: https://www.youtube.com/watch?v=ceeDinbPwOY, Mar. 10, 2017, 3 pages.
Certificate of Examination received for Australian Patent Application No. 2020102158, dated Jun. 8, 2021, 2 pages.
Clark, Josh, Designing Great iPhone Apps, O'Reilly Japan Co., O'Reilly Tim, vol. 1, May 24, 2012, 5 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Corrected Notice of Allowance received for U.S. Appl. No. 15/183,663, dated Feb. 25, 2019, 3 pages.
Corrected Notice of Allowance received for U.S. Appl. No. 15/183,663, dated Mar. 27, 2019, 2 pages.
Corrected Notice of Allowance received for U.S. Appl. No. 15/355,956, dated Jan. 3, 2020, 2 pages.
Corrected Notice of Allowance received for U.S. Appl. No. 15/554,204, dated Aug. 19, 2020, 3 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Corrected Notice of Allowance received for U.S. Appl. No. 15/798,257, dated Jun. 12, 2019, 2 pages.
Corrected Notice of Allowance received for U.S. Appl. No. 16/401,934, dated Dec. 23, 2021, 3 pages.
Corrected Notice of Allowance received for U.S. Appl. No. 16/418,786, dated Jan. 5, 2022, 3 pages.
Corrected Notice of Allowance received for U.S. Appl. No. 16/582,020, dated Aug. 11, 2021, 2 pages.
Corrected Notice of Allowance received for U.S. Appl. No. 16/401,934, dated Feb. 28, 2022, 3 pages.
Cyr, Jim, Apple Watch—Customize Modular Watch Face, available online at: https://www.youtube.com/watch?v=02W93HbKIK8, May 13, 2015, 2 pages.
Dan, Get This Look: 'Minimal' Zooper Widget, Online Available at: https://www.androidguys.com/featured/customize/get-look-minimal-zooper-widget/, Mar. 7, 2014, 2 pages.
Decision on Acceptance received for Australian Patent Application No. 2015298710, dated Jul. 19, 2019, 18 pages.
Decision on Acceptance received for Australian Patent Application No. 2018201089, dated Apr. 20, 2021, 28 pages.
Decision on Appeal received for U.S. Appl. No. 14/815,890, mailed on Nov. 24, 2020, 13 pages.
Decision on Appeal received for U.S. Appl. No. 14/846,511, mailed on Dec. 29, 2021, 20 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant received for Danish Patent Application No. PA201770397, dated Feb. 6, 2018, 2 pages.
Decision to Grant received for Danish Patent Application No. PA201770791, dated Jul. 7, 2020, 2 pages.
Decision to Grant received for Danish Patent Application No. PA201970596, dated Feb. 26, 2021, 2 pages.
Decision to Grant received for Danish Patent Application No. PA201970597, dated Aug. 19, 2021, 2 pages.
Decision to Grant received for Danish Patent Application No. PA202070609, dated May 3, 2021, 2 pages.
Decision to Grant received for European Patent Application No. 15730925.3, dated Dec. 9, 2021, 2 pages.
Decision to Grant received for European Patent Application No. 15747595.5, dated Jul. 16, 2020, 2 pages.
Decision to Grant received for European Patent Application No. 17206177.2, dated Aug. 6, 2020, 2 pages.
Decision to Refuse received for European Patent Application No. 15730924.6, dated Mar. 15, 2019, 12 pages.
Deluxe Moon-Guide, available online at: https://web.archive.org/web/20130520161057/http://www.lifewaresolutions.com/deluxe-moon-guide-ip.html, May 20, 2013, 5 pages.
Digital alarm clock app for Android, Goggle play store digital alarm clock description page, Mar. 25, 2015, 3 pages.
Droid Life, How to: Use Always-on Apps with Android Wear, Available online at: https://www.youtube.com/watch?v=_-xYB9EBTaA, Jun. 26, 2015, 3 pages.
EBPMAN Tech Reviews, LG G3 Tips: How to customize the clock face, Available online at: https://www.youtube.com/watch?v=evraMWFb1fY, Jul. 25, 2014, 1 page.
Elecont, Weather clock—hourly forecast description, Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
European Search Report received for European Patent Application No. 17206177.2, dated Apr. 30, 2018, 4 pages.
European Search Report received for European Patent Application No. 20172197.4, dated Jul. 28, 2020, 4 pages.
Evgenyevich, Sergey, Earth & Moon in HD Gyro 3D, Available at <https://www.youtube.com/watch?v=IRwNcaSYrls/>, Dec. 1, 2013, 2 pages.
Examiner's Answer to Appeal Brief received for U.S. Appl. No. 14/815,890, dated Mar. 20, 2020, 16 pages.
Examiner's Answer to Appeal Brief received for U.S. Appl. No. 14/846,511, dated Jun. 14, 2021, 15 pages.
Extended European Search Report received for European Patent Application No. 16762356.0, dated Nov. 9, 2018, 10 pages.
Extended European Search Report received for European Patent Application No. 16837432.0, dated Mar. 11, 2019, 10 pages.
Extended European Search Report received for European Patent Application No. 17810723.1, dated Nov. 12, 2019, 9 pages.
Extended European Search Report received for European Patent Application No. 20185974.1, dated Oct. 28, 2020, 7 pages.
Extended European Search Report received for European Patent Application No. 21169911.1, dated Sep. 20, 2021, 9 pages.
Extended European Search Report received for European Patent Application No. 21177569.7, dated Sep. 20, 2021, 8 pages.
Feist, Jonathan, Android customization—how to create a custom clock widget using Zooper Widget, Available Online at: https://www.androidauthority.com/zooper-widget-clock-366476/, May 15, 2014, 10 pages.
Feldman, Ari, Excerpts from: Designing Arcade Computer Game Graphics, Available online at: http://www.phatcode.net/res/269/files/dacgg.pdf, Jan. 1, 2001, 35 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/821,667, dated Apr. 26, 2018, 13 pages.
Final Office Action received for U.S. Appl. No. 14/841,606, dated Sep. 7, 2018, 34 pages.
Final Office Action received for U.S. Appl. No. 14/846,511 dated May 10, 2018, 21 pages.
Final Office Action received for U.S. Appl. No. 14/846,511, dated Aug. 11, 2020, 25 pages.
Final Office Action received for U.S. Appl. No. 14/846,511, dated Jun. 5, 2019, 24 pages.
Final Office Action received for U.S. Appl. No. 15/405,122, dated Jan. 21, 2020, 36 pages.

(56) References Cited

OTHER PUBLICATIONS

Final Office Action received for U.S. Appl. No. 15/405,122, dated Nov. 5, 2021, 45 pages.
Final Office Action received for U.S. Appl. No. 15/421,865, dated Dec. 2, 2019, 19 pages.
Final Office Action received for U.S. Appl. No. 15/421,865, dated Mar. 19, 2021, 20 pages.
Final Office Action received for U.S. Appl. No. 15/554,204, dated Oct. 31, 2019, 22 pages.
Final Office Action received for U.S. Appl. No. 15/798,235, dated Oct. 9, 2018, 45 pages.
Final Office Action received for U.S. Appl. No. 15/798,235, dated Oct. 18, 2019, 25 pages.
Final Office Action received for U.S. Appl. No. 15/881,544, dated Jan. 29, 2019, 14 pages.
Final Office Action received for U.S. Appl. No. 16/389,722, dated Dec. 6, 2021, 19 pages.
Final Office Action received for U.S. Appl. No. 16/389,722, dated Dec. 8, 2020, 18 pages.
Final Office Action received for U.S. Appl. No. 16/401,934, dated Jun. 14, 2021, 30 pages.
Final Office Action received for U.S. Appl. No. 16/418,786, dated Jan. 13, 2021, 14 pages.
Final Office Action received for U.S. Appl. No. 16/582,020, dated Apr. 28, 2020, 31 pages.
Final Office Action received for U.S. Appl. No. 16/584,281, dated Apr. 15, 2020, 26 pages.
Final Office Action received for U.S. Appl. No. 16/585,721, dated Apr. 1, 2020, 28 pages.
Final Office Action received for U.S. Appl. No. 16/861,651, dated Apr. 20, 2021, 14 pages.
Final Office Action received for U.S. Appl. No. 16/935,002, dated Jan. 5, 2022, 25 pages.
Final Office Action received for U.S. Appl. No. 16/997,588, dated Mar. 30, 2021, 23 pages.
Final Office Action received for U.S. Appl. No. 17/031,671, dated Sep. 7, 2021, 27 pages.
Final Office Action received for U.S. Appl. No. 17/031,765, dated Oct. 29, 2021, 34 pages.
Final Office Action received for U.S. Appl. No. 17/041,350, dated Sep. 17, 2021, 25 pages.
Final Office Action received for U.S. Appl. No. 14/815,879, dated Mar. 24, 2016, 46 pages.
First Action Interview received for U.S. Appl. No. 14/815,890, dated Aug. 12, 2016, 3 pages.
Fitbit surge Fitness Watch, Manual version 1.0, May 7, 2015, 48 pages.
Fuchphone Extras, LG G Watch—Designs | Watch Faces, Available online at: https://www.youtube.com/watch?v=yqxzqdi_MSE, Jul. 27, 2014, 1 page.
Fuchphone Extras, Samsung Gear Live—Designs | Watch Faces, Available online at: https://www.youtube.com/watch?v=fFjtVAxyimE, Jul. 26, 2014, 1 page.
Fukuda, Kazuhiro, Xperia Z1 Perfect Manual, Sotec Co., Ltd., No. 1, Nov. 15, 2013, pp. 217-218.
Gazer, iPhone 4S Super Manual, Shuwa System Co., Saito Kazukuni, vol. 1, Jun. 6, 2013, 7 pages.
Geary, David, Programming HTML5 Canvas, O'Reilly Japan, Inc., No. 1, Jul. 23, 2014, pp. 327-330.
Geek, How to Put the Day of the Week into the Windows Taskbar Clock, available online at: https://www.howtogeek.com/194103/how-to-put-the-day-of-the-week-into-the-windows-taskbar-clock/, 2014, 3 pages.
Google Earth 7.0.1.8244, retrieved from the Internet: http://dl.google.com/dl/earth/client/ge7/release_7_0_1/googleearth-win-bundle-7.0.1.8244.exe, Oct. 29, 2012,1 page.
Google Earth on Android—AndroidCentral.com,Available online at:—https://www.youtube.com/watch?v=1WxN1RunrE4, Feb. 22, 2010, 1 page.
GottaBeMobile, How to Change Watch Faces on Android Wear, Available online at URL: https://www.youtube.com/watch?v=B8iRGkGq6a8, Jul. 9, 2014, 4 pages.
Intention to Grant received for Danish Patent Application No. PA201570496, dated Feb. 17, 2016, 6 pages.
Intention to Grant received for Danish Patent Application No. PA201770397, dated Aug. 18, 2017, 7 pages.
Intention to Grant received for Danish Patent Application No. PA201770791, dated Feb. 19, 2020, 2 pages.
Intention to Grant received for Danish Patent Application No. PA201970596, dated Dec. 1, 2020, 2 pages.
Intention to Grant received for Danish Patent Application No. PA201970597, dated Apr. 20, 2021, 2 pages.
Intention to Grant received for Danish Patent Application No. PA202070609, dated Jan. 14, 2021, 2 pages.
Intention to Grant received for European Patent Application No. 15730925.3, dated Aug. 16, 2021, 10 pages.
Intention to Grant received for European Patent Application No. 15730925.3, dated May 28, 2020, 10 pages.
Intention to Grant received for European Patent Application No. 15747595.5, dated Feb. 17, 2020, 8 pages.
Intention to Grant received for European Patent Application No. 16762356.0, dated Dec. 23, 2021, 8 pages.
Intention to Grant received for European Patent Application No. 17206177.2, dated Feb. 24, 2020, 8 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/035090, dated Dec. 14, 2017, 14 pages.
International Preliminary Report on Patentability received for PCT Patent Application No. PCT/US2016/037686, dated Mar. 1, 2018, 12 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2018/032164, dated Nov. 21, 2019, 11 pages.
International Preliminary Report on Patentability received for PCT Patent Application No. PCT/US2019/030770, dated Nov. 19, 2020, 14 pages.
International Preliminary Report on Patentability received for PCT Patent Application No. PCT/US2020/030079, dated Nov. 18, 2021, 12 pages.
International Preliminary Report on Patentability received for PCT Patent Application No. PCT/US2020/031536, dated Nov. 18, 2021, 11 pages.
International Preliminary Report on Patentability received for PCT Patent Application No. PCT/US2020/031575, dated Nov. 18, 2021, 9 pages.

(56) References Cited

OTHER PUBLICATIONS

International Search Report and Written Opinion received for PCT Application No. PCT/US2015/034604, dated Nov. 9, 2015, 30 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/053353, dated May 9, 2016, 21 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2018/032164, dated Oct. 18, 2018, 16 pages.
International Search Report and Written Opinion received for PCT Patent Application No. PCT/US2019/030770, dated Oct. 31, 2019, 23 pages.
International Search Report and Written Opinion received for PCT Patent Application No. PCT/US2020/030079, dated Sep. 4, 2020, 18 pages.
International Search Report and Written Opinion received for PCT Patent Application No. PCT/US2020/031536, dated Sep. 23, 2020, 16 pages.
International Search Report and Written Opinion received for PCT Patent Application No. PCT/US2020/031575, dated Aug. 20, 2020, 14 pages.
International Search Report and Written Opinion received for PCT Patent Application No. PCT/US2020/045814, dated Jan. 20, 2021, 16 pages.
International Search Report and Written Opinion received for PCT Patent Application No. PCT/US2021/031212, dated Sep. 21, 2021, 21 pages.
International Search Report and Written Opinion received for PCT Patent Application No. PCT/US2021/031669, dated Oct. 13, 2021, 17 pages.
International Search Report and Written Opinion received for PCT Patent Application No. PCT/US2015/034607, dated Dec. 1, 2015, 23 pages.
Internet Blog Post, [PC] Pre-Customization of Black Desert's Characters, Online Available at: https://blog.naver.com/hsh6051/220209813968>, Dec. 14, 2014, 41 pages.
Inventerium, Tropical Fish 14, Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604 dated Sep. 4, 2015, 6 pages.
Invitation to Additional Fees and Partial International Search Report received for PCT Patent Application No. PCT/US2015/034606 dated Sep. 9, 2015, 6 pages.
Invitation to Pay Additional Fee received for European Patent Application No. 15747595.5, dated Feb. 9, 2018, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, Nov. 3, 2015, 5 pages.
Invitation to Pay Additional Fees received for PCT Patent Application No. PCT/US2015/044485, dated Nov. 3, 2015, Nov. 3, 2015, 7 pages.
Invitation to Pay Additional fees received for PCT Patent Application No. PCT/US2015/053353, dated Jan. 21, 2016, 7 pages.
Invitation to pay additional fees received for PCT Patent Application No. PCT/US2015/054223, dated Mar. 9, 2016, 9 pages.
Invitation to Pay Additional Fees received for PCT Patent Application No. PCT/US2016/035090, dated Jul. 15, 2016, 2 pages.
Invitation to Pay Additional Fees received for PCT Patent Application No. PCT/US2018/032164, dated Aug. 21, 2018, 10 pages.
Invitation to Pay Additional Fees received for PCT Patent Application No. PCT/US2019/030770, dated Jul. 26, 2019, 12 pages.
Invitation to Pay Additional Fees received for PCT Patent Application No. PCT/US2020/030079, dated Jul. 14, 2020, 12 pages.
Invitation to Pay Additional Fees received for PCT Patent Application No. PCT/US2020/031536, dated Jul. 31, 2020, 9 pages.
Invitation to Pay Additional Fees received for PCT Patent Application No. PCT/US2020/045814, dated Nov. 18, 2020, 11 pages.
Invitation to Pay Additional Fees received for PCT Patent Application No. PCT/US2021/031212, dated Jul. 28, 2021, 19 pages.
Invitation to Pay Additional Fees received for PCT Patent Application No. PCT/US2021/031669, dated Aug. 19, 2021, 9 pages.
Invitation to Pay Search Fees received for European Patent Application No. 20761084.1, dated Dec. 7, 2021, 3 pages.
ISO 9241-13:1998, Ergonomic requirements for office work with visual display terminals (VDTs), Part 13: User guidance, International Standard ISO, Zuerich, CH, vol. 9241-13, Jul. 15, 1998, 40 pages.
Jean, Our Pact Parental Control Review, Available online at : https://www.bewebsmart.com/parental-controls/our-pact-parental-control-review/, Jun. 25, 2016, 25 pages.
Kasai, Yoshino, Apple Watch Absolute Basics—Season 3—The key is to customize the dial, Mynavi Corporation, Online Available at: https://news.mynavi.jp/article/20171104-apple_watch/, Nov. 4, 2017, 5 pages.
Kenney, Briley, How To Customize a Smartwatch and other Personalization Questions, Available online at: https://smartwatches.org/learn/customize-smartwatch/, Jan. 23, 2014, 3 pages.
Kidizoom Smartwatch, Available online at: https://www.vtechnl.com/media/downloads/Kidizoom-Smart-Watch.pdf, Jun. 24, 2014, 23 pages.
Link to Wayback Machine with link to Google Play showing different layouts of complications associated with a clock face, available online at: https://play.google.com/store/apps/details?id=com.levelup.beautifulwidgets.free&hl=da, Sep. 9, 2013, 6 pages.
Living Earth, available at: http;//www.livingearthapp.com/, 2014, 6 pages.
Looking for a launcher that changes the default homescreen or widgets based on wifi, location, or other context, Online Available at: https://www.reddit.com/r/androidapps/comments/35lu90/looking_for_a_launcher_that_changes_the_default/,2015, 2 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
Minutes of Oral Proceedings received for European Patent Application No. 16762356.0, mailed on Dec. 17, 2021, 5 pages.
MS Excel 2013, Jan. 29, 2013, 2 pages.
My Mate Vince, Setting up the Fitbit Alta HR Activity Tracker on Apple iOS, Online available at:—<https://youtu.be/FdwRF4IfvFc>, Jun. 18, 2017, 3 pages.
Nerdtalk, The Best Android Clock Widgets, available at: https://www.youtube.com/watch?v=E1bAprWByfU, Apr. 25, 2011, 1 page.

(56) References Cited

OTHER PUBLICATIONS

New, but unsigned—Easy StopWatch for Symbian, XP55393563, Available online at <http://www.allaboutsymbian.com/flow/item/19490_New_but_unsigned-Easy_StopWatc.php, Mar. 15, 2014, 15 pages.
Night Display (Alarm Clock) App, Google Play Store Night Display (Alarm Clock) Description page, available at: <https://web.archive.org/web/20141007124222/https://play.google.com/store/apps/details?id=com.srk.nighttimedisplay&hl=en>, Oct. 7, 2014, pp. 1-3.
Non-Final Office Action received for U.S. Appl. No. 14/815,890, dated Jun. 6, 2017, 19 pages.
Non-Final Office Action received for U.S. Appl. No. 14/815,890, dated Oct. 19, 2015, 5 pages.
Non-Final Office Action received for U.S. Appl. No. 15/881,544, dated Jun. 7, 2018, 15 pages.
Non-Final Office Action received for U.S. Appl. No. 15/421,865, dated Mar. 21, 2019, 18 pages.
Non-Final Office Action received for U.S. Appl. No. 15/554,204, dated Apr. 17, 2019, 19 pages.
Non-Final Office Action received for U.S. Appl. No. 14/815,879, dated Dec. 15, 2016, 33 pages.
Non-Final Office Action received for U.S. Appl. No. 14/815,890, dated Dec. 18, 2018, 21 pages.
Non-Final Office Action received for U.S. Appl. No. 14/821,667, dated Feb. 4, 2019, 13 pages.
Non-Final Office Action received for U.S. Appl. No. 14/821,667, dated Jul. 14, 2017, 12 pages.
Non-Final Office Action received for U.S. Appl. No. 14/839,889, dated Mar. 7, 2017, 26 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 14/846,511 dated Jan. 7, 2020, 25 pages.
Non-Final Office Action received for U.S. Appl. No. 14/846,511 dated Oct. 27, 2017, 15 pages.
Non-Final Office Action received for U.S. Appl. No. 15/183,663, dated Jul. 9, 2018, 13 pages.
Non-Final Office Action received for U.S. Appl. No. 15/355,956, dated May 31, 2019, 32 pages.
Non-Final Office Action received for U.S. Appl. No. 15/405,122, dated Apr. 2, 2021, 35 pages.
Non-Final Office Action received for U.S. Appl. No. 15/405,122, dated May 31, 2019, 43 pages.
Non-Final Office Action received for U.S. Appl. No. 15/405,122, dated Sep. 24, 2020, 30 pages.
Non-Final Office Action received for U.S. Appl. No. 15/421,865, dated Dec. 29, 2021, 23 pages.
Non-Final Office Action received for U.S. Appl. No. 15/421,865, dated Oct. 7, 2020, 20 pages.
Non-Final Office Action received for U.S. Appl. No. 15/798,235, dated Apr. 24, 2019, 25 pages.
Non-Final Office Action received for U.S. Appl. No. 15/798,235, dated Mar. 14, 2018, 58 pages.
Non-Final Office Action received for U.S. Appl. No. 16/389,722, dated Apr. 3, 2020, 15 pages.
Non-Final Office Action received for U.S. Appl. No. 16/389,722, dated Jun. 3, 2021, 17 pages.
Non-Final Office Action received for U.S. Appl. No. 16/401,934, dated Dec. 11, 2020, 26 pages.
Non-Final Office Action received for U.S. Appl. No. 16/418,786, dated Apr. 24, 2020, 16 pages.
Non-Final Office Action received for U.S. Appl. No. 16/418,786, dated Oct. 4, 2021, 10 pages.
Non-Final Office Action received for U.S. Appl. No. 16/582,020, dated Apr. 5, 2021, 29 pages.
Non-Final Office Action received for U.S. Appl. No. 16/582,020, dated Jan. 13, 2020, 39 pages.
Non-Final Office Action received for U.S. Appl. No. 16/584,281, dated Dec. 10, 2019, 23 pages.
Non-Final Office Action received for U.S. Appl. No. 16/584,445, dated Dec. 26, 2019, 19 pages.
Non-Final Office Action received for U.S. Appl. No. 16/585,399, dated Jan. 23, 2020, 28 pages.
Non-Final Office Action received for U.S. Appl. No. 16/585,714, dated Apr. 16, 2020, 18 pages.
Non-Final Office Action received for U.S. Appl. No. 16/585,721, dated Dec. 27, 2019, 25 pages.
Non-Final Office Action received for U.S. Appl. No. 16/659,507, dated Oct. 7, 2020, 16 pages.
Non-Final Office Action received for U.S. Appl. No. 16/861,651, dated Nov. 27, 2020, 11 pages.
Non-Final Office Action received for U.S. Appl. No. 16/861,651, dated Sep. 30, 2021, 16 pages.
Non-Final Office Action received for U.S. Appl. No. 16/935,002, dated Jun. 25, 2021, 20 pages.
Non-Final Office Action received for U.S. Appl. No. 16/943,737, dated Jun. 25, 2021, 18 pages.
Non-Final Office Action received for U.S. Appl. No. 16/997,588, dated Dec. 14, 2020, 21 pages.
Non-Final Office Action received for U.S. Appl. No. 17/031,654, dated Nov. 19, 2020, 12 pages.
Non-Final Office Action received for U.S. Appl. No. 17/031,671, dated Apr. 30, 2021, 27 pages.
Non-Final Office Action received for U.S. Appl. No. 17/031,765, dated Jun. 28, 2021, 32 pages.
Non-Final Office Action received for U.S. Appl. No. 17/041,350, dated Jun. 10, 2021, 24 pages.
Non-Final Office Action received for U.S. Appl. No. 17/068,386, dated Jul. 15, 2021, 16 pages.
Non-Final Office Action received for U.S. Appl. No. 17/068,386, dated Oct. 28, 2021, 20 pages.
Non-Final Office Action received for U.S. Appl. No. 17/317,042, dated Nov. 10, 2021, 13 pages.
Non-Final Office Action received for U.S. Appl. No. 14/846,511, dated Nov. 30, 2018, 22 pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Non-Final Office Action received for U.S. Appl. No. 17/078,896, dated Dec. 24, 2021, 17 pages.
Notice of Acceptance received for Australian Patent Application No. 2015298710, dated Oct. 8, 2019, 3 pages.
Notice of Acceptance received for Australian Patent Application No. 2016229847, dated Sep. 12, 2018, 3 pages.
Notice of Acceptance received for Australian Patent Application No. 2017277813, dated Jun. 16, 2020, 3 pages.
Notice of Acceptance received for Australian Patent Application No. 2018201089, dated May 28, 2021, 3 pages.
Notice of Acceptance received for Australian Patent Application No. 2018279037, dated May 13, 2020, 3 pages.
Notice of Acceptance received for Australian Patent Application No. 2019208225, dated Jan. 21, 2021, 3 pages.
Notice of Acceptance received for Australian Patent Application No. 2019267413, dated Nov. 23, 2021, 3 pages.
Notice of Acceptance received for Australian Patent Application No. 2020204506, dated Apr. 8, 2021, 3 pages.
Notice of Acceptance received for Australian Patent Application No. 2020239670, dated Jul. 2, 2021, 3 pages.
Notice of Acceptance received for Australian Patent Application No. 2020269232, dated Dec. 16, 2021, 3 pages.
Notice of Acceptance received for Australian Patent Application No. 2020309093, dated Jul. 8, 2021, 3 pages.
Notice of Acceptance received for Australian Patent Application No. 2021202834, dated Jul. 15, 2021, 3 pages.

(56) References Cited

OTHER PUBLICATIONS

Notice of Acceptance received for Australian Patent Application No. 2021202836, dated Jun. 25, 2021, 3 pages.
Notice of Allowance received for Chinese Patent Application No. 201510479088.4, dated Jan. 21, 2021, 2 pages.
Notice of Allowance received for Chinese Patent Application No. 201510481525.6, dated May 27, 2019, 2 pages.
Notice of Allowance received for Chinese Patent Application No. 201510483268.X, dated Nov. 6, 2019, 2 pages.
Notice of Allowance received for Chinese Patent Application No. 201510483305.7, dated Jan. 8, 2019, 3 pages.
Notice of Allowance received for Chinese Patent Application No. 201510484514.3, dated Jun. 6, 2019, 2 pages.
Notice of Allowance received for Chinese Patent Application No. 201520594249.X, dated Jul. 12, 2016, 4 pages.
Notice of Allowance received for Chinese Patent Application No. 201680013193.1, dated May 7, 2021, 5 pages.
Notice of Allowance received for Chinese Patent Application No. 201680047983.1, dated Apr. 28, 2021, 3 pages.
Notice of Allowance received for Chinese Patent Application No. 201780033973.7, dated Jul. 7, 2021, 5 pages.
Notice of Allowance received for Chinese Patent Application No. 201810037665.8, dated Jul. 9, 2019, 4 pages.
Notice of Allowance received for Chinese Patent Application No. 201910906898.1, dated Oct. 28, 2021, 4 pages.
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Japanese Patent Application No. 2017-505450, dated Mar. 9, 2018, 10 pages.
Notice of Allowance received for Japanese Patent Application No. 2017-505842, dated Mar. 16, 2020, 4 pages.
Notice of Allowance received for Japanese Patent Application No. 2017-505847, dated May 20, 2019, 4 pages.
Notice of Allowance received for Japanese Patent Application No. 2017-545918, dated Jul. 22, 2019, 4 pages.
Notice of Allowance received for Japanese Patent Application No. 2018-074971, dated Apr. 23, 2019, 4 pages.
Notice of Allowance received for Japanese Patent Application No. 2018-537840, dated Mar. 19, 2020, 4 pages.
Notice of Allowance received for Japanese Patent Application No. 2019-096219, dated Jun. 26, 2020, 4 pages.
Notice of Allowance received for Japanese Patent Application No. 2019-151358, dated Jan. 22, 2021, 4 pages.
Notice of Allowance received for Japanese Patent Application No. 2020-074878, dated May 28, 2021, 4 pages.
Notice of Allowance received for Japanese Patent Application No. 2020-551465, dated Jun. 28, 2021, 4 pages.
Notice of Allowance received for Korean Patent Application No. 10-2017-7005939, dated Mar. 30, 2018, 5 pages.
Notice of Allowance received for Korean Patent Application No. 10-2018-7018904, dated Jun. 26, 2020, 4 pages.
Notice of Allowance received for Korean Patent Application No. 10-2018-7022101, dated Oct. 14, 2019, 4 pages.
Notice of Allowance received for Korean Patent Application No. 10-2019-7029673, dated Aug. 3, 2021, 3 pages.
Notice of Allowance received for Korean Patent Application No. 10-2020-7001340, dated May 10, 2021, 5 pages.
Notice of Allowance received for Korean Patent Application No. 10-2020-7026036, dated Jul. 26, 2021, 4 pages.
Notice of Allowance received for Korean Patent Application No. 10-2020-7028759, dated Oct. 19, 2021, 4 pages.
Notice of Allowance received for Korean Patent Application No. 10-2021-7002597, dated Feb. 25, 2021, 5 pages.
Notice of Allowance received for Korean Patent Application No. 10-2021-7013453, dated Aug. 11, 2021, 5 pages.
Notice of Allowance received for Korean Patent Application No. 10-2021-7013454, dated Aug. 12, 2021, 4 pages.
Notice of Allowance received for Taiwanese Patent Application No. 104124962, dated Jul. 27, 2017, 3 pages.
Notice of Allowance received for Taiwanese Patent Application No. 104124963, dated Sep. 28, 2017, 5 pages.
Notice of Allowance received for Taiwanese Patent Application No. 104124995, dated Jul. 27, 2017, 3 pages.
Notice of Allowance received for Taiwanese Patent Application No. 104124997, dated Jun. 16, 2017, 5 pages.
Notice of Allowance received for Taiwanese Patent Application No. 104124998, dated Mar. 31, 2017, 3 pages.
Notice of Allowance received for Taiwanese Patent Application No. 104134740, dated Dec. 8, 2016, 5 pages.
Notice of Allowance received for U.S. Appl. No. 14/815,879, dated Jun. 26, 2017, 8 pages.
Notice of Allowance received for U.S. Appl. No. 14/815,890, dated Feb. 12, 2021, 8 pages.
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/821,667, dated Jun. 12, 2019, 9 pages.
Notice of Allowance received for U.S. Appl. No. 14/839,889, dated Oct. 30, 2017, 16 pages.
Notice of Allowance received for U.S. Appl. No. 15/183,663, dated Jan. 17, 2019, 6 pages.
Notice of Allowance received for U.S. Appl. No. 15/355,956, dated Nov. 22, 2019, 29 pages.
Notice of Allowance received for U.S. Appl. No. 15/554,204, dated Jul. 13, 2020, 10 pages.
Notice of Allowance received for U.S. Appl. No. 15/798,235, dated Apr. 1, 2020, 8 pages.
Notice of Allowance received for U.S. Appl. No. 15/798,235, dated Sep. 22, 2020, 8 pages.
Notice of Allowance received for U.S. Appl. No. 15/798,257, dated May 22, 2019, 14 pages.
Notice of Allowance received for U.S. Appl. No. 15/881,544, dated Jun. 26, 2019, 6 pages.
Notice of Allowance received for U.S. Appl. No. 15/881,544, dated Nov. 7, 2019, 5 pages.
Notice of Allowance received for U.S. Appl. No. 16/401,934, dated Feb. 2, 2022, 8 pages.
Notice of Allowance received for U.S. Appl. No. 16/401,934, dated Nov. 1, 2021, 11 pages.
Notice of Allowance received for U.S. Appl. No. 16/418,786, dated Dec. 9, 2021, 9 pages.
Notice of Allowance received for U.S. Appl. No. 16/582,020, dated Jul. 27, 2021, 29 pages.
Notice of Allowance received for U.S. Appl. No. 16/584,281, dated Nov. 18, 2020, 8 pages.
Notice of Allowance received for U.S. Appl. No. 16/584,281, dated Sep. 29, 2020, 5 pages.
Notice of Allowance received for U.S. Appl. No. 16/584,445, dated Apr. 17, 2020, 9 pages.
Notice of Allowance received for U.S. Appl. No. 16/584,445, dated Jul. 23, 2020, 8 pages.
Notice of Allowance received for U.S. Appl. No. 16/584,445, dated Jun. 24, 2020, 5 pages.
Notice of Allowance received for U.S. Appl. No. 16/584,445, dated May 29, 2020, 5 pages.

(56) References Cited

OTHER PUBLICATIONS

Notice of Allowance received for U.S. Appl. No. 16/584,445, dated Oct. 21, 2020, 6 pages.
Notice of Allowance received for U.S. Appl. No. 16/585,366, dated Jan. 2, 2020, 6 pages.
Notice of Allowance received for U.S. Appl. No. 16/585,399, dated Jul. 21, 2020, 9 pages.
Notice of Allowance received for U.S. Appl. No. 16/585,714, dated Jan. 8, 2021, 8 pages.
Notice of Allowance received for U.S. Appl. No. 16/585,714, dated Jan. 27, 2021, 2 pages.
Notice of Allowance received for U.S. Appl. No. 16/585,714, dated Sep. 25, 2020, 15 pages.
Notice of Allowance received for U.S. Appl. No. 16/585,721, dated Oct. 30, 2020, 9 pages.
Notice of Allowance received for U.S. Appl. No. 16/585,721, dated Sep. 30, 2020, 15 pages.
Notice of Allowance received for U.S. Appl. No. 16/659,507, dated Feb. 24, 2021, 7 pages.
Notice of Allowance received for U.S. Appl. No. 16/867,002, dated Aug. 20, 2021, 12 pages.
Notice of Allowance received for U.S. Appl. No. 16/997,588, dated Sep. 30, 2021, 12 pages.
Notice of Allowance received for U.S. Appl. No. 17/031,654, dated Feb. 10, 2021, 9 pages.
Notice of Allowance received for U.S. Appl. No. 17/031,654, dated May 27, 2021, 8 pages.
Notice of Allowance received for U.S. Appl. No. 17/087,845, dated Oct. 28, 2021, 9 pages.
Nova Launcher—Lock Screen Edit, Online Available at: https://forums.androidcentral.com/ask-question/835057-nova-launcher-lock-screen-edit.html, Sep. 2017, 2 pages.
Nova, Tour of the Solar System, Retrieved from: <http://www.pbs.org/wgbh/nova/space/tour-solar-system.html>, May 24, 2013, 14 pages.
Obara, Yuuta, iPhone Application Selection for Univesity Students, Shuwa System Co., Saito Kazukuni, vol. 1, May 16, 2013, 4 pages.
Octoba, Just Install It—Utilizing Method for Android Application Business, ASCII Media Works Co., Takano Kiyoshi, vol. 1, Apr. 25, 2013, 6 pages.
Office Action and Search Report received for Danish Patent Application No. PA201970598, dated Jan. 28, 2020, 6 pages.
Office Action received for Australian Patent Application No. 2015101020, dated Oct. 26, 2015, 8 pages.
Office Action received for Danish Patent Application No. PA201570499, dated Nov. 1, 2017, 6 pages.
Office Action received for European Patent Application No. 15730924.6, dated Dec. 12, 2017, 8 pages.
Office Action received for Australian Patent Application No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016229847, dated Jul. 3, 2018, 4 pages.
Office Action received for Australian Patent Application No. 2017277813, dated Jun. 11, 2019, 3 pages.
Office Action received for Australian Patent Application No. 2017277813, dated Mar. 20, 2020, 4 pages.
Office Action received for Australian Patent Application No. 2018201089, dated Jul. 23, 2020, 4 pages.
Office Action received for Australian Patent Application No. 2018201089, dated Oct. 11, 2019, 4 pages.
Office Action received for Australian Patent Application No. 2018206770, dated Apr. 30, 2019, 4 pages.
Office Action received for Australian Patent Application No. 2018206770, dated Jul. 16, 2019, 5 pages.
Office Action received for Australian Patent Application No. 2018206770, dated Jul. 25, 2018, 5 pages.
Office Action received for Australian Patent Application No. 2018206770, dated Mar. 5, 2019, 3 pages.
Office Action received for Australian Patent Application No. 2018279037, dated Jan. 17, 2020, 4 pages.
Office Action received for Australian Patent Application No. 2018279037, dated Jun. 18, 2019, 5 pages.
Office Action received for Australian Patent Application No. 2019208225, dated Dec. 21, 2020, 3 pages.
Office Action received for Australian Patent Application No. 2019208225, dated Mar. 20, 2020, 3 pages.
Office Action received for Australian Patent Application No. 2019267413, dated Jun. 29, 2021, 3 pages.
Office Action received for Australian Patent Application No. 2020102158, dated Apr. 27, 2021, 5 pages.
Office Action received for Australian Patent Application No. 2020102158, dated Dec. 8, 2020, 9 pages.
Office Action received for Australian Patent Application No. 2020204506, dated Dec. 7, 2020, 6 pages.
Office Action received for Australian Patent Application No. 2020239670, dated Mar. 3, 2021, 4 pages.
Office Action received for Australian Patent Application No. 2020239749, dated Jul. 16, 2021, 5 pages.
Office Action received for Australian Patent Application No. 2020239774, dated Jun. 28, 2021, 8 pages.
Office Action received for Australian Patent Application No. 2020239774, dated Oct. 5, 2021, 3 pages.
Office Action received for Australian Patent Application No. 2020250323, dated Dec. 14, 2021, 2 pages.
Office Action received for Australian Patent Application No. 2020309093, dated Jan. 21, 2021, 3 pages.
Office Action received for Australian Patent Application No. 2021202834, dated May 28, 2021, 2 pages.
Office Action received for Australian Patent Application No. 2015101019, dated Feb. 12, 2016, 4 pages.
Office Action received for Chinese Patent Application No. 201520595384.6, dated Mar. 25, 2016, 3 pages.
Office Action received for Chinese Patent Application No. 201510479088.4, dated Apr. 22, 2020, 7 pages.
Office Action received for Chinese Patent Application No. 201510479088.4, dated Mar. 12, 2018, 20 pages.
Office Action received for Chinese Patent Application No. 201510479088.4, dated May 7, 2019, 6 pages.
Office Action received for Chinese Patent Application No. 201510481525.6, dated Aug. 29, 2018, 10 pages.
Office Action received for Chinese Patent Application No. 201510481525.6, dated Nov. 29, 2017, 9 pages.
Office Action received for Chinese Patent Application No. 201510483268.X, dated Apr. 16, 2019, 6 pages.
Office Action received for Chinese Patent Application No. 201510483268.X, dated Dec. 1, 2017, 11 pages.
Office Action received for Chinese Patent Application No. 201510483268.X, dated Oct. 19, 2018, 10 pages.
Office action received for Chinese Patent Application No. 201510483305.7, dated Aug. 31, 2018, 10 pages.

(56) References Cited

OTHER PUBLICATIONS

Office action received for Chinese Patent Application No. 201510483305.7, dated Dec. 1, 2017, 13 pages.
Office Action received for Chinese Patent Application No. 201510484514.3, dated Apr. 4, 2018, 12 pages.
Office Action received for Chinese Patent Application No. 201510484514.3, dated Dec. 24, 2018, 13 pages.
Office Action received for Chinese Patent Application No. 201520594249.X, dated Mar. 25, 2016, 3 pages.
Office Action received for Chinese Patent Application No. 201520595384.6, dated Dec. 30, 2016, 2 pages.
Office Action received for Chinese Patent Application No. 201520595384.6, dated Jul. 22, 2016, 3 pages.
Office Action received for Chinese Patent Application No. 201520595385.0, dated Dec. 30, 2016, 2 pages.
Office Action received for Chinese Patent Application No. 201520595385.0, dated Jul. 22, 2016, 3 pages.
Office Action received for Chinese Patent Application No. 201520595385.0, dated Mar. 25, 2016, 3 pages.
Office Action received for Chinese Patent Application No. 201520595408.8, dated Dec. 9, 2015, 4 pages.
Office Action received for Chinese Patent Application No. 201520595408.8, dated Dec. 30, 2016, 2 pages.
Office Action received for Chinese Patent Application No. 201520595408.8, dated Jul. 25, 2016, 3 pages.
Office Action received for Chinese Patent Application No. 201520595408.8, dated Mar. 25, 2016, 3 pages.
Office Action received for Chinese Patent Application No. 201520595538.1, dated Dec. 30, 2016, 2 pages.
Office Action received for Chinese Patent Application No. 201520595538.1, dated Jul. 22, 2016, 3 pages.
Office Action received for Chinese Patent Application No. 201520595538.1, dated Mar. 25, 2016, 3 pages.
Office Action received for Chinese Patent Application No. 201680013193.1, dated Feb. 1, 2021, 8 pages.
Office Action received for Chinese Patent Application No. 201680013193.1, dated Mar. 25, 2020, 21 pages.
Office Action received for Chinese Patent Application No. 201680013193.1, dated Sep. 7, 2020, 6 pages.
Office Action received for Chinese Patent Application No. 201680047983.1, dated Feb. 1, 2021, 6 pages.
Office Action received for Chinese Patent Application No. 201680047983.1, dated Jul. 1, 2020, 6 pages.
Office Action received for Chinese Patent Application No. 201680047983.1, dated Mar. 18, 2019, 18 pages.
Office Action received for Chinese Patent Application No. 201680047983.1, dated Nov. 28, 2019, 9 pages.
Office Action received for Chinese Patent Application No. 201780033973.7, dated Jan. 22, 2021, 27 pages.
Office Action received for Chinese Patent Application No. 201810037665.8, dated Dec. 7, 2018, 10 pages.
Office Action received for Chinese Patent Application No. 201910906898.1, dated Jun. 23, 2021, 6 pages.
Office Action received for Chinese Patent Application No. 201910906898.1, dated Sep. 9, 2020, 8 pages.
Office Action received for Chinese Patent Application No. 202110194015.6, dated Sep. 28, 2021, 13 pages.
Office Action received for Chinese Patent Application No. 202110453180.9, dated Nov. 8, 2021, 21 pages.
Office Action received for Chinese Patent Application No. 202110454541.1, dated Oct. 20, 2021, 19 pages.
Office Action received for Chinese Patent Application No. 201520594249.X, dated Dec. 9, 2015, 4 pages.
Office Action received for Chinese Patent Application No. 201520595538.1, dated Dec. 9, 2015, 4 pages.
Office Action received for Chinese Patent Application No. 201520595385.0, dated Dec. 9, 2015, 4 pages.
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570498, dated Oct. 30, 2015, 7 pages.
Office Action received for Danish Patent Application No. PA201570499, dated Feb. 14, 2017, 2 pages.
Office Action received for Danish Patent Application No. PA201570499, dated Jun. 16, 2016, 8 pages.
Office Action received for Danish Patent Application No. PA201570499, dated Jun. 19, 2018, 4 pages.
Office Action received for Danish Patent Application No. PA201570499, dated Nov. 3, 2015, 7 pages.
Office Action received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201770791, dated Jan. 31, 2018, 8 pages.
Office Action received for Danish Patent Application No. PA201770791, dated Jul. 13, 2018, 2 pages.
Office Action received for Danish Patent Application No. PA201770791, dated Jun. 11, 2019, 3 pages.
Office Action received for Danish Patent Application No. PA201970596, dated May 6, 2020, 4 pages.
Office Action received for Danish Patent Application No. PA201970597, dated Oct. 29, 2020, 4 pages.
Office Action received for Danish Patent Application No. PA201970598, dated Apr. 15, 2021, 6 pages.
Office Action received for Danish Patent Application No. PA201970598, dated Oct. 9, 2020, 4 pages.
Office Action received for Danish Patent Application No. PA201970599, dated Jan. 23, 2020, 6 pages.
Office Action received for Danish Patent Application No. PA201970599, dated Mar. 1, 2021, 4 pages.
Office Action received for Danish Patent Application No. PA201970599, dated May 27, 2020, 4 pages.
Office Action received for Danish Patent Application No. PA202070609, dated Dec. 10, 2020, 8 pages.
Office Action received for Danish Patent Application No. PA202070610, dated Jun. 18, 2021, 8 pages.
Office Action received for Danish Patent Application No. PA202070623, dated Aug. 24, 2021, 3 pages.
Office Action received for Danish Patent Application No. PA202070624, dated Jun. 16, 2021, 5 pages.
Office Action received for Danish Patent Application No. PA202070625, dated Jun. 16, 2021, 3 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for European Patent Application No. 15730925.3, dated Apr. 12, 2018, 8 pages.

(56) References Cited

OTHER PUBLICATIONS

Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 16762356.0, dated Dec. 11, 2020, 7 pages.
Office Action received for European Patent Application No. 16837432.0, dated Jan. 10, 2020, 7 pages.
Office Action received for European Patent Application No. 16837432.0, dated Jan. 27, 2021, 7 pages.
Office Action received for European Patent Application No. 17206177.2, dated May 15, 2018, 6 pages.
Office Action received for European Patent Application No. 17810723.1, dated Jul. 9, 2021, 8 pages.
Office Action received for European Patent Application No. 20172197.4, dated Aug. 5, 2020, 6 pages.
Office Action received for European Patent Application No. 20172197.4, dated Jul. 8, 2021, 5 pages.
Office Action received for European Patent Application No. 15730925.3, dated Feb. 27, 2019, 5 pages.
Office Action received for German Patent Application No. 112015003083.2, dated Mar. 9, 2018, 12 pages.
Office Action received for Indian Patent Application No. 202017041557, dated Dec. 8, 2021, 8 pages.
Office Action received for Japanese Patent Application No. 2017-505450, dated Jun. 20, 2017, 8 pages.
Office Action received for Japanese Patent Application No. 2017-505842, dated Feb. 22, 2019, 11 pages.
Office Action received for Japanese Patent Application No. 2017-505842, dated Sep. 9, 2019, 7 pages.
Office Action received for Japanese Patent Application No. 2017-505847, dated Feb. 12, 2019, 13 pages.
Office Action received for Japanese Patent Application No. 2017-545918, dated Sep. 14, 2018, 12 pages.
Office Action received for Japanese Patent Application No. 2018-074971, dated Jan. 28, 2019, 6 pages.
Office Action received for Japanese Patent Application No. 2018-537840, dated Jul. 8, 2019, 15 pages.
Office Action received for Japanese Patent Application No. 2019-151358, dated Oct. 2, 2020, 5 pages.
Office Action received for Japanese Patent Application No. 2020-074878, dated Sep. 7, 2020, 13 pages.
Office Action received for Japanese Patent Application No. 2020-124605, dated Dec. 17, 2021, 2 pages.
Office Action received for Japanese Patent Application No. 2020-124605, dated Sep. 3, 2021, 5 pages.
Office Action received for Japanese Patent Application No. 2020-159823, dated Dec. 23, 2021, 8 pages.
Office Action received for Japanese Patent Application No. 2020-562622, dated Jan. 7, 2022, 13 pages.
Office Action received for Korean Patent Application No. 10-2017-7005939, dated Jun. 30, 2017, 6 pages.
Office Action received for Korean Patent Application No. 10-2017-7024570, dated Jul. 10, 2019, 6 pages.
Office Action received for Korean Patent Application No. 10-2017-7024570, dated Sep. 28, 2018, 14 pages.
Office Action received for Korean Patent Application No. 10-2018-7018904, dated Aug. 20, 2019, 8 pages.
Office Action received for Korean Patent Application No. 10-2018-7022101, dated Feb. 14, 2019, 15 pages.
Office Action received for Korean Patent Application No. 10-2018-7022101, dated Jul. 9, 2019, 10 pages.
Office Action received for Korean Patent Application No. 10-2019-7029673, dated Apr. 8, 2021, 7 pages.
Office Action received for Korean Patent Application No. 10-2019-7029673, dated Nov. 5, 2019, 10 pages.
Office Action received for Korean Patent Application No. 10-2019-7029673, dated Sep. 3, 2020, 9 pages.
Office Action received for Korean Patent Application No. 10-2020-7001340, dated Mar. 26, 2021, 13 pages.
Office Action received for Korean Patent Application No. 10-2020-7001340, dated Sep. 24, 2020, 19 pages.
Office Action received for Korean Patent Application No. 10-2020-7026036, dated Dec. 7, 2020, 8 pages.
Office Action received for Korean Patent Application No. 10-2020-7028759, dated Jun. 29, 2021, 12 pages.
Office Action received for Korean Patent Application No. 10-2021-7013453, dated Jun. 5, 2021, 6 pages.
Office Action received for Korean Patent Application No. 10-2021-7013454, dated Jun. 5, 2021, 6 pages.
Office Action received for Korean Patent Application No. 10-2021-7025301, dated Oct. 15, 2021, 5 pages.
Office Action received for Korean Patent Application No. 10-2021-7036016, dated Nov. 10, 2021, 13 pages.
Office Action received for Korean Patent Application No. 10-2021-7036246, dated Nov. 26, 2021, 5 pages.
Office Action received for Korean Patent Application No. 10-2021-7036678, dated Dec. 22, 2021, 6 pages.
Office Action received for Netherland Patent Application No. 2015245, dated Jan. 24, 2017, 11 pages.
Office Action received for Netherlands Patent Application No. 2015239, dated Oct. 28, 2016, 13 pages.
Office Action received for Taiwanese Patent Application No. 104124962, dated Nov. 29, 2016, 6 pages.
Office Action received for Taiwanese Patent Application No. 104124998, dated Nov. 29, 2016, 6 pages.
Office Action received for Taiwanese Patent Application No. 104124963, dated Jan. 5, 2017, 11 pages.
Office Action received for Taiwanese Patent Application No. 104124995, dated Dec. 1, 2016, 6 pages.
Office Action received for Taiwanese Patent Application No. 104124997, dated Dec. 8, 2016, 12 pages.
Office Action received for Taiwanese Patent Application No. 104126627, dated Nov. 29, 2016, 9 pages.
Office Action received for Taiwanese Patent Application No. 104126627, dated Aug. 30, 2018, 22 pages.
Office Action received for Taiwanese Patent Application No. 104126627, dated Dec. 20, 2018, 4 pages.
Office Action received for Taiwanese Patent Application No. 104126627, dated Oct. 16, 2017, 7 pages.
Office Action received for Taiwanese Patent Application No. 104132636, dated Dec. 13, 2018, 26 pages.
Office Action received for Taiwanese Patent Application No. 104132636, dated Mar. 23, 2017, 25 pages.
Office Action received for Taiwanese Patent Application No. 104132636, dated Oct. 31, 2017, 10 pages.
Omar Romero, Sony Smartwatch 2 Custom Watchfaces Tutorial, Retrieved From: <https://www.youtube.com/watch?v=8odbxqwSQR8>, May 1, 2014, 2 pages.
Online Alarm Clock, https://web.archive.org/web/20150505081746/http://www.online-stopwatch.com/online-alarm-clock, May 5, 2015, 2 pages.
Pentax K20D Operating Manual, http://www.ricoh-imaging.eu/en/operating-manuals-download.html, 2008, pp. 173-174.
Phandroid, New Android Wear Wrist Gestures in Marshmallow, Available online at: https://www.youtube.com/watch?v=0WhKuklpQ9A, Feb. 11, 2016, 3 pages.
Phlam, Dev, Clockwork Tomato Presentation, URL: https://www.youtube.com/watch?v=2IQDx9REn0E, Apr. 29, 2016, 6 pages.
PhoneBuff, "Hybrid Stopwatch & Timer Android App Review", Available Online at: https://www.youtube.com/watch?v=B43oCFPiWVY, Apr. 4, 2012, 7 pages.
Pre-Interview First Office Action received for U.S. Appl. No. 14/815,890, dated May 26, 2016, 4 pages.
Record of Oral Hearing received for U.S. Appl. No. 14/815,890, mailed on Nov. 20, 2020, 18 pages.
Rehman, A., Install Android 4.2 Gesture-Based Keyboard & Clock App On Jelly Bean 4.1 Or Higher, Excerpts From, Available online at: <http://www.addictivetips.com/android/install-android-4-2-keyboard-clock-app-apk-on-jelly-bean-4-1-x/>, Nov. 3, 2012, 4 pages.

(56) References Cited

OTHER PUBLICATIONS

Restriction Requirement received for U.S. Appl. No. 14/815,890, dated Feb. 22, 2016, 5 pages.
Result of Consultation received for European Patent Application No. 16762356.0, dated Nov. 29, 2021, 3 pages.
Result of Consultation received for European Patent Application No. 15730925.3, dated Nov. 24, 2020, 4 pages.
Rosa, et al., Stripe Generator—a Free Tool for the Web Design Community, Available online at: http://www.stripegenerator.com/, Mar. 28, 2019, 10 pages.
Rowinski, Dan, Why The All-In-One Smartwatch Isn't Happening Any Time Soon, Online available at:—https://web.archive.org/web/20140123074218if_/https://readwrite.com/2014/01/20/smartwatch-wearable-fitness-remote-control/, Jan. 20, 2014, 6 pages.
Search Report and Opinion received for Danish Patent Application No. PA201970596, dated Dec. 4, 2019, 11 pages.
Search Report and Opinion received for Danish Patent Application No. PA201970597, dated Dec. 18, 2019, 10 pages.
Search Report and Opinion received for Danish Patent Application No. PA201970598, dated Oct. 31, 2019, 9 pages.
Search Report and Opinion received for Danish Patent Application No. PA201970599, dated Nov. 8, 2019, 12 pages.
Search Report and Opinion received for Danish Patent Application No. PA202070610, dated Jan. 8, 2021, 9 pages.
Search Report and Opinion received for Danish Patent Application No. PA202070623, dated Dec. 21, 2020, 9 pages.
Search Report and Opinion received for Danish Patent Application No. PA202070624, dated Dec. 10, 2020, 10 pages.
Search Report and Opinion received for Danish Patent Application No. PA202070625, dated Dec. 17, 2020, 9 pages.
Search Report and Opinion received for Netherland Patent Application No. 2015232, dated Jan. 25, 2017, 9 pages.
Search Report and Opinion received for Netherlands Patent Application No. 2015242, dated Jul. 4, 2017, 20 pages.
Search Report and Opinion received for Netherlands Patent Application No. 2018531, dated Jul. 27, 2017, 14 pages.
Search Report received for Danish Patent Application No. 201570768, dated Mar. 17, 2016, 11 pages.
Search Report received for Netherlands Patent Application No. 2015236, dated Apr. 21, 2021, 19 pages.
Shiota, Shinji, Windows 7 Dojo, Weekly Ascii, Ascii Mediaworks Inc., vol. 798, Aug. 31, 2010, 3 pages.
Singh, Lovepreet, Samsung Galaxy Watch: How to Change Watch Face—Tips and Tricks, Online available at: <https://www.youtube.com/watch?pp=desktop&v=IN7gPxTZ1qU>, Dec. 4, 2018, 80 pages.
Smartwatch, App Earth Space HD Live Wallpaper APK for Smart Watch, Version 1.7, Android version 2.2, Aug. 27, 2013, 1 page.
Solar Walk Free, Vito Technology,Jun. 19, 2014, 9 pages.
Sony, Live View™ micro display, Extended User Guide, Aug. 2010, 27 pages.
Sony, Sony SmartWatch, User Guide, Dec. 2011, 18 pages.
Stateoftech, Samsung Galaxy Gear Tips—Installing and Customizing Clock Faces, Online available at: https://www.youtube.com/watch?v=p2GzpL3xlUo, Dec. 12, 2013, 3 pages.
Stateoftech, Samsung Galaxy Gear Tips—Change the Clock Face, Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 16762356.0, mailed on May 10, 2021, 10 pages.
Summons to Attend Oral Proceedings received for European Patent Application No. 17206177.2, mailed on Jun. 3, 2019, 8 pages.
Sun Set, Sun Set solar image clock, Available at <https://web.archive.orgjweb/20140719005410/http://www.sunsetclock.com/>, 2013, 5 pages.
Supplemental Notice of Allowance received for U.S. Appl. No. 14/815,890, dated Mar. 10, 2021, 2 pages.
Supplemental Notice of Allowance received for U.S. Appl. No. 16/585,399, dated Aug. 26, 2020, 2 pages.
Supplemental Notice of Allowance received for U.S. Appl. No. 16/867,002, dated Sep. 9, 2021, 2 pages.
Supplemental Notice of Allowance received for U.S. Appl. No. 16/997,588, dated Oct. 22, 2021, 4 pages.
Talkandroid, Android Wear walkthrough, Available online at: https://www.youtube.com/watch?v=4xntpZac4sw, Jun. 30, 2014, 1 page.
TechCloud, "How to Create Custom Watch Face for Samsung Galaxy Gear Smartwatch just in Few Seconds", Online available at:—https://www.youtube.com/watch?v=6rO-_SREDjQ, Oct. 9, 2013, 3 pages.
The Simply Alarm app for Pebble, available online at: <https://web.archive.org/web/20150517070400>/http://www.rebootsramblings.ca/n/sahhelp/https://www.youtube.com/watch?v=IVp1scQPw08, May 17, 2015, 1 page.
Theunlockr, "How to Change the Watch Face on the Galaxy Gear", Online available at:—https://www.youtube.com/watch?v=Z7EBG5aBiZg, Jan. 3, 2014, 3 pages.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
UIKit User Interface Catalog: Page Controls, Available online at https://web.archive.org/web/20140703123442/https://developer.apple.com/library/ios/documentation/userexperience/conceptual/UIKitUICatalog/UIPageControl.html, Dec. 16, 2013, 4 pages.
Vidstube, "Bitmoji Clockface on Fitbit Versa Sense/Versa 3/Versa 2", Available online at: <https://www.youtube.com/watch?v=4V_xDnSLeHE>, Jun. 30, 2019, 1 page.
Viticci, Frederico, Checking Time Zones with Living Earth—MacStories, Available at <https://www.macstories.net/reviews/checking-time-zones-with-living-earth/>, Dec. 11, 2013, pp. 1-5.
Wade, Cliff, "Get the most out of Nova Launcher: Changing Icon Sizes", Online Available at: https://www.androidguys.com/tips-tools/get-nova-launcher-changing-icon-sizes/, Nov. 16, 2015, 3 pages.
Wade, Cliff, "Get the most out of Nova Launcher: Changing Icon Sizes", Online available at: https://www.androidguys.com/tips-tools/get-nova-launcher-changing-icon-sizes/, Nov. 16, 2015, 6 pages.
Wade, Cliff, "Get the most out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.
Wearablezone, "How To Set Up Your Fitbit Profile", Online available at:—<https://youtu.be/jsWPtcDWiJM>, Jun. 6, 2016, 3 pages.
Whitwam, Ryan, "Facer is Fast Becoming the De Facto Custom Watch Face Maker for Android Wear", available online at: http://www.androidpolice.com/2014/09/19/facer-is-fast-becoming-the-defacto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Woolsey, Amanda, "How To Customize The Clock on the Apple Watch", Available online at: <https://www.youtube.com/watch?v=t-3Bckdd9B4>, Apr. 25, 2015,1 page.
Xdream, "TickTalk Video User Manual, YouTube [online] [video]", Online available at: <https://youtu.be/jYhq3DwmVzo>, Mar. 17, 2017, 3 pages.
Xperia ZL2 SOL25, "Instruction Manual, Detailed version", KDDI Corporation, No. 1, vol. 1, Jun. 2014, 4 pages.
Zelgadis, "Reuse Animations—Synfig Animation Studio", Available online at: https://wiki.synfig.org/index.php?title=Doc:Reuse_Animations&oldid=18173, May 20, 2013, 5 pages.

(56) References Cited

OTHER PUBLICATIONS

Zephyrnix, "Steam's In-Game Home menu", Online Available at: <https://www.youtube.com/watch?v=jLoRFiPkcUw>, see 0;00-1;06, Feb. 15, 2011, 3 pages.
Zukerman, Erez,6 Beautiful, "Interesting & Versatile Timer Apps [Android]", Available at: http://www.makeuseof.com/tag/beautiful-interesting-versatile-timer-apps-android/, May 18, 2012, 5 pages.
Advisory Action received for U.S. Appl. No. 16/943,737, dated Jun. 1, 2022, 6 pages.
Applicant Initiated Interview Summary received for U.S. Appl. No. 17/031,671, dated Jun. 13, 2022, 7 pages.
Notice of Acceptance received for Australian Patent Application No. 2020239749, dated May 27, 2022, 3 pages.
Notice of Allowance received for Chinese Patent Application No. 202110454541.1, dated May 31, 2022, 6 pages (3 pages of English Translation and 3 pages of Official Copy).
Notice of Allowance received for U.S. Appl. No. 16/418,786, dated Jun. 14, 2022, 9 pages.
Office Action received for Danish Patent Application No. PA202070623, dated May 23, 2022, 3 pages.
Office Action received for European Patent Application No. 21169911.1, dated Jun. 3, 2022, 5 pages.
Office Action received for European Patent Application No. 21177569.7, dated Jun. 9, 2022, 5 pages.
Decision to Refuse received for Japanese Patent Application No. 2020-159824, dated Sep. 30, 2022, 6 pages (3 pages of English Translation and 3 pages of Official Copy).
Notice of Acceptance received for Australian Patent Application No. 2021245228, dated Oct. 4, 2022, 3 pages.
Notice of Acceptance received for Australian Patent Application No. 2022220279, dated Sep. 27, 2022, 3 pages.
Notice of Allowance received for Japanese Patent Application No. 2022-512865, dated Oct. 3, 2022, 4 pages (1 page of English Translation and 3 pages of Official Copy).
Office Action received for Australian Patent Application No. 2021250863, dated Oct. 6, 2022, 6 pages.
Office Action received for European Patent Application No. 20730136.7, dated Oct. 6, 2022, 11 pages.
Office Action received for Japanese Patent Application No. 2021-023661, dated Oct. 3, 2022, 8 pages (4 pages of English Translation and 4 pages of Official Copy).
Applicant-Initiated Interview Summary received for U.S. Appl. No. 17/713,016, dated Feb. 14, 2023, 4 pages.
Non-Final Office Action received for U.S. Appl. No. 17/746,807, dated Feb. 2, 2023, 14 pages.
Non-Final Office Action received for U.S. Appl. No. 17/948,578, dated Feb. 2, 2023, 13 pages.
Notice of Allowance received for U.S. Appl. No. 16/935,002, dated Feb. 15, 2023, 15 pages.
Applicant-Initiated Interview Summary received for U.S. Appl. No. 17/031,671, dated Dec. 9, 2022, 5 pages.
Hoffman, Chris, "5+ Cool Uses for Android's Daydream Mode", retrieved from: https://www.howtogeek.com/170990/5-cool-uses-for-androids-daydream-mode, Jul. 12, 2017, 8 pages.
International Preliminary Report on Patentability received for PCT Patent Application No. PCT/US2021/031212, dated Nov. 24, 2022, 16 pages.
International Preliminary Report on Patentability received for PCT Patent Application No. PCT/US2021/031669, dated Nov. 24, 2022, 12 pages.
Non-Final Office Action received for U.S. Appl. No. 17/158,936, dated Nov. 30, 2022, 17 pages.
Notice of Allowance received for Korean Patent Application No. 10-2020-0123852, dated Nov. 28, 2022, 7 pages (2 pages of English Translation and 5 pages of Official Copy).
Notice of Allowance received for U.S. Appl. No. 17/341,839, dated Dec. 2, 2022, 6 pages.
Office Action received for European Patent Application No. 21169911.1, dated Dec. 1, 2022, 4 pages.
Result of Consultation received for European Patent Application No. 17810723.1, dated Nov. 30, 2022, 3 pages.
Spears, Ann, "dimming screen before/instead of screensaver?", retrieved from: https://discussions.apple.com/thread/339700, Jan. 28, 2006, 1 page.
Advisory Action received for U.S. Appl. No. 17/031,765, dated Dec. 12, 2022, 7 pages.
Intention to Grant received for European Patent Application No. 17810723.1, dated Dec. 16, 2022, 9 pages.
Minutes of the Oral Proceedings received for European Patent Application No. 17810723.1, mailed on Dec. 9, 2022, 7 pages.
Notice of Allowance received for Japanese Patent Application No. 2020-124605, dated Dec. 5, 2022, 4 pages (1 page of English Translation and 3 pages of Official Copy).
Notice of Allowance received for Korean Patent Application No. 10-2020-0123887, dated Nov. 28, 2022, 7 pages (2 pages of English Translation and 5 pages of Official Copy).
Notice of Allowance received for U.S. Appl. No. 17/515,143, dated Dec. 16, 2022, 11 pages.
Office Action received for European Patent Application No. 20761084.1, dated Dec. 14, 2022, 5 pages.
Poppinga et al., "Sensor-Based Identification of Opportune Moments for Triggering Notifications", IEEE CS, Mar. 14, 2014, pp. 22-29.
Pradhan et al., "Understanding and Managing Notifications", IEEE INFOCOM 2017—IEEE Conference on Computer Communications, May 1, 2017, 9 pages.
Applicant-Initiated Interview Summary received for U.S. Appl. No. 17/031,765, dated May 3, 2023, 6 pages.
Final Office Action received for U.S. Appl. No. 17/068,386, dated May 8, 2023, 23 pages.
Final Office Action received for U.S. Appl. No. 17/746,807, dated Apr. 26, 2023, 16 pages.
Notice of Allowance received for U.S. Appl. No. 17/941,962, dated May 3, 2023, 10 pages.
Applicant-Initiated Interview Summary received for U.S. Appl. No. 17/556,165, dated Oct. 28, 2022, 4 pages.
Corrected Notice of Allowance received for U.S. Appl. No. 17/341,839, dated Oct. 26, 2022, 2 pages.
Intention to Grant received for European Patent Application No. 21177569.7, dated Oct. 27, 2022, 8 pages.
International Search Report and Written Opinion received for PCT Patent Application No. PCT/US2022/026371, dated Oct. 12, 2022, 16 pages.
Invitation to Pay Additional Fees received for PCT Patent Application No. PCT/US2022/026371, dated Aug. 18, 2022, 9 pages.
Non-Final Office Action received for U.S. Appl. No. 17/713,016, dated Oct. 27, 2022, 25 pages.
Notice of Allowance received for Korean Patent Application No. 10-2021-7036016, dated Sep. 28, 2022, 7 pages (2 pages of English Translation and 5 pages of Official Copy).
Office Action received for European Patent Application No. 19724997.2, dated Oct. 27, 2022, 5 pages.
Corrected Notice of Allowance received for U.S. Appl. No. 16/418,786, dated Jun. 23, 2022, 2 pages.
Corrected Notice of Allowance received for U.S. Appl. No. 17/373,163, dated Jun. 27, 2022, 5 pages.
Office Action received for Korean Patent Application No. 10-2020-0123852, dated Jun. 9, 2022, 10 pages (4 pages of English Translation and 6 pages of Official Copy).
Office Action received for Korean Patent Application No. 10-2020-0123857, dated Jun. 9, 2022, 12 pages (5 pages of English Translation and 7 pages of Official Copy).
Office Action received for Korean Patent Application No. 10-2020-0123887, dated Jun. 9, 2022, 5 pages (2 pages of English Translation and 3 pages of Official Copy).
Office Action received for Korean Patent Application No. 10-2020-7032187, dated Jun. 10, 2022, 16 pages (7 pages of English Translation and 9 pages of Official Copy).
Advisory Action received for U.S. Appl. No. 17/158,936, dated Jul. 24, 2023, 4 pages.
Corrected Notice of Allowance received for U.S. Appl. No. 16/935,002, dated Jul. 17, 2023, 5 pages.

(56) References Cited

OTHER PUBLICATIONS

Intention to Grant received for European Patent Application No. 20729346.5, dated Jul. 10, 2023, 9 pages.
Non-Final Office Action received for U.S. Appl. No. 17/746,807, dated Jul. 20, 2023, 14 pages.
Notice of Acceptance received for Australian Patent Application No. 2022202583, dated Aug. 7, 2023, 3 pages.
Applicant-Initiated Interview Summary received for U.S. Appl. No. 17/591,184, dated Jun. 28, 2023, 2 pages.
Final Office Action received for U.S. Appl. No. 17/546,630, dated Jun. 27, 2023, 31 pages.
Intention to Grant received for European Patent Application No. 17810723.1, dated Jun. 12, 2023, 9 pages.
Notice of Allowance received for U.S. Appl. No. 16/935,002, dated Jun. 28, 2023, 8 pages.
Notice of Allowance received for U.S. Appl. No. 17/738,940, dated Jun. 22, 2023, 9 pages.
Office Action received for Korean Patent Application No. 10-2023-0064928, dated Jun. 9, 2023, 6 pages (2 pages of English Translation and 4 pages of Official Copy).
Result of Consultation received for European Patent Application No. 20729346.5, dated Jun. 21, 2023, 3 pages.
Decision to Grant received for European Patent Application No. 21169911.1, dated Jun. 29, 2023, 3 pages.
Minutes of the Oral Proceedings received for European Patent Application No. 20729346.5, mailed on Jul. 4, 2023, 6 pages.
Non-Final Office Action received for U.S. Appl. No. 15/421,865, dated Jul. 11, 2023, 32 pages.
Notice of Allowance received for U.S. Appl. No. 17/941,962, dated Jul. 3, 2023, 9 pages.
Office Action received for Australian Patent Application No. 2022218607, dated Jun. 30, 2023, 4 pages.
Office Action received for Australian Patent Application No. 2022235622, dated Jun. 27, 2023, 3 pages.
Office Action received for Australian Patent Application No. 2023200039, dated Jul. 4, 2023, 2 pages.
Office Action received for European Patent Application No. 20730136.7, dated Jun. 27, 2023, 5 pages.
Advisory Action received for U.S. Appl. No. 17/031,765, dated Nov. 13, 2023, 5 pages.
International Preliminary Report on Patentability received for PCT Patent Application No. PCT/US2022/029279, dated Nov. 23, 2023, 11 pages.
Office Action received for Korean Patent Application No. 10-2023-7008379, dated Nov. 13, 2023, 15 pages (7 pages of English Translation and 8 pages of Official Copy).
Advisory Action received for U.S. Appl. No. 17/947,530, dated Oct. 13, 2023, 3 pages.
Notice of Allowance received for Korean Patent Application No. 10-2023-0064928, dated Sep. 22, 2023, 7 pages (2 pages of English Translation and 5 pages of Official Copy).
Applicant-Initiated Interview Summary received for U.S. Appl. No. 17/031,765, dated Oct. 31, 2023, 5 pages.
Extended European Search Report received for European Patent Application No. 23201849.9, dated Oct. 26, 2023, 9 pages.
Office Action received for Chinese Patent Application No. 202310124087.2, dated Sep. 9, 2023, 24 pages (13 pages of English Translation and 11 pages of Official Copy).
Office Action received for European Patent Application No. 20730136.7, dated Nov. 3, 2023, 5 pages.
Office Action received for Japanese Patent Application No. 2022-152693, dated Oct. 27, 2023, 6 pages (3 pages of English Translation and 3 pages of Official Copy).
Applicant-Initiated Interview Summary received for U.S. Appl. No. 17/546,630, dated Aug. 9, 2023, 4 pages.
Applicant-Initiated Interview Summary received for U.S. Appl. No. 17/947,530, dated Jun. 14, 2023, 2 pages.
Applicant-Initiated Interview Summary received for U.S. Appl. No. 17/949,081, dated Apr. 28, 2023, 2 pages.
Corrected Notice of Allowance received for U.S. Appl. No. 17/941,962, dated Aug. 3, 2023, 2 pages.
Decision to Grant received for European Patent Application No. 20761084.1, dated Jul. 27, 2023, 4 pages.
Final Office Action received for U.S. Appl. No. 17/947,530, dated Jul. 13, 2023, 17 pages.
Final Office Action received for U.S. Appl. No. 17/949,081, dated Jun. 5, 2023, 23 pages.
Hoffman Chris, "5+ Cool Uses for Android's Daydream Mode", Available on: https://www.howtogeek.com/170990/5-cool-uses-for-androids-daydream-mode/, Jul. 12, 2017, 8 pages.
International Search Report and Written Opinion received for PCT Patent Application No. PCT/US2023/011151, dated Jul. 5, 2023, 20 pages.
Invitation to Pay Additional Fees and Partial International Search Report received for PCT Patent Application No. PCT/US2023/011151, dated May 12, 2023, 13 pages.
Non-Final Office Action received for U.S. Appl. No. 17/947,530, dated Mar. 31, 2023, 14 pages.
Non-Final Office Action received for U.S. Appl. No. 17/949,081, dated Feb. 27, 2023, 19 pages.
Notice of Allowance received for Japanese Patent Application No. 2020-159823, dated Jul. 24, 2023, 23 pages (1 page of English Translation and 22 pages of Official Copy).
Notice of Allowance received for U.S. Appl. No. 17/713,016, dated Aug. 4, 2023, 7 pages.
Office Action received for Australian Patent Application No. 2022287595, dated Jul. 20, 2023, 3 pages.
Restriction Requirement received for U.S. Appl. No. 17/949,081, dated Dec. 2, 2022, 6 pages.
Restriction Requirement received for U.S. Appl. No. 17/949,081, dated Jan. 3, 2023, 6 pages.
Applicant-Initiated Interview Summary received for U.S. Appl. No. 17/947,530, dated Sep. 19, 2023, 2 pages.
Applicant-Initiated Interview Summary received for U.S. Appl. No. 17/949,081, dated Sep. 8, 2023, 2 pages.
Notice of Acceptance received for Australian Patent Application No. 2023200039, dated Aug. 31, 2023, 3 pages.
Record of Oral Hearing received for U.S. Appl. No. 15/405,122, mailed on Sep. 12, 2023, 20 pages.
Record of Oral Hearing received for U.S. Appl. No. 16/861,651, mailed on Sep. 5, 2023, 16 pages.
Decision on Appeal received for U.S. Appl. No. 16/861,651, dated Sep. 1, 2023, 14 pages.
Final Office Action received for U.S. Appl. No. 17/031,765, dated Sep. 1, 2023, 37 pages.
Office Action received for European Patent Application No. 21728746.5, dated Aug. 21, 2023, 4 pages.
Rozario, Hamlin, "How to Edit Photos on iPhone & iPad", Online Available at: https://osxdaily.com/2020/01/23/how-to-edit-photos-on-iphone-ipad/, Jan. 23, 2020, 10 pages.
Advisory Action received for U.S. Appl. No. 16/389,722, dated Jun. 9, 2023, 4 pages.
Applicant Initiated Interview Summary received for U.S. Appl. No. 17/746,807, dated Jun. 9, 2023, 2 pages.
Applicant-Initiated Interview Summary received for U.S. Appl. No. 17/681,584, dated Jun. 6, 2023, 2 pages.
Notice of Acceptance received for Australian Patent Application No. 2022201419, dated May 31, 2023, 3 pages.
Notice of Allowance received for Japanese Patent Application No. 2022-096730, dated Jun. 5, 2023, 4 pages (1 page of English Translation and 3 pages of Official Copy).
Office Action received for Australian Patent Application No. 2022235622, dated May 22, 2023, 2 pages.
Office Action received for Australian Patent Application No. 2022235634, dated May 25, 2023, 4 pages.
Applicant-Initiated Interview Summary received for U.S. Appl. No. 15/421,865, dated Oct. 3, 2023, 6 pages.
Decision to Grant received for European Patent Application No. 17810723.1, dated Sep. 21, 2023, 2 pages.
Notice of Acceptance received for Australian Patent Application No. 2022203957, dated Sep. 27, 2023, 3 pages.

(56) References Cited

OTHER PUBLICATIONS

Notice of Acceptance received for Australian Patent Application No. 2022235622, dated Sep. 13, 2023, 3 pages.
Notice of Allowance received for U.S. Appl. No. 17/738,940, dated Oct. 2, 2023, 9 pages.
Office Action received for Korean Patent Application No. 10-2022-7019034, dated Sep. 18, 2023, 6 pages (2 pages of English Translation and 4 pages of Official Copy).

\* cited by examiner

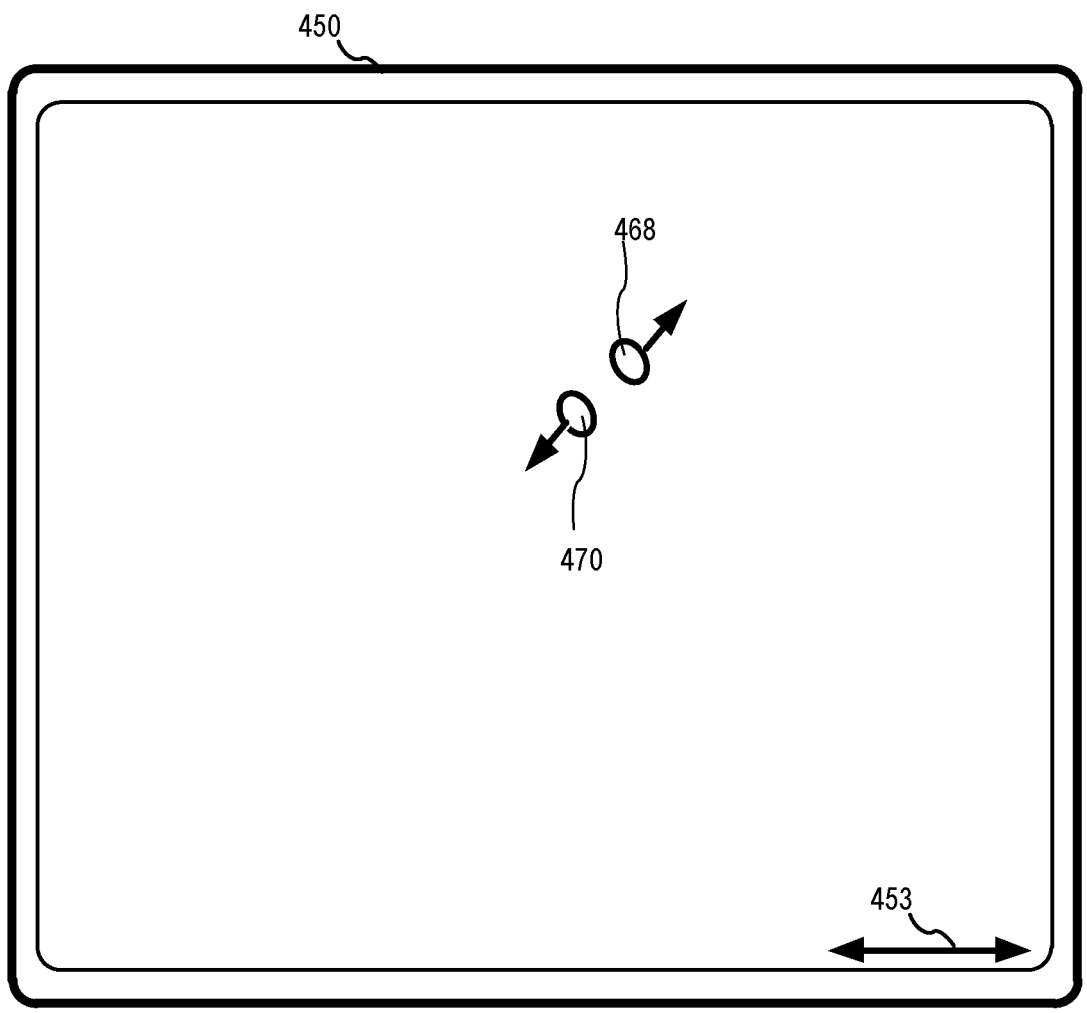
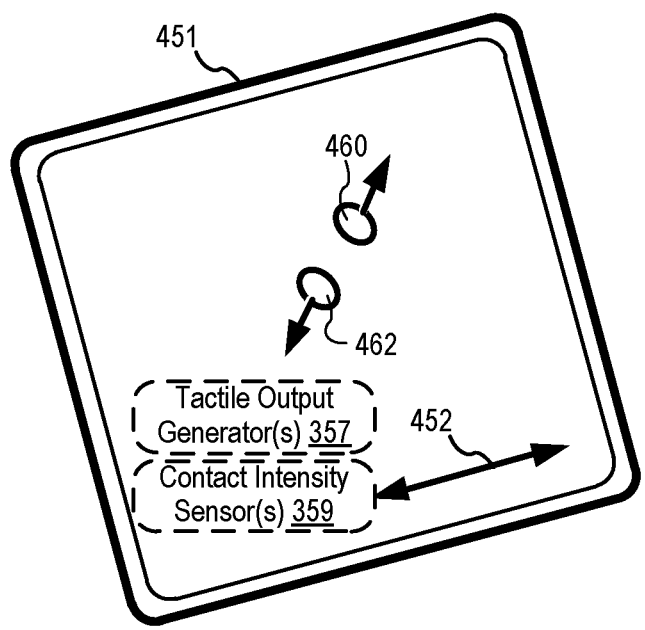
FIG. 4B

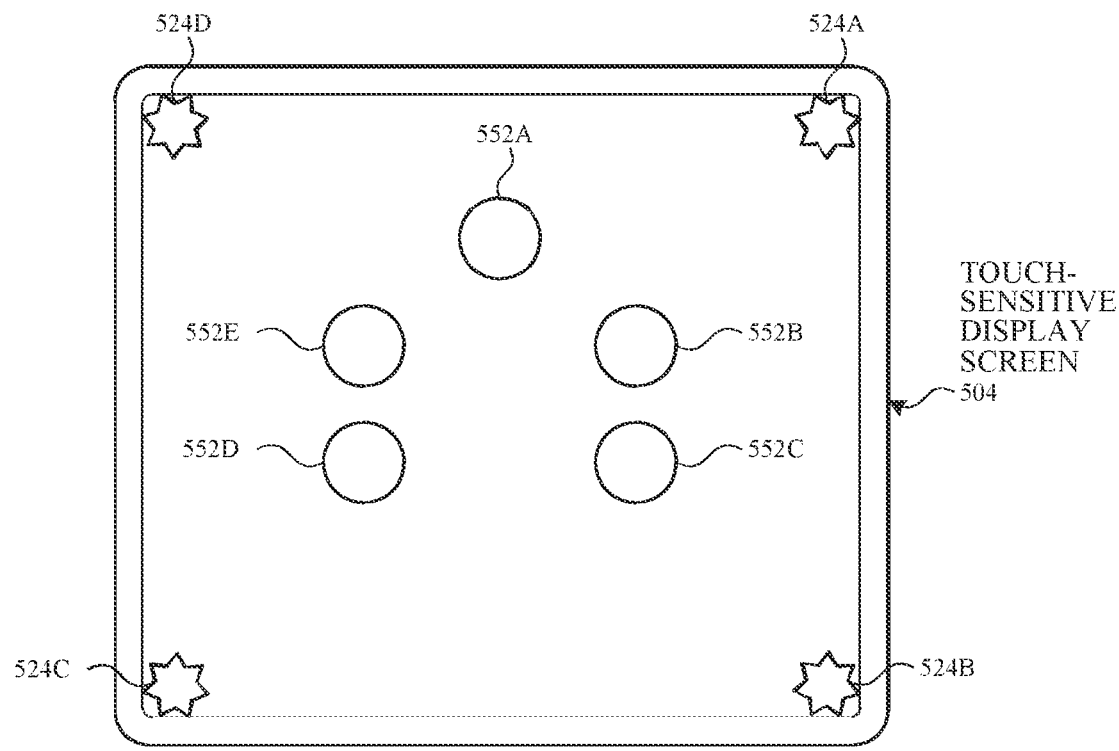
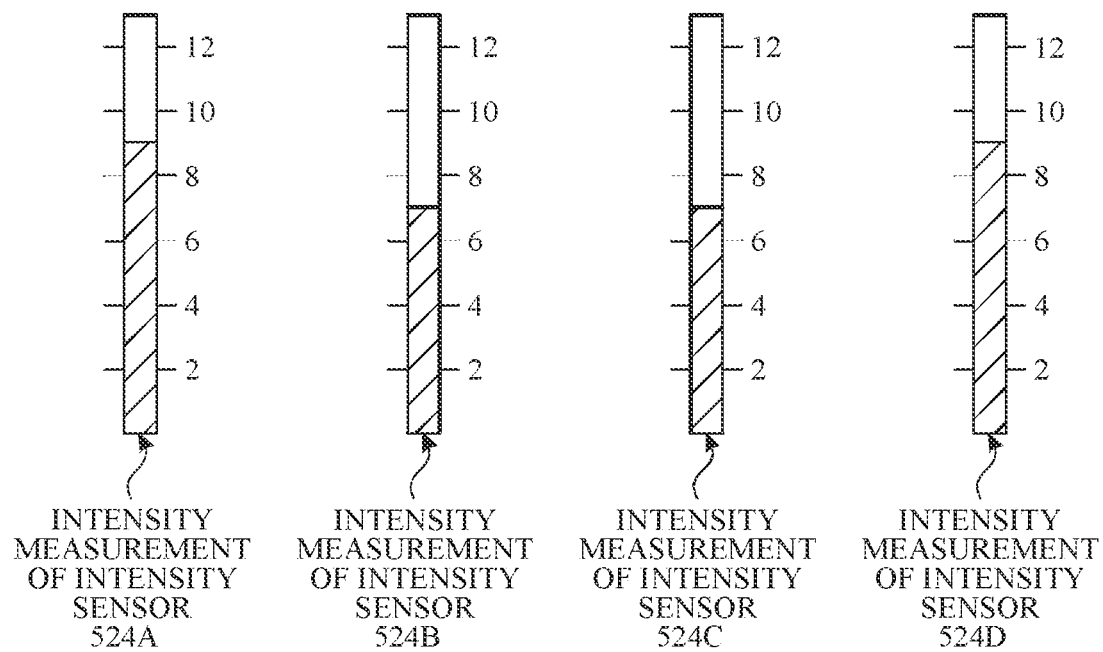
FIG. 5C

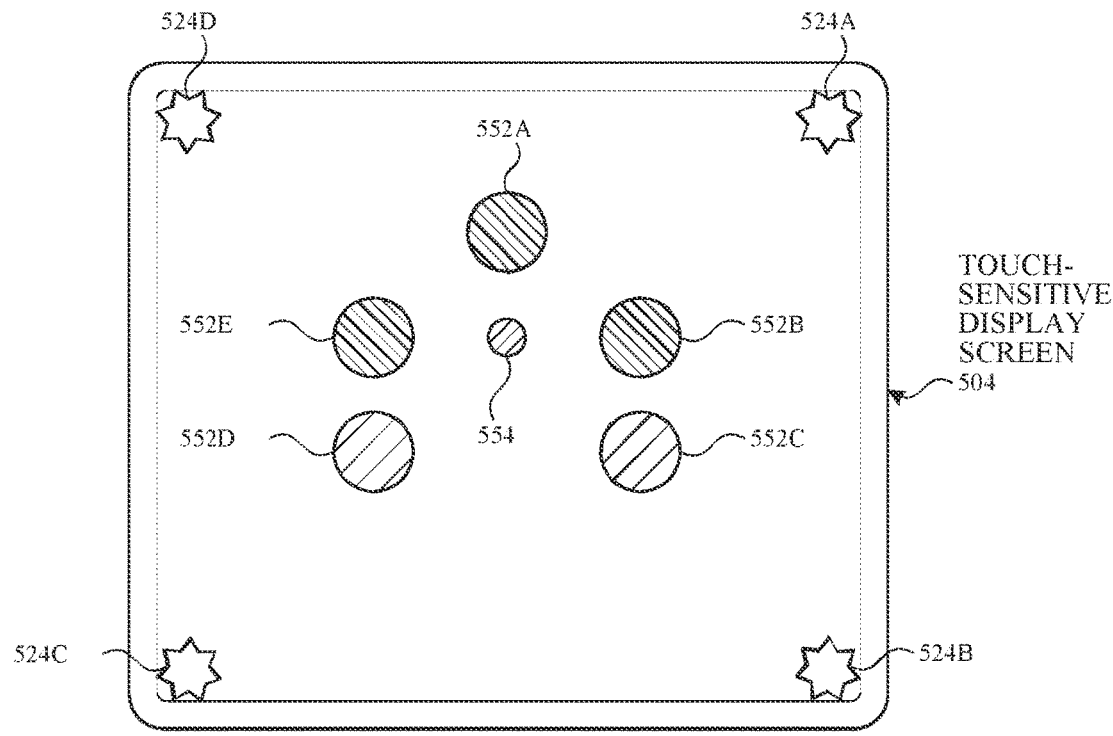
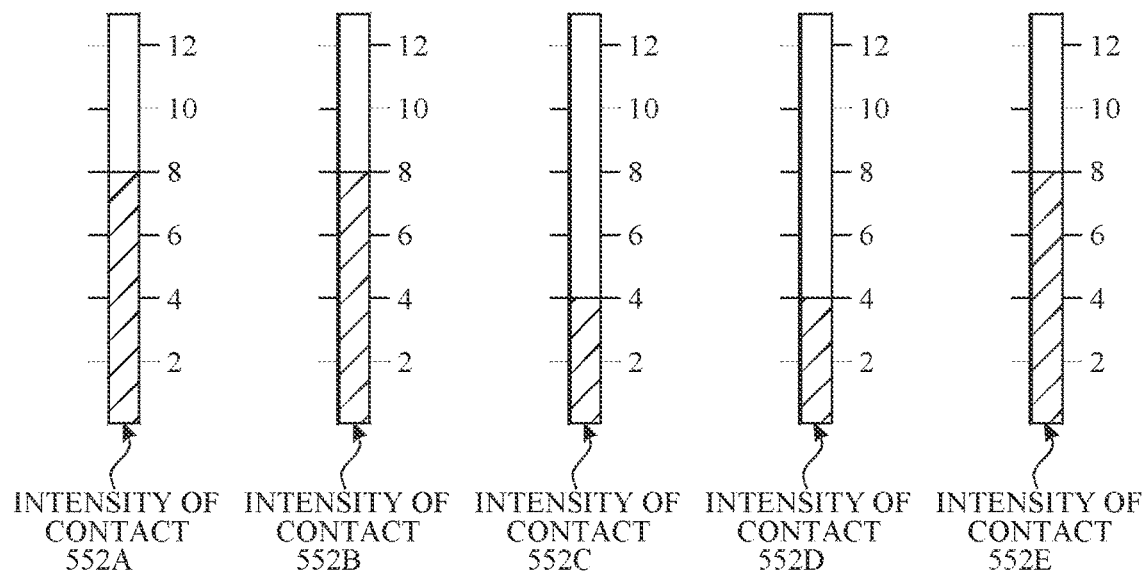
*FIG. 5D*

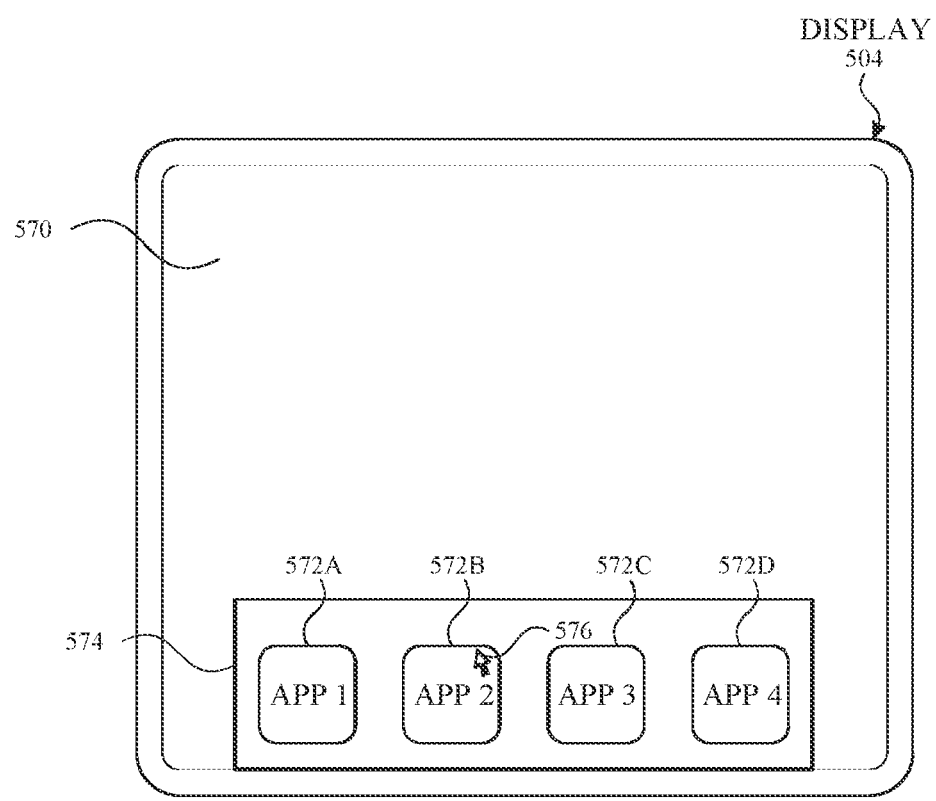
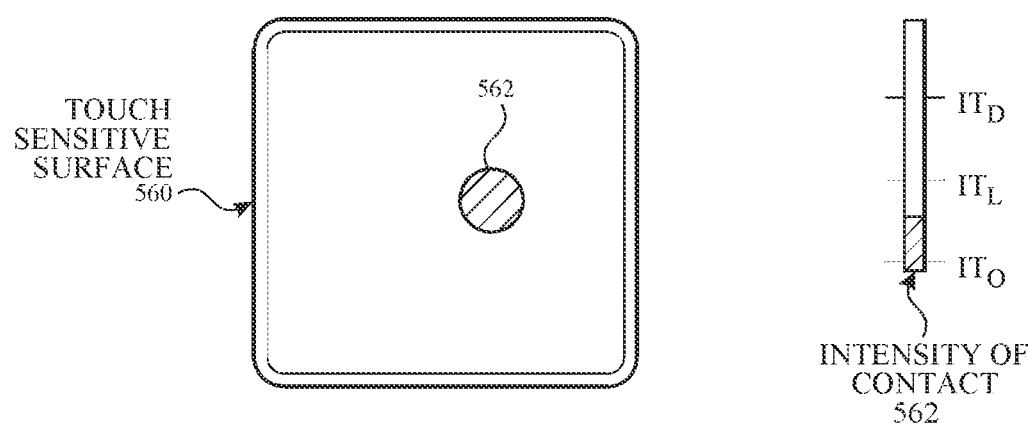
FIG. 5E

700

702
Display a watch user interface on the display on the display.

704
Detect a first user input.

706
Cease to display the first graphical object at the first location in the sequence of defined locations on the display.

708
Cease to display the second graphical object at the last location in the sequence of defined locations on the display.

710
Display the second graphical object at the first location in the sequence of locations on the display.

712
Display the first graphical object at the second location in the sequence of locations on the display.

1102
Display a watch user interface on the display.

1104
Detect a sequence of one or more inputs that correspond to a request to add a fourth complication to the watch user interface, wherein the fourth complication includes at least a seventh metric related to data from a fourth application and an eighth metric related to data from the fourth application.

1106
In response to detecting the sequence of one or more inputs.

1108
In accordance with a determination that the sequence of one or more inputs corresponds to a request to replace the first complication, replace the first complication with the fourth complication.

1110
In accordance with a determination that the sequence of one or more inputs corresponds to a request to replace the second complication, replace the second complication with the fourth complication.

1112
In accordance with a determination that the sequence of one or more inputs corresponds to a request to replace the third complication, replace the third complication with the fourth complication.

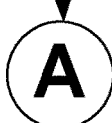

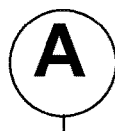

1106 (Cont.)

1114
In accordance with a determination that the sequence of one or more inputs corresponds to a request to replace the first complication, maintain the first complication with the fourth complication.

1116
In accordance with a determination that the sequence of one or more inputs corresponds to a request to replace the second complication, maintain the second complication with the fourth complication.

1118
In accordance with a determination that the sequence of one or more inputs corresponds to a request to replace the third complication, maintain the third complication with the fourth complication.

The watch user interface further including a ring-shaped area having a curved outer edge.

1120
In accordance with a first application corresponding to a fifth application, display a visual characteristic at or around the ring-shaped area.

1122
In accordance with a first application corresponding to a sixth application different than the fifth application, forgo the display of a visual characteristic at or around the ring-shaped area.

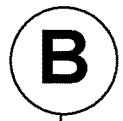

---

1124

Display a second watch user interface, the second watch user interface including a fifth complication that includes less than two metrics related to data from the first application, wherein the fifth complication is the same size as the first complication.

---

1126

Detect a sequence of one or more inputs that correspond to selection of a second watch user interface.

---

1128

Display the second watch user interface, wherein the second watch user interface includes an eighth complication corresponding to a seventh application, a ninth complication corresponding to the seventh application, and a tenth complication corresponding to the seventh application, where the seventh application is different than the first application.

---

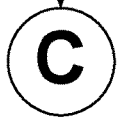

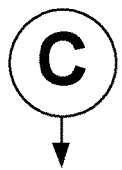

1130
Detect a sequence of one or more inputs that correspond to a request to view a simulation of the Earth as illuminated by the Sun at a non-current time.

1132
In response to detecting the sequence of one or more user inputs corresponding to a request to view the simulation of the Earth at a non-current time, rotate the simulation of the Earth to reveal a second region of the Earth as illuminated by the Sun at the non-current time.

1302
Display, on the display, a watch user interface, the watch user interface including a clock face and a user interface element at least partially surrounding the clock face.

1304
Receive, via the one or more input devices, a request to add a respective complication to a respective location on the clock face.

1306
In accordance with a determination that the respective complication is a first complication, display, on the display, the first complication in the respective location on the clock face and replacing at least a portion of the user interface element with content associated with the first complication.

1308
In accordance with a determination that the respective complication is a second complication, display, on the display, the second complication in the respective location on the clock face without replacing the portion of the user interface element with content associated with the second complication.

1310
While displaying the content associated with the first complication in the portion of the user interface element, receive an input corresponding to a location on the display.

1312
In accordance with the input corresponding to a location of the portion of the user interface element, launch an application associated with the first complication.

1314
In accordance with the input corresponding to a location on the user interface element other than the portion of the user interface element, forgo launching an application associated with the first complication

*FIG. 13*

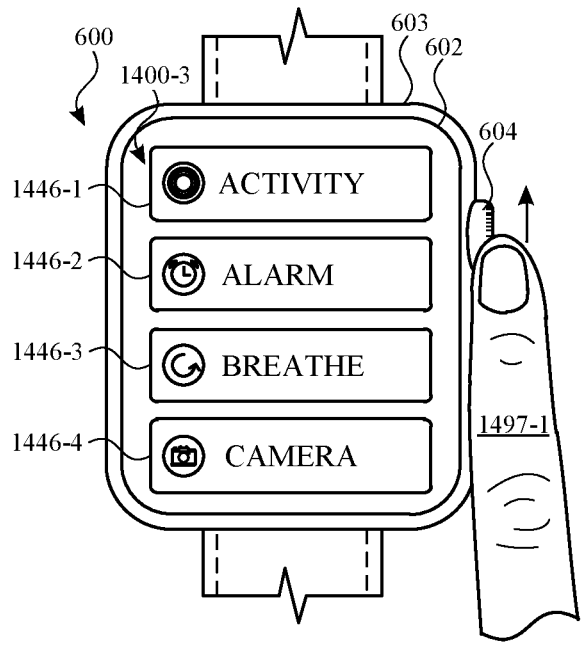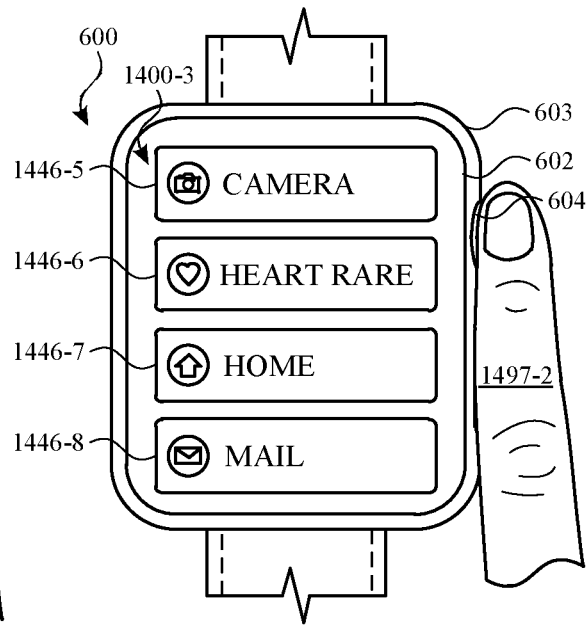
FIG. 14X          FIG. 14Y
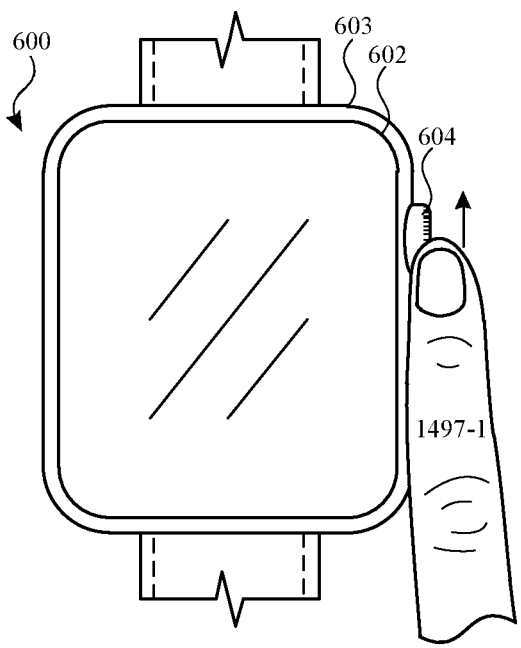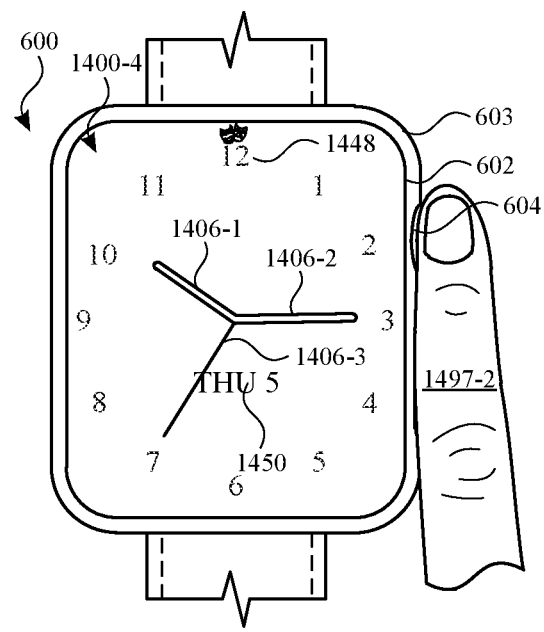
FIG. 14Z          FIG. 14AA

METHODS AND SYSTEMS FOR ADDING RESPECTIVE COMPLICATIONS ON A USER INTERFACE

CROSS-REFERENCE TO RELATED APPLICATIONS

This application is a continuation of U.S. patent application Ser. No. 16/401,934, titled "USER INTERFACES HAVING A COLLECTION OF COMPLICATIONS," filed May 2, 2019, which claims priority to U.S. Provisional Patent Application Ser. No. 62/668,041, titled "CONTEXT-SPECIFIC USER INTERFACES," filed May 7, 2018, U.S. Provisional Patent Application Ser. No. 62/679,941, titled "CONTEXT-SPECIFIC USER INTERFACES," filed Jun. 3, 2018, and U.S. Provisional Patent Application Ser. No. 62/725,215, titled "CONTEXT-SPECIFIC USER INTERFACES," filed Aug. 30, 2018. The contents of these applications are hereby incorporated by reference in their entirety.

FIELD

The present disclosure relates generally to computer user interfaces, and more specifically to techniques for context-specific user interfaces.

BACKGROUND

Portable multifunction devices allow users to concurrently access information from a variety of applications and data sources on a reduced-size device they can keep with them throughout the day in a variety of contexts (e.g., at work, at home, while traveling, etc.).

BRIEF SUMMARY

However, as context changes, the types and quantity of information a user may wish to view can also change. Thus, it is a challenge to provide an efficient interface that displays relevant information to a user throughout the day. For example, a user may normally wish to know the current temperature throughout the day but at certain times, would like to have more detailed weather information (e.g., forecasted high and low temperatures). A widget dedicated to displaying detailed weather information would provide irrelevant information (e.g., high and low temperature) most of the day, taking up space that could be used to provide additional relevant information to the user (e.g., information from different applications). This is a particular concern for portable devices with reduced-size interfaces.

Moreover, users rely on portable multifunction devices for keeping time, and increasingly for performing a variety of other operations including running software applications. However, some techniques for providing context-specific user interfaces (e.g., for keeping time and/or other operations) are generally cumbersome and inefficient. For example, some existing techniques use a complex and time-consuming user interface, which can include multiple key presses or keystrokes. Existing techniques require more time than necessary, wasting user time and device energy. This latter consideration is particularly important in battery-operated devices.

Accordingly, the present technique provides electronic devices with faster, more efficient methods for context-specific user interfaces. Such methods and interfaces optionally complement or replace other methods for context-specific user interfaces. Such methods and interfaces reduce the cognitive burden on a user and produce a more efficient human-machine interface. For battery-operated computing devices, such methods and interfaces conserve power and increase the time between battery charges and reduce the number of unnecessary, extraneous, and/or repetitive received inputs required to access information.

In some embodiments, a method is described. The method comprises: at an electronic device with a display, displaying a watch user interface on the display; the watch user interface includes: a first graphical object at a first location in a sequence of locations on the display; and a second graphical object at a last location in the sequence of locations on the display. The method further includes, while displaying the watch user interface on the display: detecting a first user input; and in response to detecting the first user input: ceasing to display the first graphical object at the first location in the sequence of defined locations on the display; ceasing to display the second graphical object at the last location in the sequence of defined locations on the display; displaying the second graphical object at the first location in the sequence of locations on the display; and displaying the first graphical object at a second location in the sequence of locations on the display.

In some embodiments, a non-transitory computer readable storage medium is described. The non-transitory computer readable storage medium stores one or more programs configured to be executed by one or more processors of an electronic device with a display. The one or more programs include instructions for: displaying a watch user interface on the display; the watch user interface including: a first graphical object at a first location in a sequence of locations on the display; and a second graphical object at a last location in the sequence of locations on the display; while displaying the watch user interface on the display: detecting a first user input; and in response to detecting the first user input: ceasing to display the first graphical object at the first location in the sequence of defined locations on the display; ceasing to display the second graphical object at the last location in the sequence of defined locations on the display; displaying the second graphical object at the first location in the sequence of locations on the display; and displaying the first graphical object at a second location in the sequence of locations on the display.

In some embodiments, a transitory computer readable storage medium is described. The transitory computer readable storage medium stores one or more programs configured to be executed by one or more processors of an electronic device with a display The one or more programs includes instructions for: displaying a watch user interface on the display; the watch user interface including: a first graphical object at a first location in a sequence of locations on the display; and a second graphical object at a last location in the sequence of locations on the display; while displaying the watch user interface on the display: detecting a first user input; and in response to detecting the first user input: ceasing to display the first graphical object at the first location in the sequence of defined locations on the display; ceasing to display the second graphical object at the last location in the sequence of defined locations on the display; displaying the second graphical object at the first location in the sequence of locations on the display; and displaying the first graphical object at a second location in the sequence of locations on the display.

In some embodiments, an electronic device is described. The electronic device comprises: a display; one or more processors; and memory storing one or more programs configured to be executed by the one or more processors.

The one or more programs include instructions for: displaying a watch user interface on the display; the watch user interface including: a first graphical object at a first location in a sequence of locations on the display; and a second graphical object at a last location in the sequence of locations on the display; while displaying the watch user interface on the display: detecting a first user input; and in response to detecting the first user input: ceasing to display the first graphical object at the first location in the sequence of defined locations on the display; ceasing to display the second graphical object at the last location in the sequence of defined locations on the display; displaying the second graphical object at the first location in the sequence of locations on the display; and displaying the first graphical object at a second location in the sequence of locations on the display.

In some embodiments, an electronic device is described. The electronic device comprises means for displaying a watch user interface on the display. The watch user interface includes: a first graphical object at a first location in a sequence of locations on the display; and a second graphical object at a last location in the sequence of locations on the display. The electronic device further comprises, while displaying the watch user interface on the display: means for detecting a first user input; and responsive to detecting the first user input: means for ceasing to display the first graphical object at the first location in the sequence of defined locations on the display; means for ceasing to display the second graphical object at the last location in the sequence of defined locations on the display; means for displaying the second graphical object at the first location in the sequence of locations on the display; and means for displaying the first graphical object at a second location in the sequence of locations on the display.

In some embodiments, a method is described. The method comprises: at an electronic device with a display, displaying a watch user interface on the display at a first time; the watch user interface at the first time includes: a first clock hand in a first position overlaid on a background, the background having a first graphical characteristic at the first time that is determined based on the first position of the first clock hand; and displaying the watch user interface on the display at a second time after the first time; the watch user interface at the second time includes: the first clock hand in a second position overlaid on the background, the background having a second graphical characteristic at the second time that is determined based on the second position of the first clock hand.

In some embodiments, a transitory computer-readable storage medium is described. The transitory computer-readable medium stores one or more programs configured to be executed by one or more processors of an electronic device with a display. The one or more programs include instructions for: displaying a watch user interface on the display at a first time; the watch user interface at the first time includes: a first clock hand in a first position overlaid on a background, the background having a first graphical characteristic at the first time that is determined based on the first position of the first clock hand; and displaying the watch user interface on the display at a second time after the first time; the watch user interface at the second time includes: the first clock hand in a second position overlaid on the background, the background having a second graphical characteristic at the second time that is determined based on the second position of the first clock hand.

In some embodiments, a non-transitory computer-readable storage medium is described. The non-transitory computer-readable storage medium stores one or more programs configured to be executed by one or more processors of an electronic device with a display. The one or more programs include instructions for: displaying a watch user interface on the display at a first time; the watch user interface at the first time including: a first clock hand in a first position overlaid on a background, the background having a first graphical characteristic at the first time that is determined based on the first position of the first clock hand; and displaying the watch user interface on the display at a second time after the first time; the watch user interface at the second time including: the first clock hand in a second position overlaid on the background, the background having a second graphical characteristic at the second time that is determined based on the second position of the first clock hand.

In some embodiments, an electronic device is described. The electronic device comprises: a display; one or more processors; and memory storing one or more programs configured to be executed by the one or more processors. The one or more programs include instructions for: displaying a watch user interface on the display at a first time; the watch user interface at the first time including: a first clock hand in a first position overlaid on a background, the background having a first graphical characteristic at the first time that is determined based on the first position of the first clock hand; and displaying the watch user interface on the display at a second time after the first time; the watch user interface at the second time including: the first clock hand in a second position overlaid on the background, the background having a second graphical characteristic at the second time that is determined based on the second position of the first clock hand.

In some embodiments, an electronic device is described. The electronic device comprises: a display; a means for displaying a watch user interface on the display at a first time; the watch user interface at the first time including: a first clock hand in a first position overlaid on a background, the background having a first graphical characteristic at the first time that is determined based on the first position of the first clock hand; and a means for displaying the watch user interface on the display at a second time after the first time; the watch user interface at the second time including: the first clock hand in a second position overlaid on the background, the background having a second graphical characteristic at the second time that is determined based on the second position of the first clock hand.

In some embodiments, a method is described. The method comprises: at an electronic device with a display: displaying a watch user interface on the display; the watch user interface includes: a first complication that includes at least a first metric related to data from a first application and a second metric related to data from the first application; a second complication that includes at least a third metric related to data from a second application and a fourth metric related to data from the second application; and a third complication that includes at least a fifth metric related to data from a third application and a sixth metric related to data from the third application; detecting a sequence of one or more inputs that corresponds to a request to add a fourth complication to the watch user interface, wherein the fourth complication includes at least a seventh metric related to data from a fourth application and an eighth metric related to data from the fourth application; and in response to detecting the sequence of one or more inputs: in accordance with a determination that the sequence of one or more inputs corresponds to a request to replace the first complication, replacing the first complication with the fourth complication; in accordance with a determination that the sequence of one or more inputs corresponds to a request to replace the second complication, replacing the second complication with the fourth complication; and in accordance with a determination that the sequence of one or more inputs corresponds to a request to replace the third complication, replacing the third complication with the fourth complication.

In some embodiments, a transitory computer-readable storage medium is described. The transitory computer-readable medium stores one or more programs configured to be executed by one or more processors of an electronic device with a display. The one or more programs include instructions for: displaying a watch user interface on the display; the watch user interface including: a first complication that includes at least a first metric related to data from a first application and a second metric related to data from the first application; a second complication that includes at least a third metric related to data from a second application and a fourth metric related to data from the second application; and a third complication that includes at least a fifth metric related to data from a third application and a sixth metric related to data from the third application; detecting a sequence of one or more inputs that corresponds to a request to add a fourth complication to the watch user interface, wherein the fourth complication includes at least a seventh metric related to data from a fourth application and an eighth metric related to data from the fourth application; and in response to detecting the sequence of one or more inputs: in accordance with a determination that the sequence of one or more inputs corresponds to a request to replace the first complication, replacing the first complication with the fourth complication; in accordance with a determination that the sequence of one or more inputs corresponds to a request to replace the second complication, replacing the second complication with the fourth complication; and in accordance with a determination that the sequence of one or more inputs corresponds to a request to replace the third complication, replacing the third complication with the fourth complication.

In some embodiments, a non-transitory computer-readable storage medium is described. The non-transitory computer-readable storage medium stores one or more programs configured to be executed by one or more processors of an electronic device with a display The one or more programs include instructions for: displaying a watch user interface on the display; the watch user interface including: a first complication that includes at least a first metric related to data from a first application and a second metric related to data from the first application; a second complication that includes at least a third metric related to data from a second application and a fourth metric related to data from the second application; and a third complication that includes at least a fifth metric related to data from a third application and a sixth metric related to data from the third application; detecting a sequence of one or more inputs that corresponds to a request to add a fourth complication to the watch user interface, wherein the fourth complication includes at least a seventh metric related to data from a fourth application and an eighth metric related to data from the fourth application; and in response to detecting the sequence of one or more inputs: in accordance with a determination that the sequence of one or more inputs corresponds to a request to replace the first complication, replacing the first complication with the fourth complication; in accordance with a determination that the sequence of one or more inputs corresponds to a request to replace the second complication, replacing the second complication with the fourth complication; and in accordance with a determination that the sequence of one or more inputs corresponds to a request to replace the third complication, replacing the third complication with the fourth complication.

In some embodiments, an electronic device is described. The electronic device comprises: a display; one or more processors; and memory storing one or more programs configured to be executed by the one or more processors. The one or more programs include instructions for: displaying a watch user interface on the display; the watch user interface including: a first complication that includes at least a first metric related to data from a first application and a second metric related to data from the first application; a second complication that includes at least a third metric related to data from a second application and a fourth metric related to data from the second application; and a third complication that includes at least a fifth metric related to data from a third application and a sixth metric related to data from the third application; detecting a sequence of one or more inputs that corresponds to a request to add a fourth complication to the watch user interface, wherein the fourth complication includes at least a seventh metric related to data from a fourth application and an eighth metric related to data from the fourth application; and in response to detecting the sequence of one or more inputs: in accordance with a determination that the sequence of one or more inputs corresponds to a request to replace the first complication, replacing the first complication with the fourth complication; in accordance with a determination that the sequence of one or more inputs corresponds to a request to replace the second complication, replacing the second complication with the fourth complication; and in accordance with a determination that the sequence of one or more inputs corresponds to a request to replace the third complication, replacing the third complication with the fourth complication.

In some embodiments, an electronic device is described. The electronic device comprises: a display; a means for displaying a watch user interface on the display; the watch user interface including: a first complication that includes at least a first metric related to data from a first application and a second metric related to data from the first application; a second complication that includes at least a third metric related to data from a second application and a fourth metric related to data from the second application; and a third complication that includes at least a fifth metric related to data from a third application and a sixth metric related to data from the third application; a means for detecting a sequence of one or more inputs that corresponds to a request to add a fourth complication to the watch user interface, wherein the fourth complication includes at least a seventh metric related to data from a fourth application and an eighth metric related to data from the fourth application; and in response to detecting the sequence of one or more inputs: in accordance with a determination that the sequence of one or more inputs corresponds to a request to replace the first complication, a means for replacing the first complication with the fourth complication; in accordance with a determination that the sequence of one or more inputs corresponds to a request to replace the second complication, a means for replacing the second complication with the fourth complication; and in accordance with a determination that the sequence of one or more inputs corresponds to a request to replace the third complication, a means for replacing the third complication with the fourth complication.

In some embodiments, a method is described. The method comprises: at an electronic device with a display and one or more input devices, displaying, on the display, a watch user interface, the watch user interface including: a clock face; and a user interface element at least partially surrounding the clock face. The method further comprises receiving, via the one or more input devices, a request to add a respective complication to a respective location on the clock face and, in response to receiving the request to add the respective complication to the respective location on the clock face: in accordance with a determination that the respective complication is a first complication, displaying, on the display, the first complication in the respective location on the clock face and replacing at least a portion of the user interface element with content associated with the first complication; and in accordance with a determination that the respective complication is a second complication, displaying, on the display, the second complication in the respective location on the clock face without replacing the portion of the user interface element with content associated with the second complication.

In some embodiments, a non-transitory computer readable storage medium is described. The non-transitory computer readable storage medium stores one or more programs configured to be executed by one or more processors of an electronic device with a display and one or more input devices. The one or more programs include instructions for: displaying, on the display, a watch user interface, the watch user interface including: a clock face; and a user interface element at least partially surrounding the clock face. The one or more programs further include instructions for receiving, via the one or more input devices, a request to add a respective complication to a respective location on the clock face and, in response to receiving the request to add the respective complication to the respective location on the clock face: in accordance with a determination that the respective complication is a first complication, displaying, on the display, the first complication in the respective location on the clock face and replacing at least a portion of the user interface element with content associated with the first complication; and in accordance with a determination that the respective complication is a second complication, displaying, on the display, the second complication in the respective location on the clock face without replacing the portion of the user interface element with content associated with the second complication.

In some embodiments, a transitory computer readable storage medium is described. The transitory computer readable storage medium stores one or more programs configured to be executed by one or more processors of an electronic device with a display and one or more input devices. The one or more programs include instructions for: displaying, on the display, a watch user interface, the watch user interface including: a clock face; and a user interface element at least partially surrounding the clock face. The one or more programs further include instructions for receiving, via the one or more input devices, a request to add a respective complication to a respective location on the clock face and, in response to receiving the request to add the respective complication to the respective location on the clock face: in accordance with a determination that the respective complication is a first complication, displaying, on the display, the first complication in the respective location on the clock face and replacing at least a portion of the user interface element with content associated with the first complication; and in accordance with a determination that the respective complication is a second complication, displaying, on the display, the second complication in the respective location on the clock face without replacing the portion of the user interface element with content associated with the second complication.

In some embodiments, an electronic device is described. The electronic device comprises: a display, one or more input devices; one or more processors; and memory storing one or more programs configured to be executed by the one or more processors. The one or more programs include instructions: displaying, on the display, a watch user interface, the watch user interface including: a clock face; and a user interface element at least partially surrounding the clock face. The one or more programs further include instructions for receiving, via the one or more input devices, a request to add a respective complication to a respective location on the clock face and, in response to receiving the request to add the respective complication to the respective location on the clock face: in accordance with a determination that the respective complication is a first complication, displaying, on the display, the first complication in the respective location on the clock face and replacing at least a portion of the user interface element with content associated with the first complication; and in accordance with a determination that the respective complication is a second complication, displaying, on the display, the second complication in the respective location on the clock face without replacing the portion of the user interface element with content associated with the second complication.

In some embodiments, an electronic device is described. The electronic device comprises: a means for displaying, on the display, a watch user interface, the watch user interface including: a clock face; and a user interface element at least partially surrounding the clock face. The electronic device further comprises, a means for receiving, via the one or more input devices, a request to add a respective complication to a respective location on the clock face and in response to receiving the request to add the respective complication to the respective location on the clock face. The device further comprises: a means for displaying, on the display, the first complication in the respective location on the clock face and replacing at least a portion of the user interface element with content associated with the first complication in accordance with a determination that the respective complication is a first complication; and a means for displaying, on the display, the second complication in the respective location on the clock face without replacing the portion of the user interface element with content associated with the second complication in accordance with a determination that the respective complication is a second complication.

In some embodiments, a method is described. The method comprises, at an electronic device with a display and one or more input devices, displaying, on the display, a watch user interface, the watch user interface including: a clock face; a user interface element at least partially surrounding the clock face; and a complication. The method further comprises: while displaying the watch user interface, detecting, via the one or more input devices, an input directed to the user interface element; and in response to detecting the input directed to the user interface element, updating, on the display, an appearance of the user interface element based on the input while maintaining display of the clock face and the complication on the display.

In some embodiments, a non-transitory computer readable storage medium is described. The non-transitory computer readable storage medium stores one or more programs configured to be executed by one or more processors of an electronic device with a display and one or more input devices. The one or more programs include instructions for: displaying, on the display, a watch user interface, the watch user interface including: a clock face; a user interface element at least partially surrounding the clock face; and a complication. The one or more programs further include instructions for: while displaying the watch user interface, detecting, via the one or more input devices, an input directed to the user interface element; and in response to detecting the input directed to the user interface element, updating, on the display, an appearance of the user interface element based on the input while maintaining display of the clock face and the complication on the display.

In some embodiments, a transitory computer readable storage medium is described. The transitory computer readable storage medium stores one or more programs configured to be executed by one or more processors of an electronic device with a display and one or more input devices. The one or more programs include instructions for: displaying, on the display, a watch user interface, the watch user interface including: a clock face; a user interface element at least partially surrounding the clock face; and a complication. The one or more programs further include instructions for: while displaying the watch user interface, detecting, via the one or more input devices, an input directed to the user interface element; and in response to detecting the input directed to the user interface element, updating, on the display, an appearance of the user interface element based on the input while maintaining display of the clock face and the complication on the display.

In some embodiments, an electronic device is described. The electronic device comprises: a display, one or more input devices; one or more processors; and memory storing one or more programs configured to be executed by the one or more processors. The one or more programs include instructions for: displaying, on the display, a watch user interface, the watch user interface including: a clock face; a user interface element at least partially surrounding the clock face; and a complication. The one or more programs further include instructions for: while displaying the watch user interface, detecting, via the one or more input devices, an input directed to the user interface element; and in response to detecting the input directed to the user interface element, updating, on the display, an appearance of the user interface element based on the input while maintaining display of the clock face and the complication on the display.

In some embodiments, an electronic device is described. The electronic device comprises: a means for displaying, on the display, a watch user interface, the watch user interface including: a clock face; a user interface element at least partially surrounding the clock face; and a complication. The device further comprises a means for detecting, via the one or more input devices, while displaying the watch user interface, an input directed to the user interface element. The device further comprises a means for updating, on the display, an appearance of the user interface element based on the input while maintaining display of the clock face and the complication on the display, in response to detecting the input directed to the user interface element.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing context-specific user interfaces, thereby increasing the effectiveness, efficiency, and user satisfaction with such devices. Such methods and interfaces can complement or replace other methods for providing context-specific user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7B illustrate a flow diagram depicting a method for providing context-specific user interfaces in accordance with some embodiments.

FIGS. 11A-11D illustrate a flow diagram depicting a method for providing context-specific user interfaces in accordance with some embodiments.

FIG. 13 illustrates a flow diagram depicting a method for providing context-specific user interfaces in accordance with some embodiments.

DESCRIPTION OF EMBODIMENTS

Figure 1A:
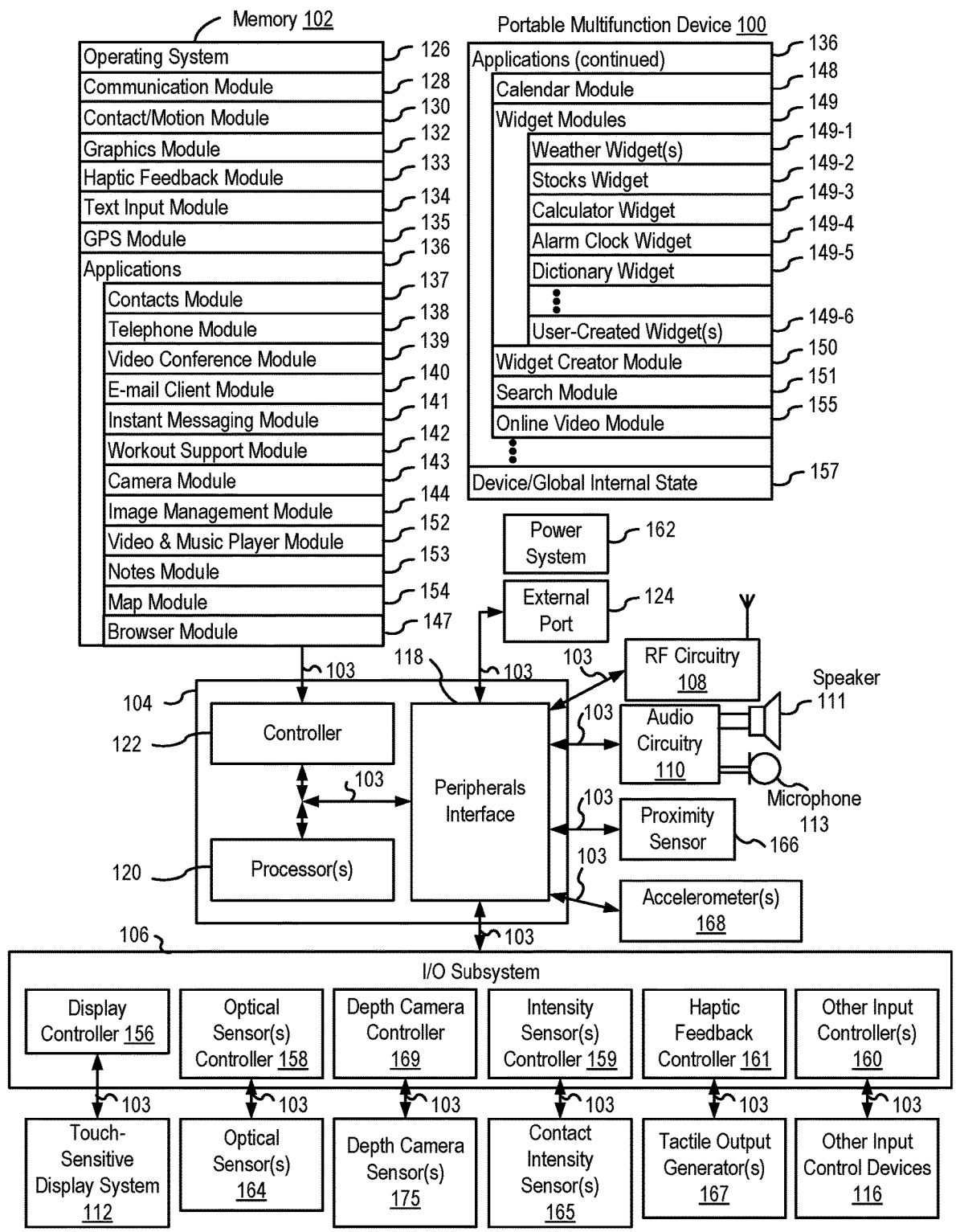
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing context-specific user interfaces, e.g., that display the time along with additional information. This is particularly true for portable multifunction devices with reduced-size displays. Providing the user with relevant information (e.g., obtained from one or more applications) at a glance in a convenient, customizable interface reduces the number of inputs needed to access the information and conserves battery life. Moreover, providing user with an interface that can be rapidly adapted to display a variety of content at different levels of detail as the context in which the user is using the interfaces changes (e.g., throughout the day) makes accessing such information through the interfaces even more efficient. Such an interface provides more efficient use of screen "real estate," which in turn reduces the number of user interactions required to access relevant data at any time of day. Such techniques can reduce the cognitive burden on a user who uses the context-specific user interfaces to access information and/or keep time, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for configuring context-specific user interfaces. FIGS. 6A-6M, 8A-8J, 10A-10T, 12A-12R, and 14A-14AE illustrate exemplary user interfaces for providing context-specific user interfaces. The user interfaces in these figures are also used to illustrate the processes described below, including the methods in FIGS. 7A-7B, 9, 11A-11D, 13, and 15A-15C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/ output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
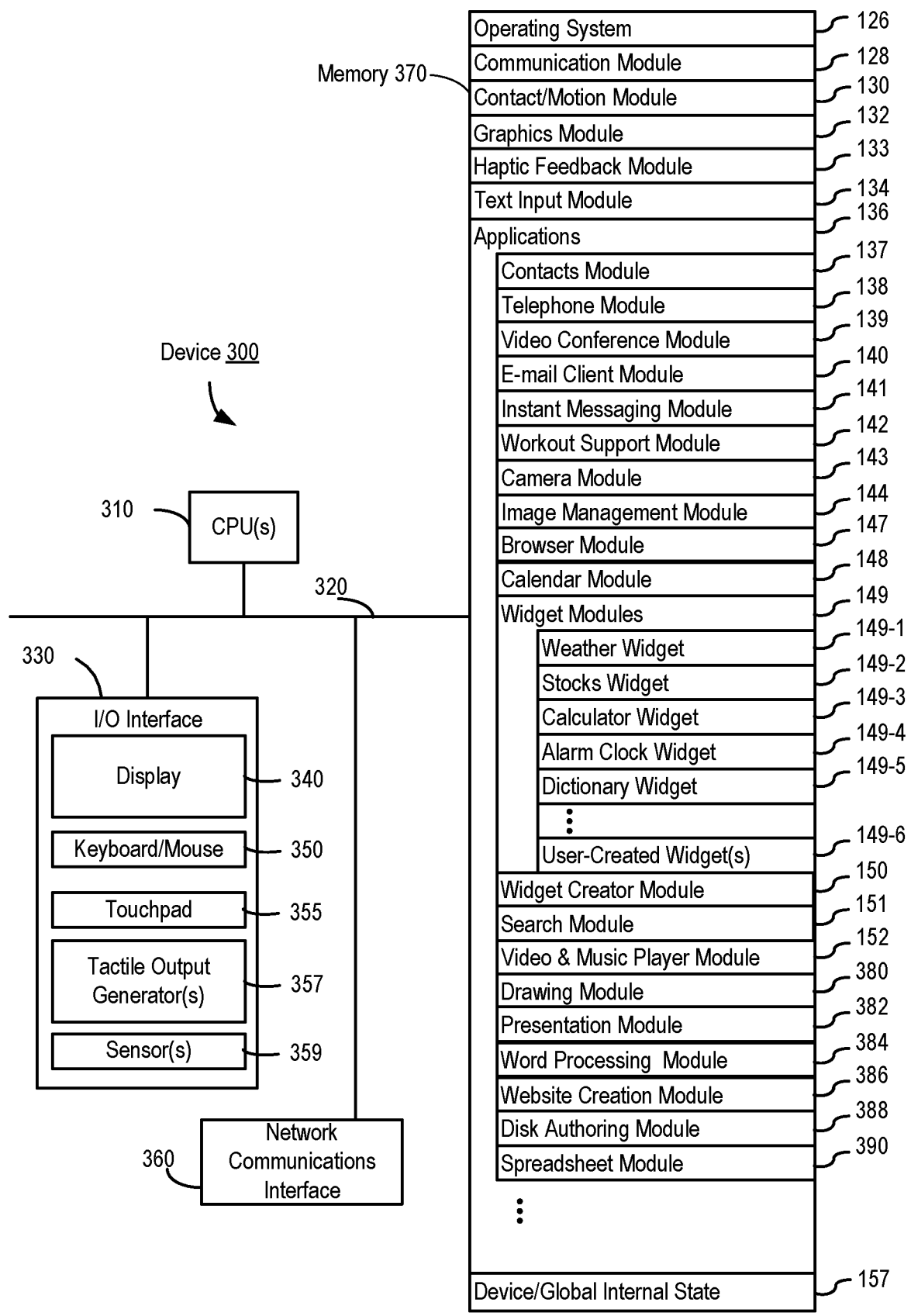
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
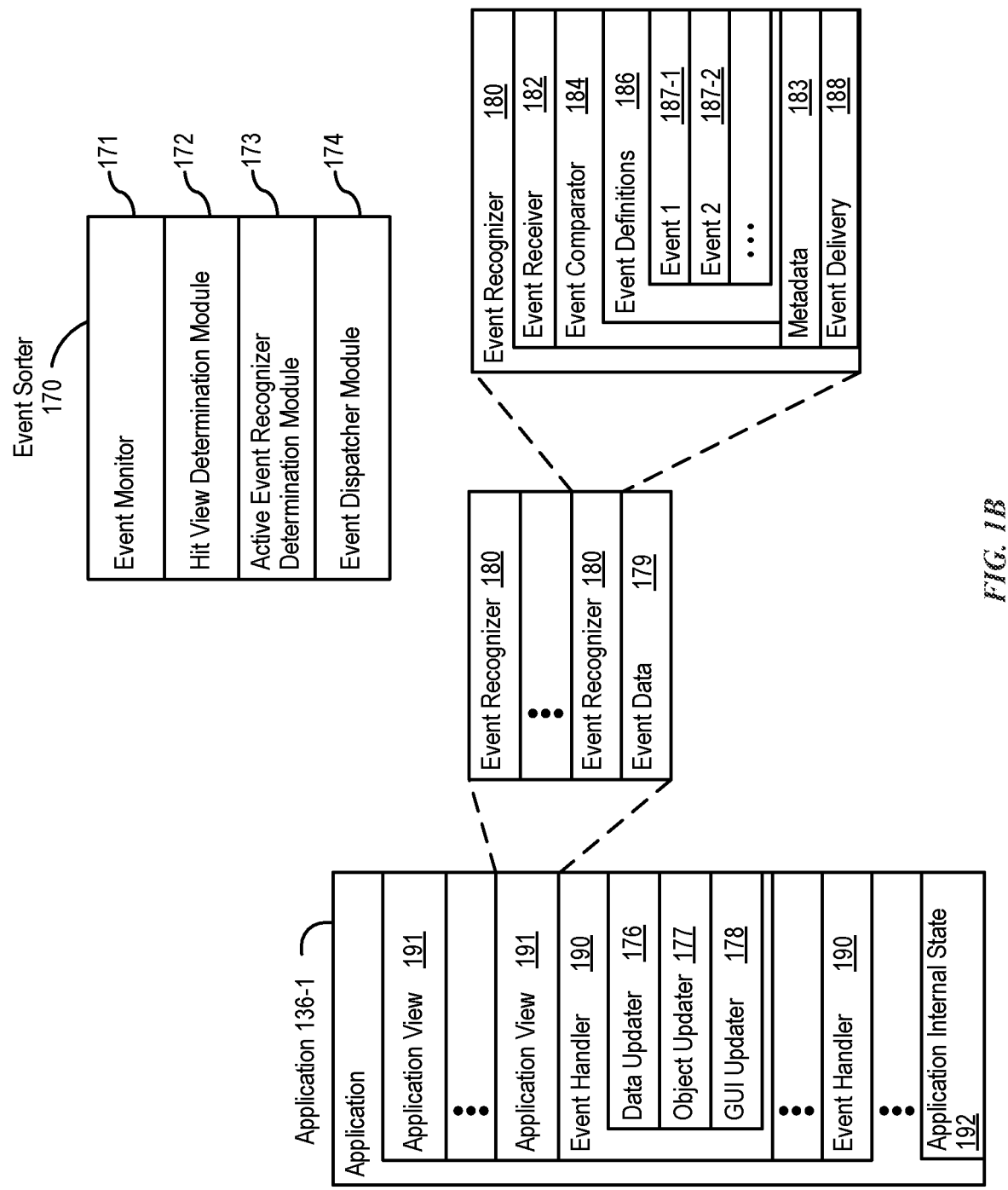
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
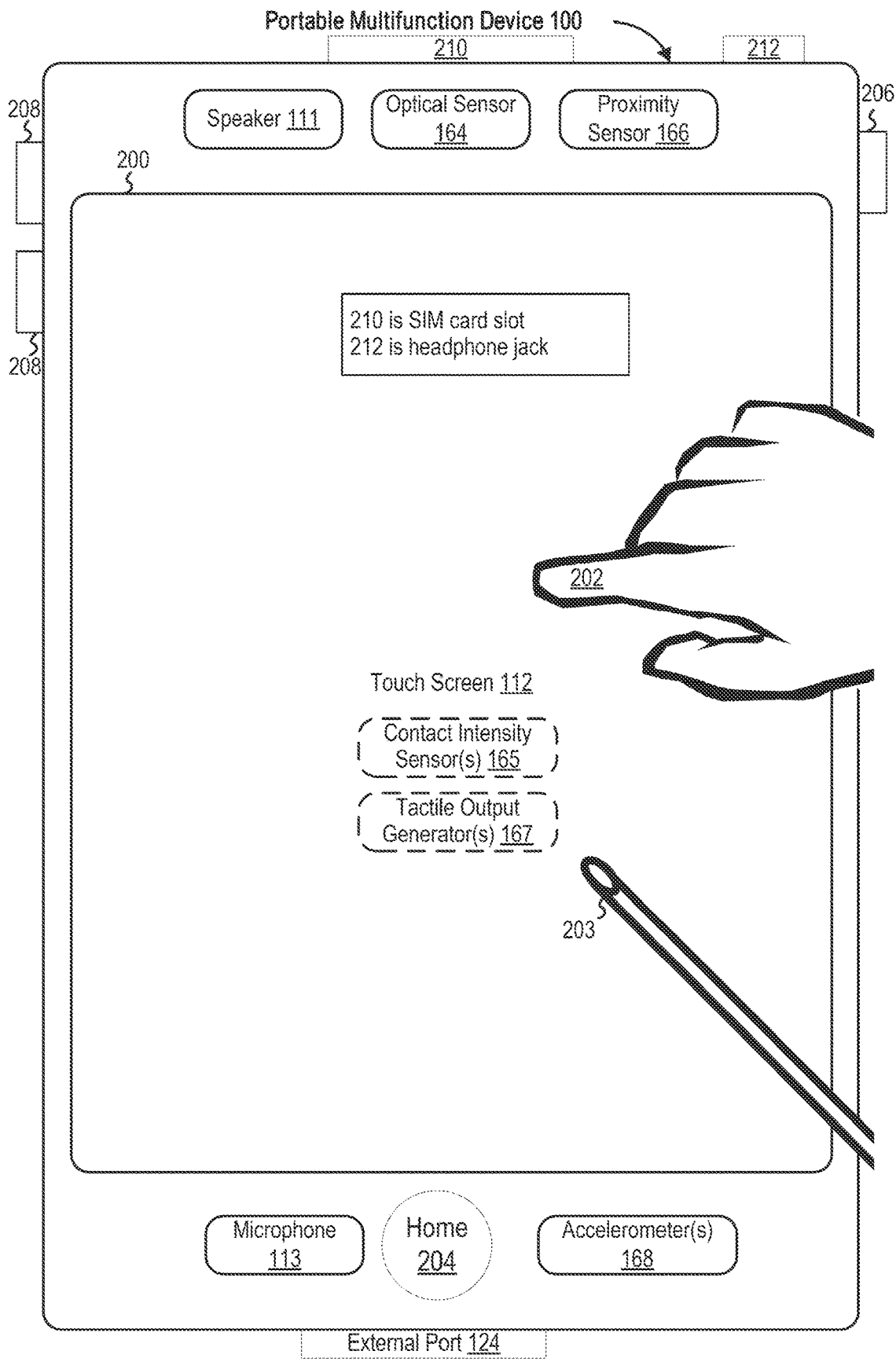
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
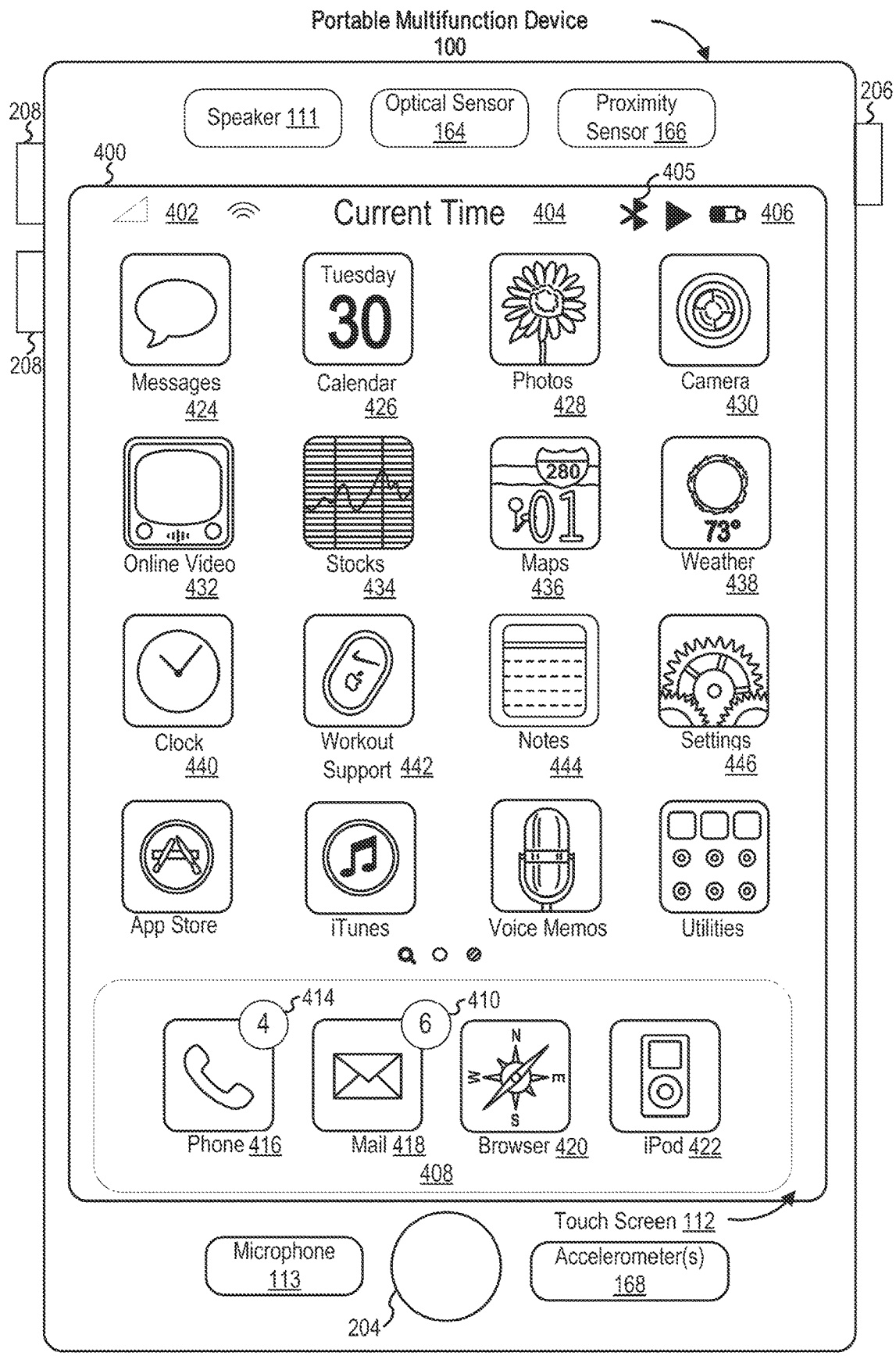
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
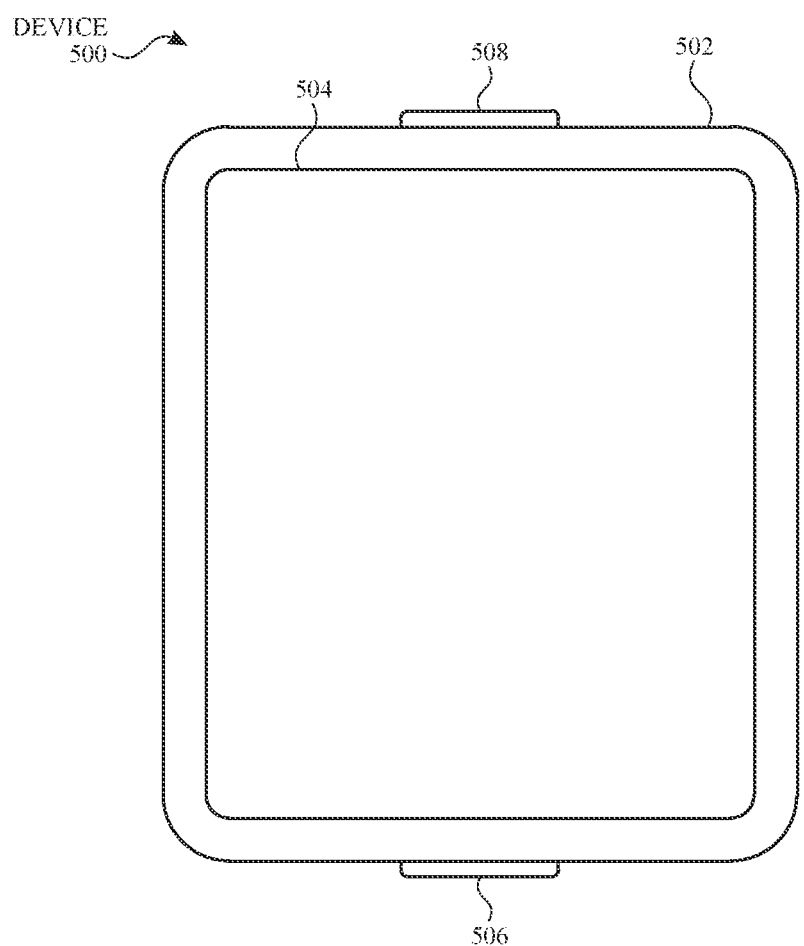
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
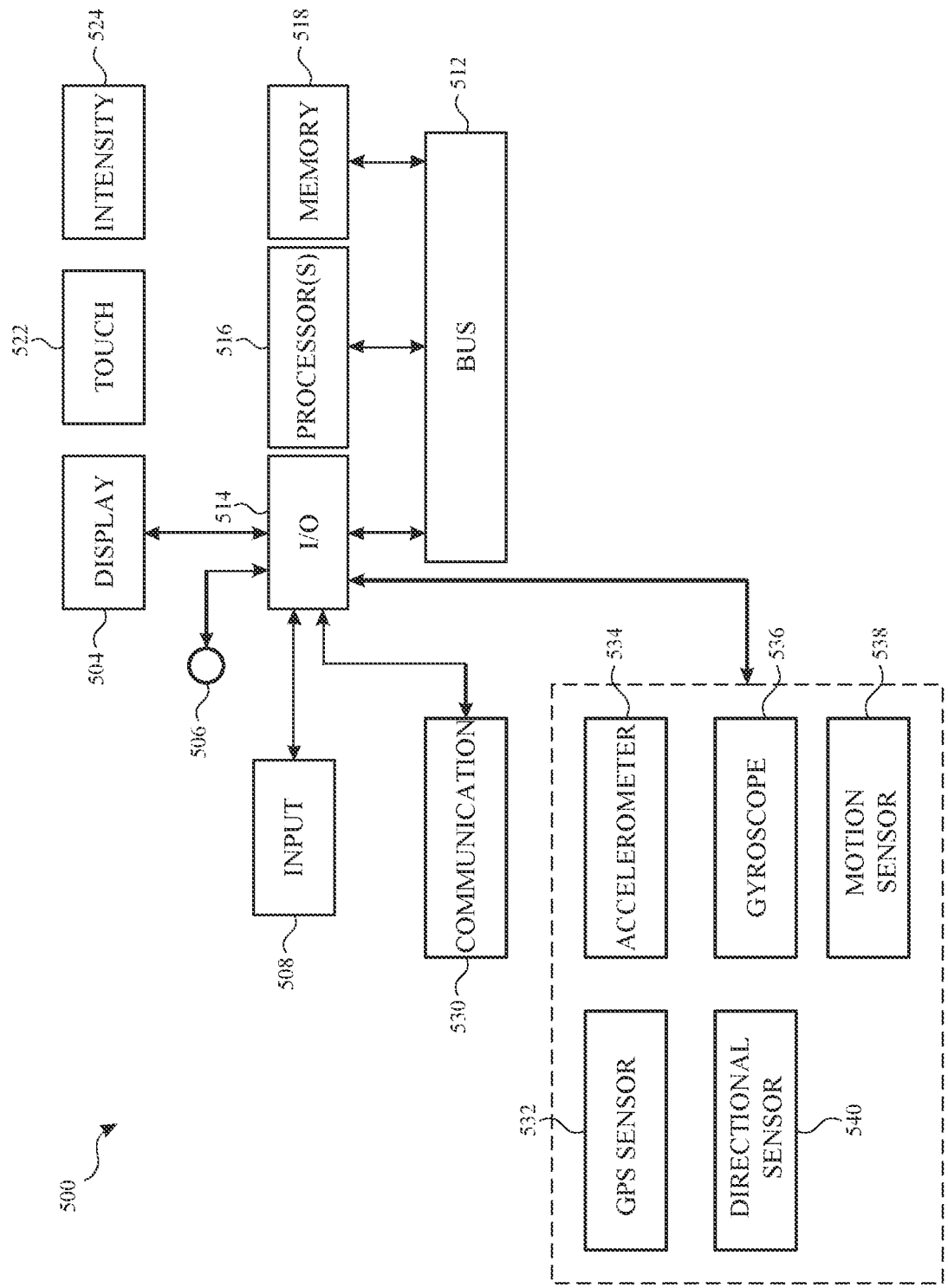
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyro-scope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 700, 900, and 1100 (FIGS. 7A-7B, 9, 11A-11D, 13, and 15A-15C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
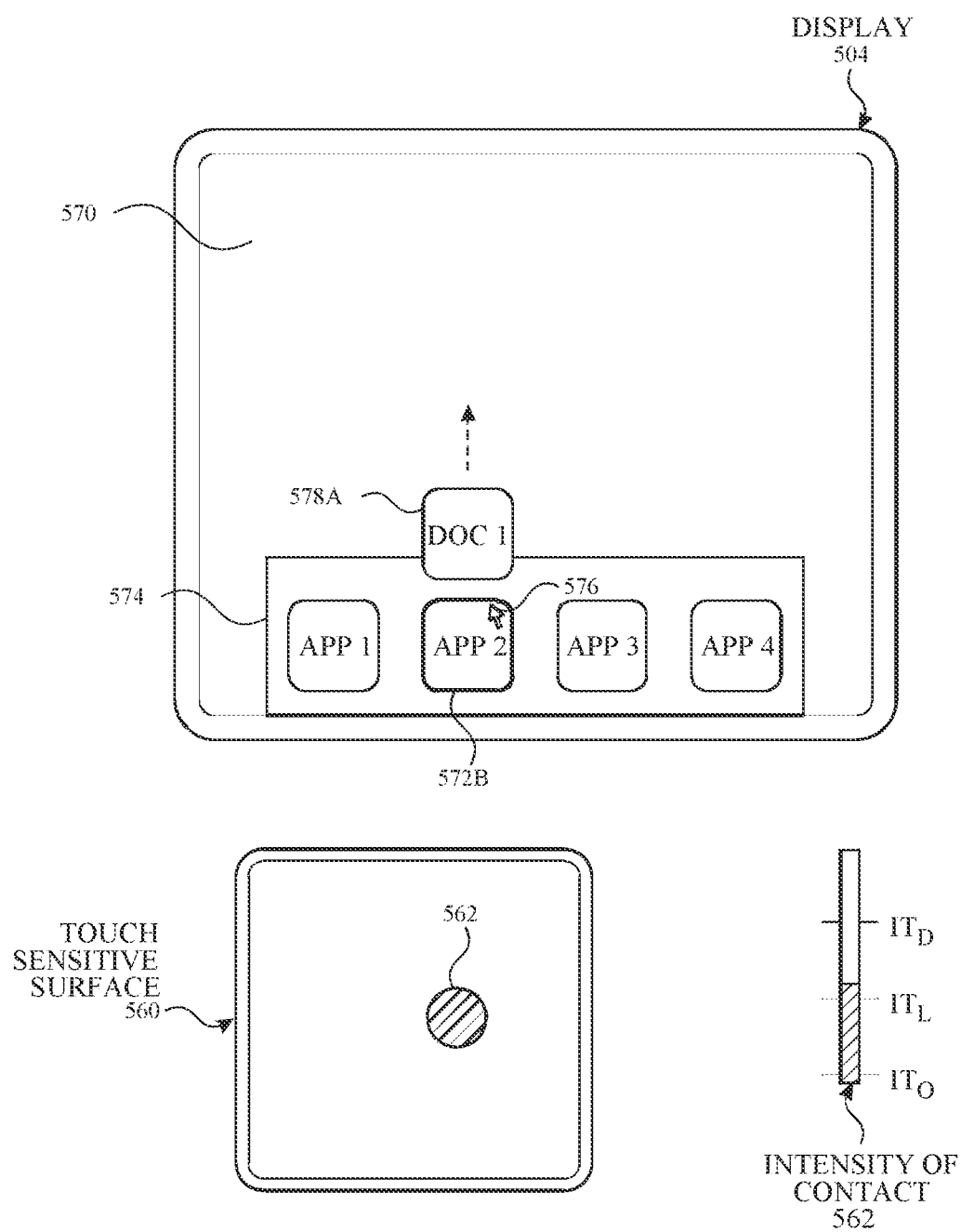
Figure 5G:
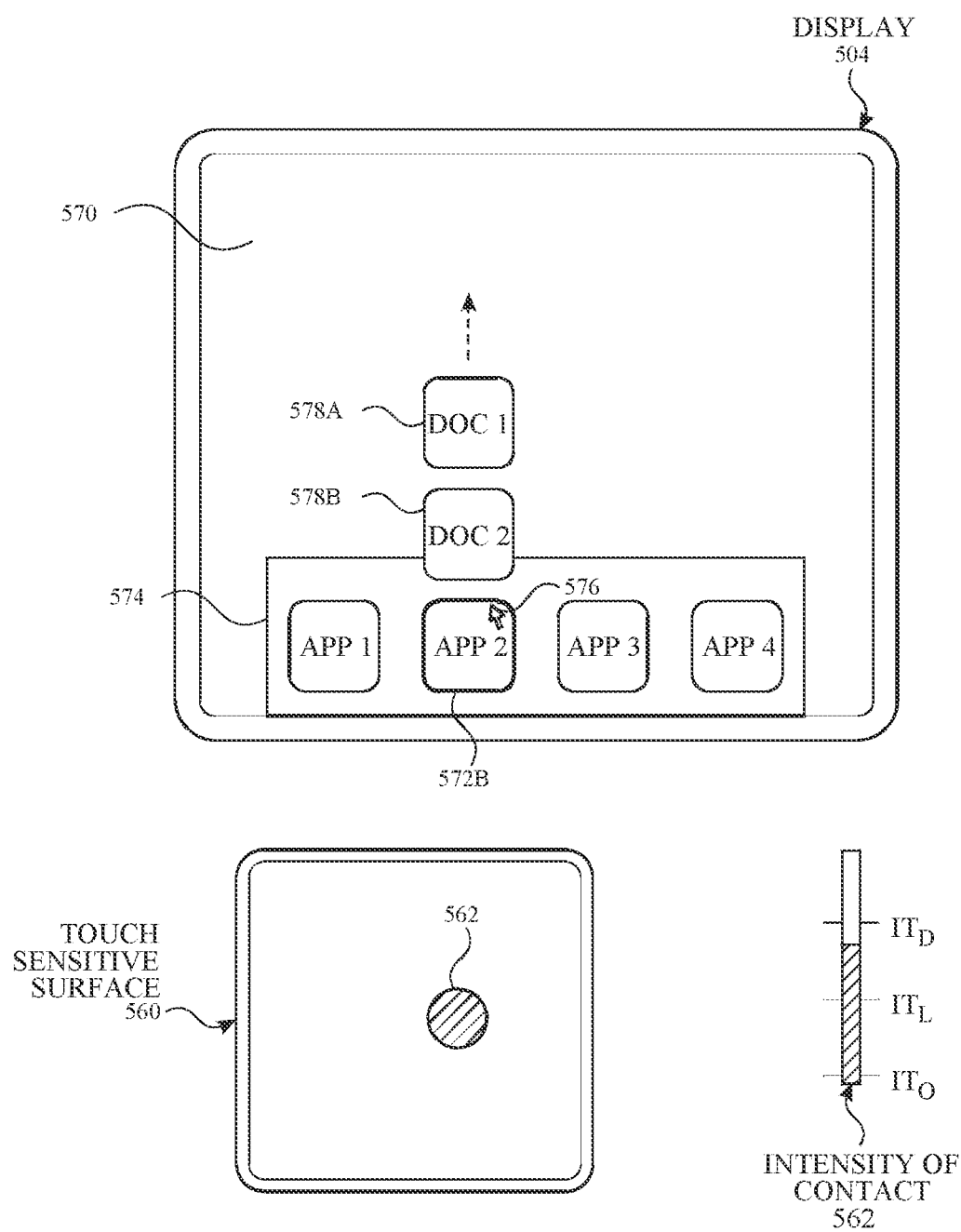
Figure 5H:
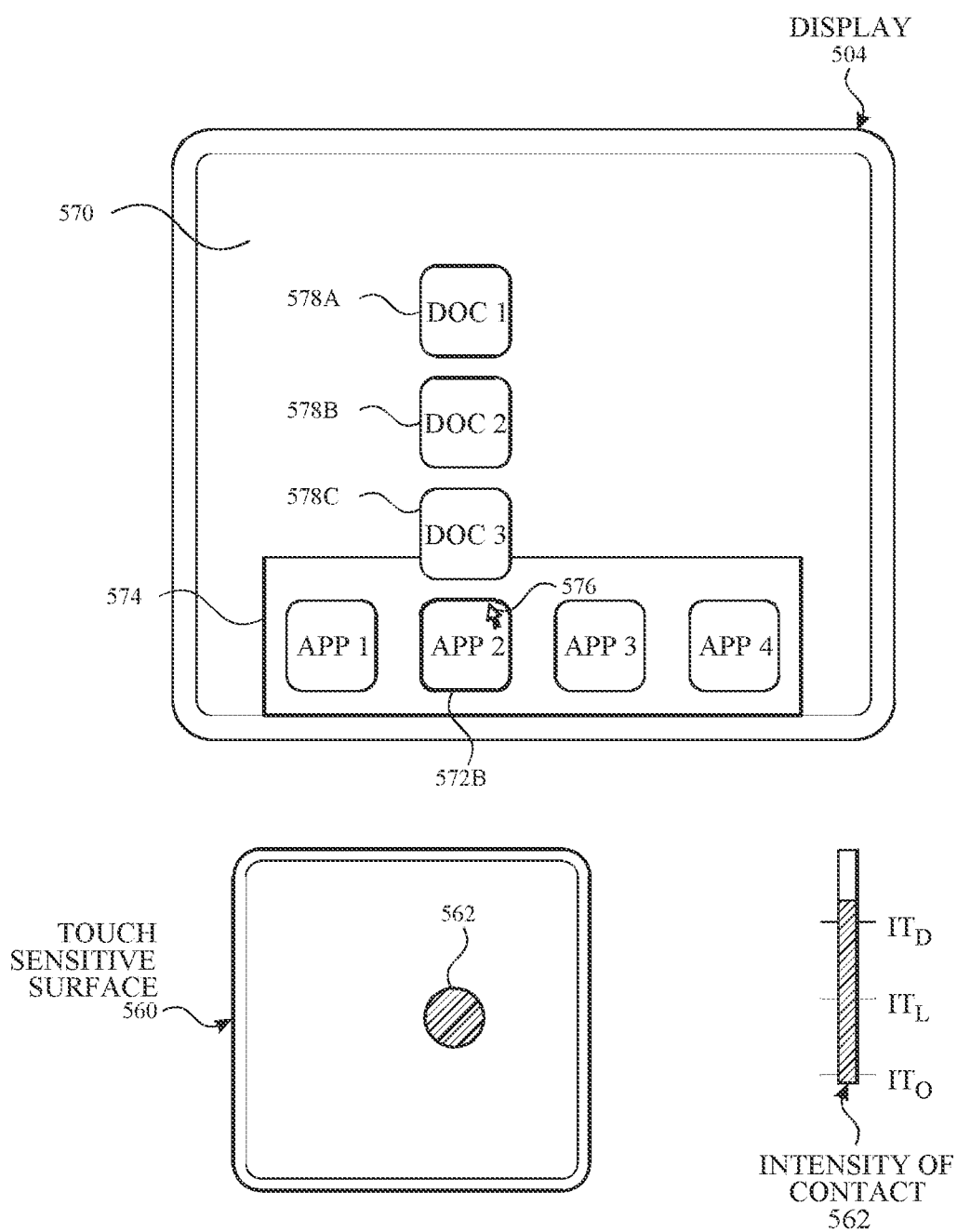

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, or device 600.

FIGS. 6A-6M illustrate exemplary context-specific user interfaces that can be used for controlling the display of graphical elements with user input, in accordance with some embodiments. The user interfaces in these figures are used to illustrate the processes described below, including the methods in FIG. 7A-7B.

Figure 6A:
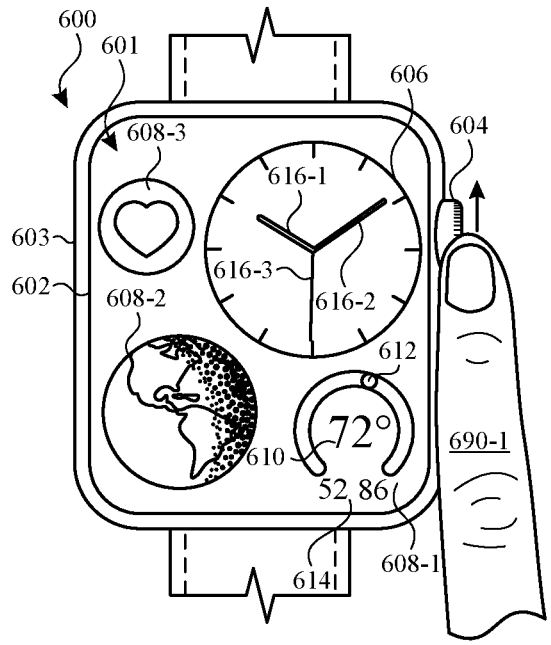
FIGS. 6A-6M illustrate exemplary context-specific user interfaces.

FIG. 6A illustrates device 600 with display 602 and rotatable input mechanism 604 (e.g., rotatable in relation to a housing or frame of the device). In some embodiments, device 600 is a wearable electronic device, such as smartwatch. In some embodiments, device 600 includes one or more features of devices 100, 300, or 500. As illustrated in FIG. 6A, device 600 displays watch user interface 601 on display 602. Watch user interface 601 includes graphical objects 606, 608-1, 608-2, and 608-3. In FIG. 6A, graphical object 606 includes an indication of time. As illustrated in FIG. 6A, the indication of time includes a representation of an analog clock face with hour hand 616-1, minute hand 616-2, and second hand 616-3. As used here, second hand 616-3 refers to a representation of a clock hand that indicates a seconds component of time, as opposed to a second hand of two or more hands (e.g., a first hand, second hand, third hand, etc.). In some embodiments, the indication of time is a representation of digital clock including a numerical indication of an hour and a numerical indication of a minute.

In FIG. 6A, graphical objects 608-1, 608-2, and 608-3 are complications (collectively "complications 608") corresponding to respective applications. In some embodiments, one or more of complications 608 display data from their respective applications. In some embodiments, one or more of graphical objects 608-1, 608-2, or 608-3 is not a complication.

A complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display.

In FIG. 6A, complications 608-1, 608-2, and 608-3 occupy respective locations at the lower-right, lower-left, and upper-left on watch user interface 601, while clock face 606 occupies a location in the upper-right on watch user interface 601. In FIG. 6A, each location is offset from the center of watch user interface 601. The lower-right, lower-left, and upper-left locations make up a sequence of locations on display 602, in which lower-right is the first location in the sequence of locations, lower-left is the second location in the sequence of locations, and upper-left is the third (and last) location in the sequence of locations. As shown in FIG. 6A, the locations are associated with respective sizes that determine the size of a graphical object displayed at a particular location. Of the three locations in the sequence of locations, the third (last) location (upper-left) has the smallest size; the second location (lower-left) has the largest size; and the first location (lower-right) has a size between the size of the second location and the size of the third location.

In some embodiments, the locations on watch user interface 601 are in a different order in the sequence than described above (e.g., upper-left, lower-right, lower left; upper-left, lower-left, lower-right; lower-left, lower-right, upper-left; etc.). In some embodiments, the sequence of locations includes only two locations (e.g., lower-left and lower-right). In some embodiments, the sequence of locations includes more than three locations. In some embodiments, locations that are adjacent in the sequence of locations are not adjacent on display 602. In some embodiments, the areas associated with the locations are a shape other than circular (e.g., rectangular).

Figure 6B:
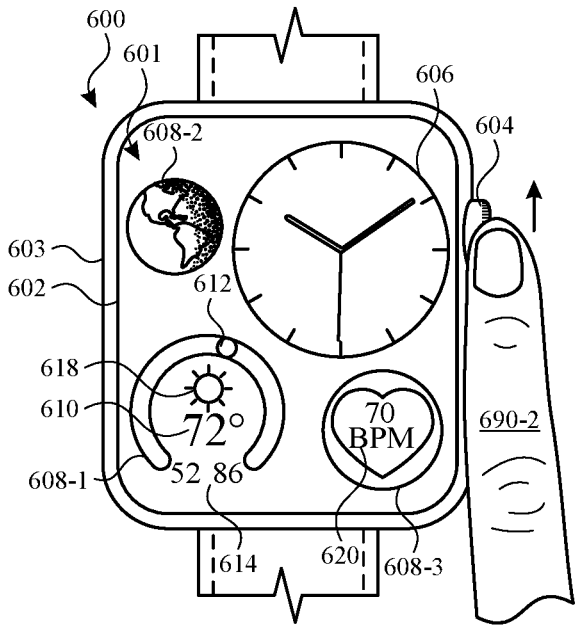

In FIG. 6A, device 600 received (e.g., detects) user input 690-1, which includes rotation of rotatable input mechanism 604 in an upward (clockwise) direction (e.g., as seen by comparing the positions of the finger shown in FIGS. 6A and 6B).

As illustrated in FIG. 6B, in response to receiving (e.g., detecting) user input 690-1, device 600 changes the locations at which complications 608-1, 608-2, and 608-3 are displayed (e.g., based on the sequence of locations). Each complication moves to the next location in the sequence, with exception of complication 608-3, which moves from the third (last) location to the first location. Complication 608-1 ceases to be displayed at the first location (lower-right) and is displayed at the second location (lower-left); complication 608-2 ceases to be displayed at the second location (lower-left) and is displayed at the third (last) location (upper-left); and complication 608-3 ceases to be displayed at the third (last) location (upper-left) and is displayed at the first location (lower-right).

Complications 608-1, 608-2, or 608-3 are modified when moving from one location to another. Due to the different sizes associated with the locations, complication 608-1 increases in size, complication 608-2 decreases in size, and complication 608-3 increases in size.

In some embodiments, the information included in one or more of the complications changes when moving from one location to another. In FIG. 6A, complication 608-1 includes a current temperature 610 and a partial ring with indicator 612 that shows the current temperature relative to the (e.g., forecasted) temperature range 614 of a high temperature (86 degrees) and low temperature (52 degrees). When displayed at the second (lower-left) location as shown in FIG. 6B, complication 608-1 additionally includes weather condition indicator 618 (e.g., indicating that a current weather condition is sunny). As another example, complication 608-3 includes a heart icon at the third location (upper-left) and includes indication 620 of heart beats per minute (70 BPM) in the larger first location (lower-right).

In some embodiments, the information included in a complication does not change when moving from one location to another (e.g., the information included in a complication does not depend on location). For example, complication 608-2 is an astronomy complication that includes a representation of Earth as currently illuminated by the Sun (e.g., showing day and night regions). In some embodiments, astronomy complication 608-2 includes an indication (e.g., a dot) showing the location of device 600 on Earth. As illustrated in FIGS. 6A and 6B, complication 608-2 appears the same (except for size) at both the second (lower-left) location and the third (last; upper-left) location.

As illustrated in FIG. 6B, device 600 receives (e.g., detects) user input 690-2, which includes rotation of rotatable input mechanism 604 further in the same direction as the rotation of user input 690-1. In some embodiments, user input 690-2 is a continuation of user input 690-1. In some embodiments, user input 690-2 is separate from user input 690-1.

Figure 6C:
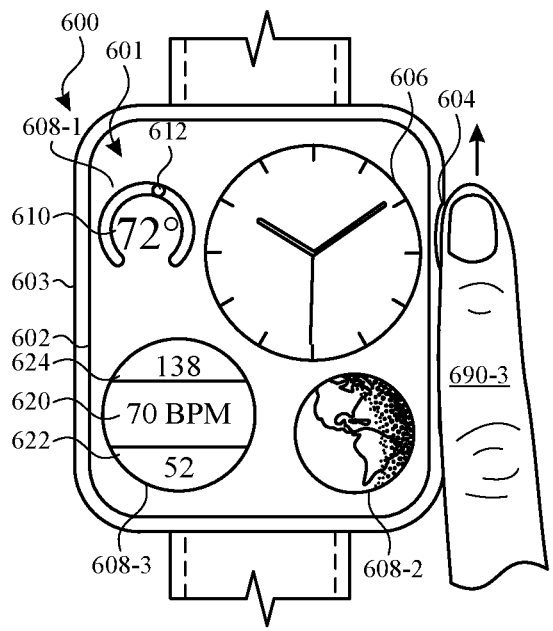

As illustrated in FIG. 6C, in response to receiving user input 690-2, device 600 further changes the locations of complications 608-1, 608-2, and 608-3 (e.g., based on the sequence of locations). Complication 608-1 ceases to be displayed at the second location (lower-left) and is displayed at the third location (upper-left); complication 608-2 ceases to be displayed at the third location (upper-left) and is displayed at the first location (lower-right); and complication 608-3 ceases to be displayed at the first location (lower-right) and is displayed at the second location (lower-left). Complication 608-1 decreases in size and includes less information. At the third location, complication 608-1 is displayed with current temperature 610 and temperature range ring with indicator 612, but without temperature range 614 showing the high and low temperatures and weather condition indicator 618 (e.g., without at least some information displayed at the second location). Complication 608-2 increases in size and continues to include a representation of Earth as currently illuminated by the Sun. Complication 608-3 increases in size and includes further information, low heart rate 622 and high heart rate 624, in addition to current heart rate 620, which was provided at the first location. The addition of information as complication 608-3 moves to progressively larger locations (e.g., third to first to second) illustrates an embodiment of a manner in which a complication can provide progressively more information as it moves to locations of progressively increasing size. Similarly, complication 608-1 includes more information as it moves from the first location to the larger second location, but includes less information when it moves from the second location (e.g., the largest location) to the third location (e.g., the smallest location).

As illustrated in FIG. 6C, device 600 receives (e.g., detects) user input 690-3, which includes rotation of rotatable input mechanism 604 further in the same direction as the rotation of user input 690-1 and user input 690-2. In some embodiments, user input 690-3 is a continuation of user input 690-2. In some embodiments, user input 690-2 is separate from user input 690-2.

Figure 6D:
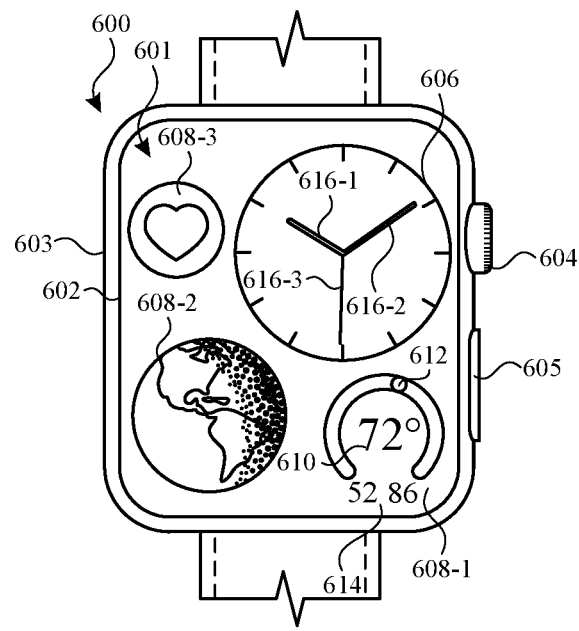
Figure 6E:
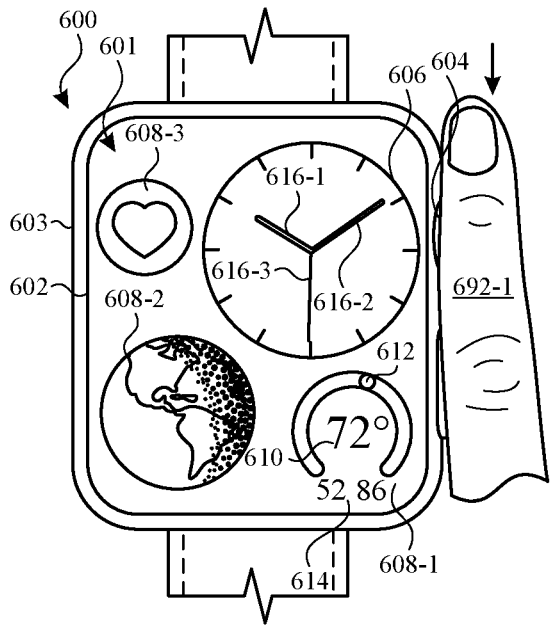
Figure 6F:
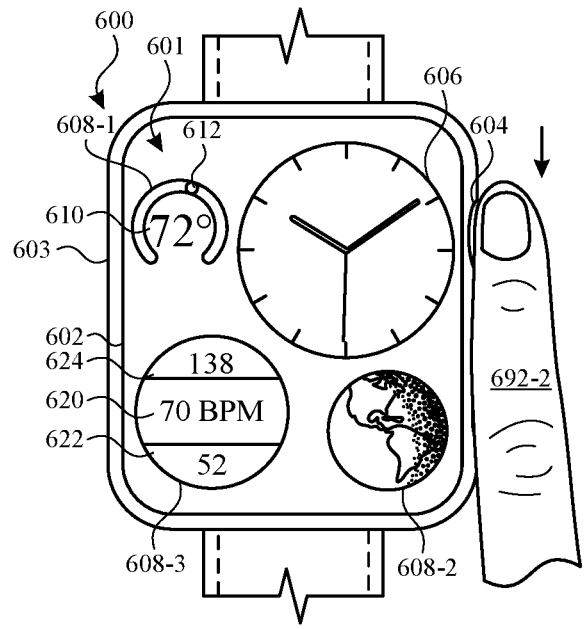
Figure 6G:
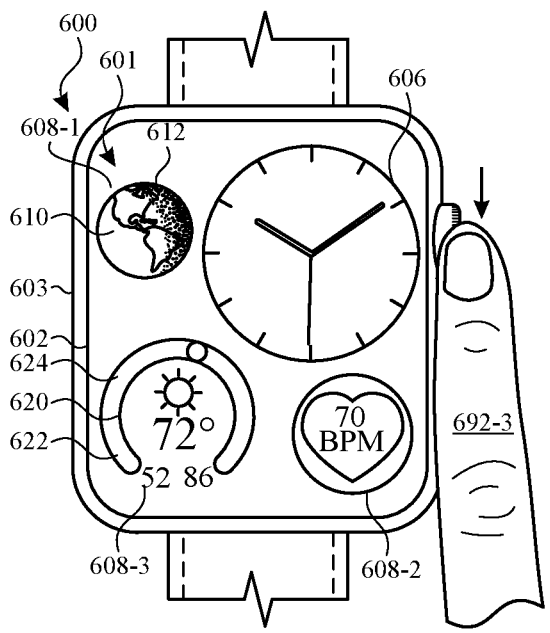
Figure 6H:
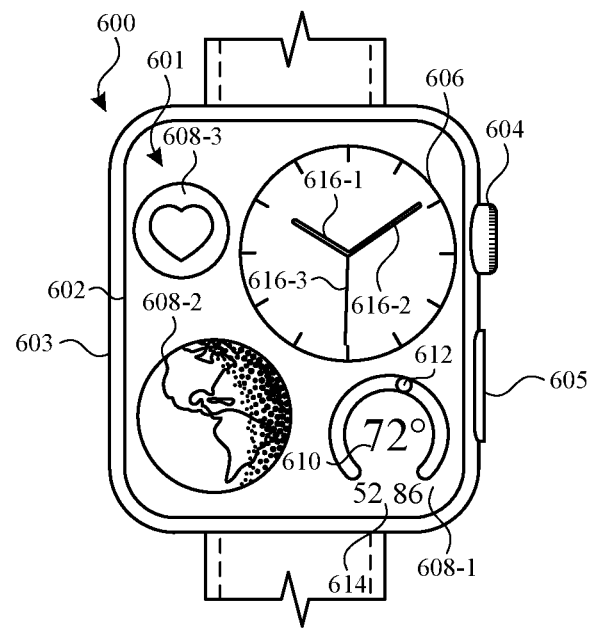

As illustrated in FIG. 6D, in response to receiving user input 690-3, device 600 further changes the locations of complications 608-1, 608-2, and 608-3 (e.g., based on the sequence of locations). Complication 608-1 ceases to be displayed at the third (last) location (upper-left) and is displayed at the first location (lower-right); complication 608-2 ceases to be displayed at the first location (lower-right) and is displayed at the second location (lower-left); and complication 608-3 ceases to be displayed at the second location (lower-left) and is displayed at the third (last) location (upper-left). In response to user inputs 690-1 thru 690-3, complications 608 cycle sequentially through the sequence of locations and return to the locations initially occupied in FIG. 6A.

As illustrated in FIGS. 6A-6D, complications 608 progress forward in the sequence of locations until reaching the last location, at which point complications 608 move to the first location in the sequence. Due to the relative positions of the locations on display 602, this results in complications 608 moving in a clockwise direction. In some embodiments, the direction (in either the logical sequence of locations or physical direction on display 602) depends on the user input (e.g., the direction of the user input). For example, complications 608 cycle in the direction illustrated in FIGS. 6A-6D in accordance with the direction of user inputs 690-1 thru 690-3 (e.g., upward or clockwise rotation of rotatable input mechanism 604).

FIGS. 6E-6H illustrate movement of complications 608 in response to user inputs 692-1 thru 692-3 having a direction opposite the direction of user inputs 690-1 thru 690-3 (e.g., downward or counter-clockwise rotation of rotatable input mechanism 604). As shown in FIGS. 6E-6H, in response to user inputs 692-1 thru 692-3, complications 608 move backward in the sequence of locations (e.g., counter-clockwise on display 602). For example, complication 608-1 moves from the first location, to the last location, to the second location, and back to the first location. In some embodiments, complications 608 move forward in the sequence of locations in response to a swipe gesture on display 602 having a first direction (e.g., up or right) and move backward in the sequence of location in response to a swipe gesture having an opposite direction (e.g., down or left).

As illustrated in FIGS. 6A-6H, clock face 606 remains in the upper-right location of watch user interface 601 during user inputs 690 and 692, even as complications 608 are moved (e.g., the upper-right location is not included in the sequence of locations between which graphical objects move in response to user input). In some embodiments, the upper-right location on watch user interface 601 is included in the sequence of locations (e.g., as a fourth (last) location), and clock face 606 is moved to different locations in the sequence along with complications 608.

FIGS. 6I-6M illustrate an embodiment with a sequence of locations in which the lower-right location is the first location, the lower-left location is the second location, the upper-left location is the third location, and the upper-right location is the fourth (last) location. As illustrated in FIGS. 6I-6M, graphical objects 606, 608-1, 608-2, and 608-3 move forward in the sequence of locations (e.g., clockwise on display 602) in response to user inputs 693-1 thru 693-4.

Figure 6I:
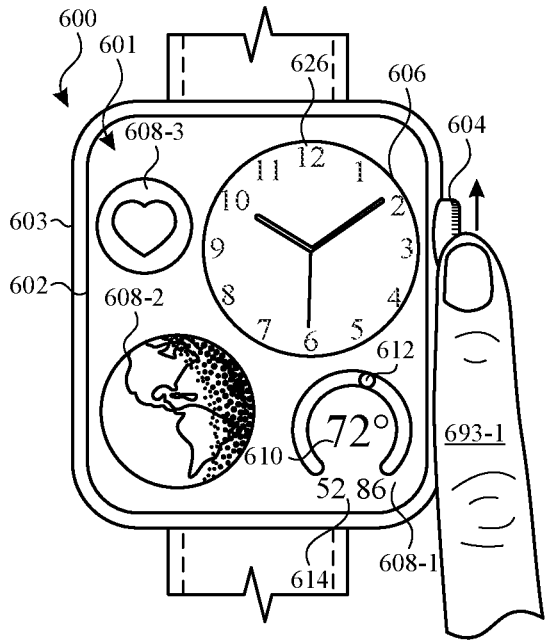
Figure 6J:
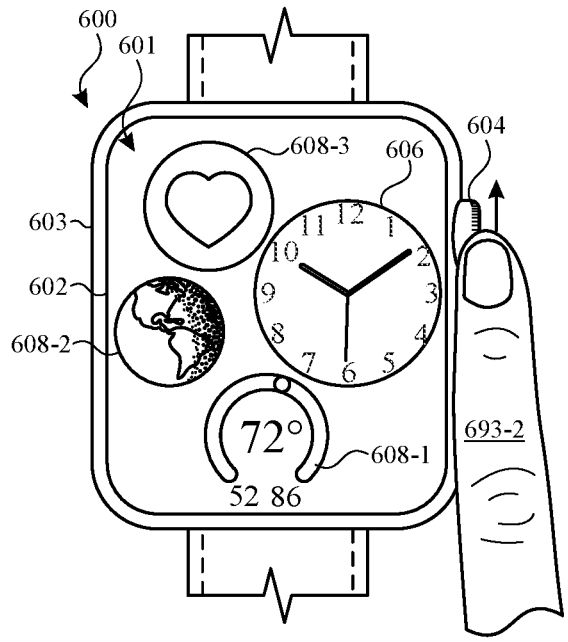
Figure 6K:
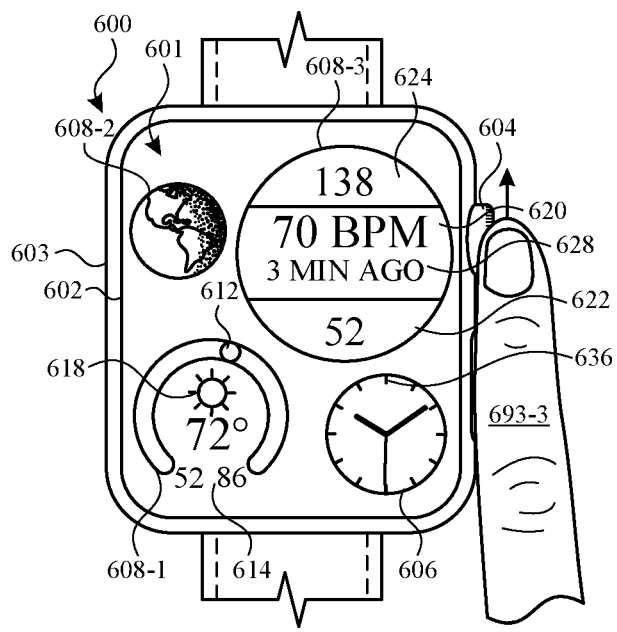
Figure 6L:
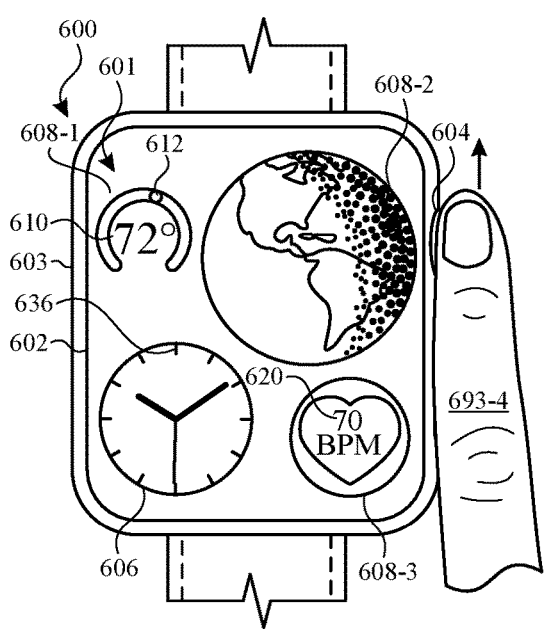
Figure 6M:
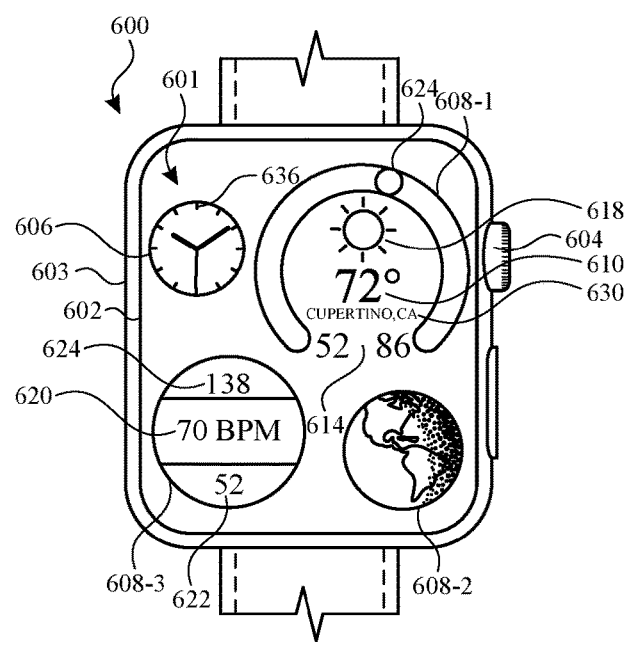

As illustrated in FIGS. 6I-6M, the fourth location has a size larger than the size of the second location (e.g., previously the location with the largest size), which allows for display of additional information compared to the first, second, and third locations. When complication 608-3 is positioned at the fourth location (FIG. 6K), it includes additional information 628 indicating when the currently displayed hear rate 620 was last updated, as compared to the information included when complication 608-3 is positioned at the location with the next largest size (the second location) (FIG. 6M). Complication 608-1 also includes additional location information 630 in the fourth location (FIG. 6M) as compared to the second location (FIG. 6K). Clock face 606 includes progressively more detail as the size of the location increases beyond a certain size. At the three smallest locations (the first, second, and third locations) clock face 606 includes the same amount of detail (e.g., tick marks 636 corresponding to hour markers), while at the largest location (the fourth location) clock face 606 includes numerals 626 corresponding to the hour markers.

As illustrated in FIGS. 6A-6H, the locations are fixed in the sense that the positions of the locations do not change or move as different graphical objects are displayed at the locations in response to user input (e.g., a graphical object displayed at a particular location always occupies the same area of display 602).

In some embodiments, ceasing to display a complication at one location and displaying the complication at another location includes an animation while ceasing to display the complication, an animation while displaying the complication, or an animation while ceasing to display the complication and while displaying the complication (e.g., the complication gradually fades away or gradually appears or the complication translates off of one location and translates into another location).

As illustrated in FIG. 6J, in some embodiments, watch user interface 601 displays an animation of complications 608-1, 608-2, and 608-3 and clock face 606 moving in a clockwise direction as each element translates off of one location and translates into the next location in the sequence of locations on the display. For example, as complications 608 transition from the configuration illustrated in FIG. 6I to the configuration illustrated in FIG. 6K, the watch user interface 601, displays complications 608-1, 608-2, and 608-3 and clock face 606 in intermediate positions (e.g., complication 608-1 is between the first position and the second position, complication 608-2 is between the second position and the third position, complication 608-3 is between the third position and the fourth (last) position, and clock face 606 is between fourth (last) position and the first position). In some embodiments, the direction of the animated movement of each graphical element corresponds to the direction of user input 693-2 (e.g., complications 608 translate in clockwise direction in response to a clockwise input 693-2 at the rotatable input mechanism).

Figure 7B:
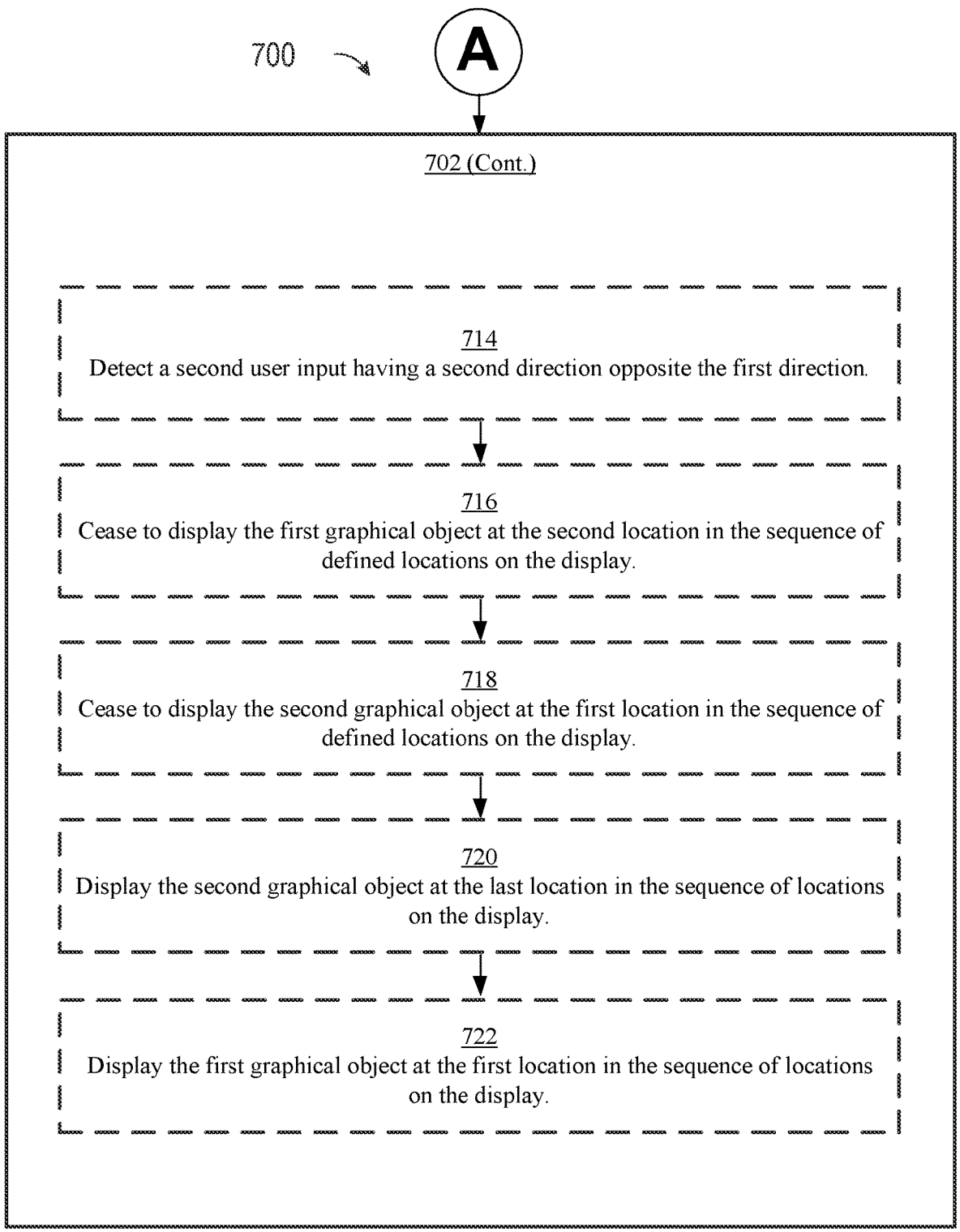

FIGS. 7A-7B are a flow diagram illustrating a method for providing context-specific user interfaces using an electronic device in accordance with some embodiments. Method 700 is performed at a device (e.g., 100, 300, 500, 600) with a display. Some operations in method 700 are, optionally, combined, the orders of some operations are, optionally, changed, and some operations are, optionally, omitted.

At block 702, the device displays a watch user interface (e.g., 601) on the display (e.g., 602). The watch user interface includes a first graphical object at a first location (e.g., 608-1 of FIG. 6A) in a sequence of locations on the display and a second graphical object at a last location (e.g., 608-3 of FIG. 6A) in the sequence of locations on the display. In some embodiments, at least one of the first graphical object and the second graphical object display data from an application (e.g., the first graphical object and/or the second graphical object is a complication associated with a watch face of the watch user interface). In some embodiments, the first graphical object includes an indication of time (606). In some embodiments, the indication of time is a representation of an analog clock including an hour hand and a minute hand. In some embodiments, the indication of time is a representation of digital clock including a numerical indication of an hour and a numerical indication of a minute. In some embodiments, the indication of time is offset from the center of the display.

Displaying multiple graphical elements as members of sequence of locations on a display, which can be re-configured in a sequential manner, provides the user with feedback about the current position of an individual graphical element relative to other graphical elements and provides visual feedback to the user indicating how subsequent inputs will alter the display. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 704, the device detects a user input. In some embodiments, the device has a rotatable input mechanism (e.g., 604), and the user input includes rotation of the rotatable input mechanism (e.g., 690). In some embodiments, the rotatable input mechanism is a physical mechanism attached to a fixed location of the electronic device (e.g., the side of the frame 603) and rotates relative to the electronic device. In some embodiments, the movement of complications between locations on the display is based on the direction of rotation (e.g., rotation in one direction results in forward movement in the sequence of locations, and rotation in the opposite direction results in backward movement in the sequence of locations).

In some embodiments, the user input is a swipe gesture detected on the display (e.g., in a first direction).

In response to detecting the user input, the device performs the operations of blocks 706, 708, 710, and 712. At block 706, the device ceases to display the first graphical object at the first location in the sequence of defined locations on the display (e.g., 608-1 of FIG. 6A in the lower-right of the display). At block 708, the device ceases to display the second graphical object at the last location in the sequence of defined locations on the display (e.g., 608-3 of FIG. 6A in the upper-left of the display). At block 710, the device displays the second graphical object at the first location in the sequence of locations on the display (e.g., 608-3 of FIG. 6B is displayed in the lower-right of the display). At block 712, the device displays the first graphical object at a second location in the sequence of locations on the display (e.g., 608-1 of FIG. 6B is displayed in the lower-left of the display). In some embodiments, there are only 2 locations and the second location is the last location. In some embodiments, there are more than 2 locations and the second location is the next location in the sequence (e.g., FIGS. 6A-6M). In some embodiments, the first graphical object, while displayed at the first location, includes first information and the first graphical object, while displayed at the second location, includes second information, different than the first information (e.g., without including the first information) (e.g., 608-1 of FIG. 6A and 608-1 of FIG. 6B).

Automatically updating a visual characteristic, such as the type and quantity of information displayed on multiple graphical elements in response to a change in location on the interface caused by an input, provides the user with more control over the device by helping the user quickly configure multiple display elements into a variety configurations without the requiring individual interactions with each element (e.g., first selecting an element, then relocating the element to another location on the display, individually adjusting nature of information displayed and repeating the steps for other elements are condensed into fewer operations that require user input). Reducing the number of inputs need to perform equivalent operations, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first graphical object has a first size while displayed at the first location, and wherein the first graphical object has a second size while displayed at the second location, the first size different than the second size. (e.g., 608-1 of FIG. 6B and 608-1 of FIG. 6C).

Automatically updating a visual characteristic, such as size, of multiple graphical elements in response to a change in location on an interface caused by an input, provides the user with more control over the device by helping the user quickly configure multiple display elements into a variety configurations without the requiring individual interactions with each element (e.g., first selecting an element, then relocating the element to another location on the display, then resizing of the element and repeating these steps for other elements are condensed in fewer operations that require user input). Reducing the number of inputs need to perform equivalent operations, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the watch user interface further includes an indication of time that is displayed at the same position before and after the first input (e.g., 606 of FIGS. 6A-6H). In some embodiments, the indication of time is a representation of an analog clock including an hour hand and a minute hand (e.g., 606). In some embodiments, the indication of time is a representation of digital clock including a numerical indication of an hour and a numerical indication of a minute.

Ceasing to display the first and the second graphical elements at the first and last locations, respectively, then redisplaying the second graphical element at the first location and the first graphical element at second location in response to an input provides the user with more control over the device by helping the user quickly configure multiple display elements into a variety configurations without requiring individual interactions with each element. Reducing the number of inputs need to perform equivalent operations, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, ceasing to display the first graphical object at the first location in the sequence of defined locations on the display and displaying the first graphical object at the second location in the sequence of locations on the display includes displaying an animation of the first graphical object moving from the first location toward the second location and ceasing to display the second graphical object at the last location in the sequence of defined locations on the display and displaying the second graphical object at the first location in the sequence of locations on the display includes displaying an animation of the second graphical object moving from the last location toward the first location (e.g., in response to the input (e.g., 693), the device (e.g., 600) displays an animation illustrated by FIGS. 6I to 6K).

Displaying animations of objects as they are reassigned to different locations on a user interface, provides the user with visual feedback about how subsequent interactions with the device will specifically change the configuration of the user interface, this feedback enables the user to choose their next input more efficiently. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first location and the second location are fixed on the display relative to a physical frame of the device (e.g., the positions of the first location and the second location do not change in response to detecting the first input). In some embodiments, in response to the first input, the second graphical object ceases to be displayed at the last location and is displayed at the first location without animating movement of the second graphical object from the last location to the first location.

In some embodiments, at block 714 the device detects a second user input having a second direction opposite the direction of the first input (e.g., 692). In response to detecting the second user input (e.g., 692-3), the device performs the operations of blocks 716, 718. 720, and 722 (e.g., 608-1, FIG. 6G to 6H). At block 716, the device ceases to display the first graphical object at the second location in the sequence of defined locations on the display (e.g., 608-1). At block 718, the device ceases to display the second graphical object (e.g., 608-2) at the first location in the sequence of defined locations on the display. At block 720, the device displays the second graphical object at the last location in the sequence of locations on the display (e.g., 608-2 of FIG. 6H). At block 722, the device displays the first graphical object at a first location in the sequence of locations on the display (e.g., 608-1 of FIG. 6H).

Updating the positioning of multiple graphical elements on a display consistent with the direction of a user input provides the user with feedback about how subsequent interactions with the device will change the configuration of user interface, this enables the user to choose their next input more efficiently. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

As described below, method 700 provides an intuitive way for configuring context-specific user interfaces. The method reduces the cognitive burden on a user, thereby creating a more efficient human-machine interface. For battery-operated computing devices, enabling a user to configure context-specific user interfaces faster and more efficiently conserves power and increases the time between battery charges.

Note that details of the processes described above with respect to method 700 (e.g., FIGS. 7A-7B) are also applicable in an analogous manner to the methods described below (e.g., methods 900 and 1100). For example, method 1100 optionally includes one or more of the characteristics of the various methods described above with reference to method 700. For example, the positions of complications 1008 of FIG. 10A on watch user interface 1000 can be reconfigured (e.g., cycled in a clockwise direction) in response to a user input at the rotatable input device 604 in a manner analogous to various technique described with reference to method 700. For brevity, these details are not repeated below.

FIGS. 8A-8J illustrate exemplary user interfaces for displaying a background of a watch user interface, in accordance with some embodiments. The user interfaces in these figures are used to illustrate the processes described below, including the methods in FIG. 9.

Figure 8A:
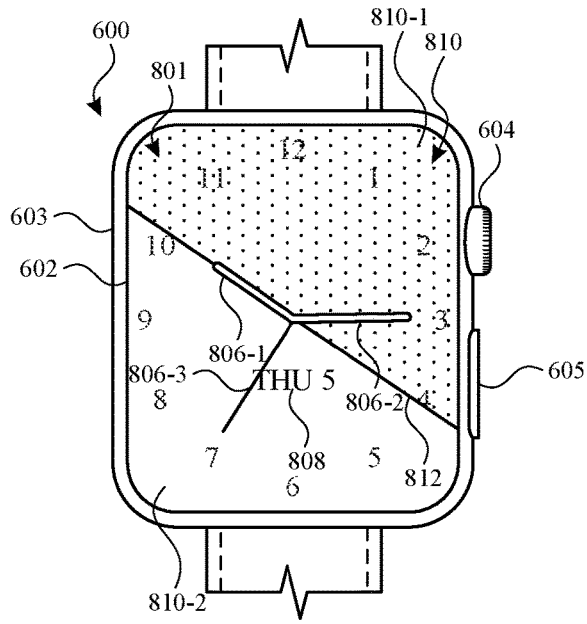
FIGS. 8A-8J illustrate exemplary context-specific user interfaces.

FIG. 8A illustrates device 600 as described above. In FIG. 8A, device 600 displays watch user interface 801 on display 602 at a first time (10:15:35). As illustrated in FIG. 8A watch user interface 801 includes an hour hand 806-1, minute hand 806-2, and second hand 806-3. As used here, second hand 806-3 refers to a representation of a clock hand that indicates a seconds component of time, as opposed to a second hand of two or more hands (e.g., a first hand, second hand, third hand, etc.). In some embodiments, watch user interface includes only hour hand 806-1 and minute hand 806-2 (e.g., not second hand 806-3) or only hour hand 806-1 (e.g., not minute hand 806-2 and second hand 806-3).

Hour hand 806-1, minute hand 806-2, and second hand 806-3 are overlaid on background 810, which includes first portion 810-1 and second portion 810-2 separated by straight linear boundary 812. In some embodiments, background 810 includes a boundary that is not linear. As indicated by the stippling on first portion 810-1 in FIG. 8A, first portion 810-1 has a different color or visual pattern than second portion 810-2. In FIG. 8A, background 810 occupies the entire background of display 602 (e.g., background 810 extends to the edges and (rounded) corners of display 602).

Background 810 includes one or more graphical characteristics based on the position of hour hand 806-1. As illustrated in FIG. 8A, linear boundary 812 is aligned along hour hand 806-1, which defines the orientation of background 810 with respect to a physical feature of device 600 (e.g., display 602, frame 603, rotatable input mechanism 604, and button 605). As oriented in FIG. 8A, first portion 810-1 is positioned generally above and to the right of second portion 810-2, and generally occupies the upper right half of display 602. Hour hand 806-1 extends from a point in the center of display 602. As a result, linear boundary 812 extends from one edge of display 602 (e.g., left edge as shown in FIG. 8A) to an opposite edge (e.g., right edge) such that first portion 810-1 and second portion 810-2 each occupy half of the area of display 602.

Figure 8B:
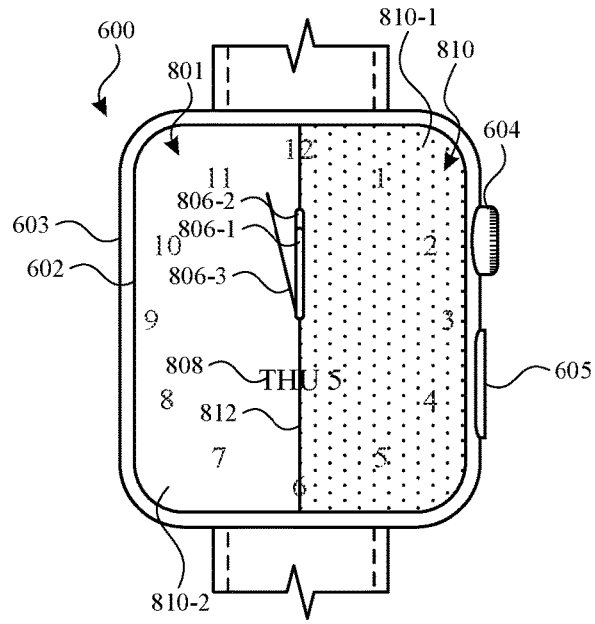

Turning now to FIG. 8B, device 600 displays watch user interface 801 at a second time (12:00:58) (e.g., after the first time), with a second graphical characteristic (e.g., re-orientated position) of background 810 based on the updated position of hour hand 806-1. As illustrated in FIG. 8B, linear boundary 812 remains aligned along hour hand 806-1 and is vertically oriented such that first portion 810-1 occupies the right half of display 602 and second portion 810-2 occupies the left half of display 602.

Figure 8C:
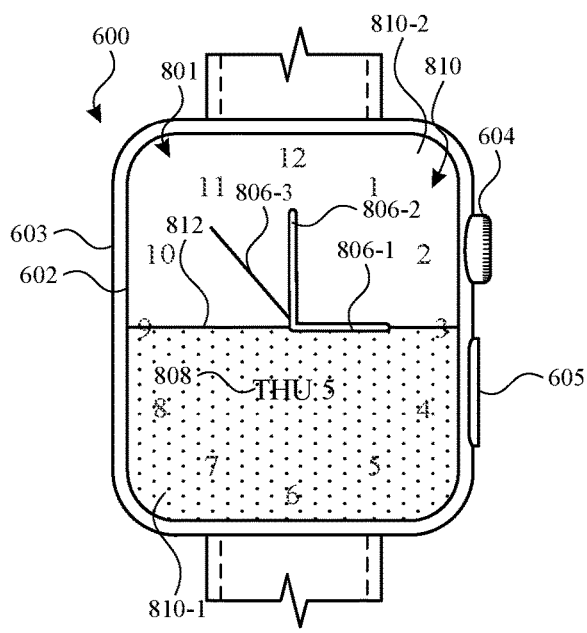
Figure 8D:
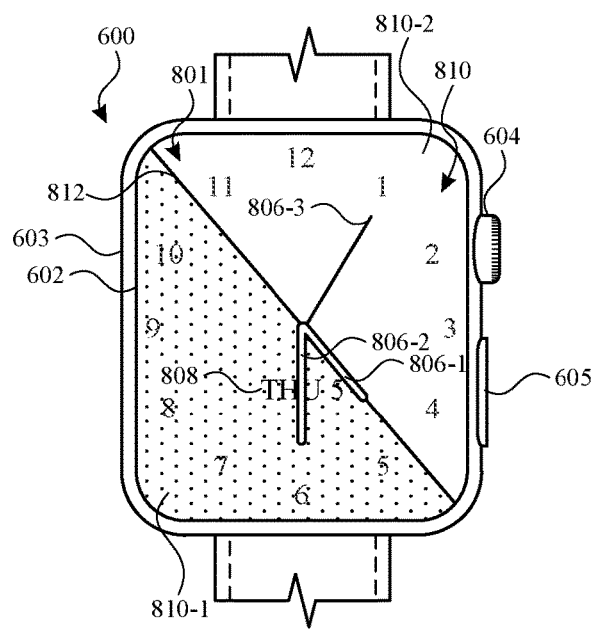

FIGS. 8C and 8D illustrate that linear boundary 812 remains aligned along hour hand 806-1 as the time and hour hand 806-1 progresses to 3:00 (FIG. 8C) and 4:30 (FIG. 8D), with background 810 rotating with hour hand 806-1. As illustrated in FIGS. 8A-8D, background 810 rotates around the same point (e.g., a common origin) as hour hand 806-1.

As illustrated in FIGS. 8A-8D, watch user interface 801 also includes graphical elements (e.g., hour numerals (1-12) and date object (808) (e.g., a calendar complication)), which are overlaid on the background and remain fixed (e.g., in the same place with respect to display 602) as hour hand 806-1, minute hand 806-2, second hand 806-3, and background 810 change position on display 602.

As illustrated in FIGS. 8A-8D, the shapes of first portion 810-1 and second portion 810-2 change as background 810 rotates. For example, in FIGS. 8B and 8C, portions 810-1 and 810-2 are roughly rectangular (with the exception of the rounded corners due to the shape of display 602), while in FIG. 8D, portions 810-1 and 810-2 are roughly triangular (with the exception of the rounded corners due to the shape of display 602).

As illustrated in FIGS. 8A-8D, background 810 remains fixed relative to hour hand 806-1 (e.g., first portion 810-1 remains on the clockwise side of hour hand 806-1). In some embodiments, first portion 810-1 is on the counter-clockwise side hour hand 806-1. In the embodiment illustrated in FIGS. 8A-8D, the graphical characteristic of background 810 repeats every twelve hours (e.g., background 810 makes a complete rotation every twelve hours). At each time (e.g., 6:00), first portion 810-1 occupies an area of display 602 that is occupied by second portion 810-2 at a different time (e.g., 12:00), and vice versa (e.g., first portion 810-1 and second portion 810-2 switch positions every six hours).

Turning now to FIGS. 8E-8H, an embodiment in which a graphical characteristic of background 810 is based on the position of minute hand 806-2 is illustrated. As illustrated in FIGS. 8E-8H, linear boundary 812 remains aligned along minute hand 806-2 as minute hand 806-2 rotates on display 602. Background 810 rotates with minute hand 806-2 around a point in the center of display 602 similar to the way in which background 810 rotates with hour hand 806-1 as illustrated in FIGS. 8A-8D. First portion 810-1 and second portion 810-2 each occupy respective halves of display 602 and change shape as the position of minute hand 806-2 changes over time. In the embodiment illustrated in FIGS. 8E-8H, the graphical characteristic of background 810 repeats every hour (e.g., background 810 makes a complete rotation every hour). First portion 810-1 and second portion 810-2 switch positions every thirty minutes. In contrast to FIGS. 8A-8D, first portion 810-1 remains on the counter-clockwise side of minute hand 806-2. In some embodiments, first portion 810-1 is on the clockwise side of minute hand 806-2. In some embodiments, a graphical characteristic is based on the position of second hand 806-3 in a manner analogous to the manner described above for hour hand 806-1 and minute hand 806-2.

Figure 8E:
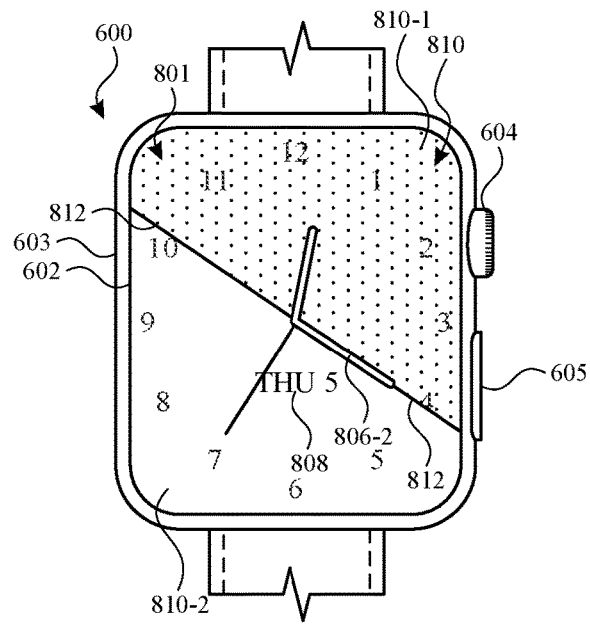
Figure 8F:
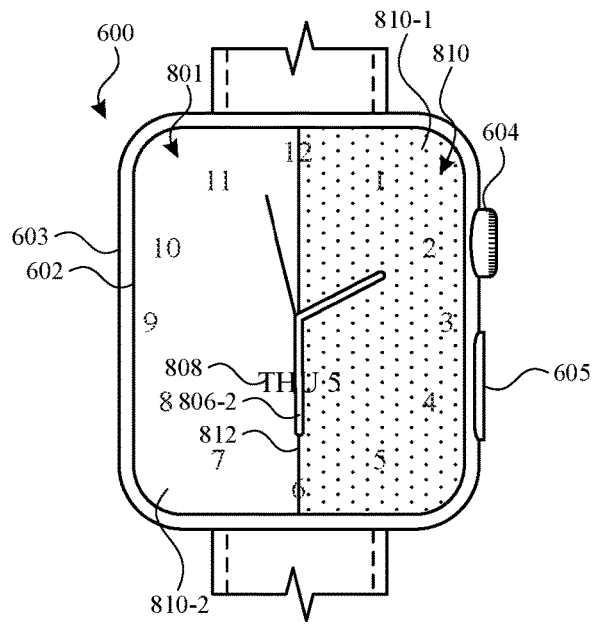
Figure 8G:
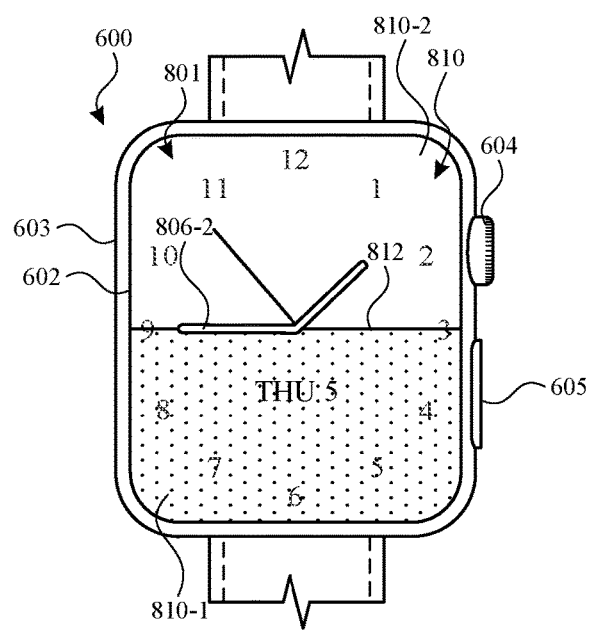
Figure 8H:
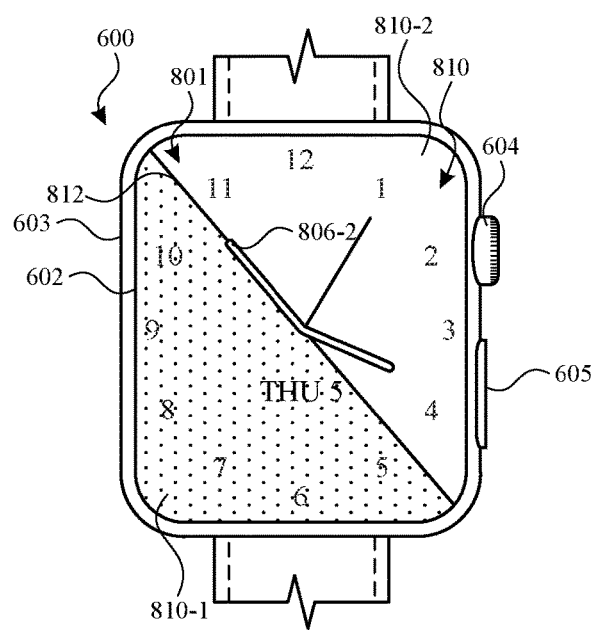
Figure 8I:
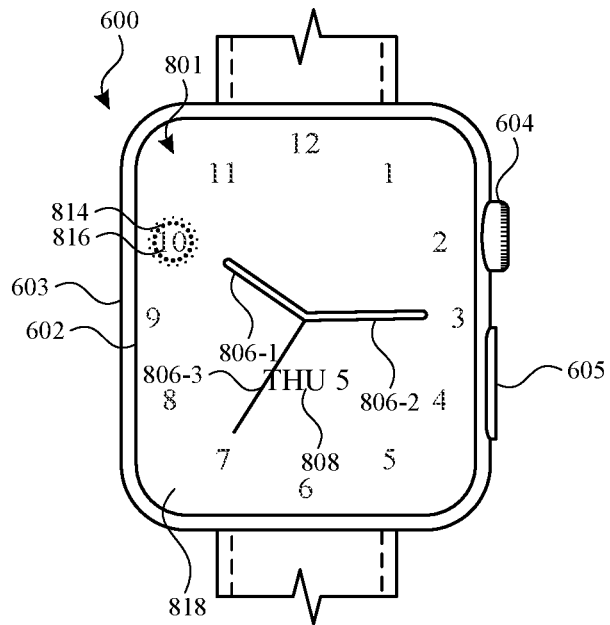
Figure 8J:
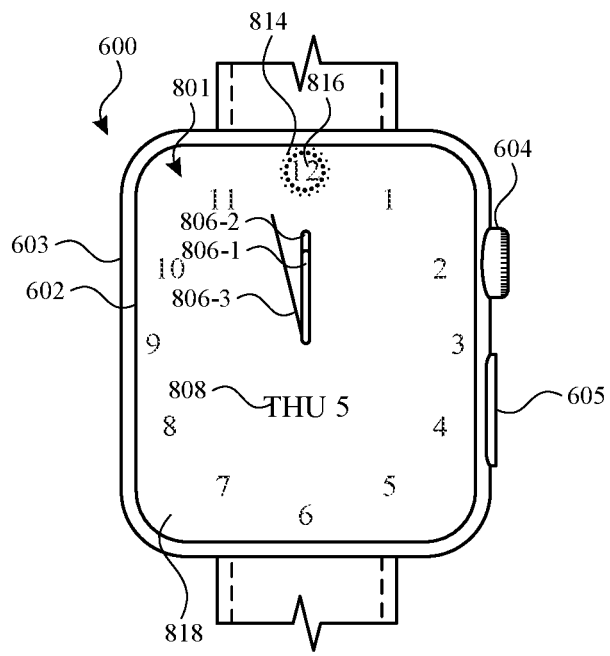

Turning now to FIGS. 8I and 8J, an embodiment with a different background is described. As illustrated in FIGS. 8I and 8J, watch user interface 801 includes background 818, which includes a spotlight effect 814. A graphical characteristic of background 818 (e.g., the position of spotlight effect 814) is based on the position of hour hand 806-1. As illustrated in FIGS. 8I and 8J, spotlight effect 814 is displayed behind the hour marker 816 corresponding to the position of hour hand 806-1. In some embodiments, spotlight 814 remains constantly aligned along hour hand 806-1 (e.g., spotlight effect 814 is displayed between hour markers 11 and 12 at 11:30). In some embodiments, spotlight 814 remains behind an hour marker corresponding to the current hour (e.g., spotlight effect 814 remains behind hour marker 11 from 11:00 to 11:59).

In some embodiments, the hand upon which the graphical characteristic of background 810 is based is determined (e.g., selected) based on user input. In some embodiments, in response to receiving a sequence of one or more user inputs, device 602 operates in a mode in which a graphical characteristic of background 810 is based on hour hand 806-1, minute hand 806-2, or second hand 806-3 (e.g., in response, at least in part, to selection of one or more affordances for accessing and selecting a menu option corresponding to one of hands 806). In some embodiments, selecting the hand upon which the graphical characteristic of background 810 is based includes entering a watch face edit mode or a watch face settings edit mode (e.g., in response to determining that a received contact has a characteristic intensity greater than or equal to a threshold intensity).

In some embodiments, in response to receiving a sequence of one or more user inputs, device 602 switches from a mode in which a graphical characteristic of background 810 is based on one hand (e.g., hour hand 806-1) to a mode in which a graphical characteristic of background 810 is based on a different hand (e.g., minute hand 806-2). In this way, a user can select the rate at which the graphical characteristic (e.g., orientation) of the background changes (e.g., rotates).

In some embodiments, the background and/or graphical characteristic of the background is determined (e.g., selected) based on user input. In some embodiments, in response to receiving a sequence of one or more user inputs, device 602 set the background and/or graphical characteristic to a selected background and/or graphical characteristic (e.g., in response to selection of one or more affordances for accessing and selecting a menu option corresponding to the background and/or graphical characteristic). In some embodiments, in response to receiving a sequence of one or more user inputs, device 602 switches from one background and/or graphical characteristic (e.g., background 810) to a different background and/or graphical characteristic (e.g., background 818).

Figure 9:
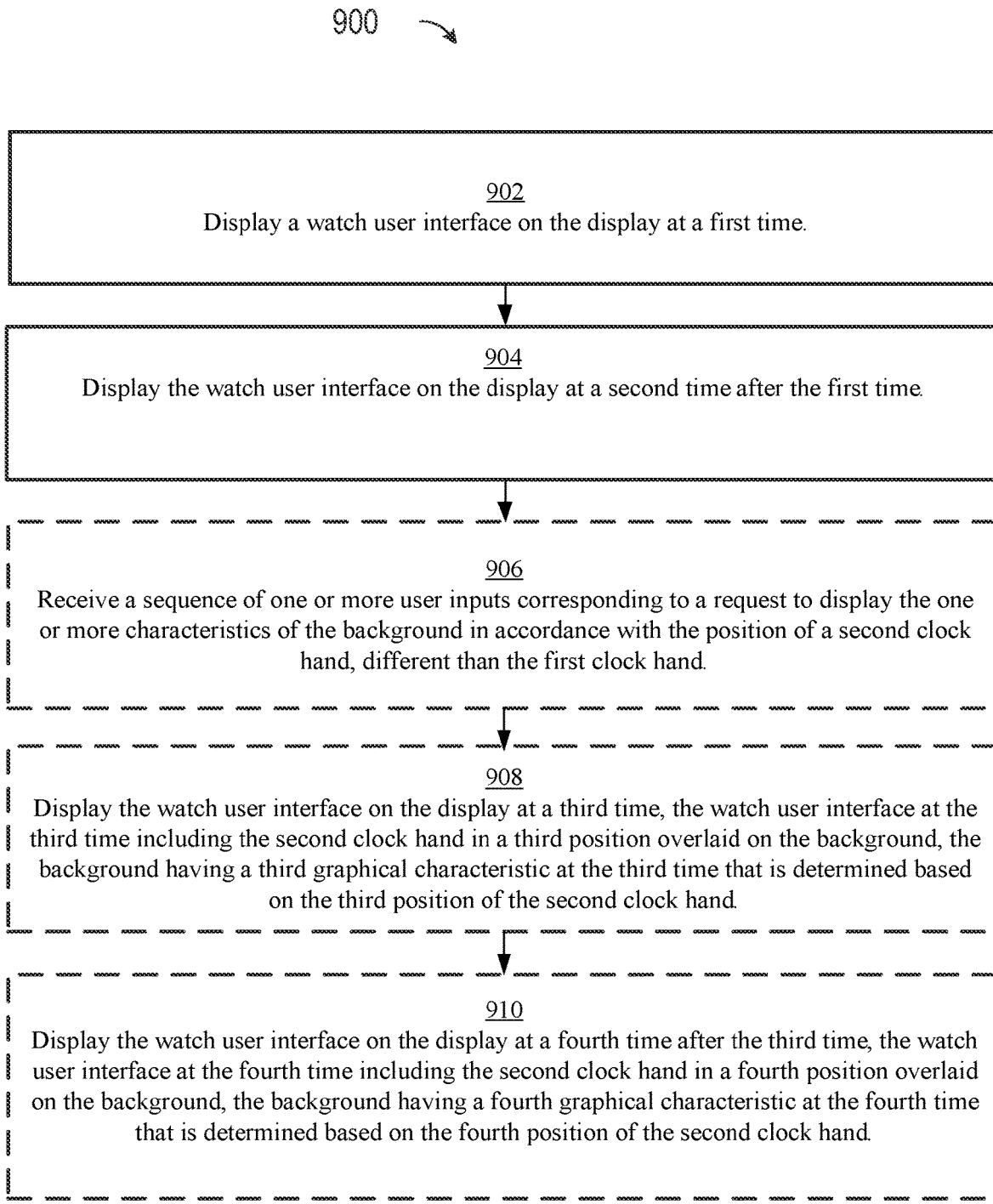
FIG. 9 illustrates a flow diagram depicting a method for providing context-specific user interfaces in accordance with some embodiments.

FIG. 9 is a flow diagram illustrating a method for providing context-specific user interfaces using an electronic device in accordance with some embodiments. Method 900 is performed at a device (e.g., 100, 300, 500, 600) with a display. Some operations in method 900 are, optionally, combined, the orders of some operations are, optionally, changed, and some operations are, optionally, omitted.

As described below, method 900 provides an intuitive way for configuring context-specific user interfaces. The method reduces the cognitive burden on a user, thereby creating a more efficient human-machine interface. For battery-operated computing devices, enabling a user to configure context-specific user interfaces faster and more efficiently conserves power and increases the time between battery charges.

At block 902, the device displays watch user interface (e.g., 801) on the display (e.g., 602) at a first time. The watch user interface at the first time includes a first clock hand in a first position (e.g., FIG. 8A, 806-1) overlaid on a background (e.g., 810), the background having a first graphical characteristic at the first time that is determined based on the first position of the first clock hand (e.g., the appearance of 810 is based on the position 806-1).

In some embodiments, the first clock hand is one of an hour hand, a minute hand, or a second hand (e.g., 806-1, 806-2, and 806-3).

In some embodiments, the background extends to an edge of the display (e.g., 810).

In some embodiments, the background includes a first portion occupying a first half of the display and a second portion occupying a second half of the display (e.g., 810-1 and 810-2).

In some embodiments, the boundary between the first portion and the second portion is a straight line (e.g., 812).

In some embodiments, the boundary is along the first clock hand (e.g., 806-1 of FIGS. 8A-8D).

In some embodiments, the first portion includes a first color or visual pattern and the second portion includes a second color or visual pattern different than the first color or visual pattern (e.g., 810-1 and 810-2).

At block 904, the device displays the watch user interface (e.g., 801) on the display (e.g., 602) at a second time after the first time (e.g., FIG. 8B, second time of approximately 12:00:57). The watch user interface at the second time includes the first clock hand (FIG. 8B, 806-1) in a second position overlaid on the background (e.g., 810), the background having a second graphical characteristic at the second time that is determined based on the second position of the first clock hand (e.g., 810 of FIG. 8A and 810 of FIG. 8B).

Dynamically modifying a characteristic of the background of a watch user interface based on the position of a clock hand provides the user with an easily decipherable visual indication of the current time measured by the watch. Providing improved visual feedback to the user enhances the operability of the device and makes the user-device interface more efficient (e.g., by helping the user to quickly resolve information displayed, the user does not need to spend as much time interacting with the device) which, additionally, reduces power usage and improves battery life of the device by enabling the user to use the device more efficiently.

In some embodiments, displaying the watch user interface on the display at the first time further includes displaying a graphical element at a fifth position and displaying the watch user interface on the display at the second time further includes displaying the graphical element at the fifth position (e.g., 808).

In some embodiments, the difference between the first graphical characteristic at a first time and the second graphical characteristic at a second time corresponds to a rotation of the background relative to a physical frame of the device (e.g., 810 of FIG. 8B and 810 of FIG. 8A). In some embodiments, the physical frame (e.g., 603) includes a rotatable input mechanism (e.g., 604) and/or a button (e.g., 605).

In some embodiments, the first clock hand and the background rotate around a common origin (e.g., 806-1 and 810 FIGS. 8A-8H).

In some embodiments, the shape of the first portion at the first time is different than the shape of the first portion at the second time (e.g., 810-1 of FIG. 8A and 810-1 of FIG. 8B) (e.g., the shapes are "triangles" when the boundary goes from corner to corner and are "rectangles" when the boundary is vertical or horizontal (corners of display are rounded, so shapes are not true triangles and rectangles).

Dynamically modifying the shape of the portions which make up the background of a watch user interface based on the position of a clock hand provides the user with an easily decipherable visual indication (e.g., a bold dynamically change shape) of the current time measured by the watch.

Providing improved visual feedback to the user enhances the operability of the device and makes the user-device interface more efficient (e.g., by helping the user to quickly resolve information displayed, the user does not need to spend as much time interacting with the device) which, additionally, reduces power usage and improves battery life of the device by enabling the user to use the device more efficiently.

In some embodiments, the first graphical characteristic at the first time includes a visual indication of the hour of the first time (e.g., FIG. 8J, 814 indicating hour 10 of time 10:15:35), and wherein the second graphical characteristic at the second time includes a visual indication of the hour of the second time (e.g., FIG. 8I, 814 indicating hour 12 of time 12:00:57). In some embodiments, the graphical characteristic includes a spotlight effect that follows the hour hand (e.g., the end of the hour hand).

Dynamically modifying the background of a watch user interface to include a spotlight on the current hour indicator based on the position of a clock hand provides the user with an easily decipherable visual indication that quickly draws the user attention to relevant information (e.g., the current hour measured by the watch). Providing improved visual feedback to the user enhances the operability of the device and makes the user-device interface more efficient (e.g., by helping the user to quickly resolve information displayed, the user does not need to spend as much time interacting with the device) which, additionally, reduces power usage and improves battery life of the device by enabling the user to use the device more efficiently.

In some embodiments, the watch user interface, at the first time and at the second time, is configured to display one or more characteristics of the background in accordance with the position of the first clock hand. Optionally, at block 906, the device receives a sequence of one or more user inputs corresponding to a request to display the one or more characteristics of the background in accordance with the position of a second clock hand (e.g., a change in a background characteristic configuration from the first hand to the second hand), different than the first clock hand (e.g., 806-2 of FIGS. 8E-8H). In some embodiments, the sequence of one or more user inputs includes a contact with the display (e.g., 602) having a characteristic intensity above an intensity threshold, which causes the electronic device (e.g., 600) to enter a watch face edit mode or a watch face settings edit mode.

Enabling the user to change the hand that dictates how the characteristic of the background of a watch user interface changes over time provides the user with feedback indicating to them how a specific unit of time is being measured by the watch via an easily decipherable visual indication. Providing improved visual feedback to the user enhances the operability of the device and makes the user-device interface more efficient (e.g., by helping the user to quickly resolve information displayed, the user does not need to spend as much time interacting with the device) which, additionally, reduces power usage and improves battery life of the device by enabling the user to use the device more efficiently.

In some embodiments, the second clock hand (e.g., 806-2) has a rate of movement different than the rate of movement of the first clock hand (e.g., the first clock hand is an hour hand and the second clock hand is a minute hand, the minute hand having rate of movement greater than the rate of movement of the hour hand).

In some embodiments, the second clock hand is one of an hour hand (e.g., 806-1), a minute hand (e.g., 806-2), or a second hand (e.g., 806-3).

After receiving the sequence of one or more user inputs at block 906, optionally, at block 908, the device displays the watch user interface (e.g., 810) on the display at a third time (e.g., FIG. 8E). The watch user interface (801) at the third time includes the second clock hand in a third position (806-2 of FIG. 8E) overlaid on the background, the background having a third graphical characteristic at the third time that is determined based on the third position of the second clock hand (e.g., 810 of FIG. 8E).

Optionally, at block 910, the device displays the watch user interface (e.g., 801) on the display (e.g., 801) at a fourth time (e.g., FIG. 8F) after the third time (e.g., FIG. 8E). The watch user interface at the fourth time includes the second clock hand in a fourth position (e.g., 806-2 of FIG. 8F) overlaid on the background and the background has a fourth graphical characteristic at the fourth time that is determined based on the fourth position of the second clock hand (e.g., 810 of FIG. 8F).

Note that details of the processes described above with respect to method 900 (e.g., FIG. 9) are also applicable in an analogous manner to the methods described above (e.g., 700) and below (e.g., 1100). For example, method 700 optionally includes one or more of the characteristics of the various methods described above with reference to method 900. For example, the background of clock face 606 in FIG. 6A can be divided into two portions and change dynamically based on the position of hour hand 616-1 in a manner analogous to techniques described with reference to method 900. For brevity, these details are not repeated below.

Figure 10A:
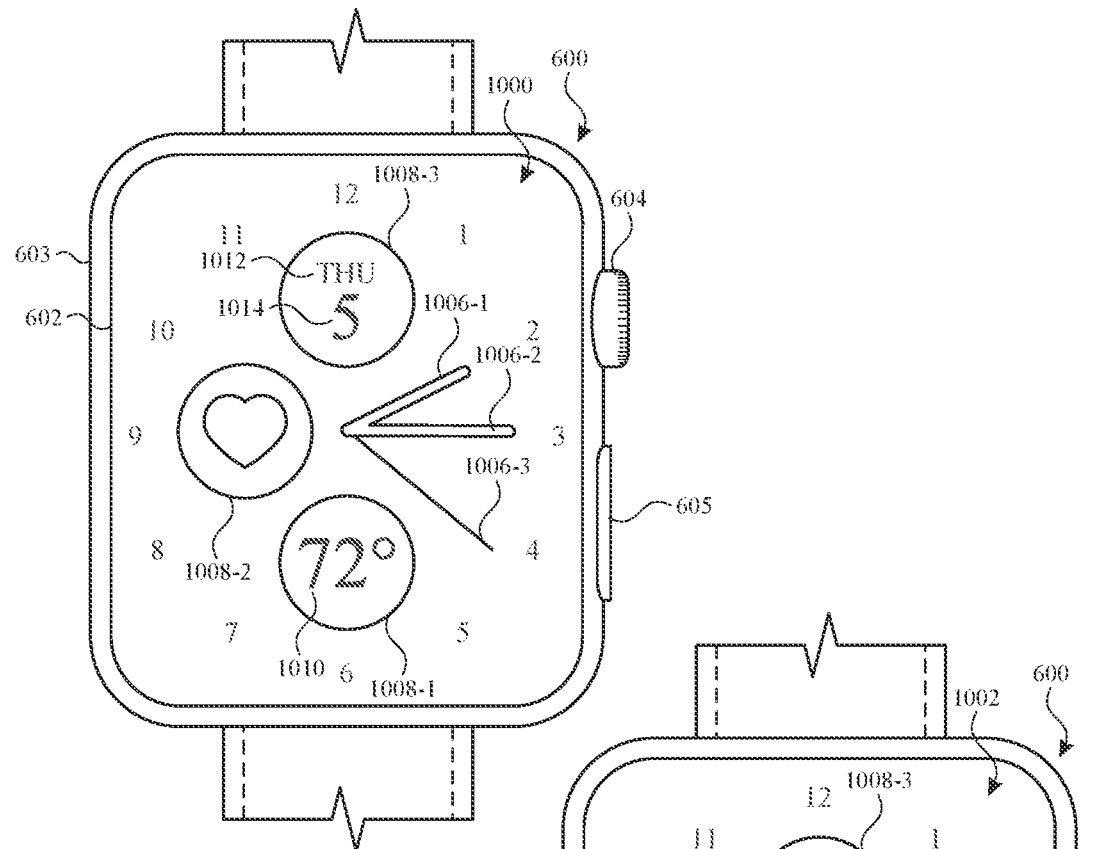
FIGS. 10A-10T illustrate exemplary context-specific user interfaces.
Figure 10B:
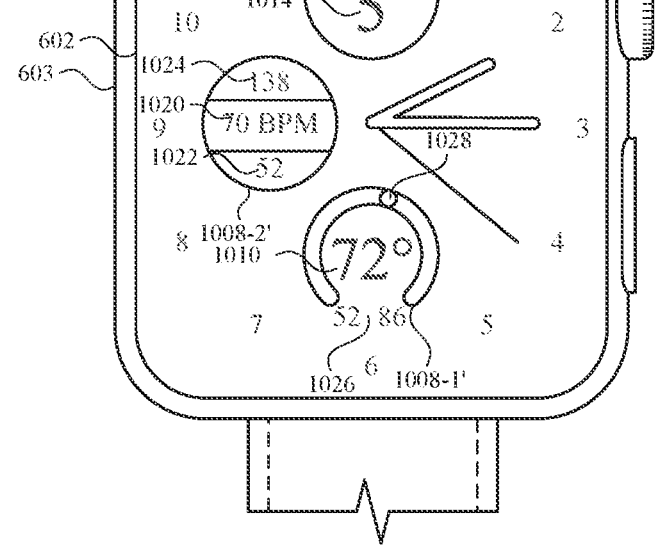
Figure 10C:
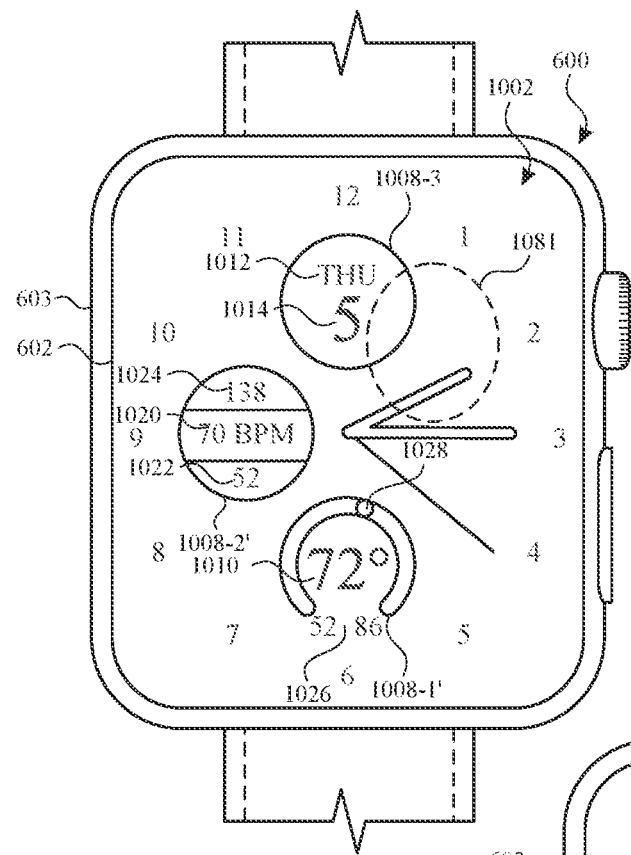
Figure 10D:
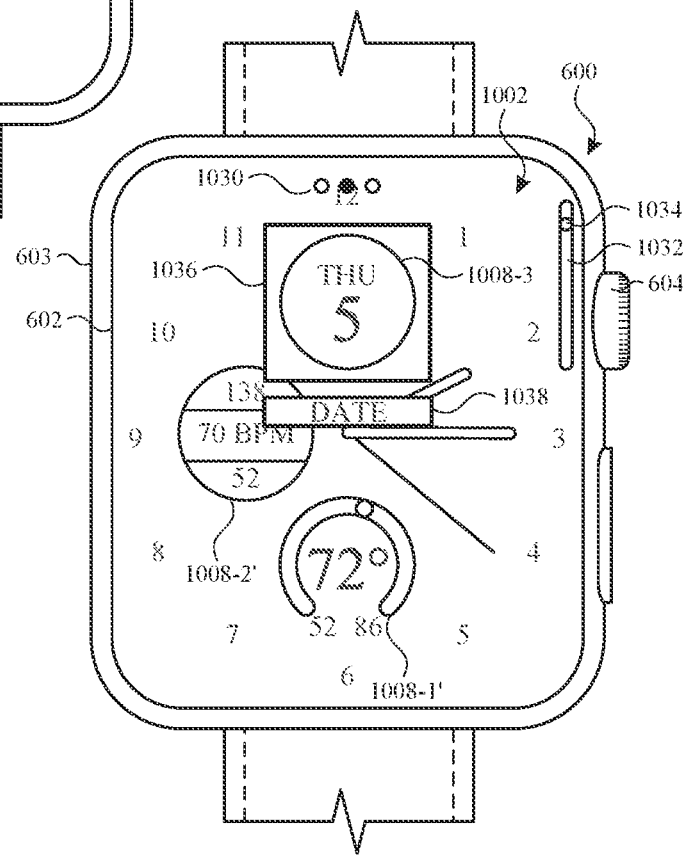
Figures 10E, 10F:
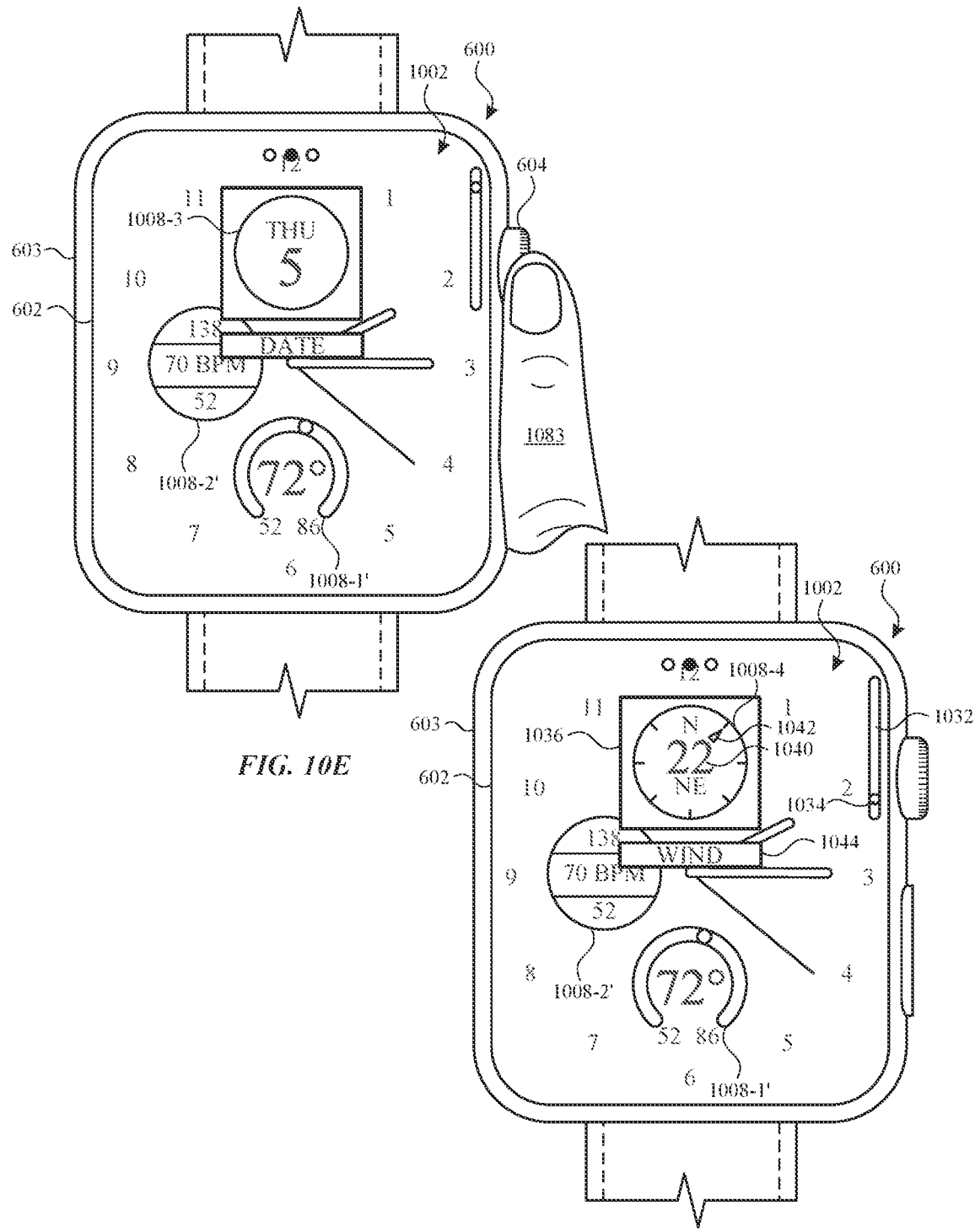
Figures 10G, 10H:
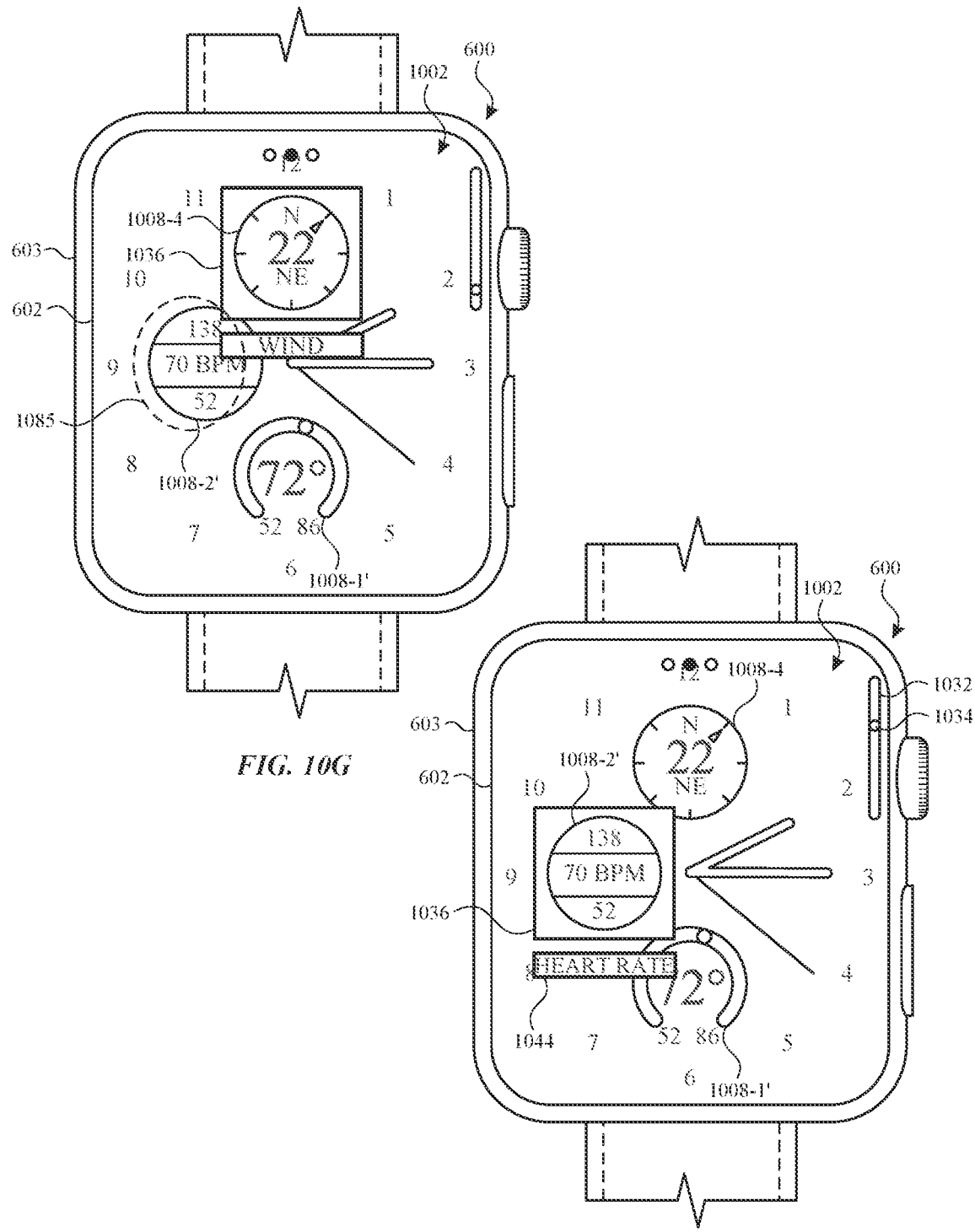
Figure 10I:
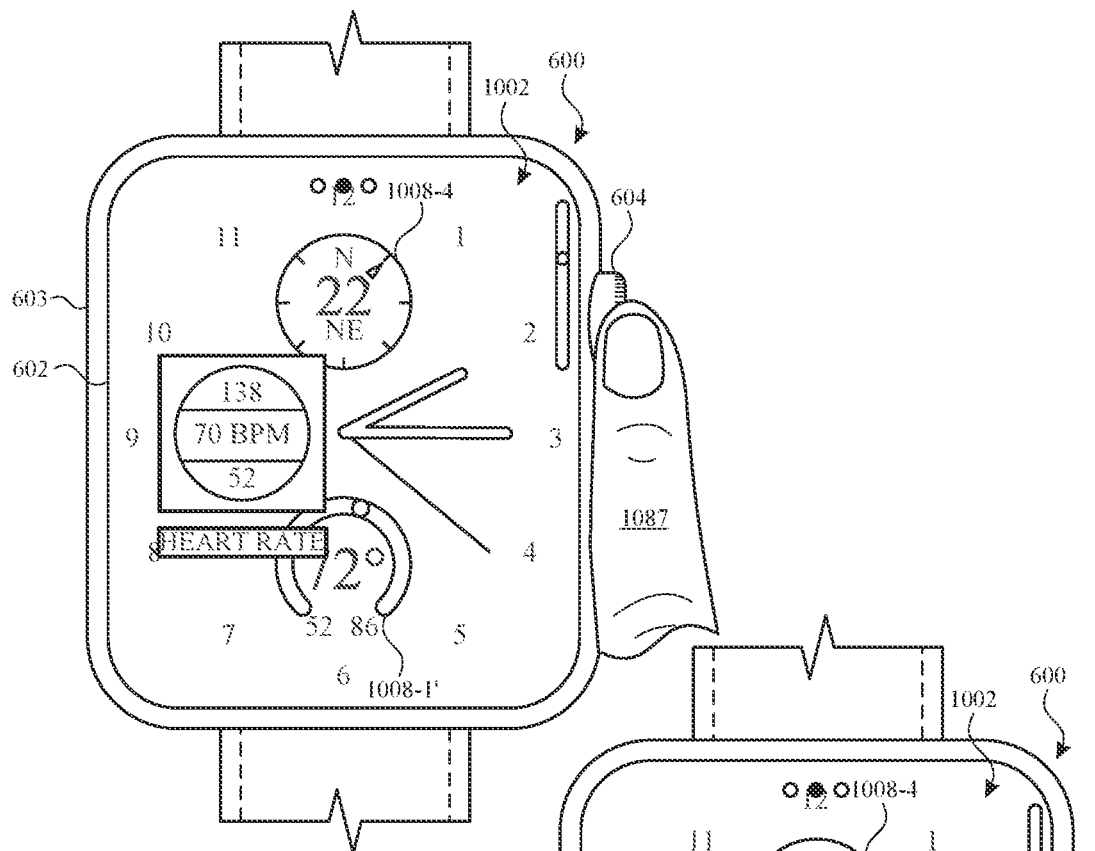
Figure 10J:
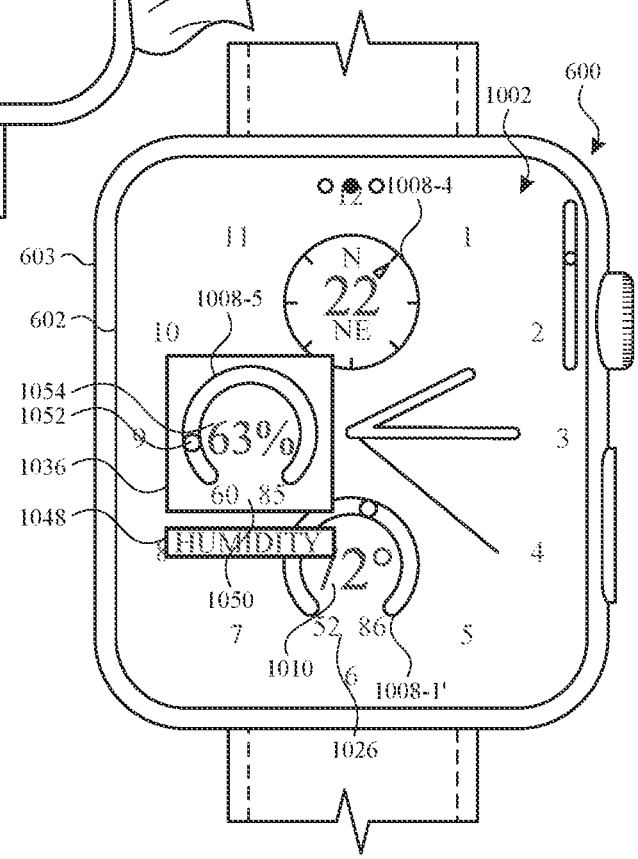
Figures 10K, 10L:
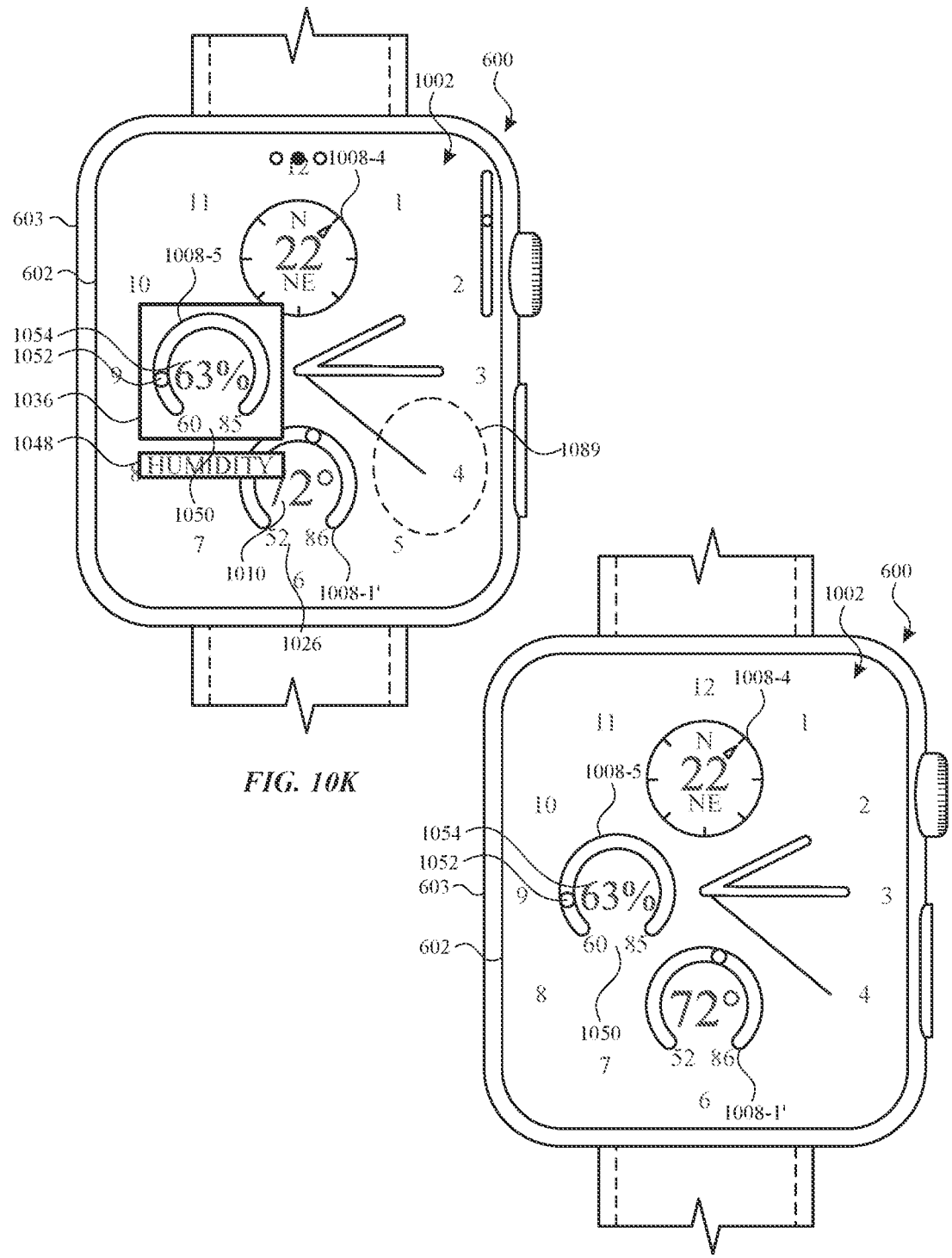
Figure 10M:
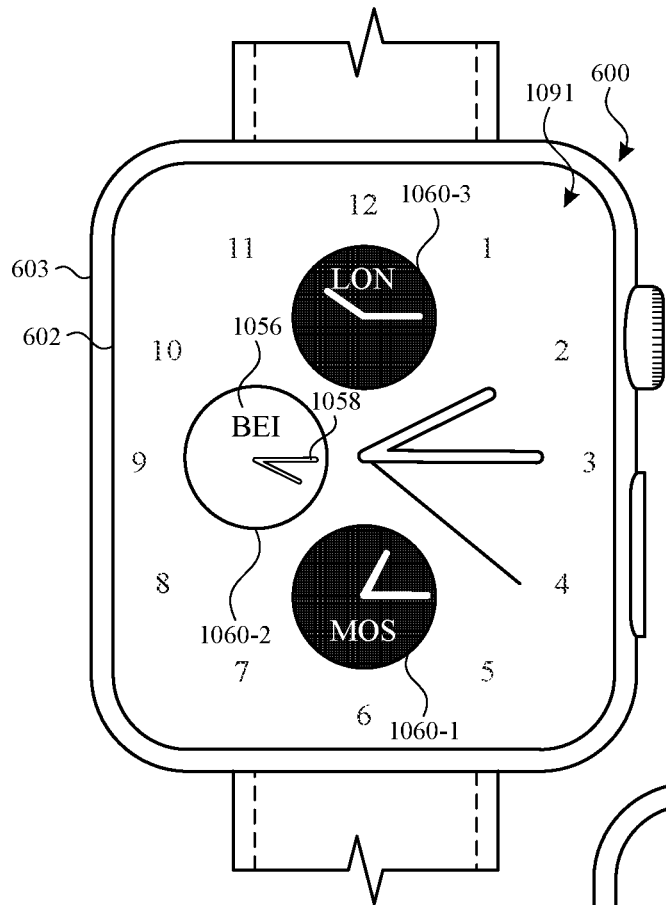
Figure 10N:
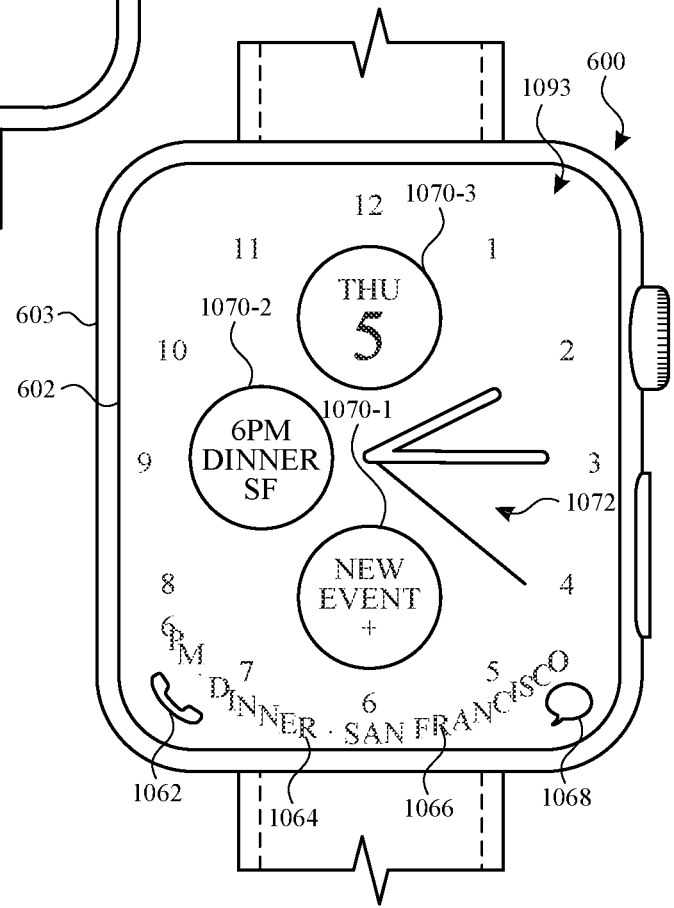
Figure 10O:
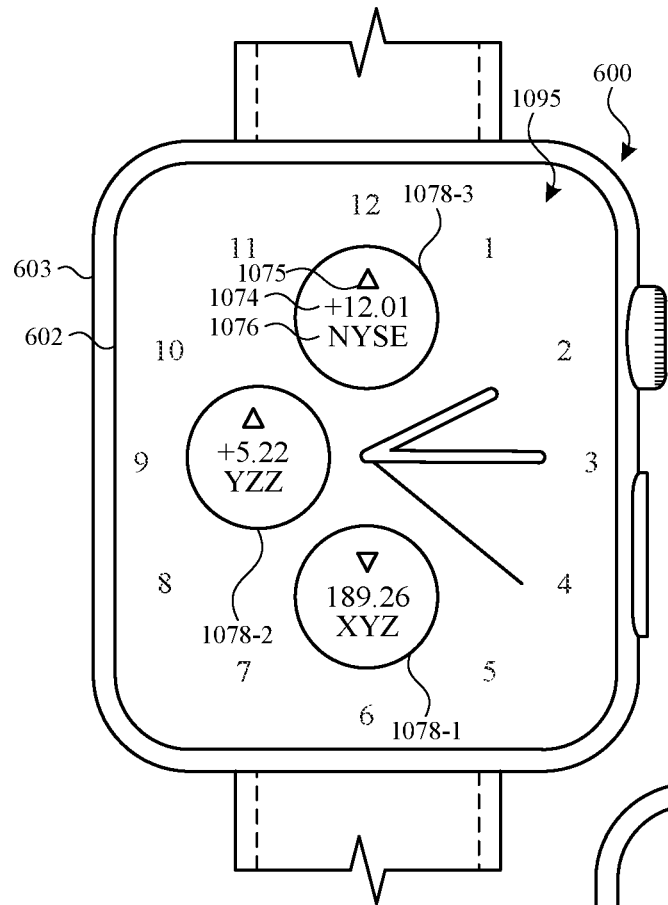
Figure 10P:
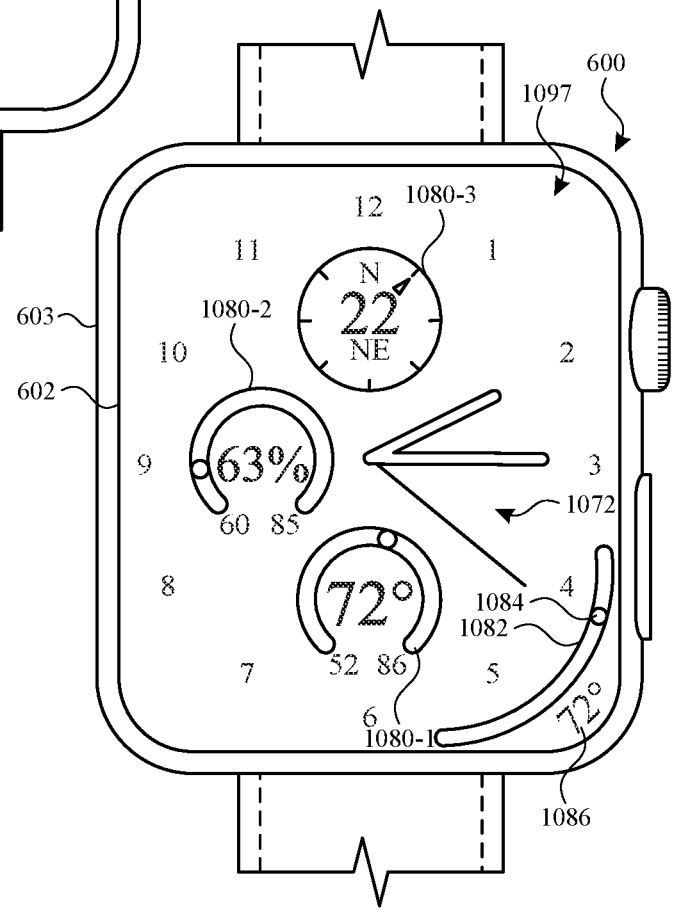
Figure 10Q:
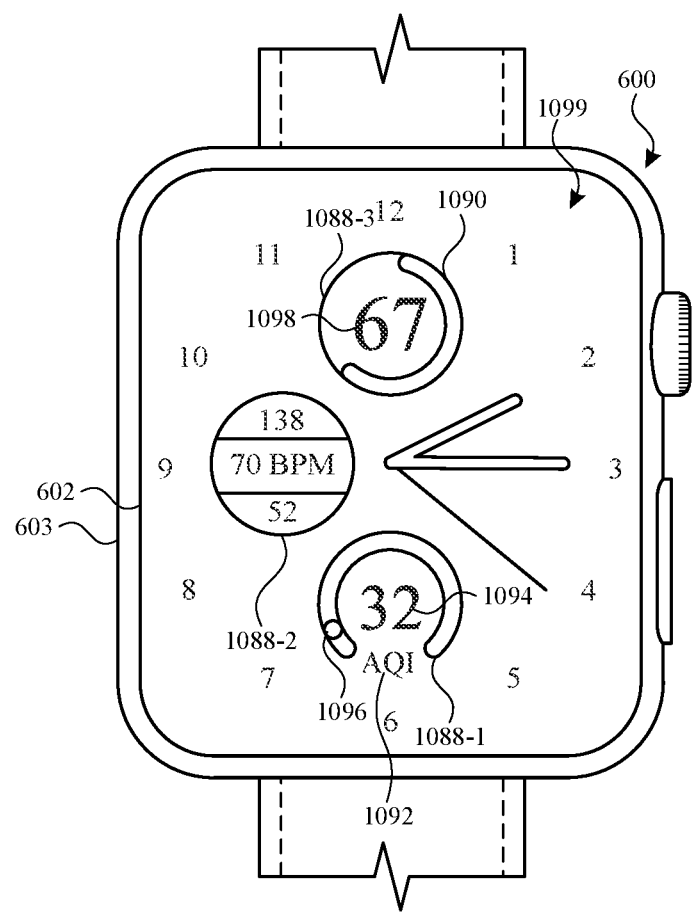
Figures 10R, 10S:
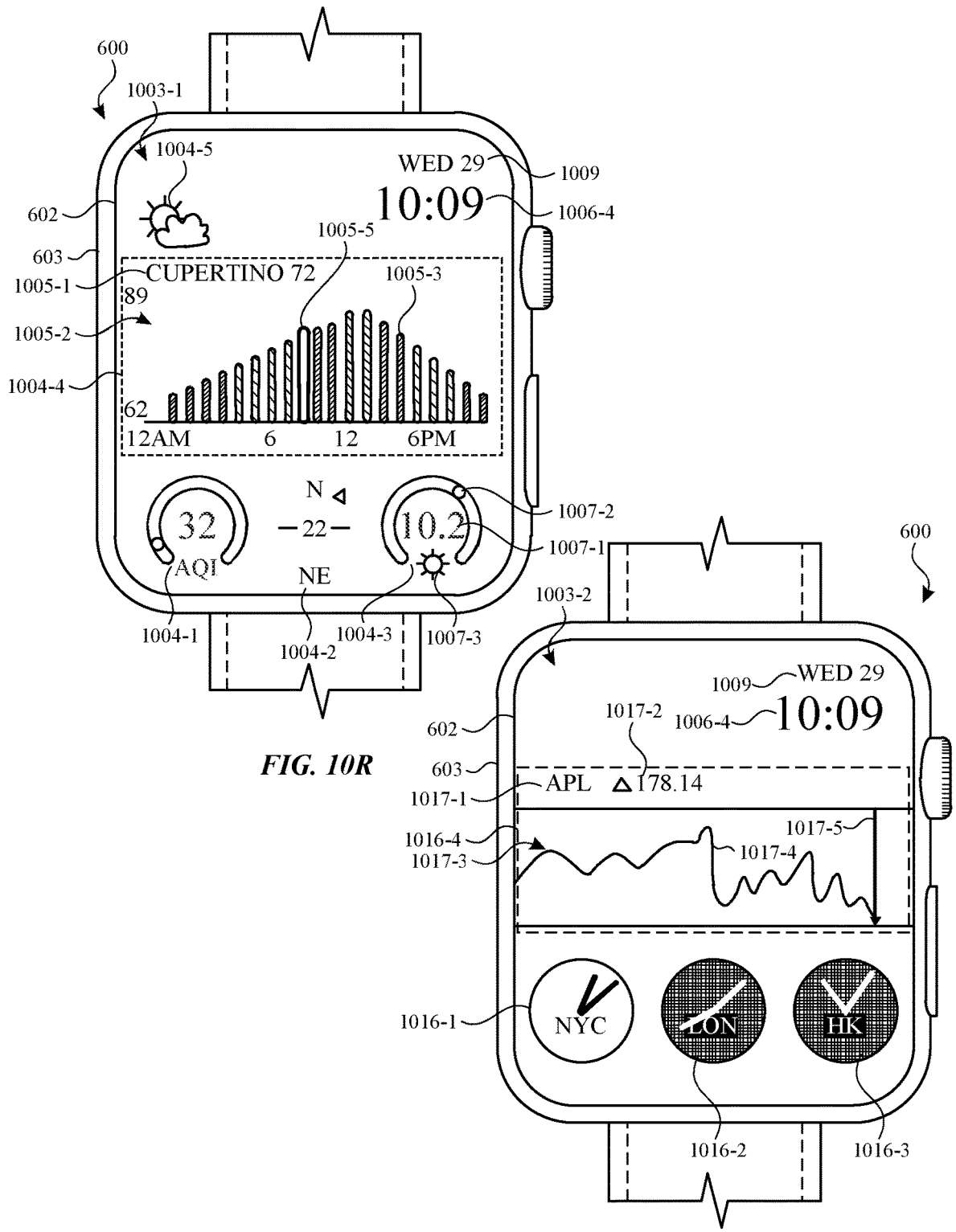
Figure 10T:
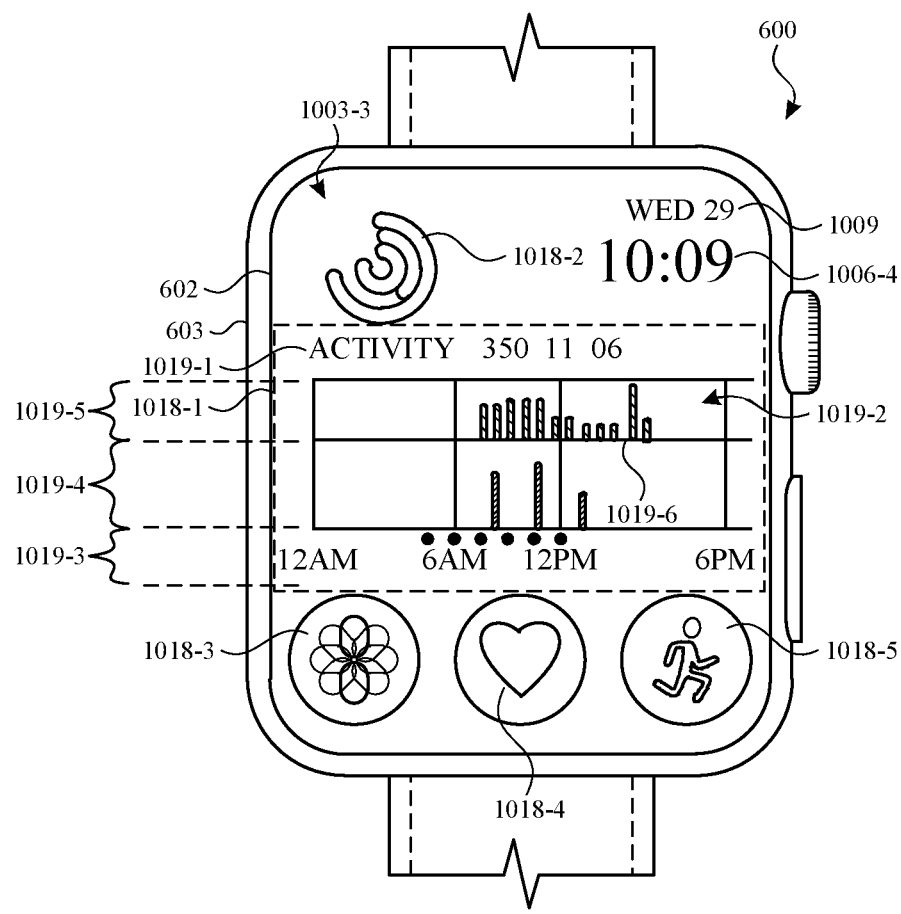

FIGS. 10A-10T illustrate exemplary watch user interfaces, in accordance with some embodiments. The user interfaces in these figures are used to illustrate the processes described below, including the methods in FIGS. 11A-11D.

FIG. 10A illustrates device 600 as described above. As illustrated in FIG. 10A, device 600 displays watch user interface 1000 on display 602. Watch user interface 1000 includes an indication of time having hour hand 1006-1, minute hand 1006-2, and second hand 1006-3. Watch user interface 1000 also includes weather complication 1008-1, heart rate complication 1008-2, and date complication 1008-3. Weather complication 1008-1 displays data from a weather application, including a single metric, current temperature 1010. Heart rate complication 1008-2 is associated with a heart rate application, as indicated by the heart icon included in the complication. Heart rate complication 1008-2 does not include a metric related to data from the heart rate application. Date complication 1008-3 provides date information including day of the week 1012 and day of the month 1014.

FIG. 10B illustrates an enhanced watch user interface 1002 displayed on display 602. Enhanced watch user interface 1002 includes an enhanced version of weather complication 1008-1', an enhanced version of heart rate complication 1008-2', and date complication 1008-3. As illustrated in FIG. 10B, weather complication 1008-1', heart rate complication 1008-2', and date complication 1008-3 are the same size as weather complication 1008-1, heart rate complication 1008-2, and date complication 1008-3 on watch user interface 1000. Weather complication 1008-1' and heart rate complication 1008-2' are enhanced in the sense that they include additional information or metrics related to data from their respective applications than weather complication 1008-1 and heart rate complication 1008-2 displayed on watch user interface 1000. Weather complication 1008-1' and heart rate complication 1008-2' also have higher resolution (e.g., smaller text size, smaller feature sizes (e.g., degree symbol), and/or larger range of colors or greyscale) than weather complication 1008-1 and heart rate complication 1008-2 displayed on watch user interface 1000.

In some embodiments, enhanced weather complication 1008-1' and enhanced heart rate complication 1008-2' are displayed in accordance with the watch user interface being enhanced watch user interface 1002 (e.g., instead of "regular" watch user interface 1000). For example, in response to a selection (e.g., by a user or based on a default setting) to display a complication associated with a weather application on display 602, device 600 displays weather complication 1008-1 in accordance with the watch user interface being watch user interface 1000, whereas device 600 displays enhanced weather complication 1008-1' in accordance with the watch user interface being enhanced watch user interface 1002. Similarly, a request to display a heart rate complication results in display of enhanced heart rate complication 1008-2' on enhanced watch user interface 1002 and display of heart rate complication 1008-2 on watch user interface 1000.

As illustrated in FIG. 10B, enhanced weather complication 1008-1', enhanced heart rate complication 1008-2', and date complication 1008-3 each includes two or more metrics related to data from a respective application. Enhanced weather complication 1008-1' includes current temperature 1010, temperature range 1026, and relative current temperature indicator 1028, which indicates the relative position of current temperature 1010 within temperature range 1026. Enhanced heart rate complication 1008-2' includes current (or most recently measured) beats per minute 1020, daily low beats per minute 1022, and daily high beats per minute 1024. Date complication 1008-3 includes day of the week 1012 and day of the month 1014.

As illustrated in FIG. 10C, device 600 receives (e.g., detects) user input 1081 (e.g., a tap) corresponding to a request to edit enhanced watch user interface 1002. As illustrated in FIG. 10D, in response to user input 1081, device 600 enters an edit mode (e.g., watch face edit mode or complication edit mode) and visually distinguishes date complication 1008-3 for editing (e.g., by displaying box 1036 around date complication 1008-3 and label 1038 identifying the associated application). In some embodiments, device 600 visually distinguishes the complication selected for editing (e.g., date complication 1008-3) by varying one or more visual properties (e.g., brightness, opacity, color, contrast, hue, saturation, etc.) of watch user interface 1002, or portions thereof. In some embodiments, while in edit mode, the complication selected for editing is displayed with a first visual property (e.g., in color or a plurality of colors other than greyscale) and one or more other complications (e.g., all other complications) are displayed with a second visual property (e.g., in greyscale or in a single color different from the plurality of colors that the complication would otherwise be displayed in when the device is not in the edit mode) even though, in some embodiments, some or all of the other complications are displayed in one or more colors in the watch face when the watch face is displayed while the device is not in the edit mode. For example, complication 1008-3 is displayed in color and complications 1008-2 and 1008-1 are displayed in greyscale. In some embodiments, while in edit mode, a visual property of one or more of the unselected complications is changed (e.g., a brightness or opacity of one or more of the unselected complications is reduced to distinguish the unselected complications from the selected complication) instead of, or in addition to, the change to the visual property of the one or more selected complications. In some embodiments, the visual distinguishing of the selected complication is instead of or in addition to an alternative selection indicator such as a selection ring around at least a portion of the selected complication. While in edit mode, device 600 also displays complication menu bar 1032 with complication position indicator 1034, which indicates the position of the currently displayed complication within a menu of complications available for selection. In some embodiments, user input 1081 includes a contact having a characteristic intensity and device 600 enters the edit mode in accordance with a determination that the characteristic intensity exceeds a predetermined threshold intensity.

As illustrated in FIG. 10E, device 600 receives (e.g., detects) user input 1083, which includes rotation of rotatable input mechanism 604. In some embodiments, user input 1083 is received at a device other than device 600 through a companion application which communicates with device 600. As illustrated in FIG. 10F, in response to receiving (e.g., detecting) user input 1083, device 600 displays a representation of wind complication 1008-4 to add to enhanced watch user interface 1002 in place of date complication 1008-3. Device 600 updates complication position indicator 1034 to indicate that wind complication 1008-4 is located near the bottom of the complication menu (e.g., because the complications are in alphabetical order and "w" is near the end of the alphabet). Wind complication 1008-4 includes metrics wind speed 1040 (22 mph) and wind direction 1042 (northeast). In some embodiments, wind complication 1008-4 is not available for selection on other watch user interfaces (e.g., watch user interface 1000).

As illustrated in FIG. 10G, device 600 receives (e.g., detects) user input 1085 (e.g., a tap) corresponding to selection of enhanced heart rate complication 1008-2'. As illustrated in FIG. 10H, in response to receiving (e.g., detecting) user input 1085, device 600 visually distinguishes enhanced heart rate complication 1008-2' for editing. In some embodiments, in response to receiving user input 1085, device 600 transitions from visually distinguishing a first complication for editing (e.g., wind complication 1008-4) to visually distinguishing a second complication for editing (e.g., heart rate complication 1008-2) by varying one or more visual properties (e.g., brightness, color, contrast, hue, saturation, etc.) of watch user interface 1002, or portions thereof. For example, in response to receiving user input 1085, device 600 transitions from displaying complication 1008-4 in color and complications 1008-2 and 1008-1 in greyscale to displaying complication 1008-2 in color and complications 1008-4 and 1008-1 in greyscale. In some embodiments, while in edit mode, a visual property of one or more of the unselected complications is changed (e.g., a brightness or opacity of one or more of the unselected complications is reduced to distinguish the unselected complications from the selected complication). In some embodiments, the visual distinguishing of the second complication is instead of or in addition to an alternative selection indicator such as a selection ring around at least a portion of the second complication. As illustrated in FIG. 10I, device 600 receives (e.g., detects) user input 1087, which includes rotation of rotatable input mechanism 604. As illustrated in FIG. 10J, in response to receiving (e.g., detecting) user input 1087, device 600 displays a representation of humidity complication 1008-5 to add to enhanced watch user interface 1002 in place of enhanced heart rate complication 1008-2'. Humidity complication 1008-5 includes metrics current humidity 1054, humidity range 1050, and relative current humidity indicator 1052. In some embodiments, humidity complication 1008-5 is not available in other watch user interfaces (e.g., watch user interface 1000).

A user can similarly request to add a new complication in place of enhanced weather complication 1008-1' by selecting enhanced weather complication 1008-1' (e.g., with a tap) in edit mode and moving rotatable input mechanism 604 to select the new complication.

As illustrated in FIG. 10K, device 600 receives (e.g., detects) user input 1089. As illustrated in FIG. 10L, in response to receiving (e.g., detecting) user input 1089, device 600 exits edit mode and displays enhanced watch user interface 1002 with selected complications wind complication 1008-4 and humidity complication 1008-5, and previously displayed enhanced weather complication 1008-1'. In some embodiments, enhanced weather complication 1008-1', wind complication 1008-4, and humidity complication 1008-5 all display data from the same weather application, thus providing three complications related to the same application, with each complication including at least two metrics not provided by either of the other two complications. FIG. 10L also illustrates an embodiment of a watch user interface with three gauge complications, each providing a parameter value and either high and/or low values or a direction (e.g., wind direction).

In some embodiments, date complication 1008-3 is replaced with humidity complication 1008-5 at FIGS. 10D and 10E resulting in an enhanced watch user interface including three complications, each having three metrics (e.g., humidity complication 1008-5 (current humidity, low humidity, and high humidity), enhanced heart rate complication 1008-2' (current heart rate, low heart rate, and high heart rate), and enhanced weather complication 1008-1' (current temperature, low temperature, and high temperature)).

In some embodiments, instead of replacing date complication 1008-3 and enhanced heart rate complication 1008-2', a user can replace a single complication (e.g., by exiting edit mode after user input 1083 in FIG. 10E), in which case device 600 maintains display of the other complications (e.g., enhanced heart rate complication 1008-2' and enhanced weather complication 1008-1'). Similarly, enhanced heart rate complication 1008-2' can be replaced while maintaining display of (e.g., without replacing) data complication 1008-3 and enhanced weather complication 1008-1; and enhanced weather complication 1008-1 can be replaced while maintaining display of (e.g., without replacing) enhanced heart rate complication 1008-2' and data complication 1008-3.

In some embodiments, elements of enhanced watch user interface 1002, such as hands 1006 and non-selected complications, are not modified (e.g., remain unchanged) while replacing the selected complication(s).

Turning now to FIG. 10M, watch user interface 1091 includes complications 1060-1, 1060-2, and 1060-3, each including metrics related to data from a world clock application for a respective location (e.g., Moscow, Beijing, and London), a time associated with the location (e.g., an analog clock face with hour and minute hands), and an indication of day, night, sunset, or sunrise (e.g., complication 1060-1 indicates that it is night in Moscow and complication 1060-2 indicates that it is day in Beijing). In some embodiments, one or more of complications 1060-1, 1060-2, or 1060-3 includes an offset to local time. As illustrated in FIG. 10M, the position of the location indicator (e.g., BEI 1056) within the complication is based on the position of hands 1058. In some embodiments, the location indicator is positioned not to overlap or interfere with the clock hands. For example, location indicators LON and BEI are positioned in the center-top of complications 1060-3 and 1060-2, respectively, and do not interfere with their respective clock hands. In complication 1060-1, location indicator MOS is positioned in the center-bottom of the complication since it would overlap with the hour hand if positioned in the center-top position of LON and BEI. In some embodiments, the position of the location indicator changes over time to avoid interfering with the clock hands as they move.

FIG. 10N illustrates an embodiment of a watch user interface with three complications related to a calendar application. Complication 1070-1 includes an affordance that can be selected to initiate a process for creating a new event in the calendar application. Complication 1070-2 includes metrics related to data from the calendar application, including time of an event (6 PM), subject or event name (DINNER), and location (SF). Complication 1070-3 is a date complication that includes a day of the week and a day of the month.

FIG. 10N also illustrates an embodiment of a complication with a visual characteristic at or around a ring-shaped area ("the numeral ring") on watch user interface 1093. Watch user interface 1093 has a ring-shaped area on the clock face that includes the hour numerals (1-12), where the ring-shaped area has a curved outer edge. In some embodiments, the ring-shaped area includes tick marks indicating hours and/or minutes or numeric minute markers. In accordance with an application corresponding to a particular application (e.g., calendar, weather, exercise, heart rate, breathe, stocks), device 600 displays a visual characteristic at or around the ring-shaped area. For example, in accordance with a complication being associated with a calendar application, device 600 displays a complication with event name 1064 and event location 1066 around the ring-shaped area of watch user interface 1093 (e.g., event name 1064 and event location 1066 follow the outer edge of the clock face). Alternatively, in accordance with a complication being associated with another application (e.g., battery, digital time, date, or stopwatch), device 600 forgoes displaying a visual characteristic at or around the ring-shaped area.

FIG. 10O illustrates an embodiment of a watch user interface with three complications with data from a stocks application. Stock complications 1078-1, 1078-2, and 1078-3 including metrics related to data from the stocks application, including ticker symbol 1076 (e.g., stock name), price 1074, and direction of movement 1075.

FIG. 10P illustrates an embodiment of corner complication displayed in the lower-right corner of watch user interface 1097 between the edge of the numeral ring and the lower and right edges and lower-right corner of display 602. The corner complication is a temperature complication that includes status bar 1082 (representing a temperature range), status indicator 1084 (representing the relative position of a current temperature within the temperature range), and current status 1086 (representing the current temperature). Status bar 1082 tracks the outer edge of the numeral ring and current status 1086 is located between status bar 1082 and the lower-right corner of display 602.

FIG. 10Q illustrates a target complication 1088-3 that displays metrics related to data from a health application. Target complication 1088-3 includes current value 1098 of a metric (e.g., floors climbed) and progress indicator 1090 indicating the amount of progress made towards a target value or goal. Progress indicator 1090 includes a ring that surrounds slightly more than half of the outer edge of complication 1088-3, which indicates that the current value of 67 represents slightly more than 50 percent progress towards a target value or goal. Other exemplary target complications include a battery complication including total battery capacity and current charge state, a health complication including a current value of steps, standing hours, or calories burned or consumed and progress toward a target or goal for steps, standing hours, or calories burned or consumed, respectively.

FIG. 10Q also illustrates air quality index (AQI) complication 1088-1, which includes a current AQI value 1094 and a relative status indicator 1096 representing the position of current AQI value 1094 relative to a range (e.g., good to hazardous). In some embodiments, AQI complication 1088-1 can be represented as a target complication, with a low AQI value being a target or goal.

FIGS. 10R-10T illustrate watch user interfaces including digital indication time 1006-4 (e.g., 10:09), compact date indicator 1009 (e.g., WED 29), and three or more complications displaying metrics related to data from a single application.

As illustrated in FIG. 10R, watch user interface 1003-1 includes five complications with data from a weather application. As described above, air quality index (AQI) complication 1004-1 includes a current air quality value and a relative status indicator and wind complication 1004-2 includes a wind speed and a wind direction. UV complication 1004-3 includes a current UV index value 1007-1, relative status indicator 1007-2 representing the position of current UV index value 1007-1 relative to a range (e.g., good to hazardous), and visual indication of the UV condition 1007-3 (e.g. a sun graphic indicating a moderate to high current UV index value).

As illustrated in FIG. 10R, weather chart complication 1004-4 includes textual weather label 1005-1 displaying a respective location (e.g., Cupertino) and current temperature at the respective location (e.g., 72) and temperature chart 1005-2. Temperature chart 1005-2 includes a first axis (e.g., hours) and a second axis (e.g., temperature), bar graph data 1005-3 representing the temperature price at the respective location (e.g., Cupertino) over a fixed period time, and current temperature indicator 1005-5 (e.g. a visually distinguished bar within the bar graph data corresponding to the current time of day). Bar graph data 1005-3 includes vertical bars at fixed intervals representing actual or forecasted temperature at the corresponding time on the first axis (e.g., time axis). In some embodiments, the scale of the first or the second axis is adjusted to reflect a desired range of temperature values or desired time scale for displaying temperature (e.g., the first axis reflects a period of 1-hour, 12-hours, 1-day, etc.). Weather icon complication 1004-5 includes a weather condition icon visually representing a current or forecasted weather condition (e.g., graphic illustrating partly cloudy weather).

Turning now to FIG. 10S, watch user interface 1003-2 includes complications 1016-1, 1016-2, 1016-3, and 1016-4. Complications 1016-1, 1016-2, and 1016-3, each include metrics related to data from a world clock application for a respective location (e.g., New York, London, and Hong Kong), a time associated with the location (e.g., an analog clock face with hour and minute hands), and an indication of day, night, sunset, or sunrise (e.g., complication 1016-1 indicates that it is day in New York and complication 1016-2 indicates that it is night in London). In some embodiments, one or more of complications 1016-1, 1016-2, or 1016-3 includes an offset to local time. As described in reference to FIG. 10M above, the position of the location indicator (e.g., NYC) within the corresponding complication is based on the position of hands (e.g., the location indicator is positioned not to overlap or interfere with the clock hands and changes over time to avoid interfering with the clock hands as they move).

As illustrated in FIG. 10S, stock complication 1016-4 includes metrics related to data from a stock application including stock label 1017-1 indicating a respective stock (e.g. APPL), price indicator 1017-2 displaying a current price and direction of price movement for the respective stock (e.g., APPL is at 178.14 and rising) and stock chart 1017-3. Stock chart 1017-3 includes first axis (e.g., relative price), second axis (e.g., time), price line 1017 indicating the price of the respective stock (e.g., APPL) over time, and current price indicator 1017-5 (e.g. vertical bar intersecting price line 1017-4 at a time on the second axis corresponding to a current time). In some embodiments, the scale of the first or the second axis is adjusted to reflect a desired time scale or value range for displaying the price of the respective stock (e.g., the first axis reflects a period of 1-day, 1-week, 1-month, 3-months, 6-months, 1-year, the year-to-date and the second axis reflects percent change, absolute change, or measure price in various fiat or cryptographic currencies).

Turning now to FIG. 10T, watch user interface 1003-3 includes two complications with data from an activity application. Activity chart complication 1018-1 includes textual activity label 1019-1 displaying calories burned (e.g., 350), minutes exercised (e.g., 11), and standing hours (e.g., 06), and activity chart 1019-2. Activity chart includes a time axis 1019-3 (e.g., hours), active minutes scale 1019-4, calorie scale 1019-5, and chart data 1019-6 representing the accrual of activity metrics over the discrete periods displayed on time axis 1019-3 (e.g., amounts of active minutes and calories burned for a given time period are represented as vertical bars of proportional height on their respective scales and standing hours are represented by circular indicators). Compact activity complication 1018-2 is includes a graphical element displaying progress towards multiple activity-related fitness goals (e.g., an icon illustrating progress toward caloric burn, active time, and standing hours goals in concentric circular bands).

As illustrated in FIG. 10T, watch user interface 1003-3 also includes three complications associated with three distinct applications other than an activity application. Breathe complication 1018-3 is associated with a breathe application (e.g., a meditation or mindfulness application), as indicated by the breathe icon included in the complication. Heart rate complication 1018-4 is associated with a heart rate application, as indicated by the heart icon included in the complication. Workout complication 1018-5 is associated with a workout application, as indicated by the workout icon included in the complication. Complications 1018-3, 1018-4, and 1018-5 do not include metrics related to data from the respective applications.

In some embodiments, device 600 allows a user to select from two or more watch user interfaces that each have three complications with data from the same application (e.g., a "collection" of complications). For example, in some embodiments, device 600 provides a user with a capability to select from two or more of watch user interfaces 1091 (FIG. 10M), 1093 (FIG. 10N), 1095 (FIG. 10O), 1097 (FIG. 10P), 1099 (FIG. 10Q), 1003-1 (FIG. 10R), 1003-2 (FIG. 10S), and 1003-3 (FIG. 10T). In some embodiments, while displaying one of watch user interfaces 1091 (FIG. 10M), 1093 (FIG. 10N), 1095 (FIG. 10O), 1097 (FIG. 10P), 1099 (FIG. 10Q), 1003-1 (FIG. 10R), 1003-2 (FIG. 10S), and 1003-3 (FIG. 10T), device 600 detects a sequence of one or more inputs that corresponds to selection of another one of watch user interfaces 1091 (FIG. 10M), 1093 (FIG. 10N), 1095 (FIG. 10O), 1097 (FIG. 10P), 1099 (FIG. 10Q), 1003-1 (FIG. 10R), 1003-2 (FIG. 10S), and 1003-3 (FIG. 10T). In response to detecting the sequence of one or more inputs, device 600 displays the selected watch user interface.

FIGS. 11A-11D are a flow diagram illustrating a method for providing context-specific user interfaces using an electronic device in accordance with some embodiments. Method 1100 is performed at a device (e.g., 100, 300, 500, or 600) with a display. Some operations in method 1100 are, optionally, combined, the orders of some operations are, optionally, changed, and some operations are, optionally, omitted.

As described below, method 1100 provides an intuitive way for configuring context-specific user interfaces. The method reduces the cognitive burden on a user, thereby creating a more efficient human-machine interface. For battery-operated computing devices, enabling a user to configure context-specific user interfaces. faster and more efficiently conserves power and increases the time between battery charges.

At block 1102, the device displays a watch user interface (e.g., 1000 of FIG. 10A) on the display (e.g., 602). The watch user interface includes a first complication (e.g. 1008-1) that includes at least a first metric related to data from a first application (e.g., 1010 of FIG. 10A-10C) and a second metric related to data from the first application (e.g., 1026 of FIG. 10A-10C). In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application (e.g., 1008-2 of FIG. 8A). In some embodiments, a complication is displayed at a fixed, predefined location on the display.

In some embodiments, the first complication includes an analog clock face having one or more hands indicating a time at a geographic location and text indicating the geographic location (e.g., 1060), wherein the text indicating the geographic location is positioned on the complication based on the position of the one or more hands (e.g., 1058). In some embodiments, the complication is positioned to avoid overlapping with the one or more hands of the clock face (e.g., FIG. 10M).

Automatically moving a textual description on a clock face to avoid being obstructed by the clock hands as they progress around the dial throughout the day provides the user with more reliable visual feedback about time of being displayed by the clock and the location which that time represents. Providing improved visual feedback to the user enhances the operability of the device and makes the user-device interface more efficient (e.g., by helping the user to quickly and accurately resolve information displayed, the user does not need to spend as much time interacting with the device) which, additionally, reduces power usage and improves battery life of the device by enabling the user to use the device more efficiently.

Further, at block 1102, the device displays a second complication (e.g., 1008-2) that includes at least a third metric related to data from a second application (e.g., 1020) and a fourth metric related to data from the second application (e.g., 1022), and a third complication (e.g., 1008-3) that includes at least a fifth metric related to data from a third application (e.g., 1012) and a sixth metric related to data from the third application (e.g., 1014). In some embodiments, the second application is different than the first application (e.g., FIG. 10A-10I). In some embodiments, the second application is the same as the first application, but the third and fourth metrics are different than the first and second metrics (e.g., FIGS. 10J-10Q). In some embodiments, the third application is different than the first and/or second application (e.g., FIG. 10A-10E). In some embodiments, the third application is the same as the first and second applications, but the fifth and sixth metrics are different than the first, second, third, and fourth metrics (e.g., FIG. 10K-10L).

Automatically grouping the display of related metrics at multiple locations on an interface provides the user an efficient way of locating relevant information and deciphering data from multiple applications provide by the device. The added context provided by the visual grouping provides the user with feedback regarding how displayed data should be interpreted, thereby enhancing the operability of the device and making the user-device interface more efficient (e.g., by helping the user to provide proper inputs and reducing user mistakes when operating/interacting with the device, increasing the speed a user can interpret data) which, additionally, reduces power usage and improves battery life of the device by enabling the user to use the device more efficiently.

In some embodiments, the first complication further includes a ninth metric related to data from the first application (e.g., 1088-1), the second complication further includes a tenth metric related to data from the second application (e.g., 1008-2 of FIGS. 10B-10I), and the third complication each further includes an eleventh metric related to data from the third application (e.g., 1008-4). In some embodiments, the first, second, or third complication is a humidity complication (e.g., 1008-5, including current humidity, low humidity, and high humidity), a heart rate complication (e.g., 1008-2, including current heart rate, low heart rate, and high heart rate), or a weather complication (e.g., 1008-1, including current temperature, low temperature, and high temperature).

In some embodiments, the first application, the second application, and the third application are the same application (e.g., FIGS. 10J-10T).

In some embodiments, the first application is different than the second application, and the third application is different than the first application and the second application (e.g., FIG. 10A-10E).

In some embodiments, the watch user interface (e.g., 1093) further includes a clock face having a curved outer edge and a curved complication having a visual feature that follows the outer edge of the clock face (e.g., FIG. 10N).

Automatically presenting information in a manner that conforms to the outer edge of the clock face provides the user with enhanced visual feedback by keeping the user interface less cluttered. This enables the user focus their attention on fewer visual elements and as a result, more rapidly locate relevant information throughout the interface and interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

In some embodiments, the watch user interface (e.g., 1097) further includes a ring-shaped area having a curved outer edge and a corner complication, a status bar that tracks the outer edge of the ring-shaped area (e.g., 1082), and a value (e.g., 1086) located between the status bar and a corner of the display (e.g., FIG. 10P).

In some embodiments, the first metric and the second metric relate to data from a clock application, the first metric representing a geographic location and the second metric representing a time associated with the geographic location (e.g., 1060). In some embodiments, the first and the second metric represent other clock data (e.g., an offset to local time, or indications of sunset and sunrise times).

In some embodiments, the first metric and the second metric relate to data from a calendar or date application (e.g., FIG. 10N), the first metric representing an event and the second metric representing a time associate with the event (e.g., 1070-2). In some embodiments, the first and second metrics represent other data (e.g., a location of the event).

In some embodiments, the first metric and the second metric relate to data from a stocks application (e.g., 1078 of FIG. 10O), the first metric representing a stock name, and the second metric representing an associated stock price. In some embodiments, the first and second metrics represent other data (e.g., a direction of price movement, a percent change in price, etc.).

In some embodiments, the first metric and the second metric relate to data from a weather application (e.g., 1008-1), the first metric representing a current temperature (e.g., 1010), and the second metric representing forecasted high and low temperatures (e.g., 1026). In some embodiments, the first and second metrics represent other data, e.g., humidity, wind speed and direction, a visual depiction of weather conditions, etc., and forecasted values thereof (e.g., FIG. 10J-10L).

In some embodiments, the first complication includes a visual representation of one or more metrics, the visual representation including an indication of a value relative to a range of values (e.g., 1088-1 and 1088-3). In some embodiments, the complication displays a target value and progress toward that value (e.g., 1090) (e.g., total battery capacity and current charge state, air quality, and various health or fitness metrics including progress toward step, floors climb, standing hours, and caloric goals). In some embodiments, the complication displays one or more metrics (e.g., current values and high and low values for a parameter) on a gauge which represents data from an application (e.g., a weather application including temperature, humidity, wind speed, etc.).

In some embodiments, the first complication includes a visual representation of one or more metrics, the visual representation including a first affordance representing a simulation of a first region of the Earth as illuminated by the Sun at a current time, the method further comprising: detecting a sequence of one or more user inputs corresponding to a request to view the simulation of the Earth at a non-current time; and in response to detecting the sequence of one or more user inputs corresponding to a request to view the simulation of the Earth at a non-current time, rotating the simulation of the Earth to reveal a second region of the Earth as illuminated by the Sun at the non-current time. In some embodiments, the sequence of one or more inputs includes an input corresponding to selection of the first complication, which causes device 600 to launch an astronomy application displaying an interactive simulation of the Earth as illuminated by the Sun at a current time. In response to an input (e.g., a swipe) on the simulation of the Earth within the astronomy application, the device rotates the simulation of the Earth to reveal a region of the Earth as illuminated by the Sun at the current time (e.g., 608-2).

A visual representation of the earth as illuminated by the Sun provides the user with a rapid means of determining a large quantity of information (e.g., time of day, geographic location, season, relative day time and night time, etc.) without cluttering the interface with excess textual elements. This enables the user to more rapidly locate relevant information throughout interface and access intended controls more quickly and accurately. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

At block 1104, the device detects a sequence of one or more inputs (e.g., 1081 and 1083) that correspond to a request to add a fourth complication (e.g., 1008-4) to the watch user interface (e.g., 1002 of FIG. 10C-10E). The fourth complication includes at least a seventh metric related to data from a fourth application (e.g., 1040) and an eighth metric related to data from the fourth application (e.g., 1042).

At block 1106, in response to detecting the sequence of one or more inputs, the device performs the operation of block 1108, block 1110, or block 1112. At block 1108, in accordance with a determination that the sequence of one or more inputs corresponds to a request to replace the first complication, the device replaces the first complication with the fourth complication (e.g., FIG. 10F). At block 1110, in accordance with a determination that the sequence of one or more inputs (e.g., 1082) correspond to a request to replace the second complication, the device replaces the second complication with the fourth complication (e.g., FIG. 10H). At block 1112, in accordance with a determination that the sequence of one or more inputs correspond to a request to replace the third complication, the device replaces the third complication with the fourth complication.

Optionally, at block 1114, in accordance with a determination that the sequence of one or more inputs corresponds to a request to replace the first complication, the device maintains the second complication and the third complication (e.g., FIG. 10F). Optionally, at block 1116, in accordance with a determination that the sequence of one or more inputs corresponds to a request to replace the second complication, the device maintains the first complication and the third complication (e.g., FIG. 10H). Optionally, at block 1118, in accordance with a determination that the sequence of one or more inputs corresponds to a request to replace the third complication, the device maintains the first complication and the second complication. In some embodiments, the watch user interface includes additional elements such as hands and additional complications that are not modified while replacing the selected complication.

In some embodiments, the watch user interface (e.g., 1093) further includes a ring-shaped area having a curved outer edge. In some embodiments, the clock face is an analog clock face having tick marks, hour markers (e.g., numbers), and/or minute markers (e.g., numbers) (e.g., 1072). Optionally, at block 1120, in accordance with the first application corresponding to a fifth application, the devices displays a visual characteristic at or around the ring-shaped area (e.g., FIG. 10N). Optionally, at block 1122, in accordance with the first application corresponding to a sixth application different than the fifth application, the device forgoes displaying the visual characteristic at or around the ring-shaped area (e.g., FIG. 10M).

Optionally, at block 1124 the device displays a second watch user interface. In some embodiments, the second watch user interface includes a fifth complication that includes less than two metrics related to data from the first application and is the same size as the first complication (e.g., 1008-2 of FIG. 10A).

Collectively re-configuring a set of elements on a watch face to provide a simplified interface in response to an input provides the user with more control over the device by helping the user quickly configure multiple display elements into a variety of configurations without requiring individual interactions with each element. Reducing the number of inputs need to perform equivalent operations, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the fifth complication does not include a metric related to data from the first application (e.g., 1008-2 of FIG. 10A).

In some embodiments, the fifth complication has a lower resolution than the first complication on the watch user interface (e.g., 1008-1 and 1008-1 of FIG. 10A).

In some embodiments, the watch user interface (e.g., 1091, 1093, 1095, 1097, and 1099) is a first watch user interface, wherein the first application, the second application, and the third application are the same application (e.g., FIG. 10M-10Q). Optionally, while displaying the first watch user interface, at block 1126 the device detects a sequence of one or more inputs that corresponds to selection of a second watch user interface (e.g., FIG. 10A-10B).

Collectively re-configuring a set of elements on a watch face to provide a themed interface directed at providing related information to the user provides the user with more control over the device by helping the user quickly configure multiple display elements into a configuration that includes a variety of relevant information without requiring individual interactions with each element. Reducing the number of inputs need to perform equivalent operations, enhances the operability of the device and makes the user-device interface more efficient (e.g., by helping the user to provide proper inputs and reducing user mistakes when operating/interacting with the device). Further, grouping related information for display makes it easier and therefore, more efficient for the user to decipher displayed data. Each of these advantages additionally reduces power usage and improves battery life of the device by enabling the user to use the device more quickly and efficiently.

In response to detecting the sequence of one or more inputs that corresponds to selection of the second watch user interface, the device optionally performs the operation of block 1128. At block 1128 the device displays the second watch user interface, wherein the second watch user interface (e.g., 1091, 1093, 1095, 1097, and 1099) which includes an eighth complication corresponding to a seventh application, a ninth complication corresponding to the seventh application, and a tenth complication corresponding to the seventh application that is different than the first application.

In some embodiments, the first complication includes a visual representation of one or more metrics, the visual representation including a first affordance representing a simulation of a first region of the Earth as illuminated by the Sun at a current time (e.g., 608-2). Optionally, at block 1130, the device detects a sequence of one or more user inputs corresponding to a request to view the simulation of the Earth at a non-current time. Optionally, at block 1132, in response to detecting the sequence of one or more user inputs corresponding to a request to view the simulation of the Earth at a non-current time, the device rotates the simulation of the Earth to reveal a second region of the Earth as illuminated by the Sun at the non-current time. In some embodiments, the sequence of one or more inputs includes an input corresponding to selection of the first complication, which causes device 600 to launch an astronomy application displaying an interactive simulation of the Earth as illuminated by the Sun at a current time. In response to an input (e.g., a swipe) on the simulation of the Earth within the astronomy application, the device rotates the simulation of the Earth to reveal a region of the Earth as illuminated by the Sun at the current time.

Note that details of the processes described above with respect to method 1100 (e.g., FIGS. 11A-11D) are also applicable in an analogous manner to the methods described above (e.g., 700 and 900). For example, method 900 optionally includes one or more of the characteristics of the various methods described above with reference to method 1100. For example, watch user interface 801 of FIG. 8A can be configured to additionally display three complications, including at least two metrics (e.g., complications 1008-1, 1008-2, and 1008-3 of FIG. 10A) over background 810, in a manner analogous to techniques described with reference to method 1100. For brevity, these details are not repeated below.

Figures 12A, 12B:
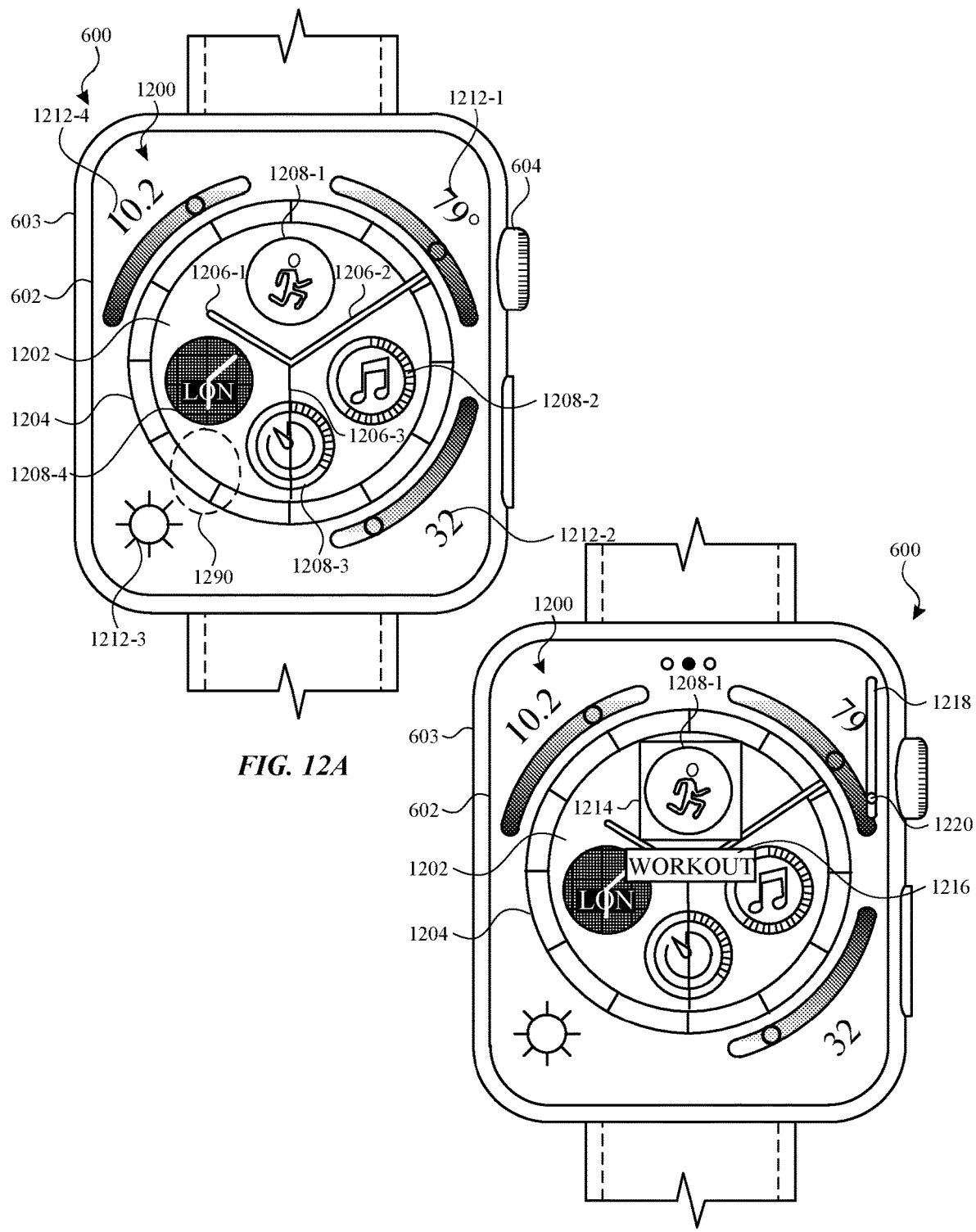
FIGS. 12A-12R illustrate exemplary context-specific user interfaces.
Figure 12C:
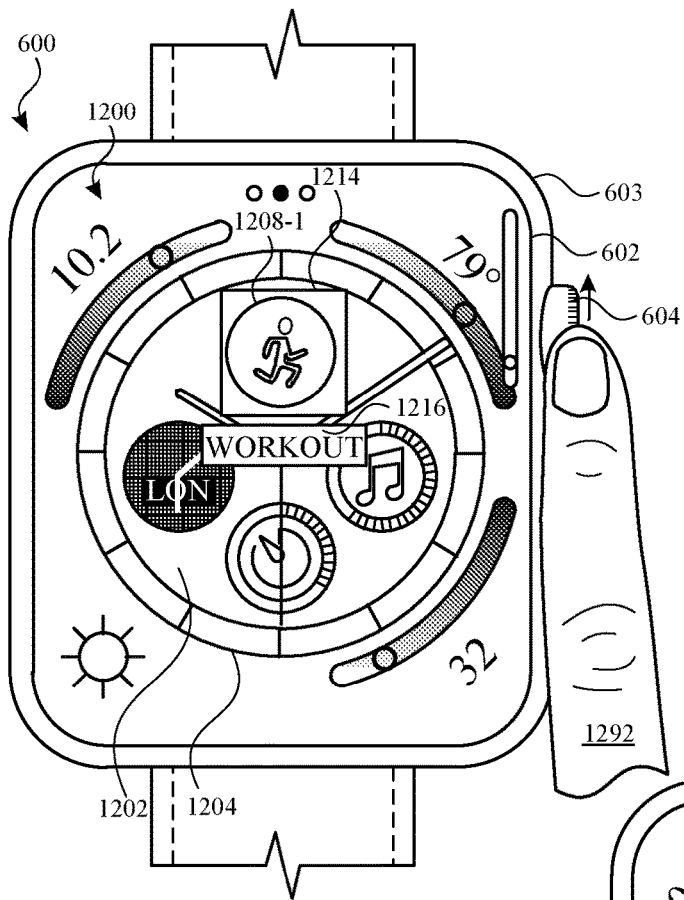
Figure 12D:
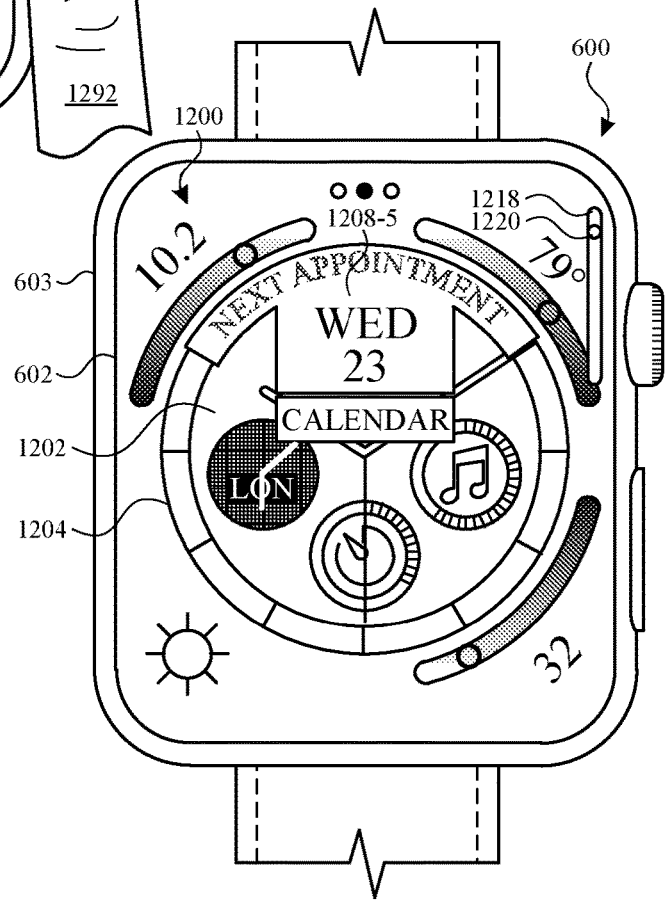
Figure 12E:
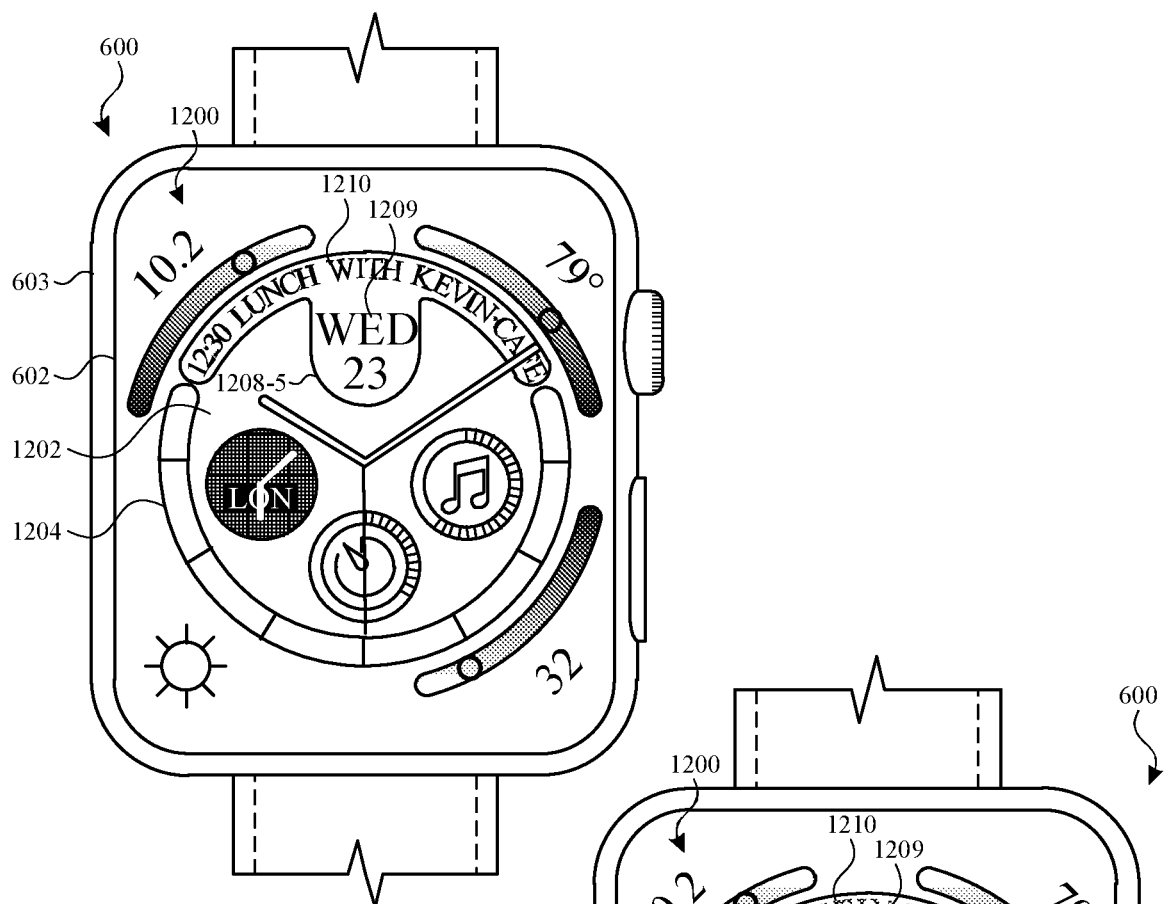
Figure 12F:
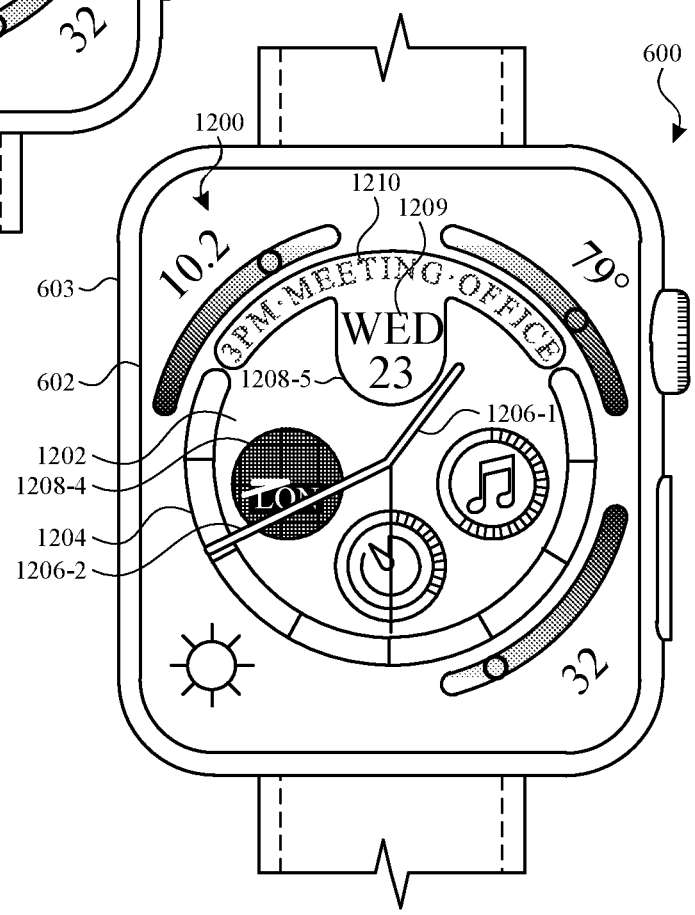
Figures 12G, 12H:
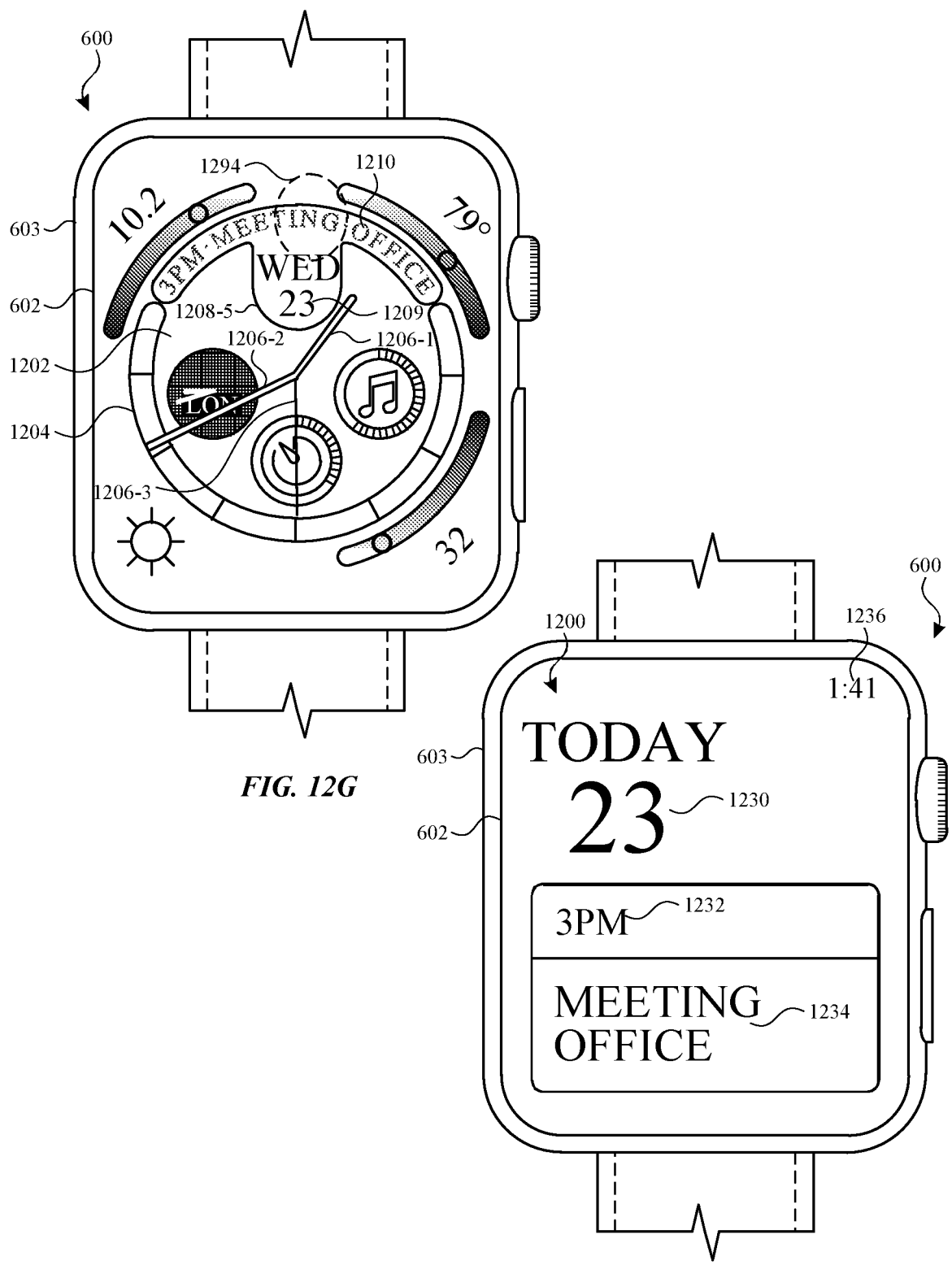
Figure 12I:
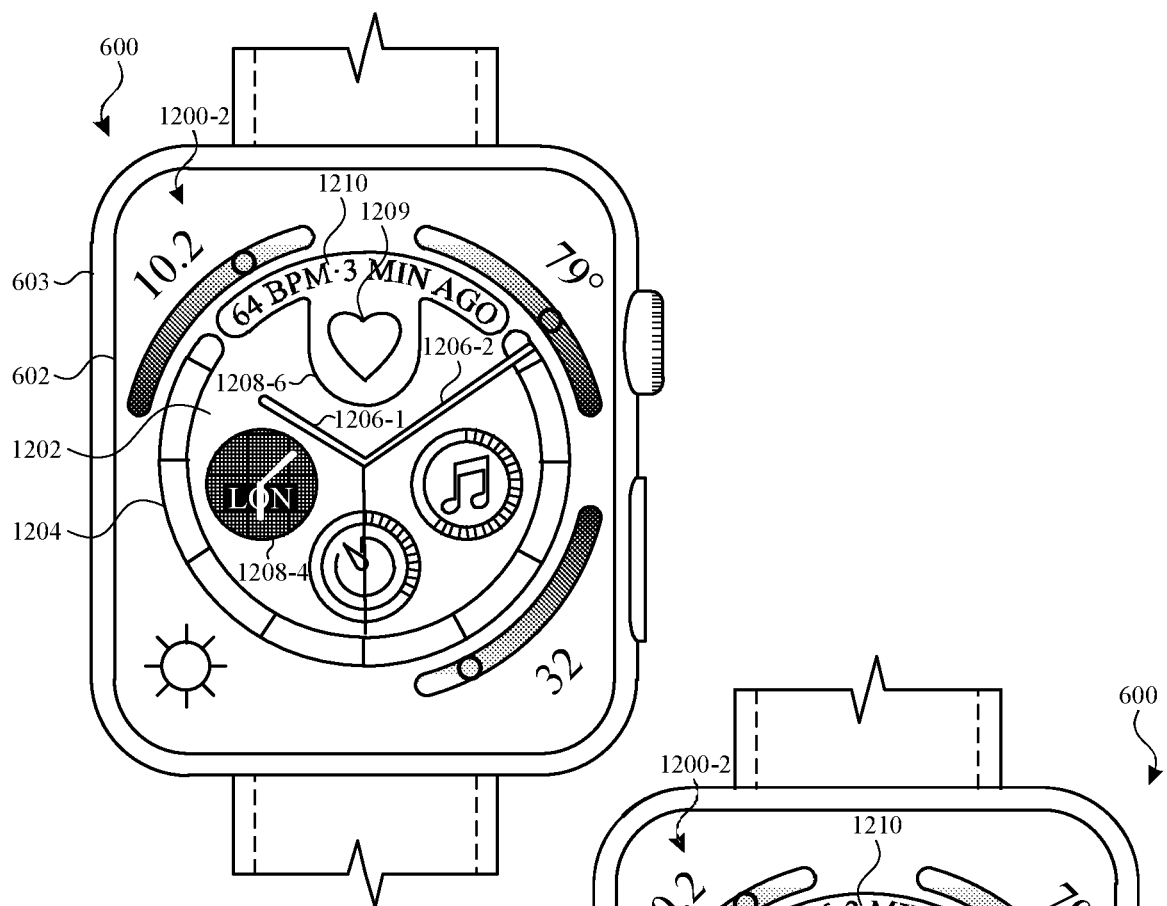
Figure 12J:
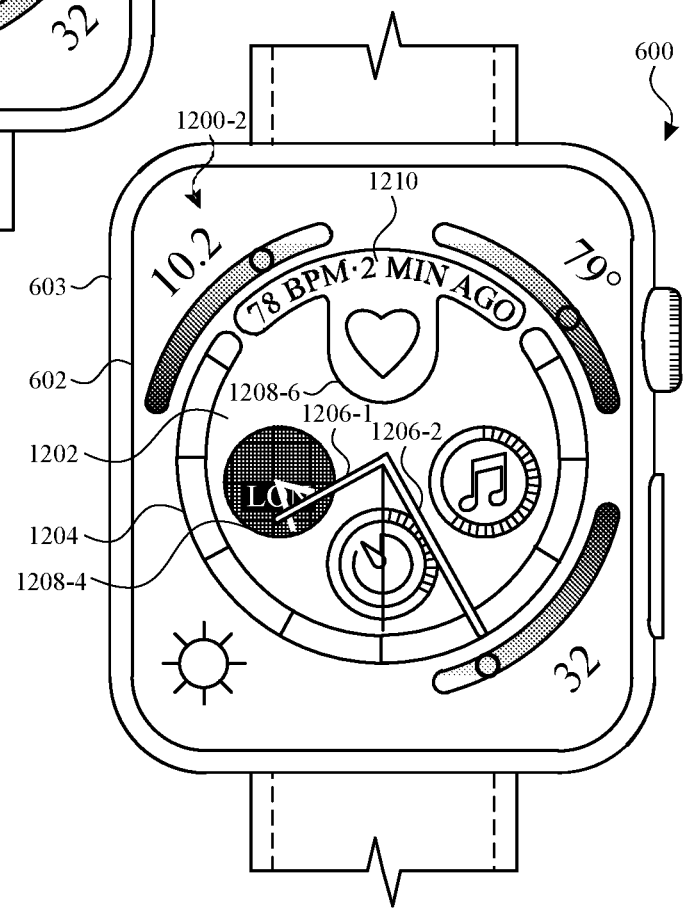
Figures 12K, 12L:
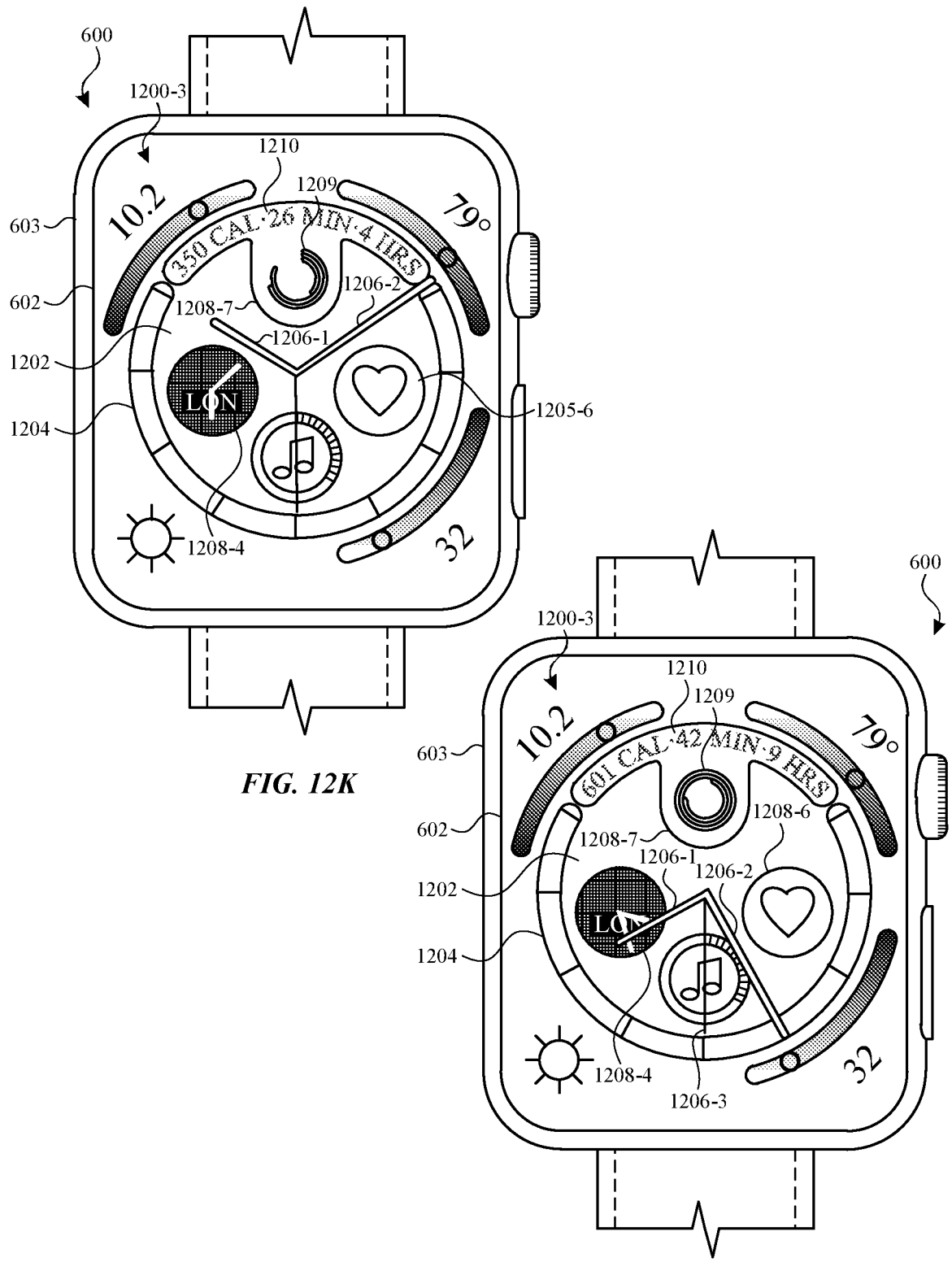
Figure 12M:
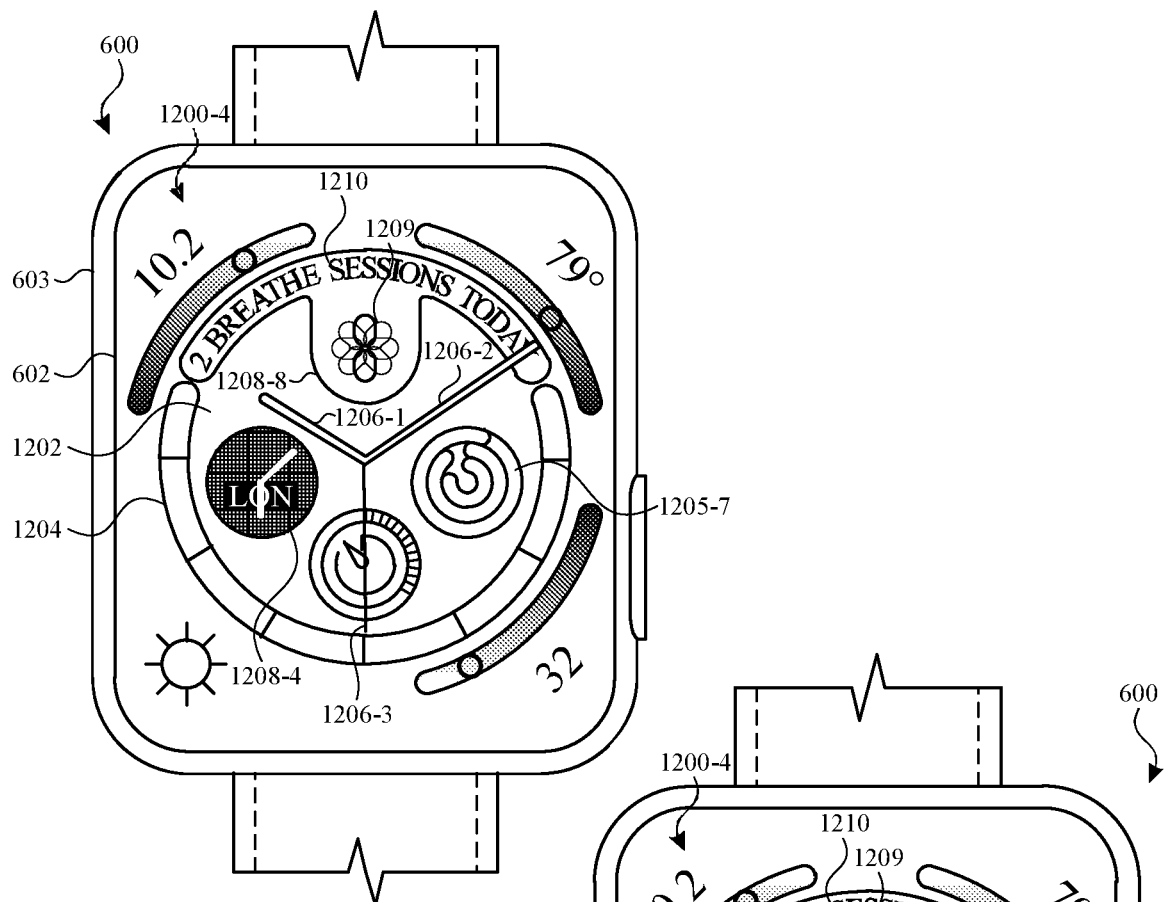
Figure 12N:
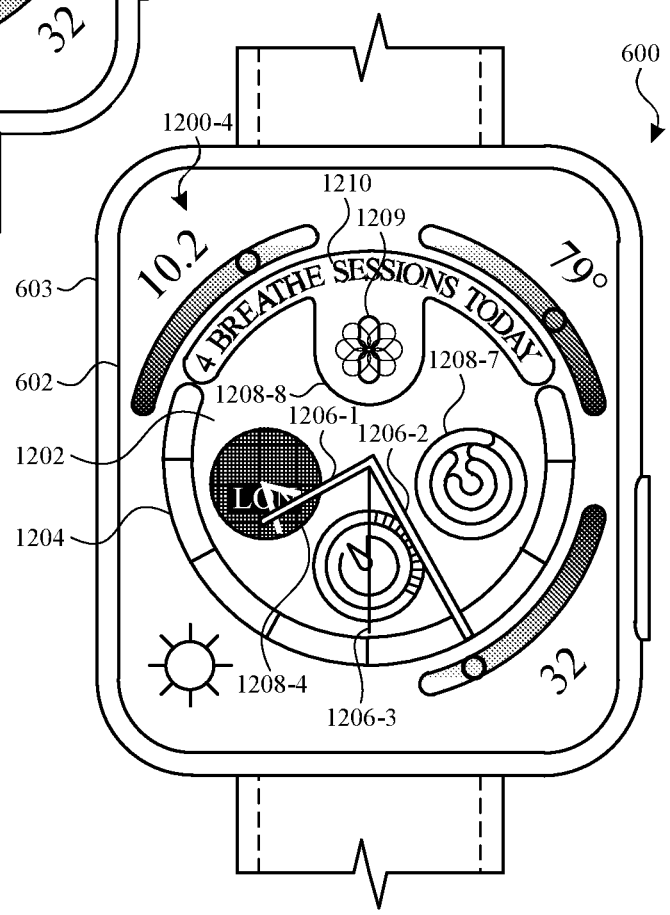
Figures 12O, 12P:
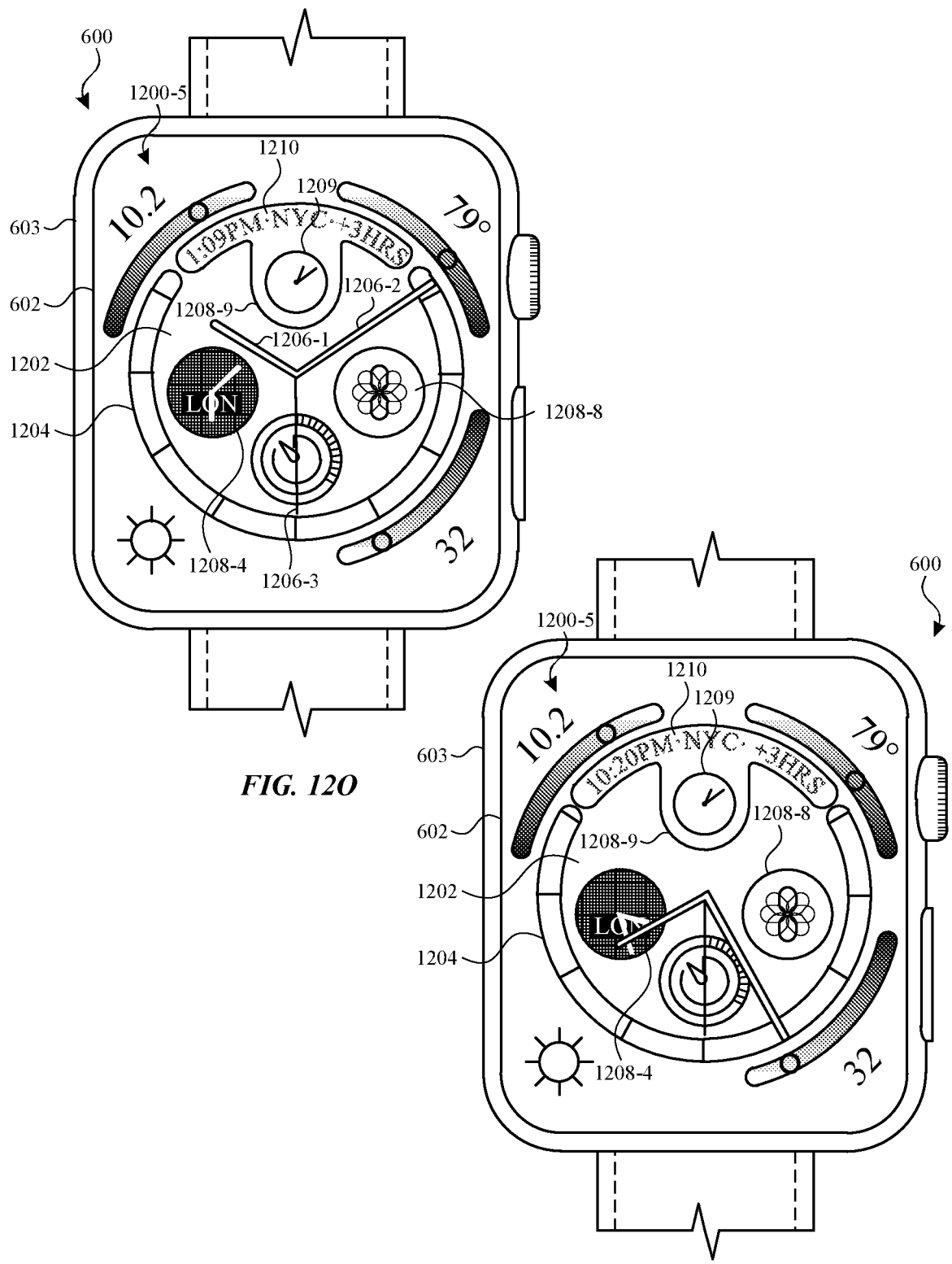
Figure 12Q:
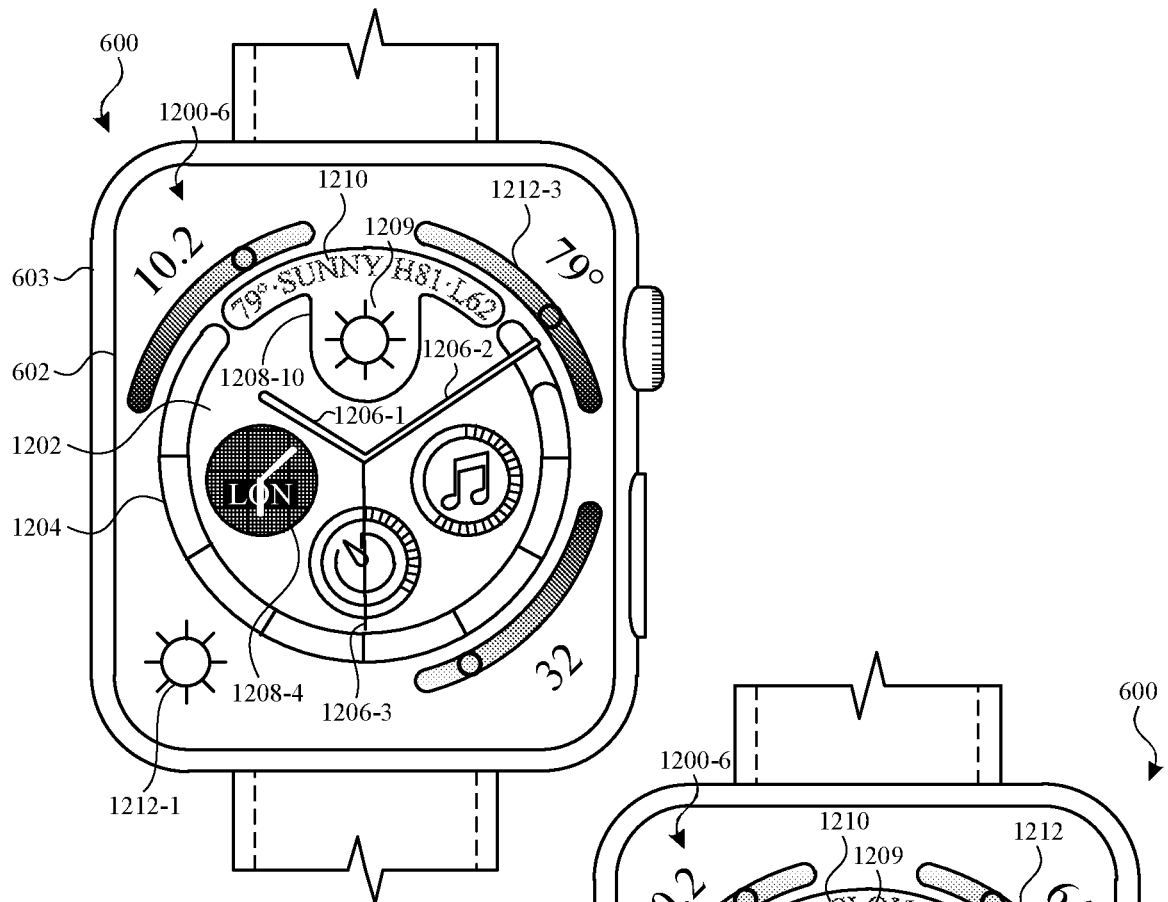
Figure 12R:
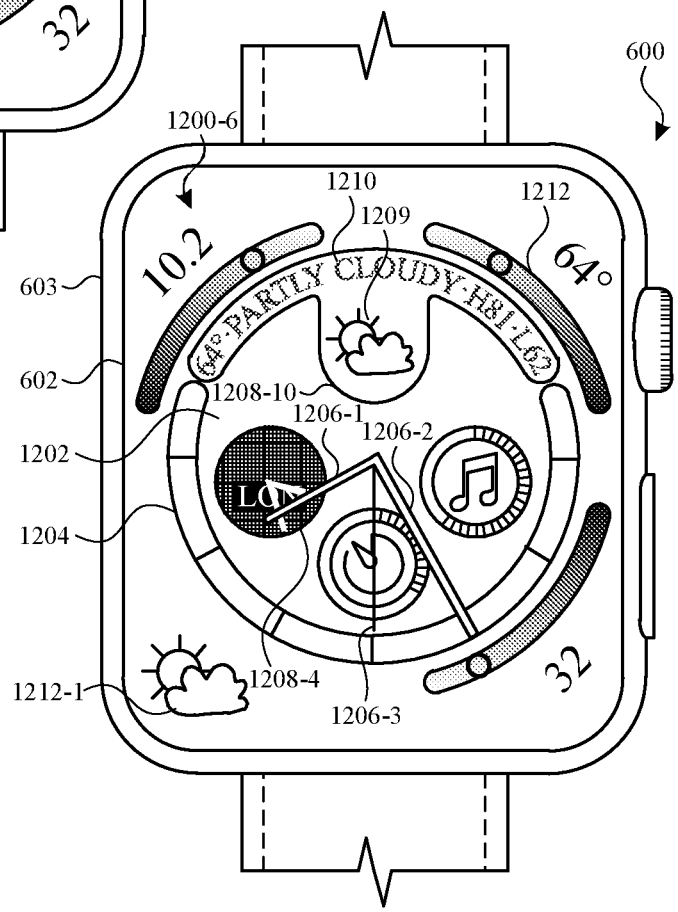

FIGS. 12A-12R illustrate exemplary watch user interfaces, in accordance with some embodiments. The user interfaces in these figures are used to illustrate the processes described below, including the methods in FIG. 13.

FIG. 12A illustrates device 600 as described above. As illustrated in FIG. 12A, device 600 displays watch user interface 1200 on display 602. Watch user interface 1200 includes clock face 1202 surrounded by bezel 1204. In FIG. 12A, clock face 1202 includes an indication of time having hour hand 1206-1, minute hand 1206-2, and second hand 1206-3. Watch user interface 1200 also includes workout complication 1208-1, music complication 1208-2, timer complication 1208-3, and world clock complication 1208-4 (collectively "complications 1208"). Workout complication 1208-1 is associated with a workout application, as indicated by the character icon included in the complication. Workout complication 1208-1 does not include a metric related to data from the workout application (e.g., workout complication 1208-1 only includes a single icon). Music complication 1208-2 is associated with a music application, as indicated by the musical note icon included in the complication, and displays data from the music application (e.g., time remaining in a currently playing music file). Timer complication 1208-3 displays data from a timer application, including elapsed time and/or time remaining (e.g., timer data is displayed in numeral form and/or graphically as a circular ring progressing radially along the inside edge of the complication at a rate proportional to the passage of time). World clock complication 1208-4 includes metrics related to data from a world clock application, including a respective location (e.g., London) and a time associated with the location (e.g., an analog clock face with hour and minute hands). In FIG. 12A, complications 1208-1, 1208-2, 1208-3, and 1208-4 occupy respective locations in the upper, right, lower, and left regions of the clock face 1202.

In FIG. 12A, watch user interface 1200 also includes corner complications 1212-1, 1212-2, 1212-3, and 1212-4 (collectively "corner complications 1212"), which occupy respective locations in the upper-right, lower-right, lower-left, and upper-left corners of watch user interface 1200 (e.g., corner complication 1212-1 resides in the region of watch user interface 1200 between the outer edge of bezel 1204 and the corner formed by intersection of the upper and right edges of display 602). As described in reference to FIG. 10P above, corner complications 1212-1, 1212-2, and 1212-4 each display data related to a range of values associated with a metric from a corresponding application (e.g., temperature, humidity, air quality index (AQI), or UV index from a weather application). Corner complication 1212-3 includes only a single graphical element illustrating data from a weather application (e.g., sunny sky conditions).

As illustrated in FIG. 12A, device 600 receives (e.g., detects) user input 1290 (e.g., a long press on display 602) corresponding to a request to edit watch user interface 1200. In response to user input 1290, device 600 enters an edit mode (e.g., watch face edit mode or complication edit mode). In FIG. 12B, device 600 indicates edit mode by visually distinguishing workout complication 1208-1 for editing (e.g., by displaying box 1214 around workout complication 1208-1 and label 1216 identifying the associated application). In some embodiments, device 600 visually distinguishes the complication selected for editing (e.g., workout complication 1208-1) by varying one or more visual properties (e.g., brightness, opacity, color, contrast, hue, saturation, etc.) of watch user interface 1200, or portions thereof. In some embodiments, while in edit mode, the complication selected for editing is displayed with a first visual property (e.g., in color or a plurality of colors other than greyscale) and one or more other complications (e.g., all other complications) are displayed with a second visual property (e.g., in greyscale or in a single color different from the plurality of colors that the complication would otherwise be displayed in when the device is not in the edit mode) even though, in some embodiments, some or all of the other complications are displayed in one or more colors in the watch face when the watch face is displayed while the device is not in the edit mode. For example, complication 1208-1 is displayed in color and complications 1208-2, 1208-3, and 1208-4 are displayed in greyscale. In some embodiments, while in edit mode, a visual property of one or more of the unselected complications is changed (e.g., a brightness or opacity of one or more of the unselected complications is reduced to distinguish the unselected complications from the selected complication) instead of, or in addition to, the change to the visual property of the one or more selected complications. In some embodiments, the visual distinguishing of the selected complication is instead of or in addition to an alternative selection indicator such as a selection ring around at least a portion of the selected complication. While in edit mode, device 600 also displays complication menu bar 1218 with complication position indicator 1220, which indicates the position of the currently displayed complication within a menu of complications available for selection. In some embodiments, user input 1290 includes a contact having a characteristic intensity and device 600 enters the edit mode in accordance with a determination that the characteristic intensity exceeds a predetermined threshold intensity.

As illustrated in FIG. 12C, device 600 receives (e.g., detects) user input 1292, which includes rotation of rotatable input mechanism 604. In some embodiments, user input 1292 is received at another device that communicates with device 600 (e.g., via a companion application associated with device 600 running on the other device). In response to receiving user input 1292, device 600 displays a representation of calendar complication 1208-5 to add to watch user interface 1200 in place of workout complication 1208-1. In FIG. 12D, device 600 updates complication position indicator 1220 to indicate that calendar complication 1208-5 is located near the top of the complication menu (e.g., because the complications are in alphabetical order and "c" is near the beginning of the alphabet). As illustrated in FIG. 12D, the representation of calendar complication 1208-5 includes indications of the type of information calendar complication 1208-5 will display on watch user interface 1200 upon exiting the edit mode (e.g., current day of week (WED), day of the month (23), and text describing the "NEXT APPOINTMENT").

In some embodiments, while in edit mode, the device receives (e.g., detects) one or more inputs (e.g., a tap on display 602 or a press of rotatable input mechanism 604) corresponding to a request to exit edit mode. In response to exiting edit mode, device 600 adds calendar complication 1208-5 to watch user interface 1200, replacing workout complication 1208-1 in the upper region of clock face 1202 and a portion of bezel 1204. As illustrated in FIG. 12E, calendar complication 1208-5 includes two components, graphical element 1209 (e.g., illustrating the current day of week and day of the month) and textual element 1210 (e.g., a textual description of an upcoming calendar event). As illustrated in FIG. 12E, graphical element 1209 is positioned on clock face 1202 closer to the center of display 602 than the inner edge of bezel 1204, without overlapping with the area previously occupied by bezel 1204 (e.g., in the position previously occupied by complication 1208-1 in the upper region of clock face 1202) and textual element 1210 is positioned in a curved region along the edge of clock face 1202 (e.g., in the position previously occupied by the top portion of bezel 1204).

Automatically presenting content in a manner that utilizes different areas of the display based on a content provides the user with enhanced visual feedback by keeping the user interface less cluttered. This enables the user focus attention on fewer visual elements and as a result, more rapidly locate relevant information throughout the interface and interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

As illustrated in FIG. 12F, as time elapses, device 600 updates watch user interface 1200. In FIG. 12F, the time displayed by hour hand 1206-1 and minute hand 1206-2 displays a current time of 1:42:30 (formerly 10:09:30 in FIG. 12E). In response to the passage of time, textual element 1210 is updated to reflect the next event relative to the current time (e.g., a meeting in the office at 3 PM) and the time displayed on world clock complication 1208-4 is updated to reflect the local time at the respective location (e.g., 09:42:30 in London). As illustrated in FIG. 12F, the size of textual element 1210 is based on the length of the associated content (e.g., the fewer number of characters in the next appointment, the shorter the textual element and the less of bezel 1204 is replaced).

Automatically adjusting the size of interface elements based on a content provides the user with enhanced visual feedback by keeping the user interface less cluttered. This enables the user focus their attention on fewer visual elements and as a result, more rapidly locate relevant information throughout the interface and interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

As illustrated in FIG. 12G, device 600 receives (e.g., detects) user input 1294 (e.g., a tap) on calendar complication 1208-5 (e.g., the graphical element portion of complication 1208-5 or the textual element portion occupying the region of watch user interface 1200 previously occupied by bezel 1202). In response to receiving user input 1294, device 600 launches the application corresponding to calendar complication 1208-5 (e.g., a calendar application). As illustrated in FIG. 12H, upon launching the calendar application, watch user interface 1200 is updated to display data from the calendar application including date element 1230, appointment time element 1232, appointment description element 1234, and digital indication of time 1236. In some embodiments, device 600 receives (e.g., detects) user input 1294 (e.g., a tap) in a location other than calendar complication 1208-5 and the device forgoes launching the calendar application.

Turning now to FIGS. 12I-12L, which illustrate embodiments of a watch user interface including a heart rate complication. FIG. 12I illustrates watch user interface 1200-2 at a first time (e.g., hour hand 1206-1 and minute hand 1206-2 indicating 10:42:30). Watch user interface 1200-2 includes heart rate complication 1208-6 which includes graphical element 1209 (e.g., a heart icon) and textual element 1210 (e.g., containing heart rate value 64 BPM and last reading value of "3 MIN AGO"). Graphical element 1209 is positioned closer to the center of display 602 than the inner edge of bezel 1204.

FIG. 12J illustrates watch user interface 1200-2 at a later time (e.g., hour hand 1206-1 and minute hand 1206-2 indicating 1:42:30). Watch user interface 1200-2 includes heart rate complication 1208-6 displaying an updated textual element 1210 (e.g., containing heart rate value 72 BPM and last reading value of "2 MIN AGO"). Watch user interface 1200-2 also includes world clock complication 1208-4 with an indication of time updated corresponding to the change in time between FIG. 12I and FIG. 12J.

Alternatively, as illustrated in FIGS. 12K-12L, device 600 displays heart complication 1208-6 in a compact form (e.g., heart rate complication 1208-6 consists of a single graphical icon positioned on clock face 1202 closer to the center of display 602 than the inner edge of bezel 1204).

FIGS. 12K-12N illustrate embodiments of a watch user interface including an activity complication. FIG. 12K illustrates watch user interface 1200-3 at a first time (e.g., hour hand 1206-1 and minute hand 1206-2 indicating 10:42:30). Watch user interface 1200-3 includes activity complication 1208-7 which includes graphical element 1209 and textual element 1201 containing calorie value (e.g., 350 CAL), active time value (e.g., 26 MIN), and standing hours value (e.g., 4 HRS). Graphical element 1209 includes an icon representing progress towards multiple activity-related fitness goals (e.g., a circular icon illustrating progress toward caloric burn, active time, and standing hours goals as three respective concentric circular bands which progress radially within the icon in proportion to progress towards the respective goals).

FIG. 12L illustrates watch user interface 1200-3 at a later time (e.g., hour hand 1206-1 and minute hand 1206-3 indicating 1:42:30). Watch user interface 1200-3 includes activity complication 1208-7 displaying an updated textual element 1210 (e.g., containing calorie value of 601 CAL, active time value of 92 MIN, and standing hours value of 9 HRS) and an updated graphical element 1209 representing illustrating elapsed progress towards caloric burn, active time, and standing hours goals. Watch user interface 1200-3 also includes world clock complication 1208-4 with an indication of time updated corresponding to the change in time between FIG. 12K and FIG. 12L.

Alternatively, as illustrated in FIGS. 12M-12N, device 600 displays activity complication 1208-7 in a compact form (e.g., activity complication 1208-7 consists of a single graphical icon positioned on clock face 1202 closer to the center of display 602 than the inner edge of bezel 1204).

FIGS. 12M-12P illustrate embodiments of a watch user interface including a breathe complication. FIG. 12M illustrates watch user interface 1200-4 at a first time (e.g., hour hand 1206-1 and minute hand 1206-2 indicating 10:42:30). Watch user interface 1200-4 includes breathe complication 1208-8 displaying a graphical element 1209 (e.g., an icon representing a corresponding meditation or mindfulness application) and textual element 1210 containing a number of sessions performed (e.g., 2 breathe sessions today).

FIG. 12N illustrates watch user interface 1200-4 at a later time (e.g., hour hand 1206-1 and minute hand 1206-3 indicating 1:42:30). Watch user interface 1200-4 includes breathe complication 1208-8 displaying graphical element 1209 (e.g., an icon representing a corresponding meditation or mindfulness application) and an updated textual element 1210 (e.g., 4 breathe sessions today). Watch user interface 1200-4 also includes world clock complication 1208-4 with an indication of time updated corresponding to the change in time between FIG. 12M and FIG. 12N.

Alternatively, as illustrated in FIGS. 12O and 12P, device 600 can display breathe complication 1208-8 in a compact form (e.g., breathe complication 1208-8 consists of a single graphical icon positioned on clock face 1202 closer to the center of display 602 than the inner edge of bezel 1204).

FIGS. 12O and 12P illustrate embodiments of a watch user interface including a world clock complication. FIG. 12O illustrates watch user interface 1200-5 at a first time (e.g., hour hand 1206-1 and minute hand 1206-2 indicating 10:42:30). Watch user interface 1200-5 includes world clock complication 1208-9 which includes graphical element 1209 (e.g., an analog clock face with hour and minute hands) and textual element 1210 including a respective location (e.g., New York), a time associated with the respective location (e.g., an analog clock face with hour and minute hands), and an offset (e.g., +3 hour offset to local time). In some embodiments, the offset is used to indicate an offset to another time zone (e.g., GMT). Watch user interface 1200-5 also includes world clock complication 1208-4 as described above (e.g., a compact representation consisting of a graphical icon displaying respective location and a time associated with the respective location (e.g., London) positioned on clock face 1202 closer to the center of display 602 than the inner edge of bezel 1204).

FIG. 12P illustrates watch user interface 1200-5 at a later time (e.g., hour hand 1206-1 and minute hand 1206-3 indicating 1:42:30). Watch user interface 1200-5 includes world clock complication 1208-9 displaying an updated graphical element 1209 (e.g., an icon illustrating an analog clock face with hour and minute hands displaying 10:20) and an updated textual element 1210 including a location (e.g., New York), an updated time associated with the respective location (e.g., a textual indication of time displaying 10:20 PM), and an offset (e.g., +3 hour offset to local time. Watch user interface 1200-5 also includes world clock complication 1208-4 with an indication of time updated to reflect the change in time between FIG. 12O and FIG. 12P.

FIGS. 12Q and 12R illustrate embodiments of a watch user interface including a weather complication. FIG. 12Q illustrates watch user interface 1200-6 at a first time (e.g., hour hand 1206-1 and minute hand 1206-2 indicating 10:42:30). Watch user interface 1200-6 includes weather complication 1208-10 displaying graphical element 1209 (e.g., icon illustrating sunny weather) and textual element 1210 containing a description of current or forecasted weather (e.g., currently 79 degrees and sunny with a forecasted high temperature of 81 and a low temperature of 62). Watch user interface 1200-6 also includes complications 1212-1 (e.g., an icon illustrating sunny sky conditions from a weather application) and 1212-3 (e.g., a gauge indicating a current temperature of 79 relative to a range) as described above.

FIG. 12R illustrates watch user interface 1200-6 at a later time (e.g., hour hand 1206-1 and minute hand 1206-2 indicating 1:42:30). Watch user interface 1200-6 includes weather complication 1208-10 displaying updated graphical element 1209 (e.g., icon illustrating partly sunny), updated textual element 1210 containing a description of current and forecasted weather (e.g., currently 64 degrees and partly sunny with a forecasted high temperature of 81 and a low temperature of 62), and updated weather complications 1212-1 (e.g., icon reflecting partly sunny weather at the second time) and 1212-3 (e.g., representing a current temperature of 64 relative to a range). Watch user interface 1200-6 also includes world clock complication 1208-4 with an indication of time updated to reflect the change in time between FIG. 12Q and FIG. 12R.

FIG. 13 is a flow diagram illustrating a method for providing context-specific user interfaces using an electronic device in accordance with some embodiments. Method 1300 is performed at a device (e.g., 100, 300, 500, or 600) with a display and one or more input devices. Some operations in method 1300 are, optionally, combined, the orders of some operations are, optionally, changed, and some operations are, optionally, omitted.

At block 1302, the device (e.g., 600) displays, on the display (e.g., 602), a watch user interface (e.g., 1200) including a clock face (e.g., 1202) and a user interface element (e.g., 1204) at least partially surrounding the clock face. In some embodiments, the clock face is a circular analog clock face (e.g., 1202). In some embodiments, the user interface element is a portion of the area on the display surrounding the clock face (e.g., a watch face bezel). In some embodiments, the user interface element is a section of a ring-shaped area surrounding the clock face (e.g., clockwise from about 10 o'clock to 2 o'clock). In some embodiments, the user interface element is entirely outside the clock face (e.g., 1204 of FIGS. 12A-12B). In some embodiments, the size of the user interface element (e.g., the angular extent of the ring-shaped area surrounding the clock face) depends on the content associated with the first complication (e.g., 1204 of FIGS. 12E-12F). As used herein, a bezel is a virtual rim that at least partially surrounds the area of the display serving as a clock face. In some embodiments, the bezel has markings associated with a particular measurement (e.g., units per hour) and is optionally rotatable. In some embodiments, the bezel is entirely outside (e.g., does not overlap) the clock face (e.g., 1204 of FIGS. 12A-12B). Unlike a static bezel, however, in some embodiments, the virtual bezel can be changed, as described in some of the embodiments described below.

At block 1304, the device (e.g., 600) receives, via the one or more input devices (e.g., 604), a request (e.g., a sequence of one or more touch and/or rotatable input mechanism inputs) to add a respective complication to a respective location on the clock face (e.g., location of 1208-1 relative to clock face in FIGS. 12A-12C). In some embodiments, the respective location is contained entirely within the clock face (e.g., 1208-1 of FIG. 12A).

In response to receiving the request to add the respective complication to the respective location on the clock face, the device performs the operations of block 1306 and/or block 1308.

At block 1306, in accordance with a determination that the respective complication is a first complication (e.g., 1208-5), the device (e.g., 600) displays, on the display (e.g., 602), the first complication in the respective location on the clock face and replaces at least a portion of the user interface element with content associated with the first complication (e.g., 1208-5 of FIG. 12E). In some embodiments, the first complication is associated with content related to a calendar application (e.g., an event or appointment description, date, time, location, etc.), weather application (e.g., sun or cloud condition, wind speed, wind direction, temperature range, humidity, etc.), exercise application (e.g., standing hours, minute of activity, calories, floors climbed, etc.), heart rate application (e.g., current heart rate, resting heart rate, active heart rate, average heart rate, time since last heart rate reading, etc.), breathe application (e.g., breath count, time, etc.), or clock application (e.g., an indication of time, location, GMT offset, etc.) (e.g., FIGS. 12E-12G and 12I-12R).

Automatically presenting content in a manner that utilizes different areas of the display based on a complication type provides the user with enhanced visual feedback by keeping the user interface less cluttered. This enables the user focus their attention on fewer visual elements and as a result, more rapidly locate relevant information throughout the interface and interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

In some embodiments, the content associated with the first complication includes first content (e.g., text; data from an application of the device) (e.g., 1210) and the first complication includes second content (e.g., a visual label 1209) displayed in the respective location on the clock face, where the second content is associated with the first complication (e.g., 1208-5 of FIGS. 12A-12G, 1208-6 of FIGS. 12I-12J, 1208-7 of FIGS. 12K-12L, 1208-8 of FIGS. 12M-12N, 1208-9 of FIGS. 12O-12P, and 1208-10 of FIGS. 12Q-12R).

In some embodiments, the first content represents data from an application and the second content represents data from the application that is different than the first content (e.g., the first content represents a date data from a calendar application and the second content represents meeting infor-
mation data from the same calendar application) (e.g., 1208-5, 1208-9 of FIGS. 12O-12P, 1208-10 of FIGS. 12Q-12R).

In some embodiments, the first content includes textual information associated with the first complication (e.g., the text curves around the outer edge of the analog face) (e.g., 1210).

In some embodiments, a size of the portion of the user interface element is based on the content associated with a first complication (e.g., in accordance with the content being first content, the portion of the user interface element has a first size; and in accordance with the content being second content, the user interface element has a second size). In some embodiments, the amount of the user interface element replaced depends on the content (e.g., length of calendar event title, etc.) (e.g., 1210 of FIGS. 12E-12F). In some embodiments, the amount of the user interface element replaced is proportional to the amount of the content (e.g., length, number of characters, etc.) (e.g., 1210 of FIGS. 12E-12F).

Automatically adjusting the size of an element on a user interface based on a the associated content, provides the user with enhance visual feedback by enabling the user to focus their attention on fewer visual elements and as a result, more rapidly locate relevant information throughout the interface and interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

At block 1308, in accordance with a determination that the respective complication is a second complication (e.g., 1208-1, 1208-2, 1208-3, 1208-4, 1208-6 of FIGS. 12K-12L, 1208-7 of FIGS. 12M-12N, and 1208-8 of FIGS. 12O-12P), the device (e.g., 600) displays, on the display (e.g., 602), the second complication in the respective location on the clock face (e.g., location of 1208-1 in FIG. 12A) without replacing the portion of the user interface element with content associated with the second complication (e.g., FIG. 12A). In some embodiments, the second complication does not include information from an associated application, such as a mail, messages, or workout complication (e.g., 1208-1, 1208-6 of FIGS. 12K-12L, and 1208-8 of FIGS. 12O-12P). In some embodiments, the second complication includes content unrelated to an application (e.g., battery level).

In some embodiments, the second complication consists of a single graphical element (e.g., a visual label) (e.g., 1208-1, 1208-2, 1208-3, 1208-4, 1208-6 of FIGS. 12K-12L, 1208-7 of FIGS. 12M-12N, and 1208-8 of FIGS. 12O-12P).

Optionally, at block 1310, while displaying the content associated with the first complication in the portion of the user interface element (e.g., FIG. 12G), the device receives an input (e.g., a tap input) corresponding to a location on the display (e.g., 1294).

In response to receiving the input corresponding to a location on the display (e.g., 1294), the device optionally performs the operations of block 1312 and/or block 1314. At block 1312, in accordance with the input corresponding to a location of the portion of the user interface element (e.g., a portion occupied by content associated with the first complication), the device launches an application associated with the first complication (e.g., FIGS. 12G-12H). At block 1314, in accordance with the input corresponding to a location on the user interface element other than the portion of the user interface element, the device forgoes launching an application associated with the first complication.

Selectively launching an application in an automatic fashion based on location of an input provides the user with more control over the device by helping the user quickly execute multiple commands without needing to navigate a complex menu structure. This enables the user, interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

In some embodiments, the first complication (e.g., 1208-5) includes date information (e.g., 1209 of FIGS. 12E-12G) (e.g., a visual label representing day of the month or week) displayed at the respective location on the clock face (e.g., location of 1208-5 in FIGS. 12E-12G) and the content associated with the first complication displayed at the portion of the user interface element includes information from an appointment (e.g., 1210 of FIGS. 12E-12G) (e.g., a textual label representing a description, subject, time, location, and/or attendees, etc.). In some embodiments, the first complication (e.g., 1208-5) is associated with a calendar application from which the date or appointment information is obtained. In some embodiments, a user input directed at the calendar information displayed in the respective location on the clock face (e.g., 1294) launches an associated calendar application (e.g., FIG. 12H).

In some embodiments, the first complication (e.g., 1208-10 of FIGS. 12Q-12R) includes first weather information (e.g., 1209 of FIGS. 12Q-12R) (e.g., a visual label representing sun, clouds, precipitation, etc.) displayed at the respective location on the clock face (e.g., the location of 1208-10 in FIGS. 12Q-12R) and the content associated with the first complication displayed at the portion of the user interface element includes second weather information different than the first weather information (e.g., 1210 of FIGS. 12Q-12R) (e.g., a textual label representing sun or cloud condition, wind speed, wind direction, temperature range, humidity, and/or location, etc.). In some embodiments, the first complication is associated with a weather application from which first or second weather information is obtained. In some embodiments, a user input directed at the first weather information displayed in the respective location on the clock face launches an associated weather application.

In some embodiments, the first complication (e.g., 1208-7 of FIGS. 12K-12L) includes first exercise information (e.g., 1209 of FIGS. 12K-12L) displayed at the respective location on the clock face (e.g., the location of 1208-10 in FIGS. 12K-12L) and the content associated with the first complication displayed at the portion of the user interface element includes second exercise information different than the first exercise information (e.g., 1210 of FIGS. 12Q-12R) (e.g., a textual label representing steps taken, floors climbed, hours stood, calories burned, and/or time active, etc.). In some embodiments, first exercise information includes a visual label (e.g., 1209 of FIGS. 12Q-12R) representing one or more fitness goals and progress toward them (e.g., steps taken, floors climbed, hours stood, calories burned, time active, etc.). In some embodiments, the first complication is associated with an exercise application from which first or second exercise information is obtained. In some embodiments, a user input directed at the first exercise information displayed in the respective location on the clock face launches an associated exercise application.

In some embodiments, the first complication (e.g., 1208-6 of FIGS. 12I-12J) includes an affordance displayed at the respective location on the clock face (e.g., the location of 1208-6 in FIGS. 12I-12J) (e.g., a heart-shaped visual label) and the content associated with the first complication displayed at the portion of the user interface element includes heart rate information (e.g., 1210 of FIGS. 12I-12J) (e.g., a textual label representing current heart rate, resting heart rate, active heart rate, average heart rate, time since last heart rate reading, etc.). In some embodiments, the first complication is associated with a heart rate application from which heart rate information is obtained. In some embodiments, a user input directed at the affordance displayed in the respective location on the clock face launches an associated heart rate application.

In some embodiments, the first complication (e.g., 1208-7 of FIGS. 12M-12N) includes an affordance displayed at the respective location on the clock face (e.g., the location of 1208-7 in FIGS. 12M-12N) and the content associated with the first complication is displayed at the portion of the user interface includes meditation or mindfulness information (e.g., 1210 in FIGS. 12M-12N). In some embodiments, the affordance is a visual label (e.g., 1209 of FIGS. 12M-12N) representing a meditation or mindfulness application (e.g., a breathe application). In some embodiments, meditation or mindfulness information includes a textual label (e.g., 1210 of FIGS. 12M-12N) representing breath count, session count, time, etc. In some embodiments, the first complication is associated with a meditation or mindfulness application from which meditation or mindfulness information is obtained. In some embodiments, a user input directed at the affordance displayed in the respective location on the clock face launches an associated meditation or mindfulness application.

In some embodiments, the first complication (e.g., 1208-9 of FIGS. 12O-12P) includes first time information (e.g., 1209 of FIGS. 12O-12P) (e.g., an analog clock including an hour hand and a minute hand) displayed at the respective location on the clock face (e.g., the location of 1208-9 in FIGS. 12O-12P) and the content associated with the first complication displayed at the portion of the user interface element includes second time information different than the first time information (e.g., 1210 of FIGS. 12O-12P) (e.g., digital indication of time, location, GMT offset, and/or etc.). In some embodiments, the first complication is associated with a clock application from which first and second time information is obtained. In some embodiments, a user input directed at the first time information displayed in the respective location on the clock face launches an associated meditation clock or mindfulness application.

Note that details of the processes described above with respect to method 1300 (e.g., FIG. 13) are also applicable in an analogous manner to the methods described above. For example, method 1300 optionally includes one or more of the characteristics of the various methods described above with reference to method 1100. For example, watch user interface 1200 of FIG. 12A can be configured to display three complications, including at least two metrics (e.g., complications 1008-1, 1008-2, and 1008-3 of FIG. 10A), in a manner analogous to techniques described with reference to method 1100. For brevity, these details are not repeated below.

Figures 14A, 14B:
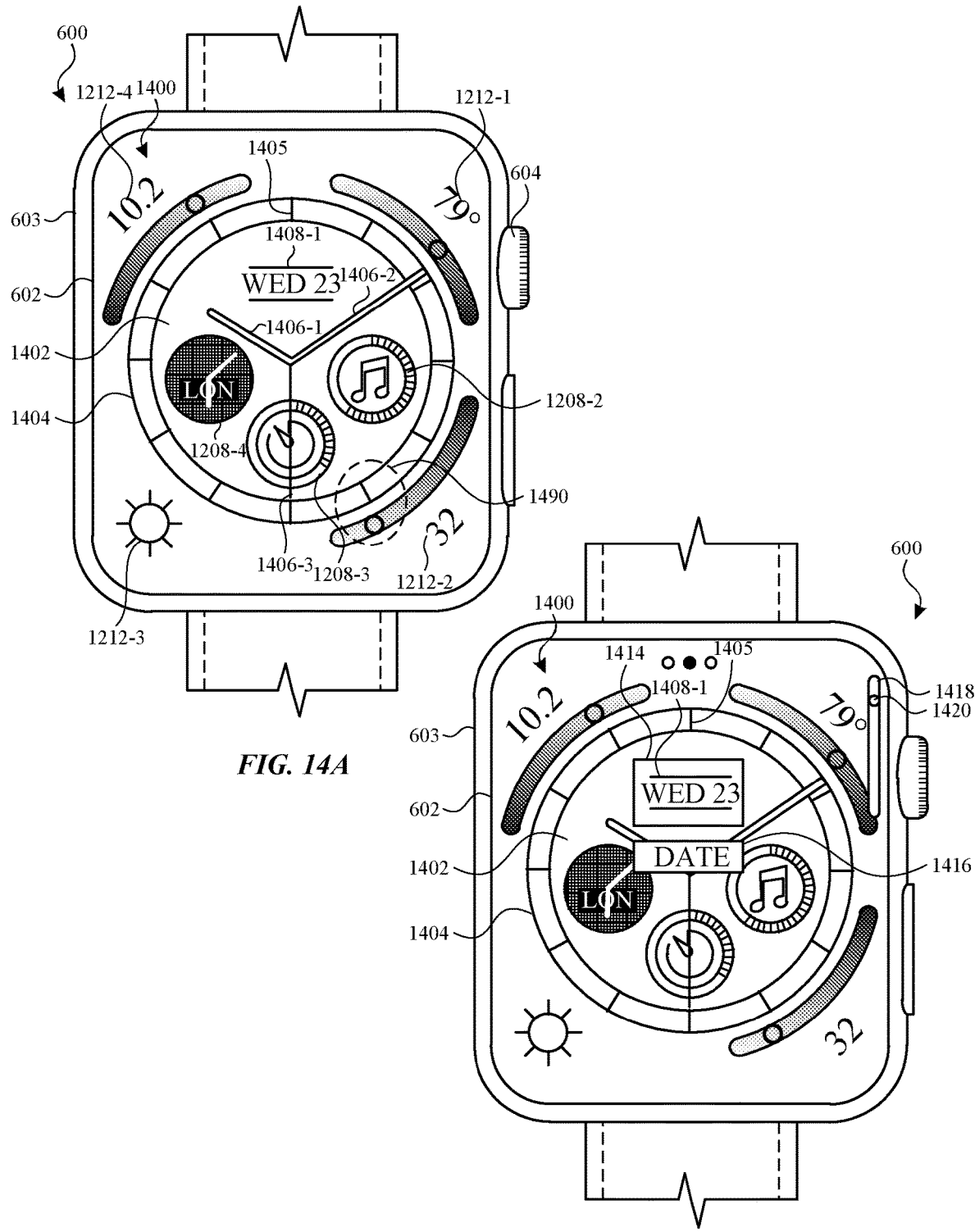
FIGS. 14A-14AE illustrate exemplary context-specific user interfaces.

FIGS. 14A-14AE illustrate exemplary watch user interfaces, in accordance with some embodiments. The user interfaces in these figures are used to illustrate the processes described below, including the methods in FIGS. 15A-15C.

FIG. 14A illustrates device 600 as described above. As illustrated in FIG. 14A, device 600 displays watch user interface 1400 on display 602. Watch user interface 1400 includes clock face 1402 surrounded by bezel 1404. Clock face 1402 includes an indication of time having hour hand 1406-1, minute hand 1406-2, and second hand 1406-3. Bezel 1404 includes hour markings 1405 (e.g., evenly spaced graphical markings that provide a visual reference to assist a user of device 600 in quickly determining a time displayed on clock face 1402). Watch user interface 1400 also includes date complication 1408-1, music complication 1208-2, timer complication 1208-3, and world clock complication 1208-4. Date complication 1408-1 displays data from an associated date or calendar application (e.g., day of the week and day of the month). Music complication 1208-2, timer complication 1208-3, world clock complication 1208-4, as described above, includes metrics related to data from respective applications. In FIG. 14A, complications 1208-1, 1208-2, 1208-3, and 1208-4 occupy respective locations in the upper, right, lower, and left regions of the clock face 1402. Watch user interface 1500 also includes corner complications 1212-1, 1212-2, 1212-3, and 1212-4 as described above.

As illustrated in FIG. 14A, device 600 receives (e.g., detects) user input 1490 (e.g., a long press on display 602) corresponding to a request to edit watch user interface 1400. In response to user input 1490, device 600 enters an edit mode (e.g., watch face edit mode or complication edit mode). In FIG. 14B, device 600 indicates edit mode by visually distinguishing date complication 1408-1 for editing (e.g., by displaying box 1414 around date complication 1408-1 and label 1416 identifying the associated application). In some embodiments, device 600 visually distinguishes the complication selected for editing (e.g., date complication 1408-1) by varying one or more visual properties (e.g., brightness, opacity, color, contrast, hue, saturation, etc.) of watch user interface 1400, or portions thereof. In some embodiments, while in edit mode, the complication selected for editing is displayed with a first visual property (e.g., in color or a plurality of colors other than greyscale) and one or more other complications (e.g., all other complications) are displayed with a second visual property (e.g., in greyscale or in a single color different from the plurality of colors that the complication would otherwise be displayed in when the device is not in the edit mode) even though, in some embodiments, some or all of the other complications are displayed in one or more colors in the watch face when the watch face is displayed while the device is not in the edit mode. For example, complication 1408-1 is displayed in color and complications 1208-2, 1208-3, and 1208-4 are displayed in greyscale. In some embodiments, while in edit mode, a visual property of one or more of the unselected complications is changed (e.g., a brightness or opacity of one or more of the unselected complications is reduced to distinguish the unselected complications from the selected complication) instead of, or in addition to, the change to the visual property of the one or more selected complications. In some embodiments, the visual distinguishing of the selected complication is instead of or in addition to an alternative selection indicator such as a selection ring around at least a portion of the selected complication. While in edit mode, device 600 also displays complication menu bar 1418 with complication position indicator 1420, which indicates the position of the currently displayed complication within a menu of complications available for selection. In some embodiments, user input 1490 includes a contact having a characteristic intensity and device 600 enters the edit mode in accordance with a determination that the characteristic intensity exceeds a predetermined threshold intensity.

Figure 14C:
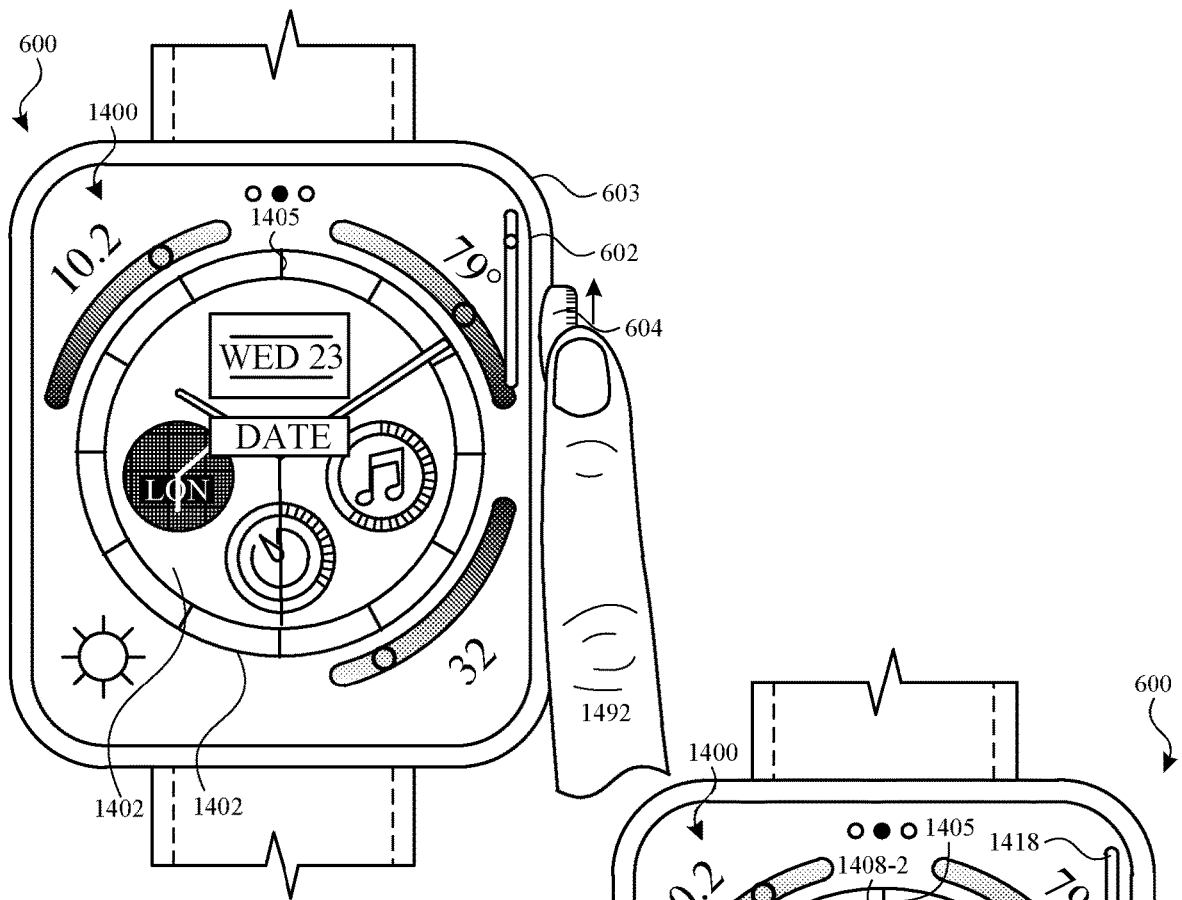
Figure 14D:
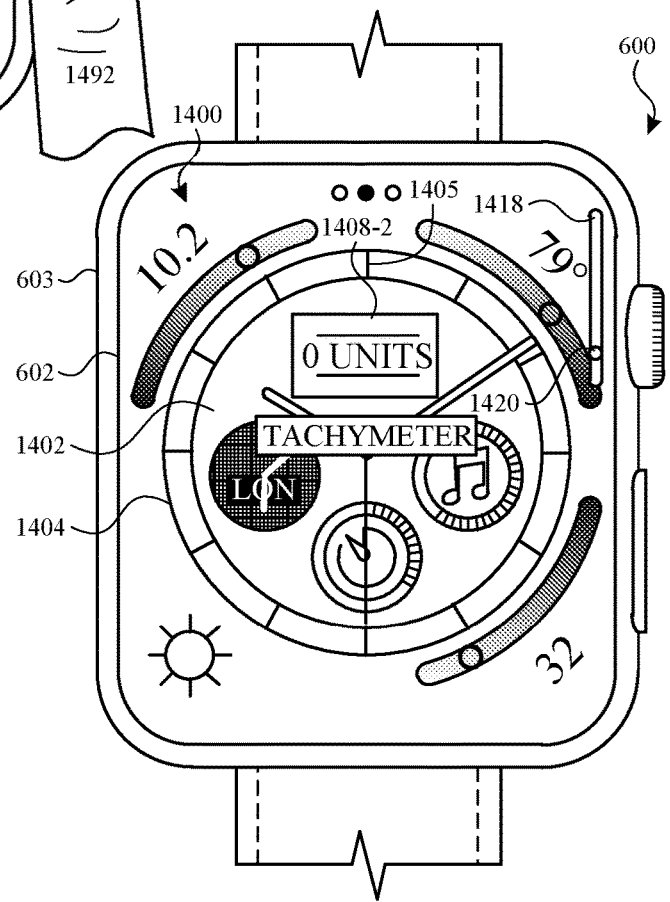

As illustrated in FIG. 14C, device 600 receives (e.g., detects) user input 1492, which includes rotation of rotatable input mechanism 604. In some embodiments, user input 1492 is received at another device that communicates with device 600 (e.g., via a companion application associated with device 600 running on the other device). In response to receiving user input 1492, device 600 displays a representation of tachymeter complication 1408-2 to add to watch user interface 1400 in place of date complication 1408-1. In FIG. 14D, device 600 updates complication position indicator 1420 to indicate that tachymeter complication 1408-2 is located near the bottom of the complication menu (e.g., because the complications are in alphabetical order and "t" is near the end of the alphabet). As illustrated in FIG. 14D, the representation of tachymeter complication 1408-5 includes an indication of the type of information tachymeter complication 1408-5 will display on watch user interface 1400 upon exiting the edit mode (e.g., generic units).

Figures 14E, 14F:
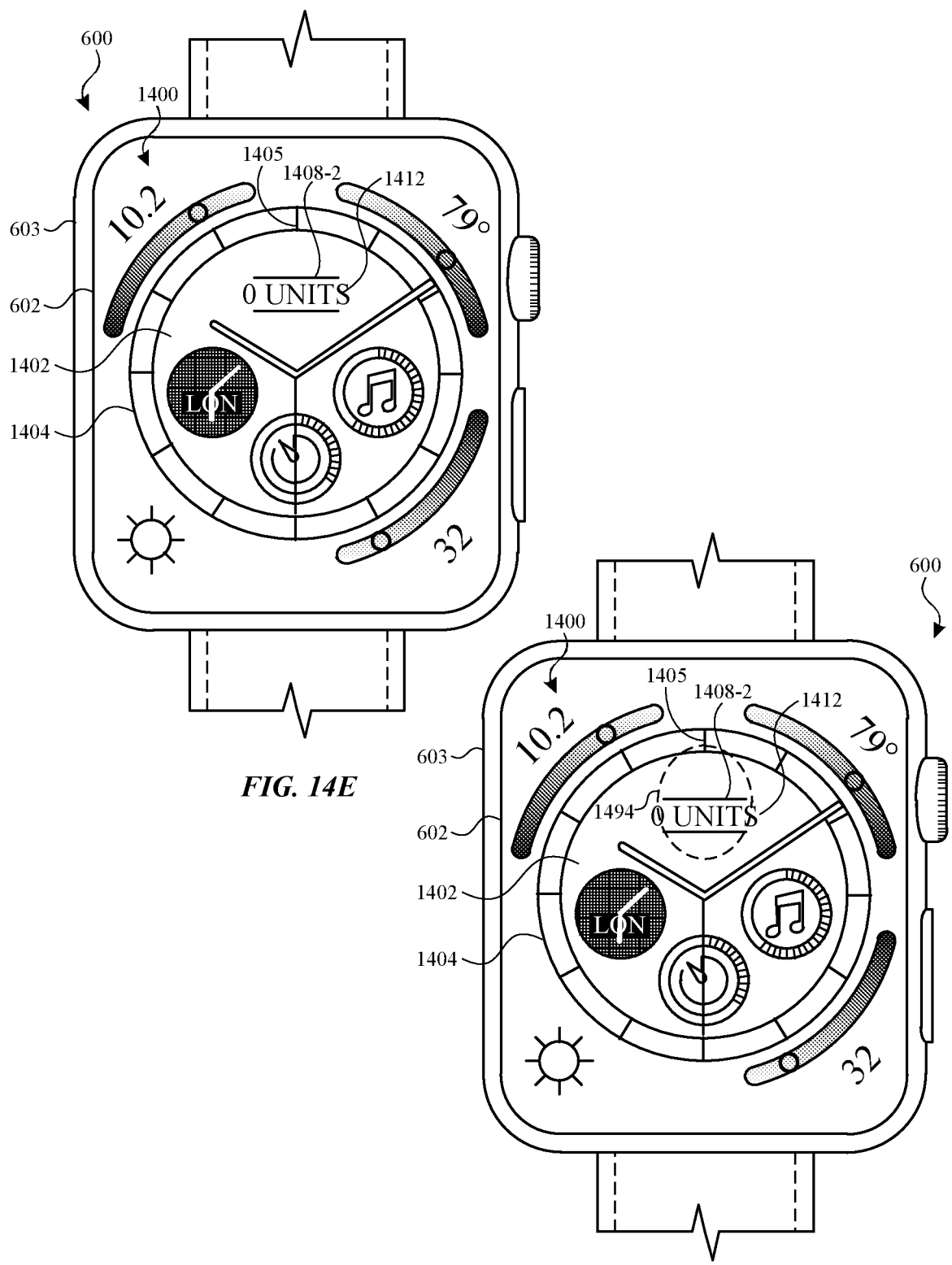

In some embodiments, while in edit mode, device 600 receives (e.g., detects) one or more inputs (e.g., a tap on display 602 or a press of rotatable input mechanism 604) corresponding to a request to exit edit mode. In response to exiting edit mode, device 600 adds tachymeter complication 1408-2 to watch user interface 1400, replacing date complication 1408-1 in the upper region of clock face 1402. As illustrated in FIG. 14E, tachymeter complication 1408-2 displays a units display 1412 positioned on clock face 1402 closer to the center of display 602 than the inner edge of bezel 1404, without overlapping with the area occupied by bezel 1204.

Figures 14G, 14H:
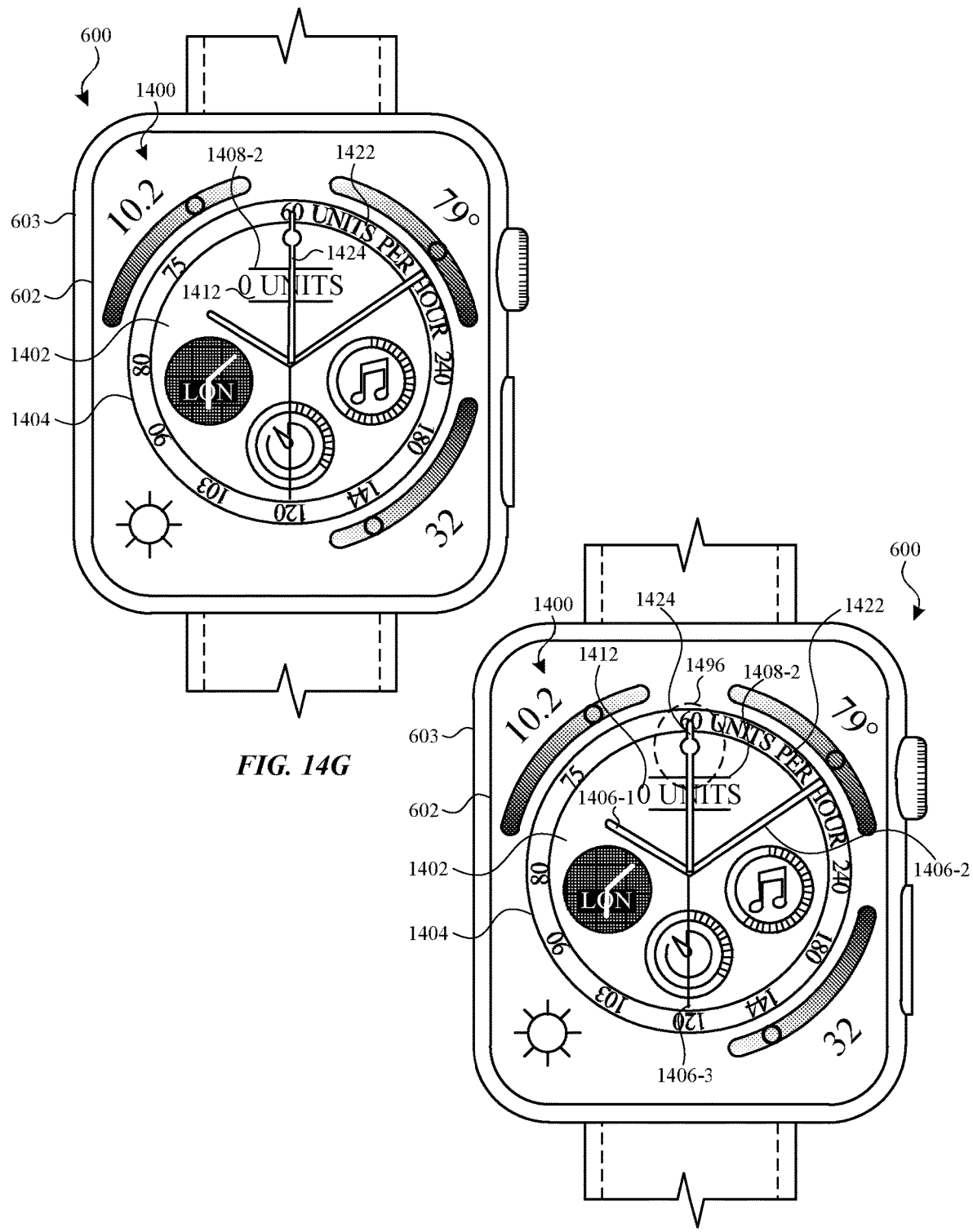

As illustrated in FIG. 14F, device 600 receives (e.g., detects) user input 1494 (e.g., a tap on display 602 in the area occupied by units display 1412). In some embodiments, user input 1494 is detected by device 600 at a location on display 1402 corresponding to bezel 1404. In response to user input 1494, device 600 updates watch user interface 1400. In FIG. 14G, watch user interface 1400 includes bezel 1404, where hour markings 1405 have been replaced by units scale 1422 (e.g., 60 units per hour scale) and tachymeter hand 1424 has been added. In some embodiments, hour markings 1405 are replaced by units scale 1422 in response to user input 1492 (selection rotation) and only tachymeter hand 1424 is added to watch user interface 1400 in response to user input 1494. In some embodiments, in response to user input 1492 (selection rotation), hour markings 1405 are replaced by units scale 1422 and tachymeter hand 1424 is added to watch user interface 1400.

Automatically updating the interface in response to a specific user interaction (e.g., after exiting edit mode), provides the user with enhanced visual feedback by keeping the user interface less cluttered during the selection. This enables the user focus their attention on fewer visual elements and as a result, more rapidly locate relevant information throughout the interface and interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

Figures 14I, 14J:
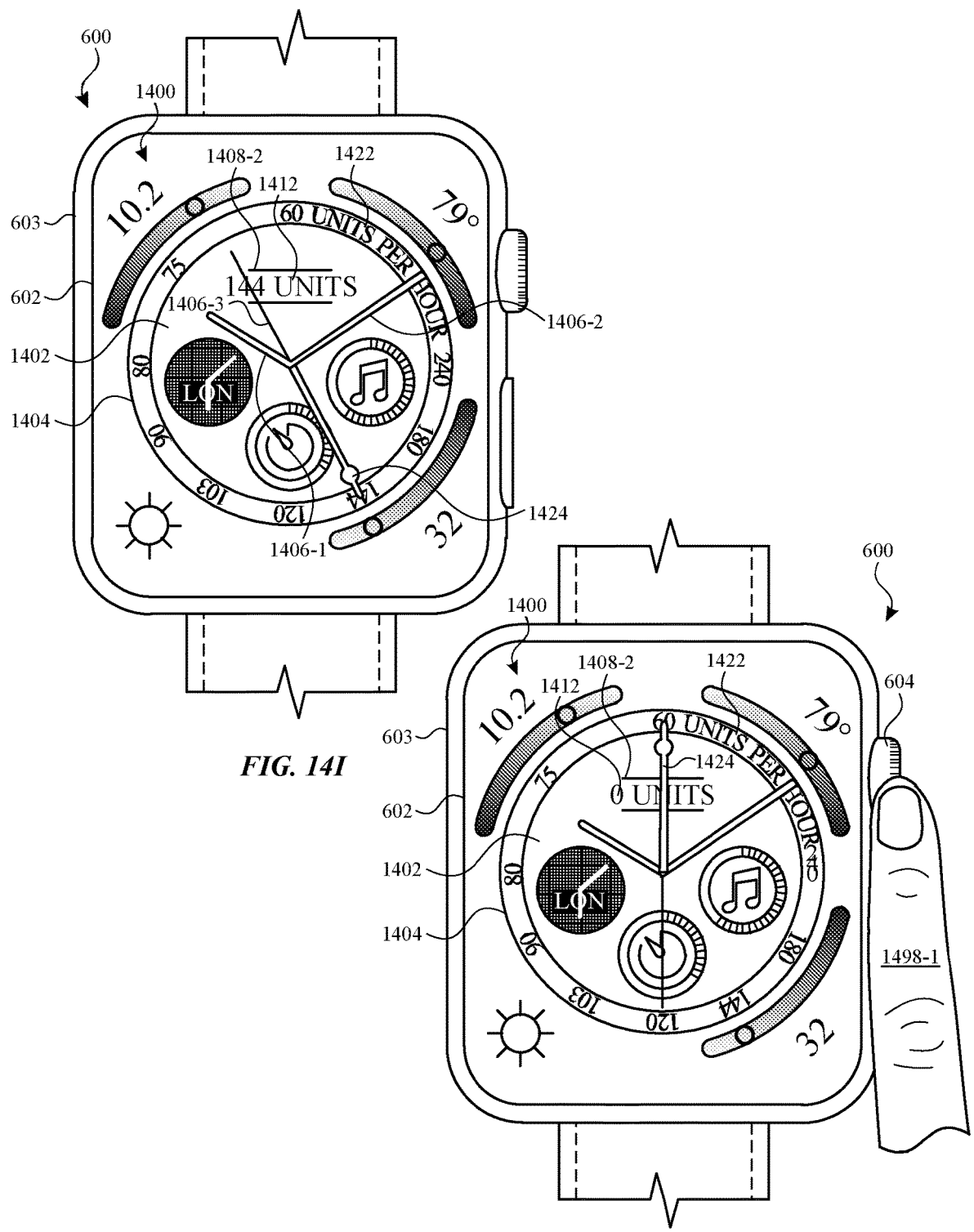

As illustrated in FIG. 14H, device 600 receives (e.g., detects) user input 1496 (e.g., a tap display corresponding to tachymeter hand 1424 or bezel 1404 with units scale 1422). In response to receiving user input 1496, device 600 updates watch user interface 1400 (e.g., rotation of tachymeter hand 1424 is started and units display 1412 updates corresponding to the location of tachymeter hand 1424 relative units scale 1422). In FIG. 14I, tachymeter hand 1424 has progressed to a location on bezel 1404 corresponding to 144 units, units display 1412 reflects the position of tachymeter hand 1424 (e.g., 144 units), and second hand 1406-3 indicates 20 seconds have elapsed.

In some embodiments, while the tachymeter hand 1424 is progressing (e.g., rotating), device 600 receives a subsequent user input (e.g., a tap on the user display). In response, the tachymeter hand 1424 and units display 1412 stop updating (e.g., tachymeter hand stops rotating and units display value reflects the position of the tachymeter hand relative to units scale 1422). In some embodiments, the subsequent user input (e.g., a tap or long-press on the user display) resets the tachymeter complication (e.g., bezel 1404, tachymeter hand 1424, and units display 1412 return their respective states illustrated in FIG. 14G).

Figure 14K:
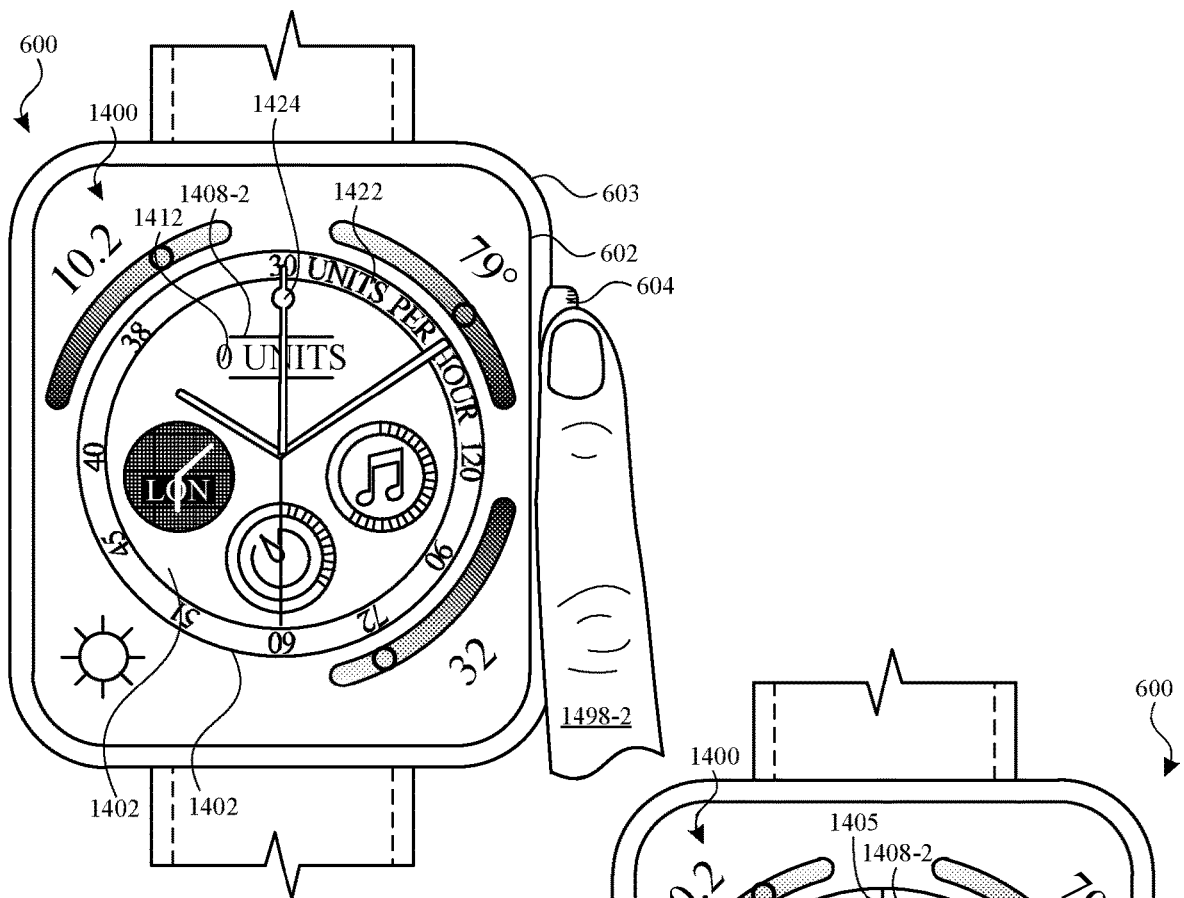
Figure 14L:
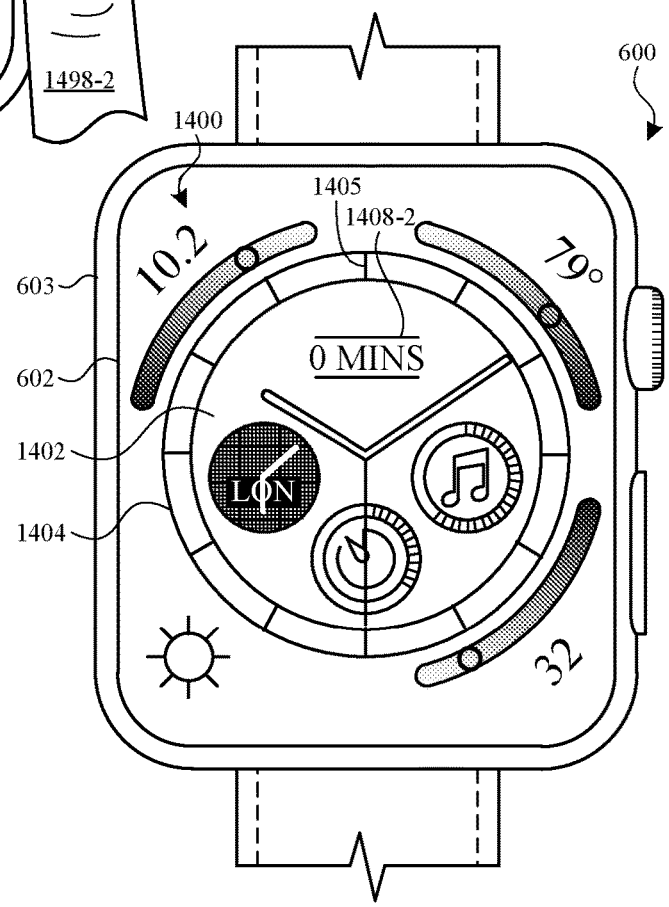

As illustrated in FIG. 14J, prior to user input 1496 (e.g., before starting the rotation of tachymeter hand 1424), device 600 receives (e.g., detects) user input 1498-1, which includes rotation of rotatable input mechanism 604. In response to receiving user input 1498-1, device 600 updates units scale 1422 on bezel 1404. FIG. 14K includes updated units scale 1422 (e.g., indicating selection of a 30 units per hour scale for tachymeter functions).

Figures 14M, 14N:
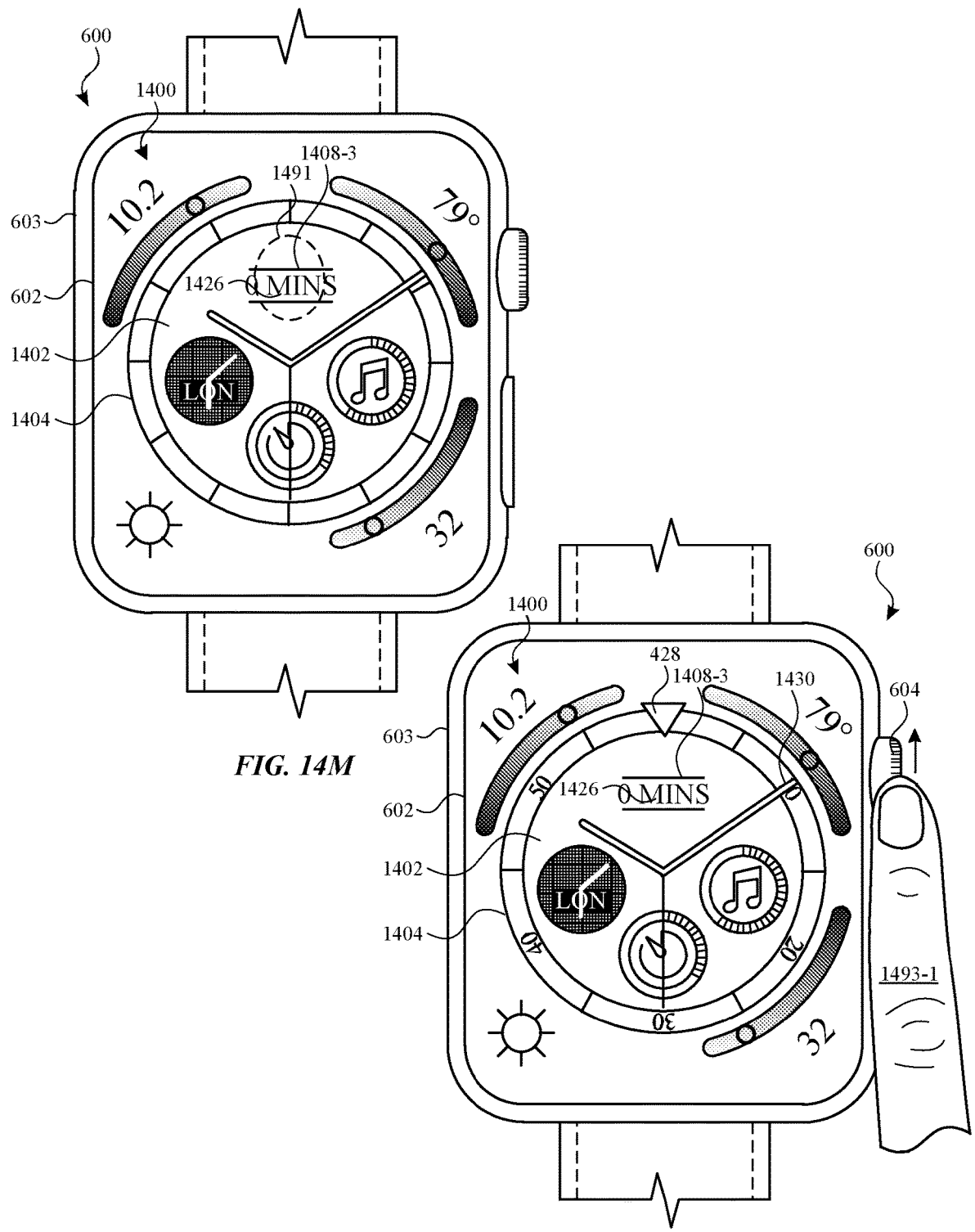

Turning now to FIG. 14M, the process of updating watch user interface 1400 with diver complication 1408-3 is illustrated (e.g., after selection of a diver complication from edit mode, device 600 displays a representation of diver complication 1408-3 to add to watch user interface 1400, and upon exiting edit mode, device 600 adds diver complication 1408-3 to watch user interface 1400, replacing the complication in the upper region of clock face 1402). As illustrated in FIG. 14M, diver complication 1408-3 includes minutes display 1426 positioned on clock face 1402 closer to the center of display 602 than the inner edge of bezel 1404, without overlapping with the area occupied by bezel 1204.

In FIG. 14M device 600 receives (e.g., detects) user input 1491 (e.g., a tap on display 602 in the area occupied by minutes display 1426). In some embodiments, user input 1491 is detected by device 600 at a location on display 1402 corresponding to bezel 1404. In response to user input 1491, device 600 updates watch user interface 1400. In FIG. 14N, updated watch user interface 1400 includes bezel 1404 where hour markings 1405 have been replaced by diver scale 1430 (e.g., numerals around the bezel corresponding to minutes) and bezel marker 1428 has been added bezel 1404 (e.g., at top of the bezel).

Figure 14O:
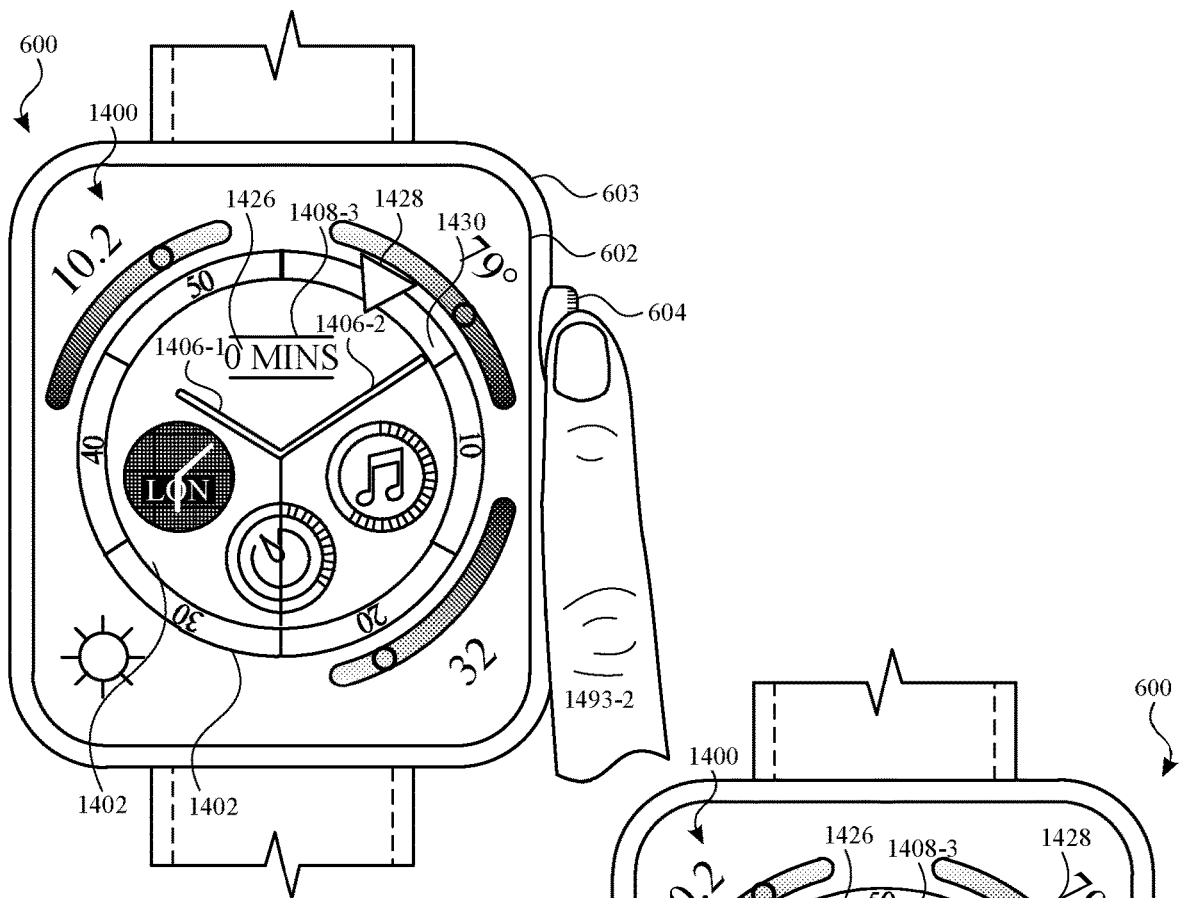
Figure 14P:
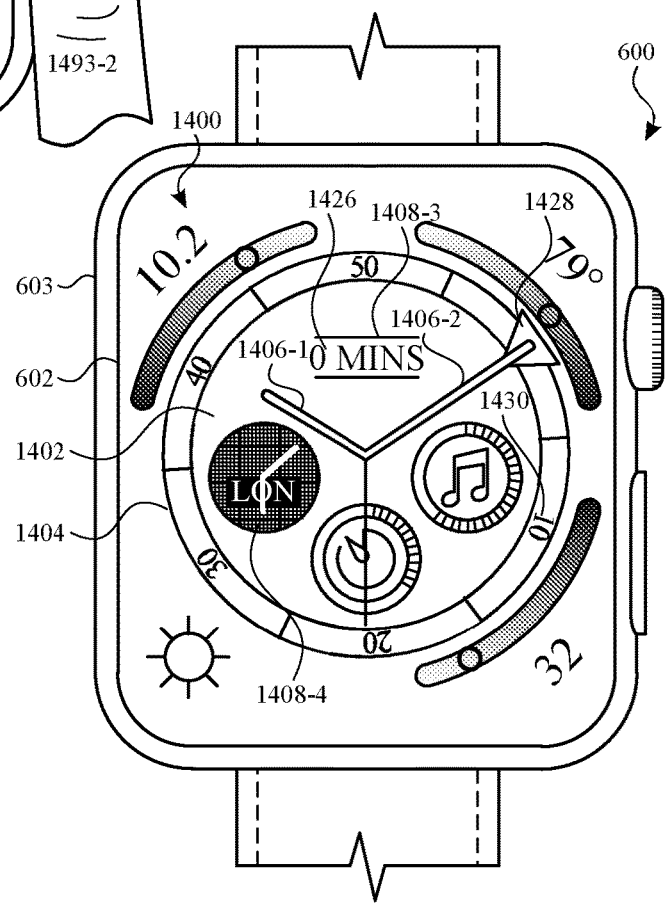

As illustrated in FIGS. 14N-14P, device 600 receives (e.g., detects) user input 1493, which includes rotation of rotatable input mechanism 604. In response to user input 1493, device 600 updates watch user interface 1400 by updating the position (e.g., rotating) bezel 1404. As illustrated by the progression of bezel marker 1428 to a position aligned with minute hand 1206-2 in FIG. 14P, bezel 1404 moves clockwise in response to user input 1493. In other embodiments, bezel 1404 progresses counter-clockwise in response to user input 1493.

Figures 14Q, 14R:
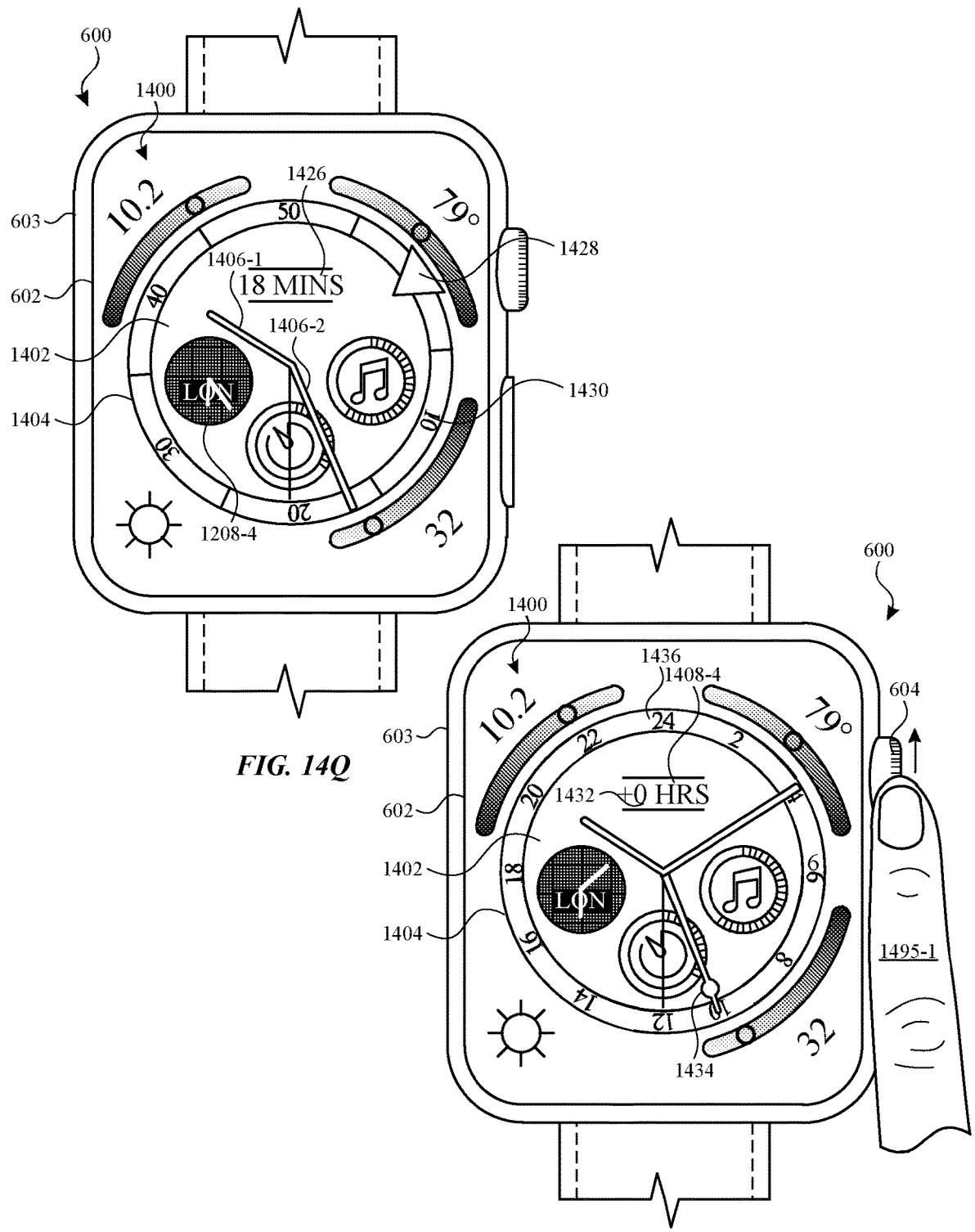

FIG. 14Q illustrates watch user interface 1400 sometime after the completion of user input 1493. Minutes display 1426 indicates the offset between bezel 1404 and minute hand 1206-2 (e.g., that 18 minutes have elapsed since the bezel was aligned with the minute hand) and indications of time have been updated (e.g. minute hand 1206-2 and world clock complication 1208-4 are updated corresponding to the change in time between FIG. 14P and FIG. 14Q).

Turning now to FIG. 14R, a process is described for updating watch user interface 1400 with GMT complication 1408-4 (e.g., after selection of a GMT complication from edit mode, device 600 displays a representation of GMT complication 1408-4 to add to watch user interface 1400; and upon exiting edit mode, device 600 adds GMT complication 1408-4 to watch user interface 1400, replacing the complication in the upper region of clock face 1402). As illustrated in FIG. 14R, GMT complication 1408-4 includes offset display 1432 (e.g., representing a time-zone for display by GMT hand, relative to GMT time) positioned on clock face 1402 closer to the center of display 602 than the inner edge of bezel 1404 (e.g., without overlapping with the area occupied by bezel 1204), GMT scale 1436 on bezel 1404 (e.g., 24-hour scale), and GMT hand 1434 (e.g., hand positioned relative to GMT scale 1436 to indicate time in a time-zone based to the offset displayed).

Figure 14S:
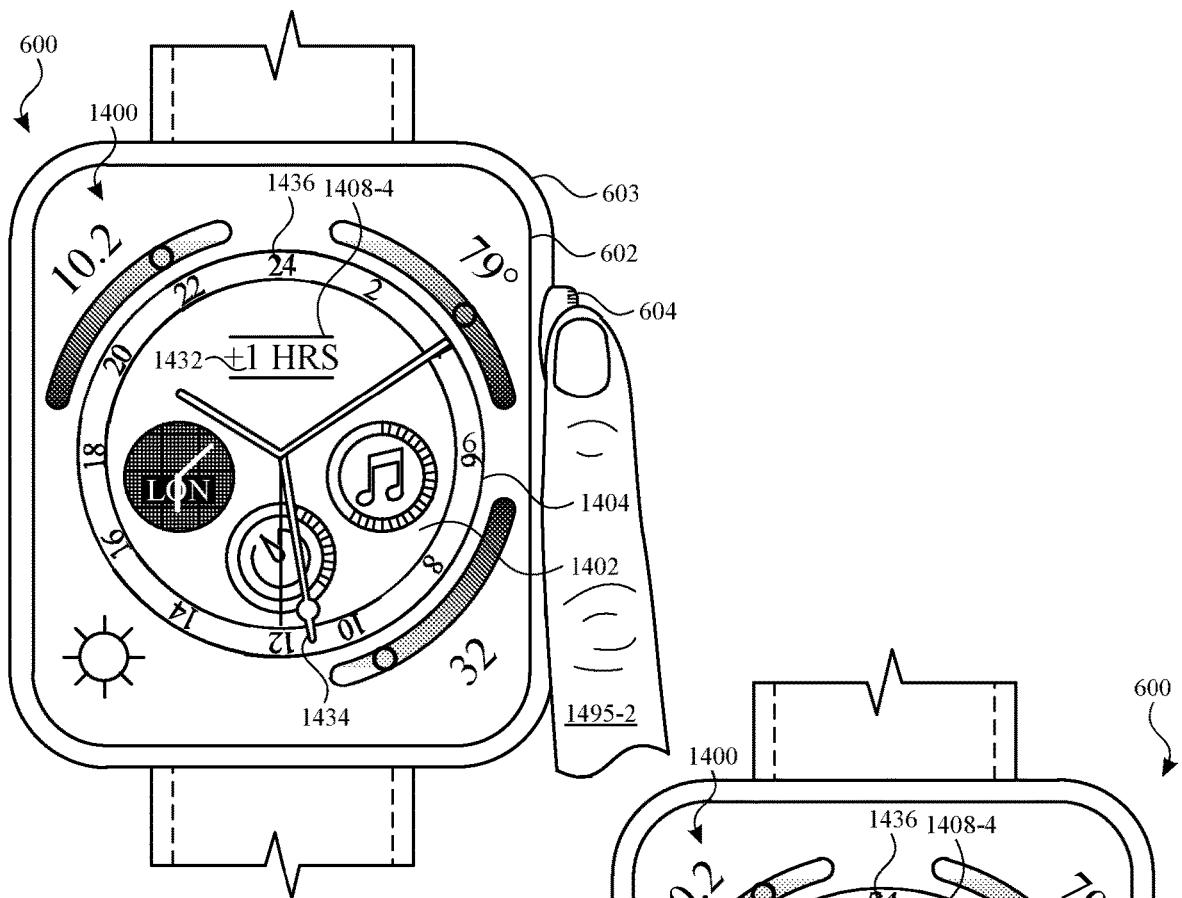
Figure 14T:
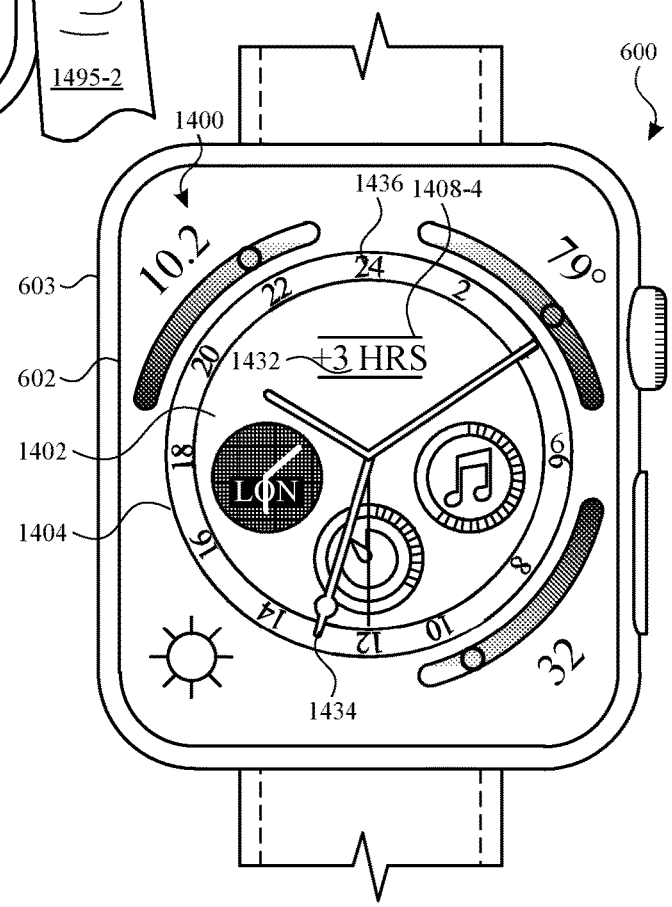

As illustrated in FIGS. 14R-14T, device 600 receives (e.g., detects) user input 1495, which includes rotation of rotatable input mechanism 604. In response to user input 1495, device 600 updates watch user interface 1400 by incrementing hour offset displayed on offset display 1432 (e.g. +0 HRS to +1 HRS to +3 HRs), and updating the position of GMT hand 1434 relative to GMT scale 1436 (e.g., GMT hand 1434 rotates around bezel to reflect change in offset).

Figure 14U:
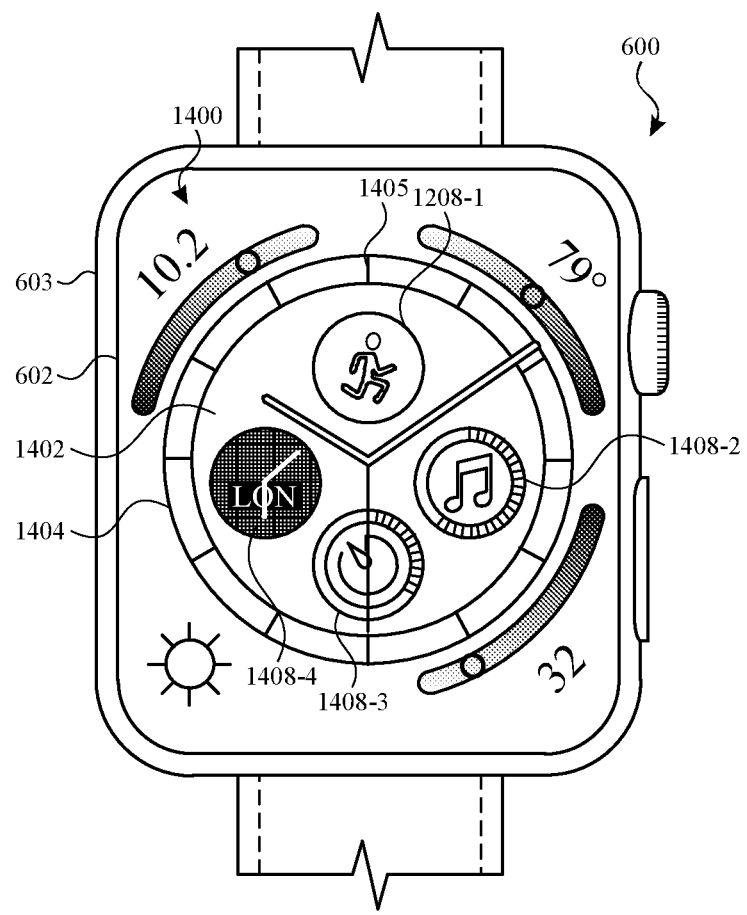

Similar to the process described in reference to FIGS. 14A-14D, a user can request to add a compact complication consisting of a single graphical element (e.g., a complication without associated bezel content such as workout complication 1208-1) in place of GMT complication 1408-4 by selecting complication 1408-4 (e.g., with a tap) in edit mode and moving rotatable input mechanism 604 to select the new complication 1208-1. FIG. 14U illustrates watch user interface 1400 after exiting edit mode (e.g., GMT hand 1434 is removed, offset display 1432 is replace by workout complication 1208-1, and GMT scale 1436 is replaced by hour markings 1405 on bezel 1404).

Figure 14V:
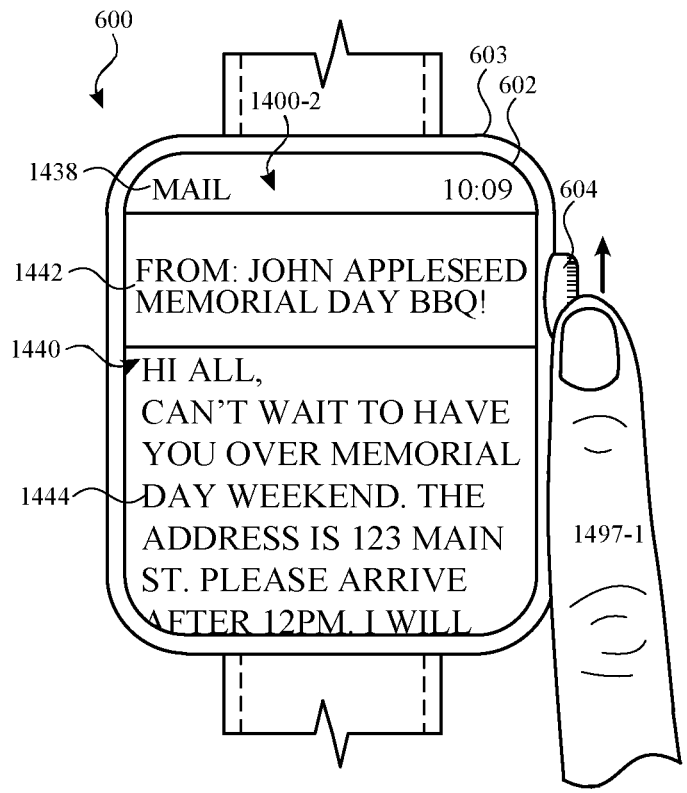

Turning now to FIGS. 14V-14AE, various functions associated with rotatable input mechanism 604 are described.

Figure 14W:
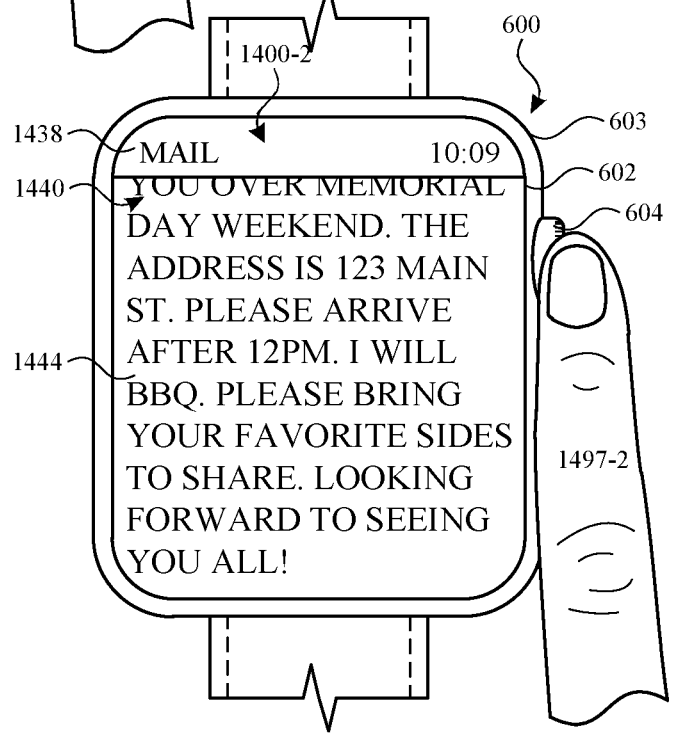
Figure 14A:
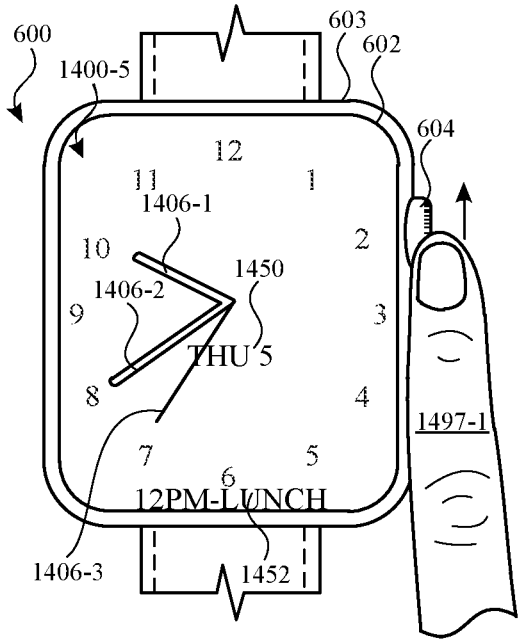
Figure 14A:
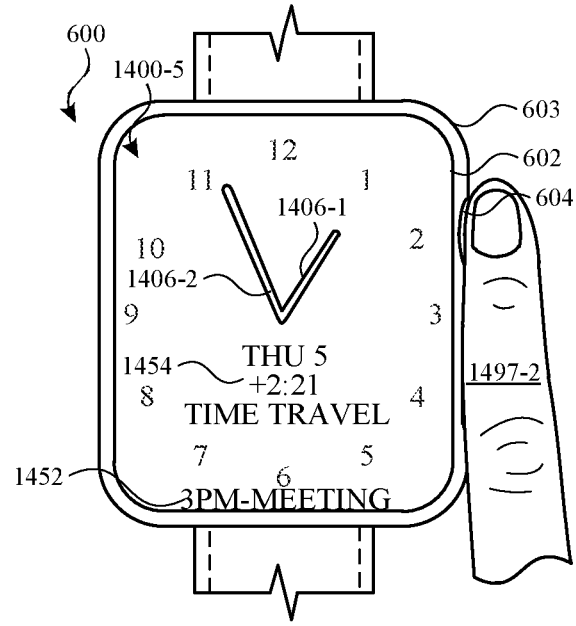
Figure 14A:
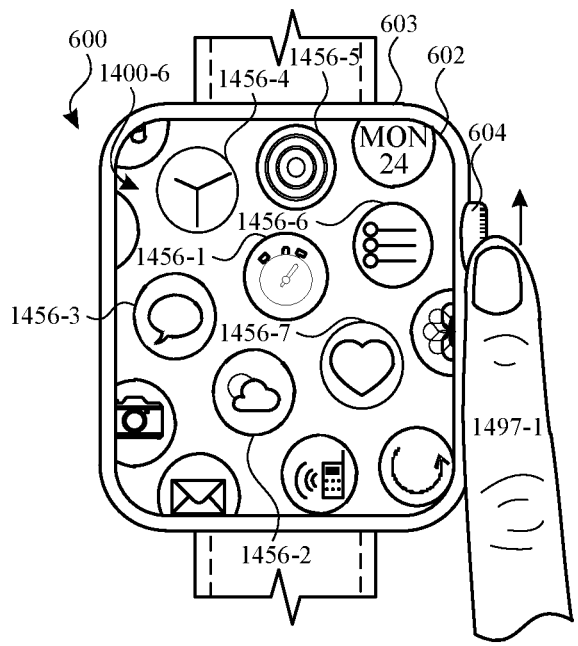
Figure 14A:
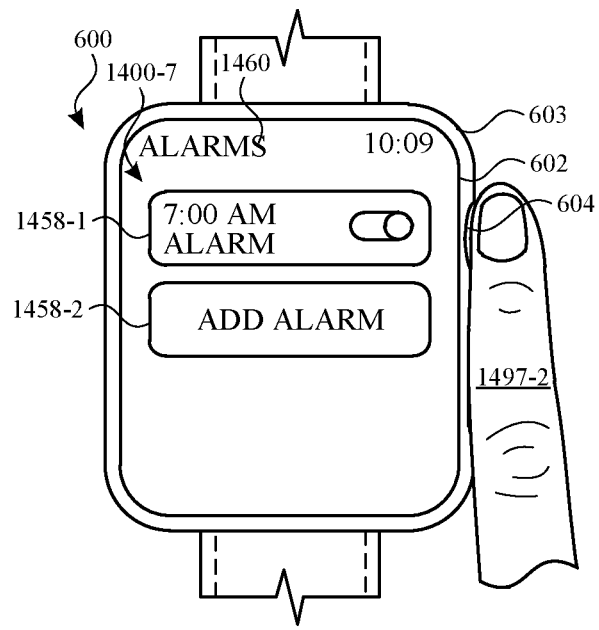

In FIG. 14V, device 600 displays mail application interface 1400-2 on display 602. Mail application interface 1400-2 includes application header 1438 (e.g., application label and indication of time), and content display area 1440. Content display area 1440 includes subject line 1442, and message content 1444. As illustrated in FIGS. 14V and 14W, device 600 receives (e.g., detects) user input 1497, which includes rotation of rotatable input mechanism 604. In response to user input 1497, device 600 updates mail application interface 1400-2 by translating subject line 1442 and message content 1444 (e.g., scrolling) upward from a first position on display 602 to a second position on display 602. As illustrated in FIG. 14W, subject line 1442 and/or message content 1444 is scrolled to a position outside of content display area 1440 and, as a result, are not displayed on display 602. In some embodiments, the direction of user input 1497 corresponds to the direction of translation of message content 1444 on display 602.

In FIG. 14X, device 600 displays application selection interface 1400-3 on display 602. Application selection interface 1400-3 includes a vertical list of application icons including activity icon 1446-1, alarm icon 1446-2, breathe icon 1446-3, and camera icon 1446-3 (collectively, "application icons 1446"). As illustrated in FIGS. 14X and 14V, device 600 receives (e.g., detects) user input 1497, which includes rotation of rotatable input mechanism 604. In response to user input 1497, device 600 updates application selection interface 1400-3 by translating application icons 1446 (e.g., scrolling) upward from a first position on display 602 to a second position on display 602. As illustrated in FIG. 14W, one or more application icons 1446 scroll to a position outside of display 602 and as a result are not displayed on display 602. In some embodiments, the direction of user input corresponds to the direction of translation of application icons 1446 on display 602.

In FIG. 14Z, display 602 of device 600 is off (e.g., screen is not displaying content or emitting light). As illustrated in FIG. 14Z, device 600 receives (e.g., detects) user input 1497, which includes rotation of rotatable input mechanism 604. In FIG. 14AA, in response to user input 1497, device 600 turns on display 602 (e.g., screen displays watch user interface 1400-4 including a clock face containing hour markings, indication of time, and date display).

FIG. 14AB illustrates device 600 displaying watch user interface 1400-5 including clock face 1402, indication of time (hour hand 1406-1, minute hand 1406-2, and second hand 1406-3) (e.g., indicating 10:40:35), and next appointment indicator 1452 (e.g., representing a user's next appointment relative to the displayed time on clock face 1402 is a 12 PM lunch). As illustrated in FIG. 14AB, device 600 receives (e.g., detects) user input 1497-1, which includes rotation of rotatable input mechanism 604. In response to receiving user input 1497-1, device 600 updates watch user interface 1400-5 (e.g., advancing the displayed indication of time proportional to input 1497-1). FIG. 14AC illustrates updated watch user interface 1400-5. Watch user interface 1400-5 includes time offset label 1454 (e.g., +2:21 Time Travel), indication of time (hour hand 1406-1, minute hand 1406-2, and second hand 1406-3) (e.g., indicating 1:55), and next appointment indicator 1452 (e.g., 3 PM—Meeting).

In FIG. 14AD, device 600 displays application selection interface 1400-6 on display 602. Application selection interface 1400-6 includes a collection of application icons including alarm icon 1456-1, weather icon 1456-2, messages icon 1456-3, clock icon 1456-4, activity icon 1456-5, to-do icon 1456-6, heart rate icon 1456-7, and calendar icon 1456-8 (collectively, "application icons 1456"). As illustrated in FIG. 14AD, device 600 receives (e.g., detects) user input 1497-1, which includes rotation of rotatable input mechanism 604. In response to user input 1497-1, device 600 updates application selection interface 1400-6 by launching the application corresponding to the application icon displayed closest to the center of display 602 (e.g., alarm icon). FIG. 14AE illustrates alarm application interface 1400-7 associated with the alarm application displayed on display 602. Alarm application interface 1400-7 includes an application label 1460 (e.g., alarms), indication of time (e.g. 10:09), alarm display 1458-1 (e.g. time, label, and on/off switch) and alarm generation affordance 1458-2.

Figure 15A:
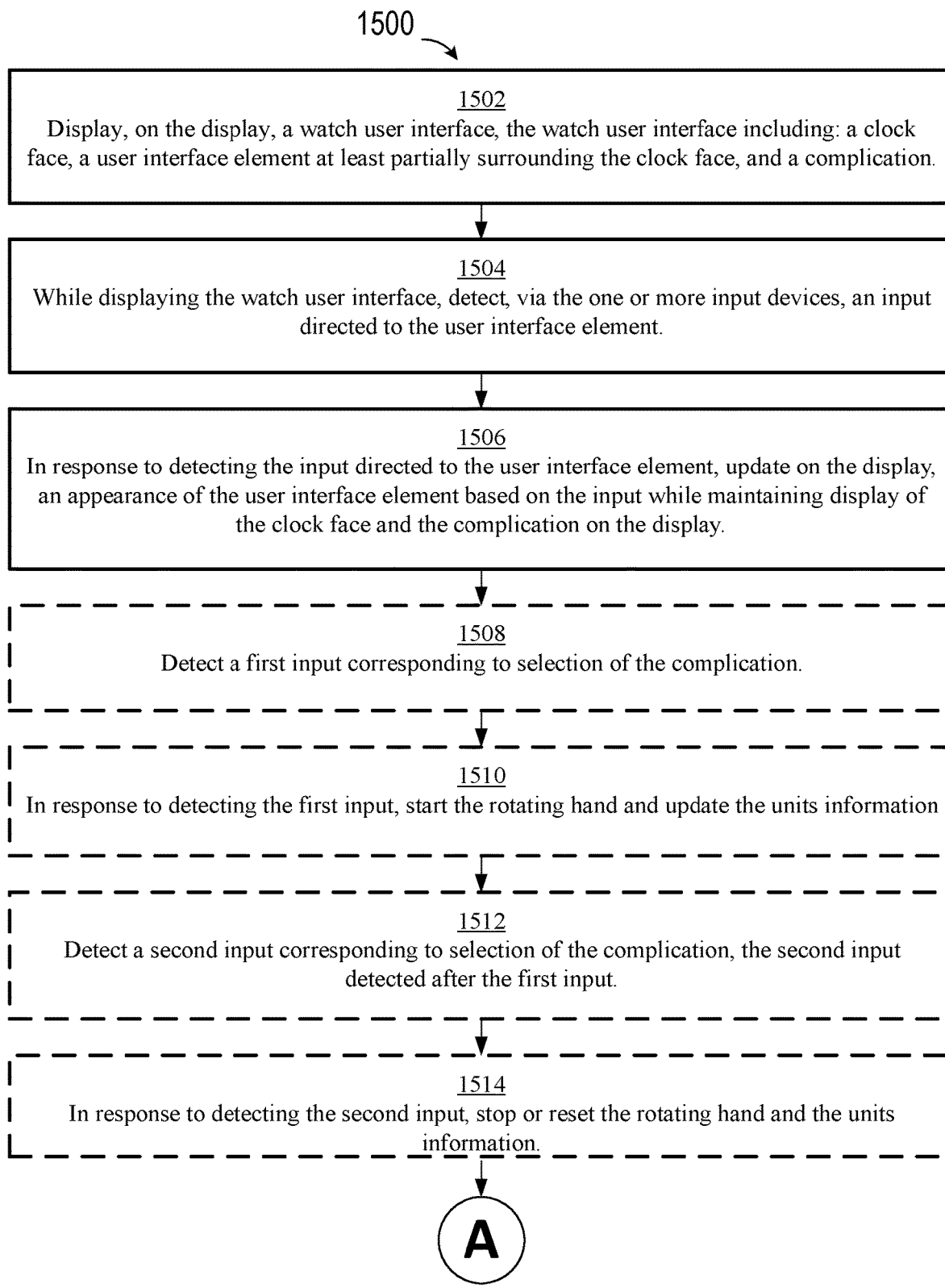
FIGS. 15A-15C illustrate a flow diagram depicting a method for providing context-specific user interfaces in accordance with some embodiments.
Figure 15B:
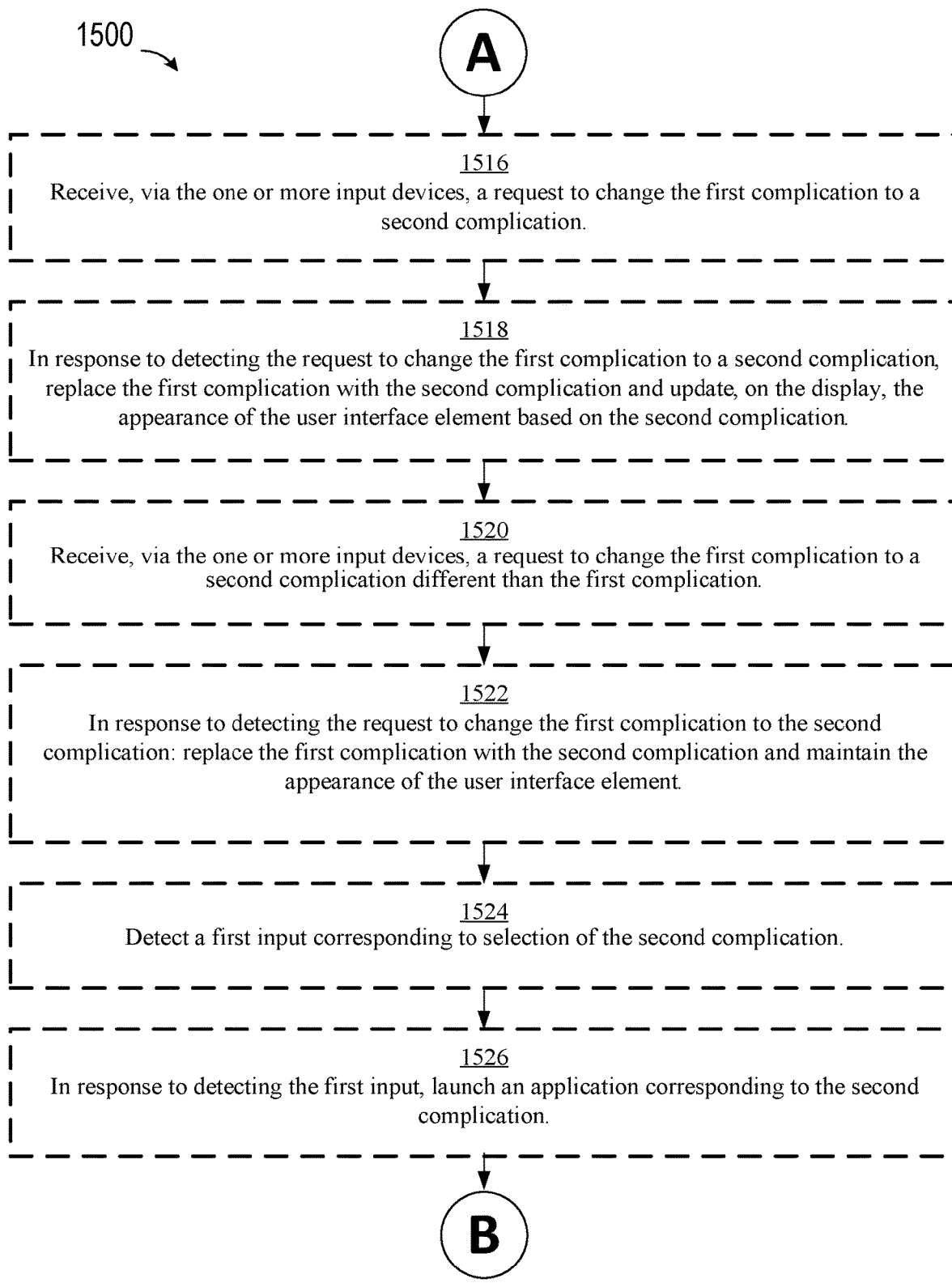
Figure 15C:
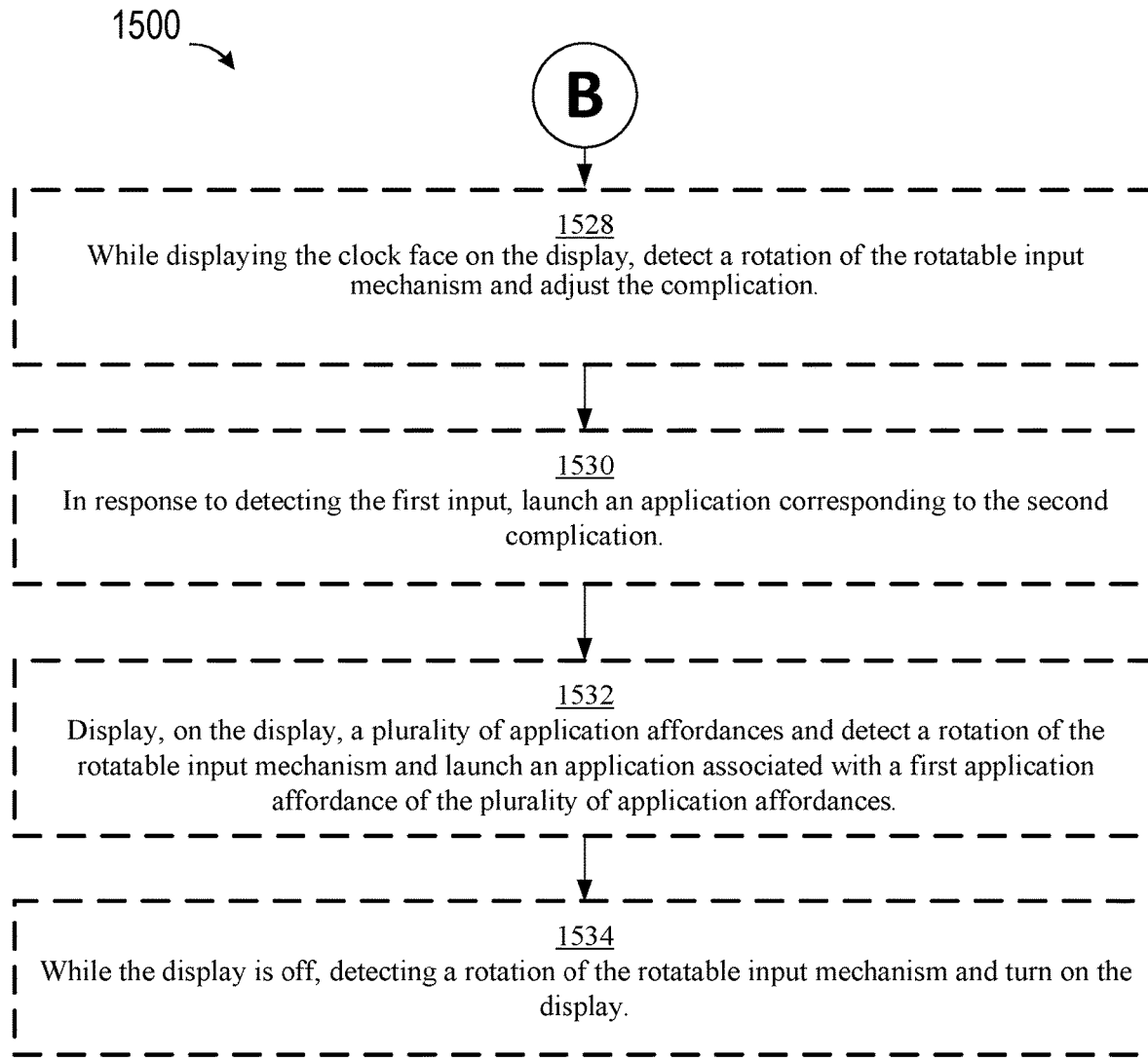

FIGS. 15A-15C are a flow diagram illustrating a method for providing context-specific user interfaces using an electronic device in accordance with some embodiments. Method 1500 is performed at a device (e.g., 100, 300, 500, or 600) with a display and one or more input devices. Some operations of method 1500 are, optionally, combined, the orders of some operations are, optionally, changed, and some operations are, optionally, omitted.

At block 1502, the device (e.g., 600) displays, on the display (e.g., 602), a watch user interface (e.g., 1400) including a clock face (e.g., 1402), a user interface element at least partially surrounding the clock face (e.g., 1404) (e.g., a watch face bezel) and a complication (e.g., 1408-1). In some embodiments, a complication, refers to any clock face feature other than those used to indicate the hours and minutes of a time (e.g., clock hands or hour/minute indications). In some embodiments, a complication includes an affordance that when selected launches a corresponding application (e.g., 1408-1, 1208-2, 1208-3, 1208-4). In some embodiments, complications provide data obtained from an application (e.g., 1408-1, 1208-2, 1208-3, 1208-4). In some embodiments, a complication is displayed at a fixed, predefined location on the display (e.g., 1408-1, 1208-2, 1208-3, and 1208-4). In some embodiments, the complication is displayed within the clock face (e.g., 1408-1, 1208-2, 1208-3, 1208-4) (e.g., completely within the clock face). In some embodiments, the complication is displayed between the user interface element and an edge of the display (e.g., 1212-1, 1212-2, 1212-3, and 1212-4).

Presenting information in a manner that conforms to space available on the clock face provides the user with enhanced visual feedback by keeping the user interface less cluttered. This enables the user focus their attention on fewer visual elements and as a result, more rapidly locate relevant information throughout the interface and interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

At block 1504, while displaying the watch user interface (e.g., 1400), the device detects, via one or more input devices (e.g., 604), an input directed to the user interface element (e.g., 1490, 1492, 1494, 1496). In some embodiments, the input directed to the user interface element includes a tap gesture at a location on the display corresponding to the user interface element (e.g., 1494, 1496).

At block 1506, in response to detecting the input directed to the user interface element, the device updates, on the display (e.g., 602), an appearance (e.g., 1405) of the user interface element (e.g., 1404) based on the input while maintaining display of the clock face (e.g., 1402) and the complication (e.g., 1408-2) on the display.

In some embodiments, in accordance with a determination that the complication is a complication of a first type (e.g., 1408-2, 1408-3, 1408-4), the user interface element includes a first visual characteristic (e.g., 1422, 1430) (e.g., a numeric scale) corresponding to first complication and in accordance with a determination that the complication is not a complication of the first type (e.g., 1408-1), the user interface element includes a second visual characteristic (e.g., 1405) (e.g., minute or hour tick marks) different than the first visual characteristic, where the second visual characteristic is independent from the complication (e.g., hour markers are independent from battery level, mail, messages, etc.). In some embodiments, the first complication is associated with content related to a tachymeter (e.g. FIG. 14E-14I), an offset (e.g., 1426) (e.g., diver bezel), or GMT time (e.g., FIGS. 14R-14T)). In some embodiments, the complication (e.g., a complication of a second type) is associated with a battery level or other types of application, such as calendar, mail, messages, etc.).

Automatically updating the appearance of a user interface element based on the type of complication provides the user with enhanced visual feedback by keeping the user interface less cluttered and only displaying relevant features. This enables the user focus their attention on fewer visual elements and as a result, more rapidly locate relevant information throughout the interface and interact more accurately with intended controls features on the display. This enhances the operability of the device and makes the user-device interface more efficient (e.g., by helping the user more quickly location information, and more accurately provide proper inputs and reducing user mistakes when operating/interacting with the device), which additionally reduces power usage and improves battery life of the device by enabling the user to use the device more quickly and efficiently.

In some embodiments, the user interface element (e.g., 1404) includes a scale indicating generic units (which can represent, e.g., miles, km, parts) per a predetermined unit of time (e.g., second, hour, day) and the clock face (e.g., 1402) includes a rotating hand (e.g., 1424) indicating a position on the scale (e.g., 1422) and the complication (e.g., 1408-2) includes units information (e.g., 1412) corresponding to the position on the scale (e.g., 1422) indicated by the rotating hand (e.g., 1424). In some embodiments, units information represents the amount of units per the predetermined unit of time based on an elapsed time.

Optionally, at block 1508, the device detects a first input (e.g., 1496) corresponding to selection of the complication and performs the operations of blocks 1510, 1512, and 1514. At block 1510, in response to detecting the first input, the device starts the rotating hand (e.g., 1424) and updates the units information (e.g., 1412). At block 1512, the device detects a second input corresponding to selection of the complication, the second input detected after the first input. At block 1514, in response to detecting the second input, the device stops or resets the rotating hand (e.g., 1424) and the units information (e.g., 1412). In some embodiments, starting the rotating hand (e.g., 1424) and updating the units displayed in the complication occurs without navigating to a corresponding application. In some embodiments, stopping or resetting the rotating hand and the units displayed in the complication occurs without navigating to a corresponding application.

In some embodiments, the complication is a first complication associated with content related to a tachymeter, an offset (e.g., diver bezel), or GMT time (e.g., 1408-2, 1408-3, 1408-4) and the device performs the operations of blocks 1516 and 1518. At block 1516, the device receives, via the one or more input devices (e.g., 604), a request (e.g., 1490, 1492) to change the first complication (e.g., 1408-1) to a second complication (e.g., 1408-2). In some embodiments, a first complication (e.g., a complication of a first type). In some embodiments, a second complication (e.g., a complication of a first type) is associated with content related to a tachymeter, an offset (e.g., diver bezel), or GMT time. In some embodiments, a second complication (e.g., a complication of a second type) is associated with a battery level or other types of application (e.g., calendar, mail, messages, etc.). At block 1518, in response to detecting the request to change the first complication to a second complication, the device replaces the first complication with the second complication and updates, on the display, the appearance of the user interface element based on the second complication (e.g., FIG. 14G).

In some embodiments, the complication is a first complication and the device performs the operations of block 1520 and 1522. In some embodiments, a first complication does not have a functionality tied to the user interface element (e.g., 1408-1, 1208-1). At block 1520, the device (e.g., 600) receives, via the one or more input devices (e.g., 604), a request to change the first complication to a second complication different than the first complication. In some embodiments, a second complication is a type of complication that does not have a functionality tied to the user interface element (e.g., 1408-1, 1208-1). In some embodiments, a second complication (e.g., a complication of a second type) is associated with a battery level or other types of application (e.g., calendar, mail, messages, etc.). At block 1522, in response to detecting the request to change the first complication to the second complication, the device replaces the first complication with the second complication and maintains the appearance of the user interface element. In some embodiments, a first complication (e.g., a complication of a first type) is associated with a battery level or other types of application, such as calendar, mail, messages, etc.).

In some embodiments, the complication is a first complication positioned at a first location of the watch user interface (e.g., 1408-2), the watch user interface includes a second complication different than the first complication positioned at a second location of the watch user interface different than the first location (e.g., 1208-2, 1208-3, 1208-4) and the device performs the operations of blocks 1524 and 1526. At block 1524, the device detects a first input corresponding to selection of the second complication and at block 1526, in response to detecting the first input, the device launches an application corresponding to the second complication.

In some embodiments, the one or more input devices includes a rotatable input mechanism (e.g., a mechanism that can rotate relative to a housing/body of the electronic device) and input directed to the user interface element includes a rotation of the rotatable input mechanism (e.g., 1492, 1493-1, 1493-2, 1495-1, 1495-2, 1498-1, 1498-2). In some embodiments, rotation of the rotatable input mechanism (e.g., 604) is about an axis parallel to the display (e.g., 602).

Optionally, at block 1528, the device, while displaying the clock face on the display (e.g., 602), detects a rotation of the rotatable input mechanism (e.g., 604) and in response to detecting the rotation of the rotatable input mechanism, adjusts the complication (e.g., FIGS. 14J-14K, 14N-14O, 14R-14T). In some embodiments, rotation of the rotatable input mechanism is about an axis parallel to the display (e.g., 602). In some embodiments, adjusting the complication includes changing the complication from a first complication to a second complication (e.g., FIGS. 14A-14F). In some embodiments, rotating the rotatable input mechanism updates the appearance of the user interface element in accordance with the adjustment of the complication (e.g., FIGS. 14N-14O) (e.g., for a watch face with a diver bezel and a corresponding complication, the user interface element is rotated relative to the clock face and the corresponding complication is adjusted to reflect the offset between an indication on the user interface element and the minute hand). In some embodiments, rotating the rotatable input mechanism (e.g., 604) updates the appearance of the clock face (e.g., 1402) in accordance with the adjustment of the complication (e.g., for a watch face with a GMT bezel and a corresponding complication, the GMT hand is rotated in accordance with an adjustment in an offset indicated by the complication (e.g., FIGS. 14R-14T).

Updating the positioning of multiple graphical elements on a display in response to analogous rotational input at a user input provides the user with feedback about how interactions with the device will change the configuration of user interface, this enables the user to choose their next input more efficiently. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1530, the device displays, on the display (e.g., 602), content different than the watch user interface (e.g., 1400-2, 1400-3) and while displaying the content different than the watch user interface, the device detects a rotation of the rotatable input mechanism (e.g., 604) and in response detecting the rotation of the rotatable input mechanism, the device scrolls the content on the display (e.g., FIGS. 14V-14W, 14X-14Y). In some embodiments, rotation of the rotatable input mechanism is about an axis parallel to the display.

Optionally, at block 1532, the device displays, on the display, a plurality of application affordances (e.g., 1456-1, 1456-2, 1456-3, 1456-4, 1456-5, 1456-6, 1456-7) (e.g., in a springboard/home screen user interface) and while displaying the plurality of application affordances, the device detects a rotation of the rotatable input mechanism (e.g., 604) and in response to detecting the rotation of the rotatable input mechanism, the devices launches an application (e.g., 1400-7) associated with a first application affordance (e.g., an affordance located at the center of the display) of the plurality of application affordances. In some embodiments, rotation of the rotatable input mechanism is about an axis parallel to the display. In some embodiments, in response to detecting the rotation, the electronic device initially zooms into a portion of the displayed plurality of application affordances and, upon further rotation, launches an application that corresponds to the centermost affordance.

Optionally, at block 1534, while the display is off (e.g., 602 of FIG. 14Z), the device detects a rotation of the rotatable input mechanism (e.g., 604) and in response to detecting the rotation of the rotatable input mechanism while the display is off, the device turns on the display (e.g., 602 of FIG. 14AA) (e.g., gradually turning on the display as the rotation of the rotatable input mechanism progresses optionally based on a speed or amount of rotation of the rotatable input mechanism). In some embodiments, rotation of the rotatable input mechanism is about an axis parallel to the display. Dynamically controlling the state of the display in response to user input allows the user to operate the device in manner where screen is off for periods of time thereby using less energy. This enables the device to conserve power and improves battery life.

In some embodiments, the user interface element includes a rotatable scale (e.g., 1430) and the complication includes a value (e.g., 1426) indicating the position of a hand on the clock face relative to the rotatable scale (e.g., the minutes offset between a marker (e.g., a red triangle) indicating the beginning of the scale and the position of the minute hand).

In some embodiments, the one or more input devices includes a rotatable input mechanism (e.g., a mechanism that can rotate relative to a housing/body of the electronic device) the device, while displaying the clock face on the display (e.g., 602), detects a rotation of the rotatable input mechanism (e.g., 604) and in response to detecting the rotation of the rotatable input mechanism, the device rotates the scale (e.g., 1430) of the user interface element on the display (e.g., to align a starting marker (e.g., 1428) (e.g., red arrow) with the minute hand). In some embodiments, rotation of the rotatable input mechanism is about an axis parallel to the display.

Automatically updating a visual characteristic, such as the position of one or more graphical elements in response to an input, provides the user with more control over the device by helping the user quickly configure display elements into a variety configurations without the requiring individual interactions with each element (e.g., first selecting an element, then relocating the element to another location on the display, individually adjusting nature of information displayed and repeating the steps for other elements are condensed into fewer operations that require user input). Reducing the number of inputs need to perform equivalent operations, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the complication includes an hours offset (e.g., 1432) from a predetermined time (e.g., local time or Greenwich Mean Time) and the user interface element (e.g., 1404) includes a time scale (e.g., 1430) (e.g., 24 hours) and the clock face (e.g., 1404) includes a hand (e.g., 1434) (e.g., the hand is a "GMT hand") that indicates a position on the time scale corresponding to the offset, wherein the hand rotates at a rate corresponding to the time scale. In some embodiments, the one or more input devices includes a rotatable input mechanism (e.g., a mechanism that can rotate relative to a housing/body of the electronic device) and while displaying the clock face on the display, the device detects a rotation of the rotatable input mechanism and in response to detecting the rotation of the rotatable input mechanism, the device changes the hours offset displayed at the complication and a position of the hand in accordance with the change in the hours offset (e.g., FIGS. 14R-14S). In some embodiments, the hand is a "GMT hand" or a hand representing any reference time zone. In some embodiments, rotation of the rotatable input mechanism is about an axis parallel to the display.

Automatically updating a visual characteristic, such as the position of one or more graphical elements in response to an input, provides the user with more control over the device by helping the user quickly configure display elements into a variety configurations without the requiring individual interactions with each element (e.g., first selecting an element, then relocating the element to another location on the display, individually adjusting nature of information displayed and repeating the steps for other elements are condensed into fewer operations that require user input). Reducing the number of inputs need to perform equivalent operations, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1500 (e.g., FIGS. 15A-15C) are also applicable in an analogous manner to the methods described above. For example, method 1500 optionally includes one or more of the characteristics of the various methods described above with reference to method 1100. For example, watch user interface 1400 of FIG. 14A can be configured to display three complications, including at least two metrics (e.g., complications 1008-1, 1008-2, and 1008-3 of FIG. 10A), in a manner analogous to techniques described with reference to method 1100. For brevity, these details are not repeated below.

As described above, one aspect of the present technology is the gathering and use of data available from various sources to provide insights into a user's general wellness. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide positive feedback to individuals using technology to pursue wellness goals. Accordingly, use of such personal information data enables users to pursue individually tailored fitness goals and otherwise, modify their behavior to improve a user's general wellness and health. Further, other uses for personal information data that benefit the user are also contemplated by the present disclosure. For instance, personal information data may be used to deliver targeted content that is of greater interest to the user.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, health and fitness applications, the present technology can be configured to allow users to select to "opt in" or "opt out" of participation in the collection of personal information data during registration for services or anytime thereafter. In another example, users can select not to provide data or records relating to a user's health or level of fitness (e.g., vital signs measurements, medication information, exercise information). In yet another example, users can select to limit the length of time health and fitness data is maintained or entirely prohibit the development of a baseline health or fitness profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, fitness goals can be selected and delivered to users by inferring exercise requirements based on non-personal information data or a bare minimum amount of personal information, such as non-personal information available to the health and fitness applications, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
    a display;
    one or more input devices;
    one or more processors; and
    memory storing one or more programs configured to be executed by the one or more processors, the one or more programs including instructions for:
        displaying, on the display, a watch user interface, the watch user interface including:
            a clock face; and
            a user interface element at least partially surrounding a portion of the clock face;
        receiving, via the one or more input devices, a request to add a respective complication to a respective location on the clock face; and
        in response to receiving the request to add the respective complication to the respective location on the clock face:
            in accordance with a determination that the respective complication is a first complication, displaying, on the display, the first complication in the respective location on the clock face and replacing at least a portion of the user interface element, that at least partially surrounds the portion of the clock face, with content associated with the first complication, wherein the content associated with the first complication includes first content, and wherein the first complication includes second content displayed in the respective location on the clock face, wherein the second content is associated with the first complication; and
            in accordance with a determination that the respective complication is a second complication, displaying, on the display, the second complication in the respective location on the clock face without replacing the portion of the user interface element with content associated with the second complication.

2. The electronic device of claim 1, wherein the first content represents data from an application and the second content represents data from the application that is different than the first content.

3. The electronic device of claim 1, wherein the first content includes textual information associated with the first complication.

4. The electronic device of claim 1, wherein the second complication consists of a single graphical element.

5. The electronic device of claim 1, wherein the respective location is contained entirely within the clock face.

6. The electronic device of claim 1, wherein the one or more programs further include instructions for:
    while displaying the content associated with the first complication in the portion of the user interface element, receiving an input corresponding to a location on the display; and
    in response to receiving the input corresponding to a location on the display:
        in accordance with the input corresponding to a location of the portion of the user interface element, launching an application associated with the first complication; and
        in accordance with the input corresponding to a location on the user interface element other than the portion of the user interface element, forgoing launching an application associated with the first complication.

7. The electronic device of claim 1, wherein a size of the portion of the user interface element is based on the content associated with the first complication.

8. The electronic device of claim 1, wherein the first complication includes date information displayed at the respective location on the clock face, and wherein the content associated with the first complication displayed at the portion of the user interface element includes information from an appointment.

9. The electronic device of claim 1, wherein the first complication includes first weather information displayed at the respective location on the clock face, and wherein the content associated with the first complication displayed at the portion of the user interface element includes second weather information different than the first weather information.

10. The electronic device of claim 1, wherein the first complication includes first exercise information displayed at the respective location on the clock face, and wherein the content associated with the first complication displayed at the portion of the user interface element includes second exercise information different than the first exercise information.

11. The electronic device of claim 1, wherein the first complication includes an affordance displayed at the respective location on the clock face and wherein the content associated with the first complication displayed at the portion of the user interface element includes heart rate information.

12. The electronic device of claim 1, wherein the first complication includes an affordance displayed at the respective location on the clock face and wherein the content associated with the first complication is displayed at the portion of the user interface includes meditation or mindfulness information.

13. The electronic device of claim 1, wherein the first complication includes first time information displayed at the respective location on the clock face, and wherein the content associated with the first complication displayed at the portion of the user interface element includes second time information different than the first time information.

14. A non-transitory computer-readable storage medium storing one or more programs configured to be executed by one or more processors of an electronic device with a display and one or more input devices, the one or more programs including instructions for:
    displaying, on the display, a watch user interface, the watch user interface including:
        a clock face; and
        a user interface element at least partially surrounding a portion of the clock face;
    receiving, via the one or more input devices, a request to add a respective complication to a respective location on the clock face; and
    in response to receiving the request to add the respective complication to the respective location on the clock face:
        in accordance with a determination that the respective complication is a first complication, displaying, on the display, the first complication in the respective location on the clock face and replacing at least a portion of the user interface element, that at least partially surrounds the portion of the clock face, with content associated with the first complication, wherein the content associated with the first complication includes first content, and wherein the first complication includes second content displayed in the respective location on the clock face, wherein the second content is associated with the first complication; and in accordance with a determination that the respective complication is a second complication, displaying, on the display, the second complication in the respective location on the clock face without replacing the portion of the user interface element with content associated with the second complication.

15. The non-transitory computer-readable storage medium of claim 14, wherein the first content represents data from an application and the second content represents data from the application that is different than the first content.

16. The non-transitory computer-readable storage medium of claim 14, wherein the first content includes textual information associated with the first complication.

17. The non-transitory computer-readable storage medium of claim 14, wherein the second complication consists of a single graphical element.

18. The non-transitory computer-readable storage medium of claim 14, wherein the respective location is contained entirely within the clock face.

19. The non-transitory computer-readable storage medium of claim 14, wherein the one or more programs further include instructions for:
while displaying the content associated with the first complication in the portion of the user interface element, receiving an input corresponding to a location on the display; and
in response to receiving the input corresponding to a location on the display:
in accordance with the input corresponding to a location of the portion of the user interface element, launching an application associated with the first complication; and
in accordance with the input corresponding to a location on the user interface element other than the portion of the user interface element, forgoing launching an application associated with the first complication.

20. The non-transitory computer-readable storage medium of claim 14, wherein a size of the portion of the user interface element is based on the content associated with the first complication.

21. The non-transitory computer-readable storage medium of claim 14, wherein the first complication includes date information displayed at the respective location on the clock face, and wherein the content associated with the first complication displayed at the portion of the user interface element includes information from an appointment.

22. The non-transitory computer-readable storage medium of claim 14, wherein the first complication includes first weather information displayed at the respective location on the clock face, and wherein the content associated with the first complication displayed at the portion of the user interface element includes second weather information different than the first weather information.

23. The non-transitory computer-readable storage medium of claim 14, wherein the first complication includes first exercise information displayed at the respective location on the clock face, and wherein the content associated with the first complication displayed at the portion of the user interface element includes second exercise information different than the first exercise information.

24. The non-transitory computer-readable storage medium of claim 14, wherein the first complication includes an affordance displayed at the respective location on the clock face and wherein the content associated with the first complication displayed at the portion of the user interface element includes heart rate information.

25. The non-transitory computer-readable storage medium of claim 14, wherein the first complication includes an affordance displayed at the respective location on the clock face and wherein the content associated with the first complication is displayed at the portion of the user interface includes meditation or mindfulness information.

26. The non-transitory computer-readable storage medium of claim 14, wherein the first complication includes first time information displayed at the respective location on the clock face, and wherein the content associated with the first complication displayed at the portion of the user interface element includes second time information different than the first time information.

27. A method, comprising:
at an electronic device with a display and one or more input devices:
displaying, on the display, a watch user interface, the watch user interface including:
a clock face; and
a user interface element at least partially surrounding a portion of the clock face;
receiving, via the one or more input devices, a request to add a respective complication to a respective location on the clock face;
in response to receiving the request to add the respective complication to the respective location on the clock face, performing one or more operations including:
in accordance with a determination that the respective complication is a first complication, displaying, on the display, the first complication in the respective location on the clock face and replacing at least a portion of the user interface element, that at least partially surrounds the portion of the clock face, with content associated with the first complication, wherein the content associated with the first complication includes first content, and wherein the first complication includes second content displayed in the respective location on the clock face, wherein the second content is associated with the first complication; and
in accordance with a determination that the respective complication is a second complication, displaying, on the display, the second complication in the respective location on the clock face without replacing the portion of the user interface element with content associated with the second complication; and
repeating the displaying the watch user interface and receiving the request to add the respective complication to the respective location on the clock face and performing the one or more operations multiple times including:
at least one time where the first complication is added to the respective location on the clock face; and
at least one time where the second complication is added to the respective location on the clock face.

28. The method of claim 27, wherein the first content represents data from an application and the second content represents data from the application that is different than the first content.

29. The method of claim 27, wherein the first content includes textual information associated with the first complication.

30. The method of claim 27, wherein the second complication consists of a single graphical element.

31. The method of claim 27, wherein the respective location is contained entirely within the clock face.

32. The method of claim 27, further comprising:
while displaying the content associated with the first complication in the portion of the user interface element, receiving an input corresponding to a location on the display; and
in response to receiving the input corresponding to a location on the display:
in accordance with the input corresponding to a location of the portion of the user interface element, launching an application associated with the first complication; and
in accordance with the input corresponding to a location on the user interface element other than the portion of the user interface element, forgoing launching an application associated with the first complication.

33. The method of claim 27, wherein a size of the portion of the user interface element is based on the content associated with the first complication.

34. The method of claim 27, wherein the first complication includes date information displayed at the respective location on the clock face, and wherein the content associated with the first complication displayed at the portion of the user interface element includes information from an appointment.

35. The method of claim 27, wherein the first complication includes first weather information displayed at the respective location on the clock face, and wherein the content associated with the first complication displayed at the portion of the user interface element includes second weather information different than the first weather information.

36. The method of claim 27, wherein the first complication includes first exercise information displayed at the respective location on the clock face, and wherein the content associated with the first complication displayed at the portion of the user interface element includes second exercise information different than the first exercise information.

37. The method of claim 27, wherein the first complication includes an affordance displayed at the respective location on the clock face and wherein the content associated with the first complication displayed at the portion of the user interface element includes heart rate information.

38. The method of claim 27, wherein the first complication includes an affordance displayed at the respective location on the clock face and wherein the content associated with the first complication is displayed at the portion of the user interface includes meditation or mindfulness information.

39. The method of claim 27, wherein the first complication includes first time information displayed at the respective location on the clock face, and wherein the content associated with the first complication displayed at the portion of the user interface element includes second time information different than the first time information.

* * * * *